US008622133B2

(12) United States Patent
Kaminsky

(10) Patent No.: US 8,622,133 B2
(45) Date of Patent: Jan. 7, 2014

(54) RESISTIVE HEATER FOR IN SITU FORMATION HEATING

(75) Inventor: Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 620 days.

(21) Appl. No.: 12/075,087

(22) Filed: Mar. 7, 2008

(65) Prior Publication Data

US 2008/0230219 A1 Sep. 25, 2008

Related U.S. Application Data

(60) Provisional application No. 60/919,430, filed on Mar. 22, 2007.

(51) Int. Cl.
*E21B 36/00* (2006.01)
*E21B 43/24* (2006.01)

(52) U.S. Cl.
USPC ............................................. 166/302; 166/60

(58) Field of Classification Search
USPC .......................................................... 166/60
See application file for complete search history.

(56) References Cited

U.S. PATENT DOCUMENTS

| 363,419 | A | 5/1887 | Poetsch |
| 895,612 | A | 8/1908 | Baker |
| 1,342,780 | A | 6/1920 | Vedder |
| 1,422,204 | A | 7/1922 | Hoover et al. |
| 1,666,488 | A | 4/1928 | Crawshaw |
| 1,701,884 | A | 2/1929 | Hogle |
| 1,872,906 | A | 8/1932 | Doherty |
| 2,033,560 | A | 3/1936 | Wells |
| 2,033,561 | A | 3/1936 | Wells |
| 2,534,737 | A | 12/1950 | Rose |
| 2,584,605 | A | 2/1952 | Merriam et al. |
| 2,634,961 | A | 4/1953 | Ljungstrom |
| 2,732,195 | A | 1/1956 | Ljungstrom |

(Continued)

FOREIGN PATENT DOCUMENTS

| CA | 994694 | 8/1976 |
| CA | 1288043 | 8/1991 |

(Continued)

OTHER PUBLICATIONS

EP Search Report RS 115432 dated Jul. 5, 2007.

(Continued)

*Primary Examiner* — Angela M DiTrani
(74) *Attorney, Agent, or Firm* — ExxonMobil Upstream Research Company-Law Department

(57) ABSTRACT

One embodiment of the method includes providing an electrically conductive first member in a wellbore located in a subsurface formation, and also providing an electrically conductive second member in the wellbore. The method also includes providing an electrically conductive granular material in the wellbore. The granular material is positioned so as to provide an electrical connection between the first member and the second member. An electrical current is established across the first member, the granular material and the second member so as to generate resistive heat within the granular material. The surrounding subsurface formation is thereby conductively heated so as to cause formation hydrocarbons in the formation to be heated, and in some cases, pyrolyzed to form hydrocarbon fluids. Preferably, the subsurface formation is an organic-rich rock formation, including, for example, an oil shale formation.

12 Claims, 34 Drawing Sheets

(56) References Cited

U.S. PATENT DOCUMENTS

| | | | |
|---|---|---|---|
| 2,777,679 A | 1/1957 | Ljungstrom | |
| 2,780,450 A | 2/1957 | Ljungstrom | |
| 2,795,279 A | 6/1957 | Sarapuu | |
| 2,812,160 A | 11/1957 | West et al. | |
| 2,813,583 A | 11/1957 | Marx et al. | |
| 2,847,071 A | 8/1958 | De Priester | |
| 2,887,160 A | 5/1959 | De Priester | |
| 2,895,555 A | 7/1959 | De Priester | |
| 2,923,535 A | 2/1960 | Ljungstrom | |
| 2,944,803 A | 7/1960 | Hanson | |
| 2,952,450 A | 9/1960 | Purre | |
| 2,974,937 A | 3/1961 | Kiel | |
| 3,004,601 A | 10/1961 | Bodine | |
| 3,013,609 A | 12/1961 | Brink | |
| 3,095,031 A | 6/1963 | Eurenius et al. | |
| 3,106,244 A | 10/1963 | Parker | |
| 3,109,482 A | 11/1963 | O'Brien | |
| 3,127,936 A | 4/1964 | Eurenius | |
| 3,137,347 A * | 6/1964 | Parker | 166/248 |
| 3,149,672 A | 9/1964 | Orkiszewski et al. | |
| 3,170,815 A | 2/1965 | White | |
| 3,180,411 A | 4/1965 | Parker | |
| 3,183,675 A | 5/1965 | Schroeder | |
| 3,183,971 A | 5/1965 | McEver et al. | |
| 3,194,315 A | 7/1965 | Rogers | |
| 3,205,942 A | 9/1965 | Sandberg | |
| 3,225,829 A | 12/1965 | Chown et al. | |
| 3,228,869 A | 1/1966 | Irish | |
| 3,241,611 A | 3/1966 | Dougan | |
| 3,241,615 A | 3/1966 | Brandt et al. | |
| 3,254,721 A | 6/1966 | Smith et al. | |
| 3,256,935 A | 6/1966 | Nabor et al. | |
| 3,263,211 A | 7/1966 | Heidman | |
| 3,267,680 A | 8/1966 | Schlumberger | |
| 3,271,962 A | 9/1966 | Dahms et al. | |
| 3,284,281 A | 11/1966 | Thomas | |
| 3,285,335 A | 11/1966 | Reistle, Jr. | |
| 3,288,648 A | 11/1966 | Jones | |
| 3,294,167 A | 12/1966 | Vogel | |
| 3,295,328 A | 1/1967 | Bishop | |
| 3,323,840 A | 6/1967 | Mason et al. | |
| 3,358,756 A | 12/1967 | Vogel | |
| 3,372,550 A | 3/1968 | Schroeder | |
| 3,376,403 A | 4/1968 | Mircea | |
| 3,382,922 A | 5/1968 | Needham | |
| 3,400,762 A | 9/1968 | Peacock et al. | |
| 3,436,919 A | 4/1969 | Shock et al. | |
| 3,439,744 A | 4/1969 | Bradley | |
| 3,468,376 A | 9/1969 | Slusser et al. | |
| 3,500,913 A | 3/1970 | Nordgren et al. | |
| 3,501,201 A | 3/1970 | Closmann et al. | |
| 3,502,372 A | 3/1970 | Prats | |
| 3,513,914 A | 5/1970 | Vogel | |
| 3,515,213 A | 6/1970 | Prats | |
| 3,516,495 A | 6/1970 | Patton | |
| 3,521,709 A | 7/1970 | Needham | |
| 3,528,252 A | 9/1970 | Gail | |
| 3,528,501 A | 9/1970 | Parker | |
| 3,547,193 A | 12/1970 | Gill | |
| 3,559,737 A | 2/1971 | Ralstin | |
| 3,572,838 A | 3/1971 | Templeton | |
| 3,599,714 A | 8/1971 | Messman | |
| 3,602,310 A | 8/1971 | Halbert | |
| 3,613,785 A | 10/1971 | Closmann et al. | |
| 3,620,300 A | 11/1971 | Crowson | |
| 3,642,066 A | 2/1972 | Gill | |
| 3,661,423 A | 5/1972 | Garret | |
| 3,692,111 A | 9/1972 | Breithaupt et al. | |
| 3,695,354 A | 10/1972 | Dilgren et al. | |
| 3,700,280 A | 10/1972 | Papadopoulos et al. | |
| 3,724,225 A | 4/1973 | Mancini et al. | |
| 3,729,965 A | 5/1973 | Gartner | |
| 3,730,270 A | 5/1973 | Allred | |
| 3,739,851 A | 6/1973 | Beard | |
| 3,741,306 A | 6/1973 | Papadopoulos | |
| 3,759,328 A | 9/1973 | Ueber et al. | |
| 3,759,329 A | 9/1973 | Ross | |
| 3,759,574 A | 9/1973 | Beard | |
| 3,779,601 A | 12/1973 | Beard | |
| 3,880,238 A | 4/1975 | Tham et al. | |
| 3,882,937 A | 5/1975 | Robinson | |
| 3,882,941 A | 5/1975 | Pelofsky | |
| 3,888,307 A | 6/1975 | Closmann | |
| 3,924,680 A | 12/1975 | Terry | |
| 3,943,722 A | 3/1976 | Ross | |
| 3,950,029 A | 4/1976 | Timmins | |
| 3,958,636 A | 5/1976 | Perkins | |
| 3,967,853 A | 7/1976 | Closmann et al. | |
| 3,978,920 A | 9/1976 | Bandyopadhyay | |
| 3,999,607 A | 12/1976 | Pennington et al. | |
| 4,003,432 A | 1/1977 | Paull et al. | |
| 4,005,750 A | 2/1977 | Shuck | |
| 4,007,786 A | 2/1977 | Schlinger | |
| 4,008,762 A | 2/1977 | Fisher et al. | |
| 4,008,769 A | 2/1977 | Chang | |
| 4,014,575 A | 3/1977 | French et al. | |
| 4,030,549 A | 6/1977 | Bouck | |
| 4,037,655 A | 7/1977 | Carpenter | |
| 4,043,393 A | 8/1977 | Fisher et al. | |
| 4,047,760 A | 9/1977 | Ridley | |
| 4,057,510 A | 11/1977 | Crouch et al. | |
| 4,065,183 A | 12/1977 | Hill et al. | |
| 4,067,390 A | 1/1978 | Camacho et al. | |
| 4,069,868 A | 1/1978 | Terry | |
| 4,071,278 A | 1/1978 | Carpenter et al. | |
| 4,093,025 A | 6/1978 | Terry | |
| 4,096,034 A | 6/1978 | Anthony | |
| 4,125,159 A | 11/1978 | Vann | |
| 4,140,180 A | 2/1979 | Bridges et al. | |
| 4,149,595 A | 4/1979 | Cha | |
| 4,160,479 A | 7/1979 | Richardson et al. | |
| 4,163,475 A | 8/1979 | Cha et al. | |
| 4,167,291 A | 9/1979 | Ridley | |
| 4,169,506 A | 10/1979 | Berry | |
| 4,185,693 A | 1/1980 | Crumb et al. | |
| 4,186,801 A | 2/1980 | Madgavkar et al. | |
| 4,202,168 A | 5/1980 | Acheson et al. | |
| 4,239,283 A | 12/1980 | Ridley | |
| 4,246,966 A | 1/1981 | Stoddard et al. | |
| 4,250,230 A | 2/1981 | Terry | |
| 4,265,310 A | 5/1981 | Britton et al. | |
| 4,271,905 A | 6/1981 | Redford et al. | |
| 4,272,127 A | 6/1981 | Hutchins et al. | |
| 4,285,401 A | 8/1981 | Erickson | |
| 4,318,723 A | 3/1982 | Holmes et al. | |
| 4,319,635 A | 3/1982 | Jones | |
| 4,320,801 A | 3/1982 | Rowland et al. | |
| 4,324,291 A | 4/1982 | Wong et al. | |
| 4,340,934 A | 7/1982 | Segesman | |
| 4,344,485 A | 8/1982 | Butler | |
| 4,358,222 A | 11/1982 | Landau | |
| 4,362,213 A | 12/1982 | Tabor | |
| 4,368,921 A | 1/1983 | Hutchins | |
| 4,369,842 A | 1/1983 | Cha | |
| 4,372,615 A | 2/1983 | Ricketts | |
| 4,375,302 A | 3/1983 | Kalmar | |
| 4,384,614 A | 5/1983 | Justheim | |
| 4,397,502 A | 8/1983 | Hines | |
| 4,401,162 A | 8/1983 | Osborne | |
| 4,412,585 A | 11/1983 | Bouck | |
| 4,417,449 A | 11/1983 | Hegarty et al. | |
| 4,468,376 A | 8/1984 | Suggitt | |
| 4,472,935 A | 9/1984 | Acheson et al. | |
| 4,473,114 A | 9/1984 | Bell et al. | |
| 4,474,238 A | 10/1984 | Gentry et al. | |
| 4,483,398 A | 11/1984 | Peters et al. | |
| 4,485,869 A | 12/1984 | Sresty et al. | |
| 4,487,257 A | 12/1984 | Dauphine | |
| 4,487,260 A | 12/1984 | Pittman et al. | |
| 4,495,056 A | 1/1985 | Venardos | |
| 4,511,382 A | 4/1985 | Valencia et al. | |
| 4,532,991 A | 8/1985 | Hoekstra et al. | |
| 4,533,372 A | 8/1985 | Valencia et al. | |
| 4,537,067 A | 8/1985 | Sharp et al. | |

(56) References Cited

U.S. PATENT DOCUMENTS

| | | |
|---|---|---|
| 4,545,435 A | 10/1985 | Bridges et al. |
| 4,546,829 A | 10/1985 | Martin et al. |
| 4,550,779 A | 11/1985 | Zakiewicz |
| 4,552,214 A | 11/1985 | Forgac et al. |
| 4,567,945 A | 2/1986 | Segalman |
| 4,585,063 A | 4/1986 | Venardos et al. |
| 4,589,491 A | 5/1986 | Perkins |
| 4,589,973 A | 5/1986 | Minden |
| 4,602,144 A | 7/1986 | Vogel |
| 4,607,488 A | 8/1986 | Karinthi et al. |
| 4,626,665 A | 12/1986 | Fort, III |
| 4,633,948 A | 1/1987 | Closmann |
| 4,634,315 A | 1/1987 | Owen et al. |
| 4,637,464 A | 1/1987 | Forgac et al. |
| 4,640,352 A | 2/1987 | Vanmeurs et al. |
| 4,671,863 A | 6/1987 | Tejeda |
| 4,694,907 A | 9/1987 | Stahl et al. |
| 4,704,514 A | 11/1987 | Van Egmond et al. |
| 4,705,108 A | 11/1987 | Little et al. |
| 4,706,751 A | 11/1987 | Gondouin |
| 4,730,671 A | 3/1988 | Perkins |
| 4,737,267 A | 4/1988 | Pao et al. |
| 4,747,642 A | 5/1988 | Gash et al. |
| 4,754,808 A | 7/1988 | Harmon et al. |
| 4,776,638 A | 10/1988 | Hahn |
| 4,779,680 A | 10/1988 | Sydansk |
| 4,815,790 A | 3/1989 | Rosar et al. |
| 4,817,711 A | 4/1989 | Jeambey |
| 4,828,031 A | 5/1989 | Davis |
| 4,860,544 A | 8/1989 | Krieg et al. |
| 4,886,118 A | 12/1989 | Van Meurs et al. |
| 4,923,493 A | 5/1990 | Valencia et al. |
| 4,926,941 A | 5/1990 | Glandt et al. |
| 4,928,765 A | 5/1990 | Nielson |
| 4,929,341 A | 5/1990 | Thirumalachar et al. |
| 4,974,425 A | 12/1990 | Krieg et al. |
| 5,016,709 A | 5/1991 | Combe et al. |
| 5,036,918 A | 8/1991 | Jennings et al. |
| 5,050,386 A | 9/1991 | Krieg et al. |
| 5,055,030 A | 10/1991 | Schirmer |
| 5,055,180 A | 10/1991 | Klaila |
| 5,082,055 A | 1/1992 | Hemsath |
| 5,085,276 A | 2/1992 | Rivas et al. |
| 5,117,908 A | 6/1992 | Hofmann |
| 5,120,338 A | 6/1992 | Potts, Jr. et al. |
| 5,217,076 A | 6/1993 | Masek |
| 5,236,039 A | 8/1993 | Edelstein |
| 5,255,742 A | 10/1993 | Mikus |
| 5,275,063 A | 1/1994 | Steiger et al. |
| 5,297,420 A | 3/1994 | Gilliland |
| 5,297,626 A | 3/1994 | Vinegar et al. |
| 5,305,829 A | 4/1994 | Kumar |
| 5,372,708 A | 12/1994 | Gewertz |
| 5,377,756 A | 1/1995 | Northrop et al. |
| 5,392,854 A | 2/1995 | Vinegar et al. |
| 5,411,089 A | 5/1995 | Vinegar et al. |
| 5,416,257 A | 5/1995 | Peters |
| 5,620,049 A | 4/1997 | Gipson et al. |
| 5,621,844 A | 4/1997 | Bridges |
| 5,661,977 A | 9/1997 | Shnell |
| 5,730,550 A | 3/1998 | Andersland et al. |
| 5,838,634 A | 11/1998 | Jones et al. |
| 5,844,799 A | 12/1998 | Joseph et al. |
| 5,868,202 A | 2/1999 | Hsu |
| 5,899,269 A | 5/1999 | Wellington et al. |
| 5,905,657 A | 5/1999 | Celniker |
| 5,907,662 A * | 5/1999 | Buettner et al. ............. 392/301 |
| 5,956,971 A | 9/1999 | Cole et al. |
| 6,015,015 A | 1/2000 | Luft et al. |
| 6,016,867 A | 1/2000 | Gregoli et al. |
| 6,023,554 A | 2/2000 | Vinegar et al. |
| 6,055,803 A | 5/2000 | Mastronarde |
| 6,056,057 A | 5/2000 | Vinegar et al. |
| 6,079,499 A | 6/2000 | Mikus et al. |
| 6,148,911 A | 11/2000 | Gipson et al. |
| 6,158,517 A | 12/2000 | Hsu |
| 6,246,963 B1 | 6/2001 | Cross et al. |
| 6,247,358 B1 | 6/2001 | Dos Santos |
| 6,328,104 B1 | 12/2001 | Graue |
| 6,434,435 B1 | 8/2002 | Tubel et al. |
| 6,434,436 B1 | 8/2002 | Adamy et al. |
| 6,480,790 B1 | 11/2002 | Calvert et al. |
| 6,540,018 B1 * | 4/2003 | Vinegar et al. ............. 166/60 |
| 6,581,684 B2 | 6/2003 | Wellington et al. |
| 6,585,046 B2 | 7/2003 | Neuroth et al. |
| 6,589,303 B1 | 7/2003 | Lokhandwale et al. |
| 6,591,906 B2 | 7/2003 | Wellington et al. |
| 6,607,036 B2 | 8/2003 | Ranson et al. |
| 6,609,761 B1 | 8/2003 | Ramey et al. |
| 6,668,922 B2 | 12/2003 | Ziauddin et al. |
| 6,684,644 B2 | 2/2004 | Mittricker et al. |
| 6,684,948 B1 | 2/2004 | Savage |
| 6,708,758 B2 | 3/2004 | de Rouffignac et al. |
| 6,709,573 B2 | 3/2004 | Smith |
| 6,712,136 B2 | 3/2004 | de Rouffignac et al. |
| 6,715,546 B2 | 4/2004 | Vinegar et al. |
| 6,722,429 B2 | 4/2004 | de Rouffignac et al. |
| 6,742,588 B2 | 6/2004 | Wellington et al. |
| 6,745,831 B2 | 6/2004 | De Rouffignac et al. |
| 6,745,832 B2 | 6/2004 | Wellington et al. |
| 6,752,210 B2 | 6/2004 | de Rouffignac et al. |
| 6,754,588 B2 | 6/2004 | Cross et al. |
| 6,764,108 B2 | 7/2004 | Ernst et al. |
| 6,782,947 B2 | 8/2004 | de Rouffignac et al. |
| 6,796,139 B2 | 9/2004 | Briley et al. |
| 6,820,689 B2 | 11/2004 | Sarada |
| 6,832,485 B2 | 12/2004 | Sugarmen et al. |
| 6,854,929 B2 | 2/2005 | Vinegar et al. |
| 6,858,049 B2 | 2/2005 | Mittricker |
| 6,877,555 B2 | 4/2005 | Karanikas et al. |
| 6,880,633 B2 | 4/2005 | Wellington et al. |
| 6,887,369 B2 | 5/2005 | Moulton et al. |
| 6,896,053 B2 | 5/2005 | Berchenko et al. |
| 6,896,707 B2 | 5/2005 | O'Rear et al. |
| 6,913,078 B2 | 7/2005 | Shahin et al. |
| 6,918,444 B2 | 7/2005 | Passey et al. |
| 6,923,258 B2 | 8/2005 | Wellington et al. |
| 6,932,155 B2 | 8/2005 | Vinegar et al. |
| 6,948,562 B2 | 9/2005 | Wellington et al. |
| 6,951,247 B2 | 10/2005 | De Rouffignac et al. |
| 6,953,087 B2 | 10/2005 | de Rouffignac et al. |
| 6,964,300 B2 | 11/2005 | Vinegar et al. |
| 6,969,123 B2 | 11/2005 | Vinegar et al. |
| 6,988,549 B1 | 1/2006 | Babcock |
| 6,994,160 B2 | 2/2006 | Wellington et al. |
| 6,997,518 B2 | 2/2006 | Vinegar et al. |
| 7,001,519 B2 | 2/2006 | Linden et al. |
| 7,004,247 B2 | 2/2006 | Cole et al. |
| 7,004,251 B2 | 2/2006 | Ward et al. |
| 7,011,154 B2 | 3/2006 | Maher et al. |
| 7,028,543 B2 | 4/2006 | Hardage et al. |
| 7,032,660 B2 | 4/2006 | Vinegar et al. |
| 7,036,583 B2 | 5/2006 | de Rouffignac et al. |
| 7,048,051 B2 | 5/2006 | McQueen |
| 7,051,807 B2 | 5/2006 | Vinegar et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,093,655 B2 | 8/2006 | Atkinson |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |
| 7,104,319 B2 | 9/2006 | Vinegar et al. |
| 7,121,342 B2 | 10/2006 | Vinegar et al. |
| 7,124,029 B2 | 10/2006 | Jammes et al. |
| 7,165,615 B2 | 1/2007 | Vinegar et al. |
| 7,181,380 B2 | 2/2007 | Dusterhoft et al. |
| 7,198,107 B2 | 4/2007 | Maguire |
| 7,219,734 B2 | 5/2007 | Bai et al. |
| 7,225,866 B2 | 6/2007 | Berchenko et al. |
| 7,243,618 B2 | 7/2007 | Gurevich |

(56) References Cited

U.S. PATENT DOCUMENTS

| | | |
|---|---|---|
| 7,322,415 B2 | 1/2008 | de St. Remey |
| 7,331,385 B2 | 2/2008 | Symington et al. |
| 7,353,872 B2 | 4/2008 | Sandberg |
| 7,357,180 B2 | 4/2008 | Vinegar et al. |
| 7,441,603 B2 | 10/2008 | Kaminsky et al. |
| 7,461,691 B2 | 12/2008 | Vinegar et al. |
| 7,484,561 B2 | 2/2009 | Bridges |
| 7,516,785 B2 | 4/2009 | Kaminsky |
| 7,516,786 B2 | 4/2009 | Dallas et al. |
| 7,516,787 B2 | 4/2009 | Kaminsky |
| 7,546,873 B2 | 6/2009 | Kim et al. |
| 7,549,470 B2 | 6/2009 | Vinegar et al. |
| 7,556,095 B2 | 7/2009 | Vinegar |
| 7,617,869 B2 | 11/2009 | Carney |
| 7,631,691 B2 | 12/2009 | Symington et al. |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,857,056 B2 | 12/2010 | Kaminsky et al. |
| 7,860,377 B2 | 12/2010 | Vinegar et al. |
| 7,905,288 B2 | 3/2011 | Kinkead |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 | 4/2002 | Wellington et al. |
| 2002/0077515 A1 | 6/2002 | Wellington et al. |
| 2002/0099504 A1 | 7/2002 | Cross et al. |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0178195 A1 | 9/2003 | Agee et al. |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |
| 2003/0196789 A1 | 10/2003 | Wellington |
| 2003/0209348 A1 | 11/2003 | Ward et al. |
| 2003/0213594 A1 | 11/2003 | Wellington et al. |
| 2004/0020642 A1 | 2/2004 | Vinegar et al. |
| 2004/0140095 A1 | 7/2004 | Vinegar et al. |
| 2004/0198611 A1 | 10/2004 | Atkinson |
| 2004/0211557 A1 | 10/2004 | Cole et al. |
| 2005/0051327 A1 | 3/2005 | Vinegar et al. |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0213657 A1 | 9/2006 | Berchenko et al. |
| 2007/0000662 A1* | 1/2007 | Symington et al. ........... 166/248 |
| 2007/0023186 A1 | 2/2007 | Kaminsky et al. |
| 2007/0045265 A1 | 3/2007 | McKinzie, II |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102359 A1 | 5/2007 | Lombardi et al. |
| 2007/0131415 A1 | 6/2007 | Vinegar et al. |
| 2007/0137869 A1 | 6/2007 | MacDougall et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. |
| 2008/0087420 A1 | 4/2008 | Kaminsky et al. |
| 2008/0087421 A1 | 4/2008 | Kaminsky |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0127632 A1 | 6/2008 | Finkenrath et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1 | 9/2008 | Kaminsky |
| 2008/0271885 A1 | 11/2008 | Kaminsky |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0308608 A1 | 12/2009 | Kaminsky et al. |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1 | 4/2010 | Symington et al. |
| 2010/0133143 A1 | 6/2010 | Roes et al. |
| 2010/0218946 A1 | 9/2010 | Symington et al. |
| 2010/0282460 A1 | 11/2010 | Stone et al. |
| 2010/0319909 A1 | 12/2010 | Symington et al. |

FOREIGN PATENT DOCUMENTS

| | | |
|---|---|---|
| CA | 2560223 | 3/2007 |
| EP | 0387846 | 9/1990 |
| EP | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 2005/010320 | 2/2005 |
| WO | WO 2005/045192 | 5/2005 |
| WO | WO 2006/115943 | 11/2006 |
| WO | WO2007/033371 | 3/2007 |
| WO | WO2007/050445 | 5/2007 |
| WO | WO 2007/050479 | 5/2007 |
| WO | WO2010/047859 | 4/2010 |

OTHER PUBLICATIONS

International Search Report dated Jun. 16, 2008 for PCT/US2008/003043 filed Mar. 7, 2008.

Katz, D.L. et al. (1978) "Predicting phase behavior of condensate/crude-oil systems using methane intereaction coefficients," Journal of Petroleum Technology, pp. 1649-1655.

Salomonsson, G. (1951) "The Ljunstrom In-Situ Method for Shale-Oil Recovery" Oil Shale and Cannel Coal (vol. 2), Proceedings of the $2^{nd}$ Oil Shale and Cannel Coal Conference, Glasgow, Jul. 1951, pp. 260-280.

Sierra, R. et al. (2001) "Promising Progress in Field Application of Reservoir Electrical Heating Methods," SPE Paper 69709.

Yen, T.F. and G.V. Chilingarian (1976) "Oil Shale,"Amsterdam, Elsevier p. 292.

Ali, A.H.A, et al, (2003) "Watching Rocks Change-Mechanical Earth Modeling", *Oilfield Review*, pp. 22-39.

Allred, (1964) "Some Characteristic Properties of Colorado Oil Shale Which May Influence In Situ Processing," *Quarterly Colo. School of Mines, $1^{st}$ Symposium Oil Shale*, v.59. No. 3, pp. 47-75.

Asquith, G., et al., (2004) *Basic Well Log Analysis*, Second Ed., Chapter 1, pp. 1-20.

Ball, J.S., et al. (1949) "Composition of Colorado Shale-Oil Naphtha", *Industrial and Engineering Chemistry*, vol. 41, No. 3 pp. 581-587.

(56) References Cited

OTHER PUBLICATIONS

Barnes, A. L. et al. (1968) "Quarterly of the Colorado School of Mines" *Fifth Symposium on Oil Shale*, v. 63(4), Oct. 1968, pp. 827-852.

Bastow, T.P., (1998) Sedimentary Processes Involving Aromatic Hydrocarbons >>. Thesis (PhD in Applied Chemistry) Curtin University of Technology (Australia), December, p. 1-92.

Baugman, G. L. (1978) *Synthetic Fuels Data Handbook*, Second Edition, Cameron Engineers Inc. pp. 3-145.

Berry, K. L., et al. (1982) "Modified in situ retorting results of two field retorts", Gary, J. H., ed., 15th Oil Shale Symp., CSM, pp. 385-396.

Blanton, T. L. et al, (1999) "Stress Magnitudes from Logs: Effects of Tectonic Strains and Temperature", *SPE Reservoir Eval. & Eng. 2*, vol. 1, February, pp. 62-68.

Boyer, H. E. et al. (1985) "Chapter 16: Heat-Resistant Materials," *Metals Handbook*, American Society for Metals, pp. 6-1-16-25.

Brandt, A. R., "Converting Oil Shale to Liquid Fuels: Energy Inputs and Greenhouse Gas Emissions of the Shell in Situ Conversion Process," Environ. Sci. Technol. 2008, 42, pp. 7489-7495.

Brandt, H. et al. (1965) "Stimulating Heavy Oil Reservoirs With Downhole Air-Gas Burners," *World Oil*, (Sep. 1965), pp. 91-95.

Bridges, J. E., et al. (1983) "The IITRI in situ fuel recovery process", *J. Microwave Power*, v. 18, pp. 3-14.

Burnham, A. K. et al. (1983) "High-Pressure Pyrolysis of Green River Oil Shale" in Geochemistry and Chemistry of Oil Shales: ACS Symposium Series, pp. 335-351.

Burwell, E. L. et al. (1970) "Shale Oil Recovery by In-Situ Retorting—A Pilot Study" Journal of Petroleum Engr., Dec. 1970, pp. 1520-1524.

Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.

Chute, F. S., and Vermeulen, F. E., (1988) "Present and potential applications of electromagnetic heating in the in situ recovery of oil", AOSTRA J. Res., v. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Cipolla, C.L., et al. (1994), "Practical Application of in-situ Stress Profiles", *Society of Petroleum Engineers*, SPE 28607, pp. 487-499.

Cook, G. L. et al. (1968) "The Composition of Green River Shale Oils" United Nations Symposium of the Development and Utilization of Oil Shale Resources, pp. 3-23.

Covell, J. R., et al. (1984) "Indirect in situ retorting of oil shale using the TREE process", Gary, J. H., ed., 17th Oil Shale Symposium Proceedings, Colorado School of Mines, pp. 46-58.

Cummins, J. J. et al. (1972) Thermal Degradation of Green River Kerogen at 150 to 350C: Rate of Product Formation, Report of Investigation 7620, *US Bureau of Mines*, 1972, pp. 1-15.

Day, R. L., (1998) "Solution Mining of Colorado Nahcolite, Wyoming State Geological Survey Public Information Circular 40," *Proceedings of the First International Soda Ash Conference*, V.II (Rock Springs, Wyoming, Jun. 10-12) pp. 121-130.

DePriester, C. et al. (1963) "Well Stimulation by Downhole Gas-Air Burner," *Jrnl. Petro. Tech.*, (Dec. 1963), pp. 1297-1302.

Domine, F. et al. (2002) "Up to What Temperature is Petroleum Stable? New Insights from a 5200 Free Radical Reactions Model", *Organic Chemistry*, 33, pp. 1487-1499.

Dougan, P. M. et al. (1981) "BX In Situ Oil Shale Project," *Colorado School of Mines; Fourteenth Oil Shale Symposium Proceedings*, 1981, pp. 118-127.

Dougan, P. M. (1979) "The BX In Situ Oil Shale Project," *Chem. Engr. Progress*, pp. 81-84.

Duncan, D. C., (1967) "Geologic Setting of Oil Shale Deposits and World Prospects," *in Proceedings of the Seventh World Petroleum Congress*, v.3, Elsevier Publishing, pp. 659-667.

Dunks, G. et al. (1983) "Electrochemical Studies of Molten Sodium Carbonate," *Inorg. Chem.*, 22, pp. 2168-2177.

Dusseault, M.B. (1998) "Casing Shear: Causes, Cases, Cures", Society of Petroleum Engineers, SPE 48,864 pp. 337-349.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado*, Rocky Mountain Association of Geologists, Guidebook, pp. 111-122.

Fainberg, V. et al. (1998) "Integrated Oil Shale Processing Into Energy and Chemicals Using Combined-Cycle Technology," *Energy Sources*, v.20.6, pp. 465-481.

Farouq Ali, S. M., (1994), "Redeeming features of in situ combustion", DOE/NIPER *Symposium on In Situ Combustion Practices-Past, Present, and Future Application*, Tulsa, OK, Apr. 21-22, No. ISC 1, p. 3-8.

Fisher, S. T. (1980) "A Comparison of Eleven Processes for Production of Energy from the Solid Fossil Fuels of North America," *SPE* 9098, pp. 1-27.

Fox, J. P, (1980) "Water-related Impacts of In-Situ Oil Shale Processing," *California Univ., Berkeley, Lawrence Berkeley Lab*, Chapters 6-7.

Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.

Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.

Fredrich, J. T. et al, (2003) "Stress Perturbations Adjacent to Salt Bodies in the Deepwater Gulf of Mexico", *Society of Petroleum Engineers* SPE 84554, pp. 1-14.

Frederiksen, S. et al, (2000) "A Numerical Dynamic Model for the Norwegian-Danish Basin", *Tectonophysics*, 343, 2001, pp. 165-183.

Freund, H. et al., (1989) "Low-Temperature Pyrolysis of Green River Kerogen", *The American Association of Petroleum Geologists Bulletin*, v. 73, No. 8 (August) pp. 1011-1017.

Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.

Garthoffner, E. H., (1998), "Combustion front and burned zone growth in successful California ISC projects", SPE 46244, pp. 1-11.

Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.

Hansen, K. S. et al, (1989) "Earth Stress Measurements in the South Belridge Oil Field, Kern County, California", *SPE Formation Evaluation*, December pp. 541-549.

Hansen, K. S. et al, (1993) "Finite-Element Modeling of Depletion-Induced Reservoir Compaction and Surface Subsidence in the South Belridge Oil Field, California", SPE 26074, pp. 437-452.

Hansen, K. S. et al, (1995) "Modeling of Reservoir Compaction and Surface Subsidence at South Belridge", *SPE Production & Facilities*, August pp. 134-143.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Hardy, M., et al. (2003) "Solution Mining of Nahcolite at American Soda's Yankee Gulch Project," *Mining Engineering*, Oct. 2003, pp. 23-31.

Henderson, W, et al. (1968) "Thermal Alteration as a Contributory Process to the Genesis of Petroleum", *Nature* vol. 219, pp. 1012-1016.

Hilbert, L. B. et al, (1999) "Field-Scale and Wellbore Modeling of Compaction-Induced Casing Failures", *SPE Drill. & Completion*, 14(2), June pp. 92-101.

Hill, G.R. et al. (1967) "The Characteristics of a Low Temperature In Situ Shale Oil," $4^{th}$ *Symposium on Oil Shale, Quarterly of the Colorado School of Mines*, v.62(3), pp. 641-656.

Hill, G. R. et al. (1967) "Direct Production of a Low Pour Point High Gravity Shale Oil", *I&EC Product Research and Development*, 6(1), March pp. 52-59.

(56) References Cited

OTHER PUBLICATIONS

Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-91.

Humphrey, J. P. (1978) "Energy from in situ processing of Antrim oil shale", *DOE Report* FE-2346-29.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Jacobs, H. R. (1983) "Analysis of the Effectiveness of Steam Retorting of Oil Shale", *AIChE Symposium Series—Heat Transfer—*Seattle 1983 pp. 373-382.

Johnson, D. J. (1966) "Decomposition Studies of Oil Shale," *University of Utah*, May 1966.

Katz, D.L. et al. (1978) *"Predicting Phase Behavior of Condensate/Crude-Oil Systems Using Methane Interaction Coefficients, J. Petroleum Technology"*, pp. 1649-1655.

Kenter, C. J. et al, (2004) "Geomechanics and 4D: Evaluation of Reservoir Characteristics from Timeshifts in the Overburden", *Gulf Rocks 2004, 6th North America Rock Mechanics Symposium (NARMS): Rock Mechanics Across Borders and Disciplines*, Houston, Texas, Jun. 5-9, ARMA/NARMS 04-627.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Lekas, M. A. et al. (1991) "Initial evaluation of fracturing oil shale with propellants for in situ retorting—Phase 2", *DOE Report DOE/MC/11076-3064*.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.

Lundquist, L. (1951) "Refining of Swedish Shale Oil", *Oil Shale Cannel Coal Conference*, vol./Issue: 2, pp. 621-627.

Marotta, A. M. et al, (2003) "Numerical Models of Tectonic Deformation at the Baltica-Avalonia Transition Zone During the Paleocene Phase of Inversion", *Tectonophysics*, 373, pp. 25-37.

Miknis, F.P, et al (1985) "Isothermal Decomposition of Colorado Oil Shale", DOE/FE/60177-2288 (DE87009043) May 1985.

Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.

Molenaar, M. M. et al, (2004) "Applying Geo-Mechanics and 4D: '4D In-Situ Stress' as a Complementary Tool for Optimizing Field Management", *Gulf Rocks 2004, 6th North America Rock Mechanics Symposium (NARMS): Rock Mechanics Across Borders and Disciplines*, Houston, Texas, Jun. 5-9, ARMA/NARMS 04-639, pp. 1-7.

Moschovidis, Z. (1989) "Interwell Communication by Concurrent Fracturing—a New Stimulation Technique", *Journ. of Canadian Petro. Tech.* 28(5), pp. 42-48.

Motzfeldt, K. (1954) "The Thermal Decomposition of Sodium Carbonate by the Effusion Method," *Jrnl. Phys. Chem.*, v. LIX, pp. 139-147.

Mut, Stephen (2005) "The Potential of Oil Shale," *Shell Oil Presentation at National Academies, Trends in Oil Supply Demand*, in Washington, DC, Oct. 20-21, 2005, 11 pages.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.

Nottenburg, R.N. et al. (1979) "Temperature and stress dependence of electrical and mechanical properties of Green River oil shale," *Fuel*, 58, pp. 144-148.

Nowacki, P. (ed.), (1981) *Oil Shale Technical Handbook*, Noyes Data Corp. pp. 4-23, 80-83 & 161-183.

Pattillo, P. D. et al, (1998) "Reservoir Compaction and Seafloor Subsidence at Valhall", SPE 47274, 1998, pp. 377-386.

Pattillo, P. D. et al, (2002) "Analysis of Horizontal Casing Integrity in the Valhall Field", SPE 78204, pp. 1-10.

Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.

Peters, G., (1990) "The Beneficiation of Oil Shale by the Solution Mining of Nahcolite," *23rd Colorado School of Mines Oil Shale Symposium* (Golden, CO) pp. 142-151.

Plischke, B., (1994) "Finite Element Analysis of Compaction and Subsidence—Experience Gained from Several Chalk Fields", *Society of Petroleum Engineers*, SPE 28129, 1994, pp. 795-802.

Prats, M. et al. (1975) "The Thermal Conductivity and Diffusivity of Green River Oil Shales", *Journal of Petroleum Technology*, pp. 97-106, Jan. 1975.

Prats, M., et al. (1977) "Soluble-Salt Processes for In-Situ Recovery of Hydrocarbons from Oil Shale," *Journal of Petrol. Technol.*, pp. 1078-1088.

Rajeshwar, K. et al. (1979) "Review: Thermophysical Properties of Oil Shales", *Journal of Materials Science*, v.14, pp. 2025-2052.

Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).

Reade Advanced Materials; 2006 About.com Electrical resistivity of materials. [Retrieved on Oct. 15, 2009] Retrieved from internet: URL: http://www.reade.com/Particle%5FBriefngs/elec%5Fres.html. Entire Document.

Riva, D. et al. (1998) "Suncor down under: the Stuart Oil Shale Project", Annual Meeting of the *Canadian Inst. of Mining, Metallurgy, and Petroleum*, Montreal, May 3-7.

Rupprecht, R. (1979) "Application of the Ground-Freezing Method to Pentrate a Sequence of Water-Bearing and Dry Formations—Three Construction Cases," *Engineering Geology*, 13, pp. 541-546.

Ruzicka, D.J. et al. (1987) "Modified Method Measures Bromine Number of Heavy Fuel Oils", *Oil & Gas Journal*, 85(31), Aug. 3, pp. 48-50.

Salamonsson, G. (1951) "The Ljungstrom In Situ Method for Shale-Oil Recovery," *2nd Oil Shale and Cannel Coal Conference*, 2, Glasgow, Scotland, Inst. of Petrol., London, pp. 260-280.

Sahu, D. et al. (1988) "Effect of Benzene and Thiophene on Rate of Coke Formation During Naphtha Pyrolysis", *Canadian Journ. of Chem. Eng.*, 66, Oct. pp. 808-816.

Sandberg, C. R. et al. (1962) "In-Situ Recovery of Oil from Oil Shale—A Review and Summary of Field and Laboratory Studies," RR62.039FR, Nov. 1962.

Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001, 17 pages.

Siskin, M. et al. (1995) "Detailed Structural Characterization of the Organic Material in Rundel Ramsay Crossing and Green River Oil Shales," *Kluwer Academic Publishers*, pp. 143-158.

Smart, K. J. et al, (2004) "Integrated Structural Analysis and Geomechanical Modeling: an Aid to Reservoir Exploration and Development", *Gulf Rocks 2004, 6th North America Rock Mechanics Symposium (NARMS): Rock Mechanics Across Borders and Disciplines*, Houston, Texas, Jun. 5-9, ARMA/NARMS 04-470.

(56) References Cited

OTHER PUBLICATIONS

Smith, F. M. (1966) "A Down-hole Burner—Versatile Tool for Well Heating," $25^{th}$ *Tech. Conf. on Petroleum Production*, Pennsylvania State Univ., pp. 275-285.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stevens, A. L., and Zahradnik, R. L. (1983) "Results from the simultaneous processing of modified in situ retorts 7& 8", Gary, J. H., ed., $16^{th}$ *Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Symington, W.A., et al (2006) ExxonMobil's electrofrac process for in situ oil shale conversion $26^{th}$ Oil Shale Symposium, Colorado School of Mines.

Syunyaev, Z.I. et al. (1965) "Change in the Resistivity of Petroleum Coke on Calcination," Chemistry and Technology of Fuels and Oils, 1(4), pp. 292-295.

Templeton, C. C. (1978) "Pressure-Temperature Relationship for Decomposition of Sodium Bicarbonate from 200 to 600° F," *J. of Chem. And Eng. Data*, 23(1), pp. 7-8.

Thomas, A. M. (1963) "Thermal Decomposition of Sodium Carbonate Solutions," *J. of Chem. And Eng. Data*, 8(1), pp. 51-54.

Thomas, G. W. (1964) "A Simplified Model of Conduction Heating in Systems of Limited Permeability," *Soc. Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. Et al. (1967) "Thermal Conductivity and Thermal Diffusivity of Green River Oil Shale," *Thermal Conductivity: Proceedings of the Seventh Conference* (Nov. 13-16, 1967), *NBS Special Publication* 302, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to In Situ Retorting," *US Bureau of Mines Report of Investigations 7576*, 1971.

Tisot, P. R. (1975) "Structural Response of Propped Fractures in Green River Oil Shale as It Relates to Underground Retorting," *US Bureau of Mines Report of Investigations 8021*.

Tissot, B. P., and Welte, D. H. (1984) *Petroleum Formation and Occurrence*, New York, Springer-Verlag, p. 160-174, 175-198 and 254-266.

Tissot, B. P., and Welte, D. H. (1984) *Petroleum Formation and Occurrence*, New York, Springer-Verlag, p. 267-289 and 470-492.

Turta, A., (1994), "In situ combustion- from pilot to commercial application", *DOE/NIPER Symposium on In Situ Combustion Practices-Past, Present, and Future Application*, Tulsa, OK, Apr. 21-22, No. ISC 3, p. 15-39.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.

Veatch, Jr. R.W. and Martinez, S.J., et al. (1990) "Hydraulic Fracturing: Reprint Series No. 28", *Soc. of Petroleum Engineers* SPE 14085, Part I, Overview.

Warpinski, n. R., (1989) "Elastic and Viscoelastic Calculations of Stresses in Sedimentary Basins", *SPE Formation Evaluation*, vol. 4, pp. 522-530.

Yen, T. F. et al. (1976) *Oil Shale*, Amsterdam, Elsevier, p. 216-267.

Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.

Oil & Gas Journal, 1998, "Aussie oil shale project moves to Stage 2", Oct. 26, p. 42.

"Encyclopedia of Chemical Technology" ($4^{th}$ ed.), *Alkali and Chlorine Products*, pp. 1025-1039 (1998).

\* cited by examiner

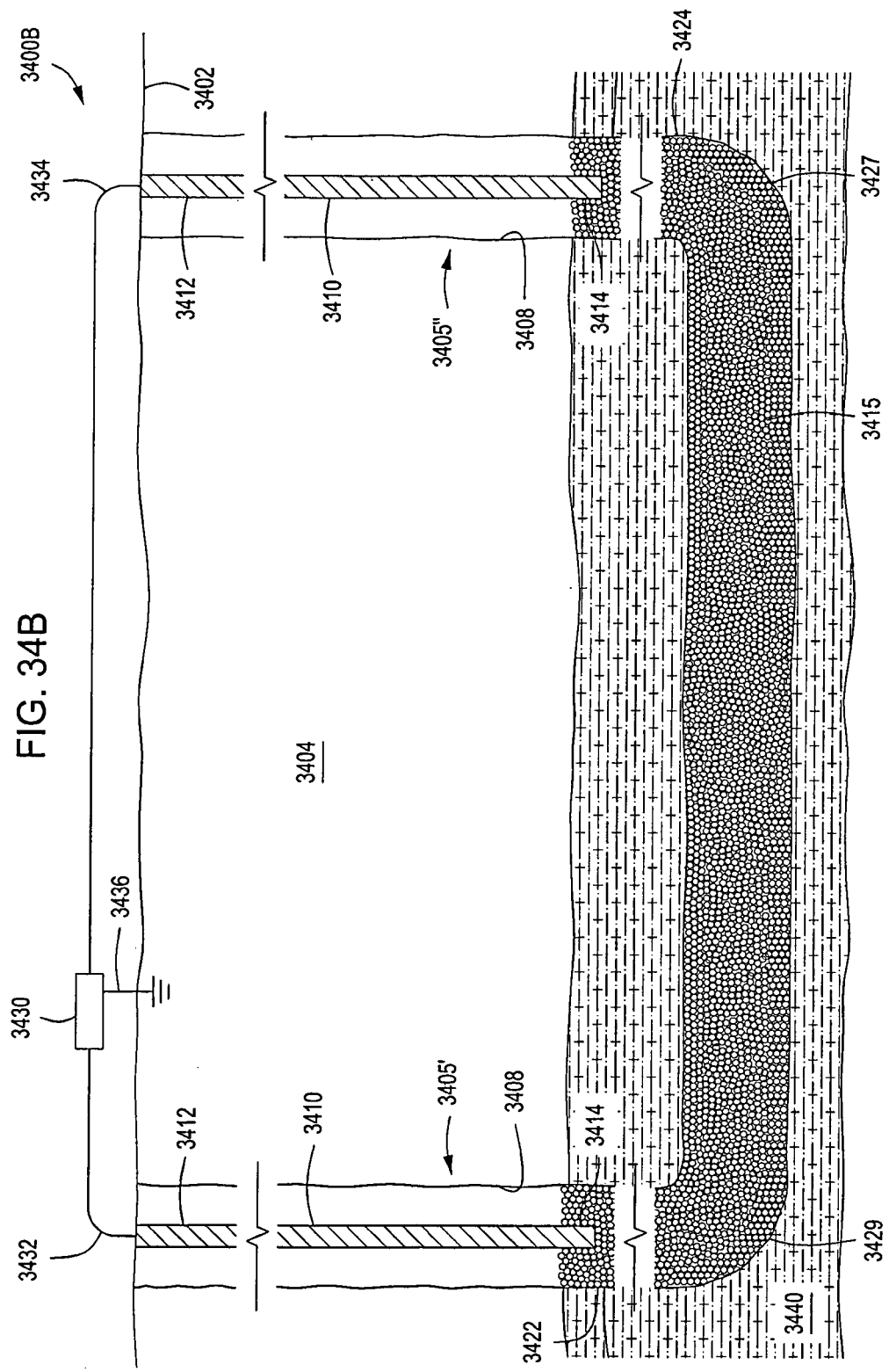

RESISTIVE HEATER FOR IN SITU FORMATION HEATING

CROSS-REFERENCE TO RELATED APPLICATIONS

This application claims the benefit of U.S. Provisional patent application Ser. No. 60/919,430, filed on Mar. 22, 2007. That application is titled "Resistive Heater for In Situ Formation Heating."

BACKGROUND OF THE INVENTION

1. Field of the Invention

The present invention relates to the field of hydrocarbon recovery from subsurface formations. More specifically, the present invention relates to the in situ recovery of hydrocarbon fluids from organic-rich rock formations including, for example, oil shale formations, coal formations and tar sands. The present invention also relates to methods for heating a subsurface formation using electrical energy.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Such formations are notably found in Wyoming, Colorado, and Utah. Oil shale formations tend to reside at relatively shallow depths and are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated to the necessary temperature, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T. F. Yen, and G. V. Chilingarian, "*Oil Shale,*" Amsterdam, Elsevier, p. 292) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ. The purpose of such in situ heating was to distill hydrocarbons and to produce them to the surface. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as early heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "The Ljungstrom In Situ Method for Shale-Oil Recovery," $2^{nd}$ Oil Shale and Cannel Coal Conference, v. 2, Glasgow, Scotland, Institute of Petroleum, London, p. 260-280 (1951).)

Additional in situ methods have been proposed. These methods generally involve the injection of heat and/or solvent into a subsurface oil shale formation. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre).

In 1989, U.S. Pat. No. 4,886,118; issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's enterprise. The '118 patent proposed controlling the rate of heat conduction within the rock surrounding each heat injection well to provide a uniform heat front.

Additional history behind oil shale retorting and shale oil recovery can be found in co-owned patent publication WO 2005/010320 entitled "Methods of Treating a Subterranean Formation to Convert Organic Matter into Producible Hydrocarbons," and in patent publication WO 2005/045192 entitled "Hydrocarbon Recovery from Impermeable Oil Shales."

A need exists for improved processes for the production of shale oil. In addition, a need exists for improved methods for heating a subsurface formation and pyrolyzing solid hydrocarbons. Still further, a need exists for methods addressing the cost-effective installation of robust subsurface heater wells. A need also exists for improved subsurface heater well arrangements that use granular conductive material. Granular materials placed even in oddly shaped subsurface regions form connections with surrounding materials.

SUMMARY OF THE INVENTION

In one embodiment, a method for heating a subsurface formation using an electrical resistance heater is provided. The method may include providing an electrically conductive first member in a wellbore located at least partially within a subsurface formation, and providing an electrically conductive second member in the wellbore. The method may further include providing an electrically conductive granular material in the wellbore, where the granular material is positioned to provide electrical communication between the conductive first member and the conductive second member, thereby forming a granular connection. The method further includes passing an electrical current through the first member, the granular material and the second member, thereby generating heat, with the generated heat produced primarily through electrical resistive heating of the granular material over the life of the heating operation. The heat is then transferred, by thermal conduction into the subsurface formation so as to cause solid hydrocarbons in the formation to be pyrolyzed into hydrocarbon fluids.

Another embodiment of the invention includes a method for heating a subsurface formation. The method may include forming a wellbore to the subsurface formation, and filling at least a part of the wellbore with a conductive granular material to act as a resistive heating element. The method may further include passing electricity through the granular material in order to generate resistive heat within the granular material, and continuing to pass electricity through the granular material to generate additional resistive heat in order to cause in situ pyrolysis of at least some solid hydrocarbons. Pyrolysis of the solid hydrocarbons forms hydrocarbon fluids. Heat again is generated primarily from the granular material over the life of the heating operation.

Another embodiment of the invention includes a method for heating a subsurface formation using an electrically resistive heater. The method includes forming a wellbore below an earth surface and into the subsurface formation. The method may further include running a string of casing into the wellbore, and also running an elongated, electrically conductive conductor element within the string of casing. The method may further include injecting electrically conductive granular material between the conductor element and the surrounding string of casing proximate a bottom of the wellbore. A voltage is applied across the string of casing and the conductor element in order to resistively heat the conductive granular material. This serves to heat the surrounding subsurface formation.

Another embodiment of the invention includes a method for heating a subsurface formation. The method may include passing electricity through a conductive granular material to generate resistive heat within the granular material, where the granular material is disposed between and within at least two adjacent wellbores completed at least partially within the subsurface formation. An example is through interconnecting fractures. The granular material may provide electrical communication between the wellbores, where a majority of the resistive heat is generated within the wellbores as opposed to the granular material over the life of the heating operation. The method may further include transferring, by thermal conduction, at least a portion of the resistive heat into the subsurface formation in order to cause in situ pyrolysis of at least some solid formation hydrocarbons to form hydrocarbon fluids.

Also provided herein is a resistive heater for heating a subsurface formation. The resistive heater may include a wellbore formed from an earth surface and into the subsurface formation, a string of casing in the wellbore, and an elongated, electrically conductive conductor element within the string of casing. The resistive heater further includes a conductive granular material disposed within the string of casing at a bottom of the wellbore and along the depth of the subsurface formation. The granular material thereby provides an electrical connection between the string of casing and the conductor element. The granular material may have an electrical resistance that is higher than the electrical resistance of the string of casing and the conductor element. In this way resistive heat is generated primarily within the granular material when a current is passed through the string of casing, the granular material and the conductor element.

Another embodiment of the invention includes a method for heating a subsurface formation. The method may include providing a first wellbore to the subsurface formation. A conductive member is then run into the first wellbore. The method may further include providing a second wellbore, with the second wellbore having a bottom portion that intersects the first wellbore within the subsurface formation. The method may further include running a conductive member into the second wellbore. The method may further include filling at least a part of each of the first and second wellbores with a conductive granular material. The granular materials provides an electrical connection between the conductive member in the first wellbore and the conductive member in the second wellbore. The method may further include passing an electrical current through the conductive member in the first wellbore, the granular material, and the conductive member in the second wellbore in order to generate heat via electrical resistance primarily within the granular material over the life of the heating operation. The granular material thus acts as a resistive heating element for heating the surrounding formation.

Another embodiment of the invention includes a method of producing a hydrocarbon fluid. The method may include heating an organic-rich rock formation in situ using an electrical resistance heater, and producing a hydrocarbon fluid from the organic-rich rock formation. In this instance, the hydrocarbon fluid is at least partially generated as a result of pyrolysis of formation hydrocarbons located in the organic-rich rock formation. The heating is performed by using an electrical resistance heater formed by providing an electrically conductive first member in a wellbore located at least partially within a subsurface formation, providing an electrically conductive second member in the wellbore, and providing an electrically conductive granular material in the wellbore that is positioned to provide electrical communication between the first member and the second member. The first member has a lower end terminating at a first depth located within the subsurface formation, and is insulated above the first depth. Similarly, the second member has a lower end terminating at a second depth located within the subsurface formation, and is insulated above the second depth. An electrical current is passed through the first member, the granular material and the second member, thereby generating heat through electrical resistive heating of the granular material. Heat is transferred by thermal conduction from the granular material and into the subsurface formation.

Another embodiment of the invention includes a method of producing a hydrocarbon fluid. The method may include heating an organic-rich rock formation in situ using an electrical resistance heater, and producing a hydrocarbon fluid from the organic-rich rock formation The hydrocarbon fluid is at least partially generated asia result of pyrolysis of formation hydrocarbons located in the organic-rich rock formation. The method may include using an electrical resistance heater that is formed by passing electricity through a conductive granular material to generate resistive heat within the granular material, where the granular material is disposed between and within at least two adjacent wellbores completed at least partially within the subsurface formation. The granular material may provide electrical communication between the wellbores, where a majority of the resistive heat is generated within the wellbores. The granular material has a bulk resistance that is greater than a resistance of the wellbores. The electrical resistance heater may further include transferring, by thermal conduction, at least a portion of the resistive heat into the subsurface formation in order to cause in situ pyrolysis of at least some solid formation hydrocarbons to form the hydrocarbon fluid.

Another embodiment of the invention includes a method for heating a subsurface formation using electrically resistive heat. The method may include providing a first wellbore located at least partially within a subsurface formation, the first wellbore having an electrically conductive first member, an electrically conductive second member, and an electrically conductive first granular material in the first wellbore, where the first granular material is positioned to provide electrical communication between the first member and the second member. The method may further include providing a second wellbore located at least partially within the subsurface formation, the second wellbore having an electrically conductive third member, an electrically conductive fourth member, and an electrically conductive second granular material in the second wellbore, where the second granular material is positioned to provide electrical communication between the third member and the fourth member. The method may further include passing a first electrical current through the first member, the first granular material and the second member, thereby generating first heat, with the generated first heat produced primarily through electrical resistive heating of the first granular material. The method may further include passing a second electrical current through the third member, the second granular material and the fourth member, thereby generating second heat, with the generated second heat produced primarily through electrical resistive heating of the second granular material. The method may also include heating formation hydrocarbons located substantially equidistant from the first wellbore and the second wellbore primarily with the generated first heat, second heat or both.

Another embodiment of the invention includes a method for heating a subsurface formation. The method may include forming a wellbore to the subsurface formation, placing a string of electrically conductive casing proximate the bottom of the wellbore, running an elongated electrically conductive element into the wellbore and within the string of conductive casing, thereby forming an annular region between the string of conductive casing and the elongated conductive element, filling at least a part of the annular region with a conductive granular material to act as a resistive heating element, radially passing an electrical current through the string of conductive casing, through the granular material, and through the elongated conductive element within the casing in order to generate resistive heat within the granular material and continuing to radially pass electricity through the granular material to generate additional resistive heat in order to cause in situ pyrolysis of at least some formation hydrocarbons, thereby forming hydrocarbon fluids.

Another embodiment of the invention includes a method of producing a hydrocarbon fluid. The method may include heating an organic-rich rock formation in situ primarily using heat generated by electrical resistive heating of a granular material included in an electrical resistance heater, thereby producing a heated portion of the organic-rich rock formation, controlling the rate of heat generation such that the electrical conductivity of a majority of the heated portion of the organic-rich rock formation does not increase substantially and producing a hydrocarbon fluid from the organic-rich rock formation, the hydrocarbon fluid having been generated as a result of heating and pyrolysis of formation hydrocarbons located in the heated portion of the organic-rich rock formation, with the heating and pyrolysis resulting primarily from the heat generated by electrical resistive heating of the granular material. The electrical resistance heater may be formed by passing electricity through a conductive granular material to generate resistive heat within the granular material, the granular material being disposed between and within at least two adjacent wellbores completed at least partially within the organic-rich rock formation, the granular material providing electrical communication between the wellbores, where a majority of the resistive heat is generated within the granular material and transferring, by thermal conduction, at least a portion of the resistive heat into the organic-rich rock formation in order to cause in situ pyrolysis of the formation hydrocarbons located in the heated portion of the organic-rich rock formation to form the hydrocarbon fluid.

Another embodiment of the invention includes a method of producing a hydrocarbon fluid. The method may include heating an organic-rich rock formation in situ primarily using heat generated by electrical resistive heating of a granular material included in an electrical resistance heater, thereby producing a heated portion of the organic-rich rock formation, controlling the rate of heat generation such that the electrical conductivity of a majority of the heated portion of the organic-rich rock formation does not increase substantially and producing a hydrocarbon fluid from the organic-rich rock formation, the hydrocarbon fluid having been at least partially generated as a result of heating and pyrolysis of formation hydrocarbons located in the heated portion of the organic-rich rock formation, with the heating and pyrolysis resulting primarily from the heat generated by electrical resistive heating of the granular material. The electrical resistance heater may be formed by providing a wellbore located at least partially within the organic-rich rock, the wellbore having an electrically conductive first member, an electrically conductive second member, and an electrically conductive granular material in the wellbore, where the granular material is positioned to provide electrical communication between the first member and the second member; and passing an electrical current through the first member, the granular material and the second member, thereby generating heat, with the generated heat produced primarily through electrical resistive heating of the granular material.

Another embodiment of the invention includes a method for heating an organic-rich rock formation. The method may include providing a plurality of heater wells, each of the plurality of heater wells comprising: a first wellbore located at least partially within the organic-rich rock formation; an electrically conductive first member located in the first wellbore; a second wellbore, the second wellbore having a bottom portion that intersects the first wellbore within the organic-rich rock formation; an electrically conductive second member located in the second wellbore; and an electrically conductive granular material filling at least a part of each of the first and second wellbores so as to provide an electrical connection between the first member in the first wellbore and the second member in the second wellbore, the granular material thereby forming a granular mass and acting as a resistive heating element, the first member, granular material and second member thereby forming an electrical flow path. The method may further include passing electrical current through each electrical flow path in order to generate heat primarily via electrical resistive heating within the granular material, transferring, by thermal conduction, at least a portion of the generated heat into the organic-rich rock formation, the heated volume being defined at it's extremities by the plurality of granular masses and heating a majority of the formation hydrocarbons located in the heated volume of the organic-rich rock formation primarily with the generated heat, thereby causing the formation hydrocarbons to be substantially pyrolyzed to form hydrocarbon fluids.

BRIEF DESCRIPTION OF THE DRAWINGS

So that the present invention can be better understood, certain drawings, charts, graphs and flow charts are appended hereto. It is to be noted, however, that the drawings illustrate only selected embodiments of the inventions and are therefore not to be considered limiting of scope, for the inventions may admit to other equally effective embodiments and applications.

FIG. 34B is another cross-sectional view of a heater well. In this embodiment, two wellbores are completed through a targeted subsurface formation. The wellbores are again connected using granular material.

DETAILED DESCRIPTION OF CERTAIN EMBODIMENTS

Definitions

Figure 1:
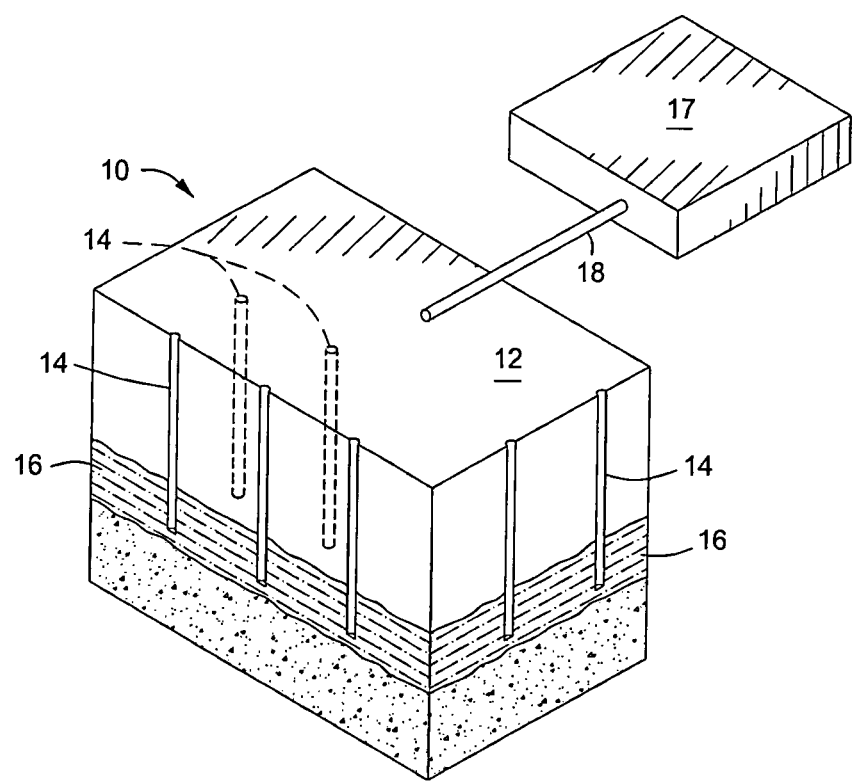
FIG. 1 is a cross-sectional isomeric view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

As used herein, the term "bulk resistance" means the electrical resistance experienced by an electrical current in a mass of granular material having surface-to-surface contact. As used herein, the term "bulk resistivity" means the electrical resistivity of a mass of granular material having surface-to-surface contact as calculated using length and cross-sectional dimensions defined by the overall size of the mass.

Description of Specific Embodiments

The inventions described herein are in connection with certain specific embodiments. However, to the extent that the following detailed description is specific to a particular embodiment or a particular use, such is intended to be illustrative only and is not to be construed as limiting the scope of the invention.

As discussed herein, some embodiments of the invention include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the invention the natural resources may include hydrocarbon fluids, including, for example, products of the pyrolysis of formation hydrocarbons such as shale oil. In some embodiments of the invention the natural resources may also include water-soluble minerals, including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas, and water produced from the heated formation. The fluid processing facility 17 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
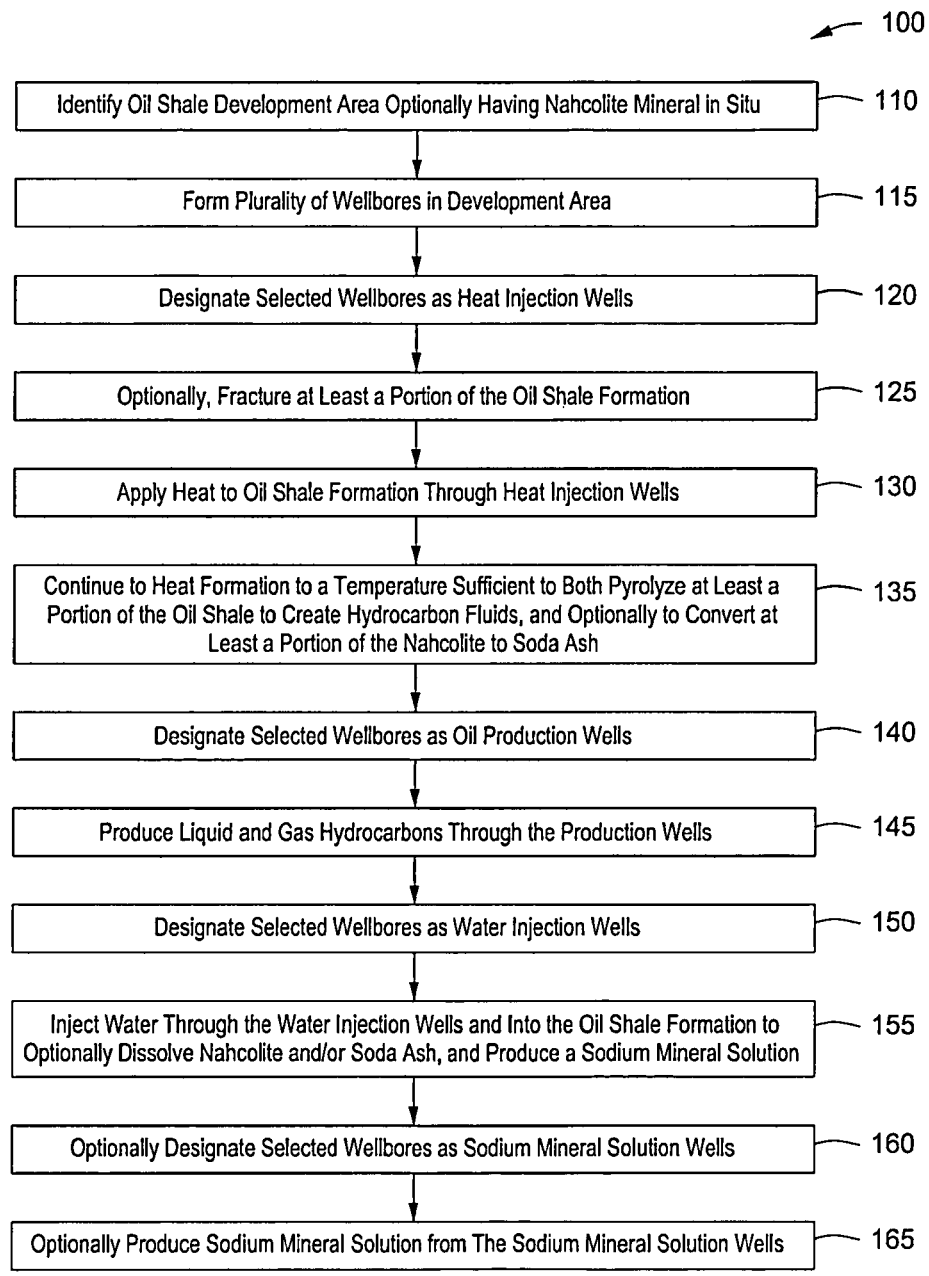
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and hydrocarbon fluid generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naphtha. Generated gases include light alkanes, light alkenes, $H_2$, $CO_2$, CO, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability of portions of the formation are increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability in portions of the formation and/or be used to provide a planar source for heating. The WO 2005/010320 patent publication incorporated above describes one use of hydraulic fracturing.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (Box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
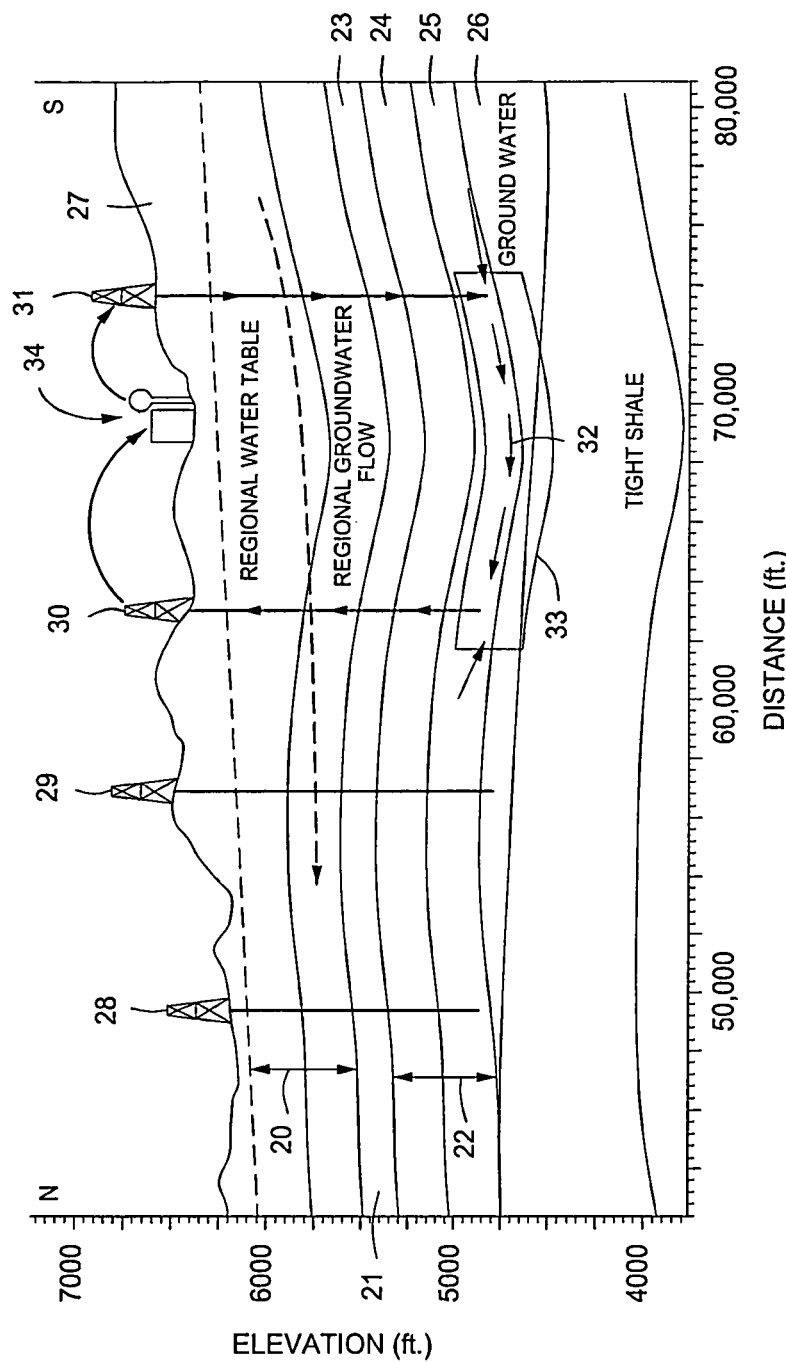
FIG. 3 is a cross-sectional side view of an illustrative oil shale formation that is within or connected to groundwater aquifers and a formation leaching operation.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically water circulating 32 through an oil shale volume that was heated 33, that resides within or is connected to an aquifer 22, and from which hydrocarbon fluids were previously recovered. Introduction of water via the water injection well 31 forces water into the previously heated oil shale 33 and water-soluble minerals and migratory contaminants species are swept to the water production well 30. The water may then processed in a facility 34 wherein the water-soluble minerals (e.g. nahcolite or soda ash) and the migratory contaminants may be substantially removed from the water stream. Water is then reinjected into the oil shale volume 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water. It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 meters, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. No. 6,880,633 and U.S. Pat. No. 7,032,660. Shell's '660 patent uses subsurface freezing to protect against groundwater flow and groundwater contamination during in situ shale oil production. Additional patents that disclose the use of so-called freeze walls are U.S. Pat. No. 3,528,252, U.S. Pat. No. 3,943,722, U.S. Pat. No. 3,729,965, U.S. Pat. No. 4,358,222, U.S. Pat. No. 4,607,488, and WO Pat. No. 98996480.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet, or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 feet, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

Another method for reducing the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 meters). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or 30 feet. Regardless of the arrangement of or distance between the heater wells, in certain embodiments, a ratio of heater wells to production wells disposed within a organic-rich rock formation may be greater than about 5, 8, 10, 20, or more.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
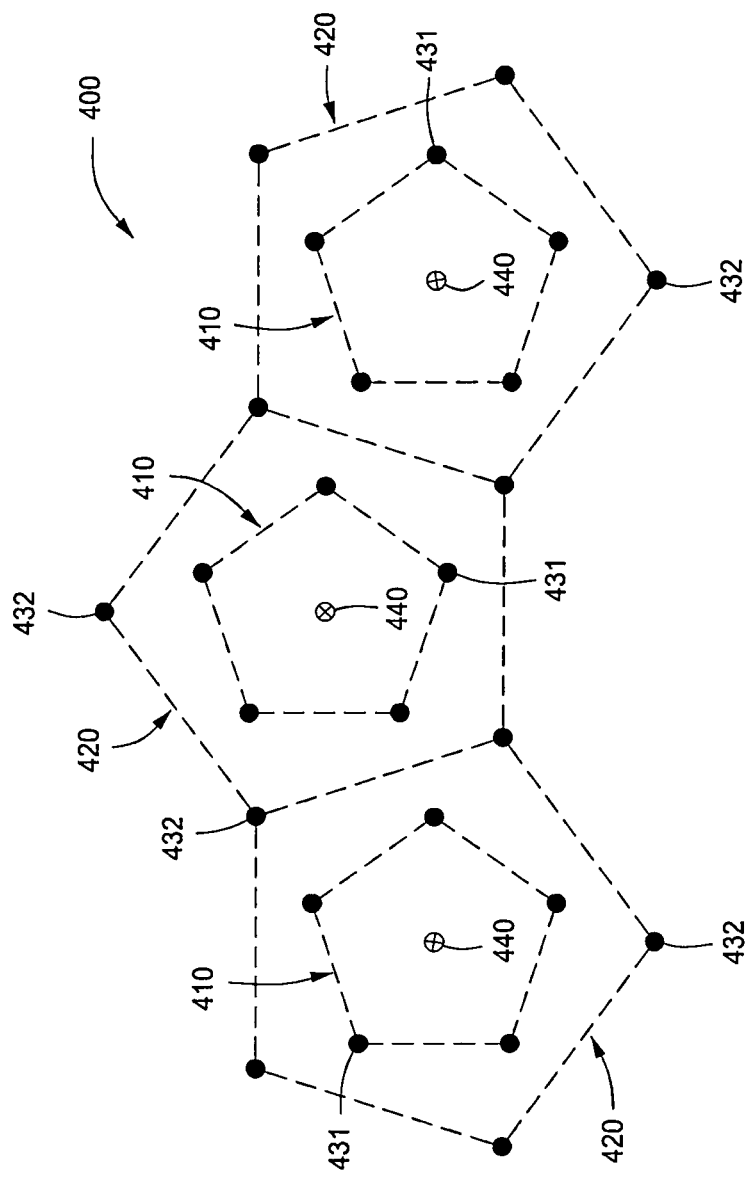
FIG. 4 is a plan view of an illustrative heater well pattern, around production wells. Two layers of heater wells are shown.

FIG. 4 provides a plan view of an illustrative heater well arrangement using more than one layer of heater wells. The heater well arrangement is used in connection with the production of hydrocarbons from a shale oil development area 400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

A production well 440 is shown central to the well layers 410 and 420. It is noted that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

Another method for reducing the number of heater wells is to use well patterns that are elongated in a particular direction, particularly in a direction determined to provide the most efficient thermal conductivity. Heat convection may be affected by various factors such as bedding planes and stresses within the formation. For instance, heat convection may be more efficient in the direction perpendicular to the least horizontal principal stress on the formation. In some instanced, heat convection may be more efficient in the direction parallel to the least horizontal principal stress.

In connection with the development of a shale oil field, it may be desirable that the progression of heat through the subsurface in accordance with steps 130 and 135 be uniform. However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. No. 1,701,884, U.S. Pat. No. 3,376,403, U.S. Pat. No. 4,626,665, U.S. Pat. No. 4,704,514, and U.S. Pat. No. 6,023,554).

A review of application of electrical heating methods for heavy oil reservoirs is given by R. Sierra and S. M. Farouq Ali, "Promising Progress in Field Application of Reservoir Electrical Heating Methods", Society of Petroleum Engineers Paper 69709, 2001.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation extending from horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C., causing artificial maturation.

International patent application WO2005/010320 describes using granular conductive materials within hydraulic fractures as the primary heating elements. Also, U.S. Pat. No. 3,137,347 discloses the use of a conductive granular material to longitudinally connect subsurface electrodes for in situ heating of oil shales. In the '347 patent, the granular material is heated with the stated aim of causing the oil shale itself to become electrically conductive.

The '347 patent envisions the granular material being an initial source of heat until the oil shale is warmed. At some point, the oil shale itself is said to become electrically conductive. Heat conducted into the surrounding formation due to the passing of current through the oil shale material itself causes pyrolysis and generates hydrocarbon fluids for production.

The present disclosure provides important improvements to the use of granular materials as part of an electrically resistive downhole heater. By using a granular material, the heater wells will be much less susceptible to failure due to stresses and bending. In this respect, the granular mass can readily change shape as needed. Moreover, the heater wells may be simpler and cheaper to construct. Thus, methods are provided herein for applying heat to a subsurface formation wherein conductive granular material provides a conductive pathway between electrically conductive members within wellbores or even between wellbores. In the present embodiments, the granular material itself generates resistive heat sufficient to convert and continue to convert solid hydrocarbons into hydrocarbon fluids.

Improved methods for heating a subsurface formation using an electrical resistance heater are provided. The methods described herein have various benefits in improving the recovery of shale oil. In one embodiment, the method includes providing an electrically conductive first member in a wellbore located in a subsurface formation, and also providing an electrically conductive second member in the wellbore. The method also includes providing an electrically conductive granular material in the wellbore. The granular material has a bulk resistance that is greater than a resistance of the conductive first member and a resistance of the conductive second member.

The granular material is positioned so as to provide an electrical connection between the electrically conductive first member and the electrically conductive second member. A current is established across the electrically conductive first member, the granular material and the electrically conductive second member so as to cause an electrical current to flow. This generates resistive heat which, in turn, transfers heat to at least a portion of the subsurface formation.

The subsurface formation is an organic-rich rock formation. In one aspect, the subsurface formation contains heavy hydrocarbons. In one aspect, the subsurface formation contains solid hydrocarbons. Preferably, the subsurface formation is an oil shale formation. The method may include the step of further applying a voltage to cause solid hydrocarbons in the oil shale formation to be pyrolyzed into hydrocarbon fluids.

The electrical resistance of the conductive members may vary. In any event, a majority of the generated heat emanates from the granular material. In one aspect, at least 75% of the heat is generated via electrical resistance of current flow through the granular material.

It is not required that the granular material directly contact the conductive members, although it is preferred that the granular material contacts both the first member and the second member. In many embodiments, there is no substantial fluid flow within the granular material. In some embodiment, there is no substantial hydrocarbon fluid flow within the granular material while the electrical current is established through the granular material. In one aspect, Darcy flow of hydrocarbon fluids does not substantially occur through the granular material and into the wellbore while the electrical current is established through the granular material.

Various embodiments for heater well arrangements using granular material are described. In some embodiments, the electrical flow through the granular material is primarily longitudinal, while in others the electrical flow through the granular material is primarily radial. The desired resistivity of the in-place bulk granular material is substantially greater for the radial flow embodiments than for the longitudinal flow embodiments. In either arrangement, the resistive heat from the granular material thermally conducts into and warms the surrounding subsurface formation, causing pyrolysis.

A voltage may be passed through the wellbore by passing an alternating current. Alternatively, the voltage may be created by passing a direct current. The voltage in one aspect is between about 200 and 3,000 Volts. Alternatively, the voltage is between about 400 and 2,000 Volts. As an additional step, the method may also comprise testing the electrical conductivity of the electrical circuit formed by the electrically conductive first member, the granular material, and the electrically conductive second member.

The electrically conductive first member may comprise a well pipe. The well pipe may be, for example, a casing, tubing, or combinations thereof. In this arrangement, the electrically conductive second member may optionally be placed within the well pipe. In one aspect, the electrically conductive second member hangs within the surrounding well pipe. A weight may be placed proximate the bottom of the electrically conductive second member so as to maintain the electrically conductive second member in tension.

In one aspect, the step of providing an electrically conductive first member in a wellbore comprises running a well pipe string in the wellbore to a first depth, the well pipe string thereby serving as at least a portion of the electrically conductive first member. The step of providing an electrically conductive second member in the wellbore comprises running a second conductive string within the well pipe string to a second depth below the first depth. The second conductive string thereby serves as at least a portion of the electrically conductive second member. The step of providing an electrically conductive granular material in the wellbore then includes placing the granular material around the second conductive string below the first depth.

The wellbore may be left uncased below the first depth. In this instance, the granular material resides in an annular region defined between the second conductive string and the surrounding subsurface formation. Alternatively, the wellbore may be cased with an electrically nonconductive casing below the first depth. In either instance, it is preferred that the surface casing not be electrified so as to enhance safety. This may be accomplished in several ways such as where the electrical flow near the surface is through an insulated wire.

In one aspect, the well pipe string comprises an upper portion and a lower portion. Each of these portions is electrically conductive. An intermediate portion that is non-conductive is provided between the upper and lower portions. In this arrangement, the conductive first member may further comprises an electrically conductive wire or cable to provide electrical communication between the lower portion of the first member and a power source at a surface.

In another aspect, the step of providing an electrically conductive first member in the wellbore includes electrically connecting an electrically conductive third conductive member to the well pipe string. The well pipe string and the third member thus serve as at least a portion of the first member. The third member may be disposed around at least a portion of the granular material. The third member may be electrically connected between the well pipe string and the granular material. Alternatively, the third member may be electrically connected to the well pipe string, while the well pipe string is electrically connected to the granular material.

In one aspect, the second depth is near the bottom of the subsurface formation. The second conductive string is insulated with an electrically insulating material from at least the first depth to a third depth. The third depth is between the first depth and the second depth so that at least a lower portion of the second conductive string is left uninsulated. Then, the step of establishing a current includes establishing a current between the well pipe string and the lower portion of the second conductive string. In this way current is applied through the granular material in order to resistively heat the subsurface formation through the generation of heat within the granular material.

The step of establishing a current may include applying a positive voltage to the first member and a negative voltage to the second member. In this way the voltage is applied from the well pipe string, though the granular material, and to the second conductive string. Alternatively, the step of applying a voltage may include applying a positive voltage to the second member and a negative voltage to the first member. In this way the voltage is applied from the second conductive string, through the granular material, and to the well pipe string.

In another aspect, the first depth and the second depth are both near the bottom of the subsurface formation. An annular region is then defined by the well pipe string and the second conductive string. The step of establishing a current would then include applying a voltage radially through the granular material so as to resistively heat the subsurface formation through the generation of heat within the granular material. Preferably, the first depth is proximate the shallowest depth of the subterranean formation, and the granular material is continuous within the annular region.

In one embodiment of the method, the subsurface formation contains two separate oil shale zones. The electrically conductive granular material is placed within the annular region adjacent each of the two separate oil shale zones. The granular material may be separated within the annular region by slugs of substantially electrically insulating material. The substantially electrically insulating material may be an insulating granular material. In one aspect, the slugs of insulating granular material comprise at least one of quartz sand, ceramic particles, clay particles, and gravel.

Additional methods for heating a subsurface formation are provided herein. In one embodiment, the method includes forming a wellbore to the subsurface formation, and then filling at least a part of the wellbore with an electrically conductive granular material to act as a resistive heating element. The method also includes passing electricity through the granular material in order to generate resistive heat, and then continuing to pass electricity through the granular material. In this way, additional resistive heat is generated in order to cause pyrolysis of at least some solid hydrocarbons in the subsurface formation into hydrocarbon fluids. In one aspect, the solid hydrocarbons comprise kerogen, or oil shale.

The granular material may be fabricated of various materials. In one embodiment, the granular material is comprised of at least 50 wt. % calcined coke.

Certain electrically conductive hardware may be installed into the wellbores. In one embodiment, the method further includes placing a string of conductive casing proximate the bottom of the wellbore, and also running an elongated conductive element into the wellbore and within the string of casing. This serves to form an annular region between the string of conductive casing and the elongated conductive element along the subsurface formation. The electrically conductive granular material is disposed in at least a portion of the annular region. The elongated conductive element preferably comprises a metal rod or a metal wire. Preferably, the elongated conductive element is centralized in the casing using nonconductive centralizers. In this embodiment, the steps of passing electricity through the granular material comprise passing an electrical current through the casing, through the granular material, and through the conductive element within the casing. This creates longitudinal resistive heating.

In an alternate embodiment, the method includes running a string of conductive casing into the wellbore to a first depth, and running an elongated conductive element into the wellbore and within the string of conductive casing to a lower second depth. Here, the elongated conductive element is insulated from about the first depth in the wellbore to the second depth proximate the bottom of the wellbore, but with an exposed portion left proximate the bottom of the wellbore. In this embodiment, the step of passing electricity through the electrically conductive granular material comprises radially passing an electrical current through the string of casing, through the granular material, and through the exposed portion of the elongated conductive element in order to generate resistive heat in the granular material.

In each of the above methods, the electrically conductive granular material may be a mixture of two or more component granular materials, each having a different conductivity. This allows the operator to adjust the bulk resistance of the mixture. In one aspect, one or more of the component granulated materials comprises essentially nonconductive materials. Examples of such nonconductive materials include ceramic particles, clay particles, gravel, quartz sand, or combinations thereof. In another aspect, one or more of the component granulated materials comprises highly conductive materials. Examples of such highly conductive materials include steel shot, metal alloy particles, metal filings, or combinations thereof. In yet another aspect, the electrically conductive granular material may be mixed with a binder which sets after being placed in the wellbore. An example of a binder is cement.

In each of the above methods, the electrically conductive granular material may comprise one or more slugs of highly conductive granular material interspersed between slugs of less conductive granular material. In this way, only subsections of the wellbore receiving the less conductive granular material will be substantially heated. In an inverse embodiment, the electrically conductive granular material comprises one or more slugs of highly insulative granular material interspersed with slugs of more conductive granular material. In this way, only subsections of the wellbore receiving the more conductive granular material will be substantially heated.

In another embodiment of the methods herein, the method includes running a string of conductive casing into the wellbore to a first depth, and then completing the wellbore horizontally at a second depth. This wellbore serves as a first wellbore. The method also includes completing a second wellbore having a string of conductive casing, wherein the second wellbore intersects the first wellbore proximate the second depth. The method also includes providing electrically conductive granular material in the first wellbore, the second wellbore, or both to provide electrical communication between the string of casing in the second wellbore and the granular material in the first wellbore. In this embodiment, the step of passing electricity through the granular material comprises directing an electrical current through the strings of casing in the first and second wellbores, and further through the granular material to generate resistive heat. The resistive heat is still primarily generated from the granular material.

In each of the above methods, the electrically conductive granular material may be placed in the wellbore or wellbores in various ways. In one aspect, the granular material is pumped into the wellbore as a slurry. In another aspect, the granular material is mixed with a second material to improve dry flowability. An example of such a second material is silica powder. In another aspect, the granular material is placed in the wellbore through coiled tubing.

Yet another method for heating a subsurface formation using an electrically resistive heater is provided herein. The subsurface formation comprises at least one of an oil shale zone, coal or tar sands. In this embodiment, the method includes forming a wellbore below an earth surface and into the subsurface formation; running a string of casing into the wellbore; running an elongated, electrically conductive conductor element within the string of casing; injecting electrically conductive granular material between the conductor element and the surrounding string of casing proximate a bottom of the wellbore; and applying a voltage across the string of casing and the conductor element in order to resistively heat the subsurface formation. The voltage may be applied by passing an alternating current or a direct current. In one aspect, the voltage is applied by passing a three-phase alternating current. The method may further include the step of testing the conductivity of the electrical circuit formed by the string of casing and the conductor element.

The wellbore in the above method is preferably substantially vertical. In this instance, the electrically conductive conductor element hangs within the surrounding string of casing. A weighted assembly may be disposed proximate the bottom of the conductor element to provide tension to the conductor element after it is run into the wellbore. The method may further comprise installing electrically nonconductive centralizers between the conductor element and the surrounding string of casing. The centralizers are preferably sized to frictionally engage an inner diameter of the surrounding string of casing while permitting relative longitudinal movement between the string of casing and the conductor element. The step of installing electrically nonconductive centralizers is performed by attaching the centralizers to the conductor element. The conductor element may be a metal rod. Alternatively, the conductor element may be one of a metal bar, pipe or tube. Alternatively still, the conductor element may be a wire such as an elongated wire, a braided wire or a cable.

In one aspect, the applied voltage is between 220 volts and 4,000 volts. In another aspect, the applied voltage is between 1,000 and 3,000 volts.

A resistive heater is also provided herein. In one aspect, the resistive heater comprises a wellbore formed from an earth surface and into the subsurface formation. Preferably, the subsurface formation is an oil shale zone. A string of casing is placed in the wellbore. In addition, an elongated, electrically conductive conductor element is placed within the string of casing. The conductor element may be a metal rod. Alternatively, the conductor element is one of a metal bar, pipe, or tube. Alternatively still, the conductor element may be a wire such as an elongated wire, a braided wire, or a cable.

The resistive heater also comprises electrically conductive granular material. The granular material is disposed within the string of casing at a bottom of the wellbore and along the depth of the subsurface formation. The granular material provides an electrical connection between the string of casing and the conductor element.

The resistive heater may also include a plurality of electrically nonconductive centralizers. The centralizers are disposed between the conductor element and the surrounding string of casing. The centralizers permit relative longitudinal movement between the string of casing and the conductor element. At the same time, the centralizers are preferably sized to slidingly engage an inner diameter of the surrounding string of casing.

In one aspect, the wellbore is substantially vertical. In this embodiment, the conductor element freely hangs within the surrounding string of casing. A weighted assembly may be disposed proximate a bottom of the conductor element in order to apply tension to the conductor element.

To prevent hydrocarbon fluids and potentially corrosive gases from entering the wellbore, the wellbore may optionally be sealed to formation gases. In one aspect, the wellbore is pressurized with an inert gas such as nitrogen. In one aspect, the pressure is at least 50 psia.

Yet another method for heating a subsurface formation is provided herein. In one aspect, the method comprises forming a wellbore to the subsurface formation; running a string of conductive casing into the wellbore; running a conductive string into the wellbore within the string of casing and to the subsurface formation; filling at least a part of the wellbore with an electrically conductive granular material to provide an electrical connection between the string of casing and the conductive string and to act as a resistive heating element; and passing electricity through the granular material in order to generate resistive heat. The subsurface formation preferably comprises solid hydrocarbons such as kerogen, or oil shale.

In one aspect the string of casing is completed at the depth of the subsurface formation. In this instance, the granular material is disposed in an annular region defined between the conductive string and the surrounding string of casing such that resistivity is radially created.

In another aspect, the string of casing is completed at a first depth above the subsurface formation, leaving an open hole at the subsurface formation. The conductive string is insulated from about the first depth in the wellbore to a second depth proximate the bottom of the wellbore, but leaving an exposed portion proximate the bottom of the wellbore. The granular material is disposed substantially in an annular region defined between the conductive string and the surrounding open hole such that resistivity is longitudinally generated.

In still another aspect, the string of casing is completed at the depth of the subsurface formation. The string of casing comprises a first conductive portion to the shallowest depth in the subsurface formation desired to be treated. The string of casing may optionally have a second nonconductive portion extending down through the subsurface formation. The conductive string is insulated from about the first depth in the wellbore through the subsurface formation, but leaving an exposed portion proximate the bottom of the wellbore. The granular material is disposed substantially in an annular region defined between the conductive string and the surrounding open hole or, alternatively, nonconductive portion of the casing such that resistivity is longitudinally generated.

Yet another method for heating a subsurface formation is provided herein. In one aspect, the method comprises forming a first wellbore that is substantially vertical, and is completed in the subsurface formation; forming a second wellbore having a deviated portion which intersects the first wellbore within the subsurface formation; inserting heater elements into the first wellbore and the second wellbore; and activating the heater elements to generate heat into the subsurface formation. The deviated portion of the second wellbore may be substantially horizontal.

The heater elements are electrical heaters that comprise electrically conductive granular material. Using the granular material, an electrical communication is created at the intersection between the first and second wellbores. The step of activating the heater elements comprises passing an electrical current through the granular material to provide resistive heat to the surrounding subsurface formation.

The step of inserting heater elements into the first wellbore may comprise running coiled tubing into the first wellbore and, optionally, the second wellbore, and pumping the granular material into at least the first wellbore. Alternatively, the step of inserting heater elements into the second wellbore comprises running coiled tubing into the second wellbore and, optionally, the first wellbore, and pumping the granular material into at least the second wellbore. In one aspect, the granular material is pumped into the wellbore as a slurry. Alternatively, the granular material is mixed with a second material to improve dry flowability. An example is silica powder.

The above method may further include forming a third wellbore that is substantially vertical, and that intersects with the second wellbore within the subsurface formation. A heater element is then inserted into the third wellbore.

In another embodiment, two or three wells are drilled such that they intersect downhole. The wells within the target formation are spaced about 10 to 120 feet apart, and preferably 20 to 80 feet apart. Granular material is placed in the wells and connected via a conductive member to the surface. The conductive member may be casing, a rod, wire, or a combination. In the three-well case, utilization of three-phase power is preferred. In the two-well case, direct or alternating current may be used, though alternating current is preferred. The granular material serves as the primary heat source in the system and generates the heat via electrical resistance.

Methods of producing hydrocarbon fluid are also provided herein. The methods include heating an organic-rich rock formation in situ using an electrical resistance heater, and then producing a hydrocarbon fluid from the organic-rich rock formation. In these methods the hydrocarbon fluid has been at least partially generated as a result of pyrolysis of formation hydrocarbons located in the organic-rich rock formation.

In one embodiment, the electrical resistance heater is formed by providing electrically conductive first and second members in a wellbore. The first member has a lower end terminating at a first depth, with the first depth being located at least partially within a subsurface formation. The first member is insulated above the first depth. The second member has a lower end that terminates at a second depth lower than the first depth. The second member is insulated above the second depth.

The electrical resistance heater is also formed by providing an electrically conductive granular material in the wellbore. The granular material is positioned to provide electrical communication between the lower end of the first member and the lower end of the second member. An electrical current is established through the first member, the granular material and the second member in order to generate heat from the granular material. At least a portion of the generated heat is transferred by thermal conduction into the surrounding subsurface formation.

In another embodiment, electricity is passed through a conductive granular material to generate resistive heat within the granular material. Here, the granular material is disposed between and within at least two adjacent wellbores that are completed at least partially within a subsurface formation. The granular material provides electrical communication between the wellbores such that a majority of the resistive heat is generated within the granular material. The granular material has a bulk resistance that is greater than a resistance of the wellbores. The method then includes transferring, by thermal conduction, at least a portion of the resistive heat into the subsurface formation in order to cause in situ pyrolysis of at least some solid formation hydrocarbons to form hydrocarbon fluid.

Figure 29:
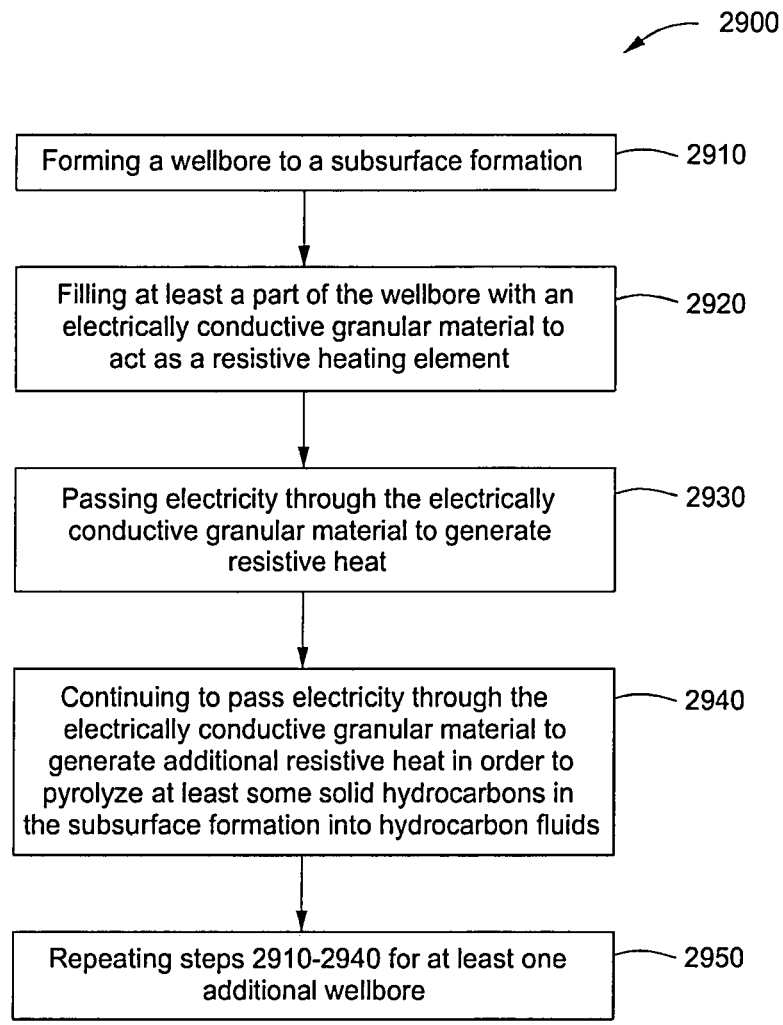
FIG. 29 is a flow chart showing steps that may be performed in connection with one embodiment of the present inventions for heating a subsurface formation.

FIG. 29 provides a flow chart showing certain steps that may be performed in connection with one method 2900 of the present inventions. The method 2900 pertains to the heating of a subsurface formation. In the illustrative embodiment of FIG. 29, the method 2900 includes the step of forming a wellbore to the subsurface formation. This step is shown at Box 2910. This step 2910 is not limited to the manner in which the wellbore is formed or its depth. Further, the step 2910 is not limited to the location or type of subsurface formation. However, it is preferred that the formation comprise solid hydrocarbons such as kerogen.

The illustrative method 2900 also includes filling at least a part of the wellbore with an electrically conductive granular material. This step is shown at Box 2920. The granular material acts as a resistive heating element. This step 2920 is not limited to the type of granular material, so long as it has a resistivity sufficient to heat the surrounding formation in response to carrying a current.

The illustrative method 2900 also includes passing electricity through the granular material in order to generate resistive heat. This step is shown at Box 2930. This step 2930 is not limited to the manner in which the electricity is passed or the hardware downhole which delivers the electricity. In one aspect, a voltage is applied across a string of casing placed downhole. The voltage is further applied through the electrically conductive granular material and to a conductor element in order to resistively heat the subsurface formation. The voltage may be applied by passing an alternating current. Alternatively, the voltage may be applied by passing a direct current. In one aspect, a three-phase alternating current is provided.

The illustrative method 2900 may include the step of continuing to pass electricity through the electrically conductive granular material to generate additional resistive heat. This step is shown at Box 2940. This step 2940 may be employed for the purpose of causing pyrolysis of at least some solid hydrocarbons in the subsurface formation into hydrocarbon fluids. Preferably, temperatures in excess of 300° C., and perhaps greater than 500° C., are achieved from the resistive heating.

In one aspect, the steps 2910 through 2940 are repeated for one or more adjacent wellbores. This is shown at Box 2950. Preferably, multiple heater wells are employed for heating an extended area of a subsurface formation. The heater wells may be placed in linear arrays, or may be arranged in patterns with hydrocarbon production wells. Examples of such patterns included 3-spot, 5-spot and 7-spot well patterns.

In order to practice the illustrative method 2900, a heater well is employed. Various arrangements for a heater well may be used. Such wells contemplate the use of electrical resistance heaters and well designs that are relatively low cost, and yet robust. These designs may, in certain embodiments, provide heater wells that survive high temperatures without experiencing problems associated with material softening and creep. Such wells may also, in certain applications, avoid problems associated with high geomechanical stresses on the well due to thermal expansion or formation subsidence arising from maturation of the oil shale and resulting formation fracturing and movement.

Figure 30A:
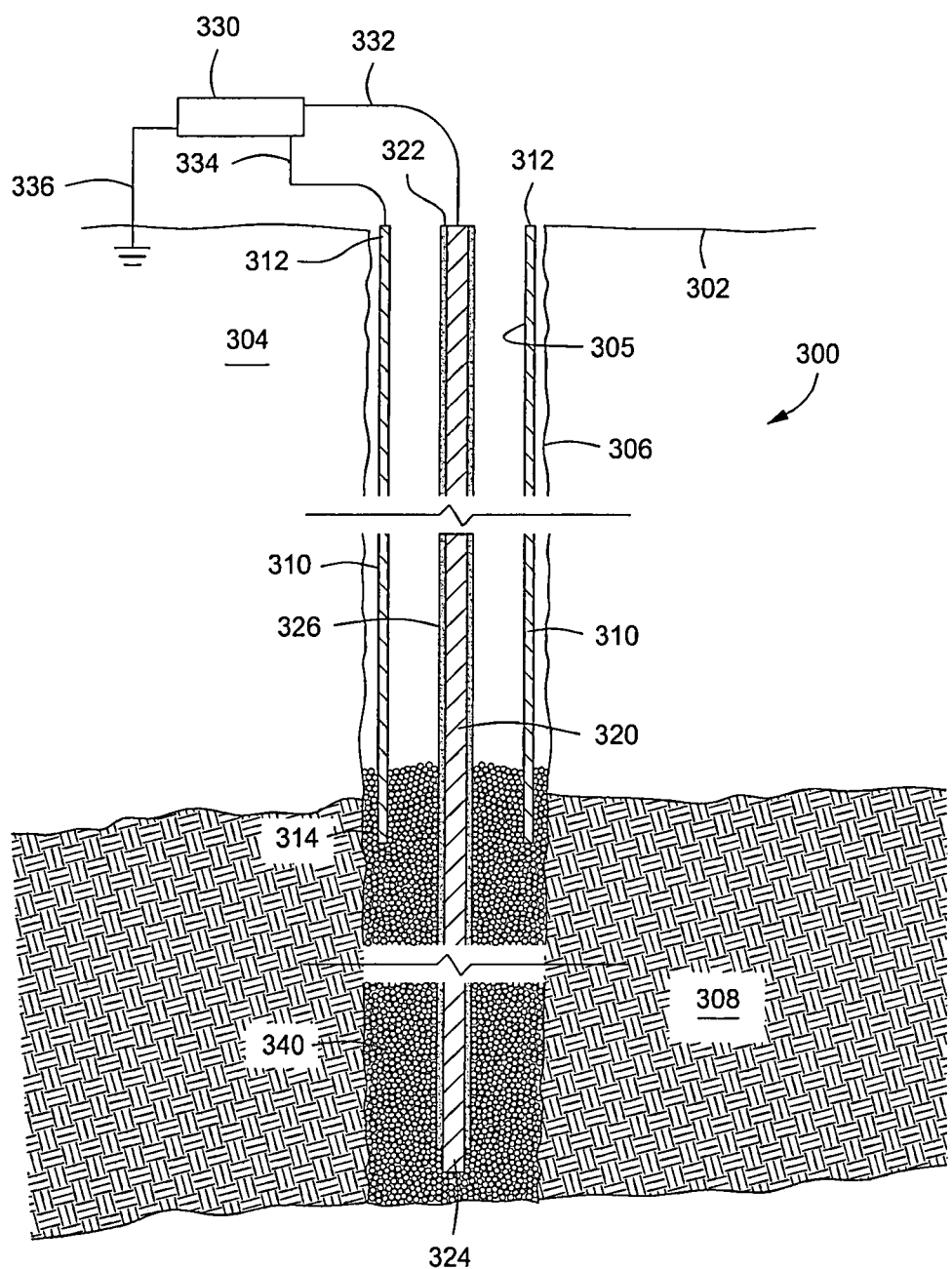
FIG. 30A is a cross-sectional view of a heater well, in one embodiment. Here, a wellbore is completed through a targeted subsurface formation. The wellbore is completed as an open hole at the level of the formation. A single conductive rod is located within a string of well casing in the heater well arrangement. Electricity flows substantially longitudinally through the granular material.

FIG. 30A is a cross-sectional view of an illustrative heater well 300, in one embodiment. Here, a wellbore 305 is completed from an earth surface 302, through the subterranean earth 304, and through a targeted subsurface formation 308. The wellbore 305 has a wall 306 that defines a radius. The wellbore 305 is completed as an open hole at the level of the targeted formation 308. Preferably, the formation 308 comprises solid hydrocarbons such as kerogen.

The heater well 300 comprises an electrically conductive first member 310. In the illustrative heater well 300, the electrically conductive first member 310 is a string of casing.

The string of casing 310 has a top end 312 adjacent the earth surface 302, and a lower end 314. The lower end 314 is completed at a first depth. Below the lower end 314, the wellbore 305 is completed as an open hole.

The string of casing 310 may be fabricated from any conductive material. In one aspect, the material is a metal having a low resistivity. For example, the string of casing 310 may be constructed from a material having a resistivity less than about 0.00001 ($1 \times 10^{-5}$) ohm-meters.

The heater well 300 also comprises an electrically conductive second member 320. In the illustrative heater well 300, the electrically conductive second member 320 is a solid rod. However, the electrically conductive second member 320 may be an elongated tubular body. Alternatively, the electrically conductive second member 320 may be a thin solid body such as an elongated wire. The wire may be, for example, a solid wire, a braided wire or a cable.

The solid rod (or other conductive member) 320 has a top end 322 adjacent the earth surface 302, and a lower end 324. The lower end 324 is completed at a second depth within the wellbore 305. This second depth is below the first depth, and extends to or near the bottom of the wellbore 305. It is preferred that the conductive second member 320 have a weight (not shown) proximate the lower end 324 so as to place the second member 320 in greater tension.

The solid rod 320 may be fabricated from any conductive material. In one aspect, the material is a metal having a low resistivity. For example, the solid rod 320 may have a resistivity less than about 0.00001 ($1 \times 10^{-5}$) ohm-meters.

In order to practice the method 2900, an electrical current is provided between the electrically conductive first member 310 and the electrically conductive second member 320. Therefore, a power source 330 is employed. The power source 330 delivers an electrical current to either the electrically conductive first member 310 or the electrically conductive second member 320. Conductive wire 332 provides electrical communication between the power source 330 and the solid rod 320, while conductive wire 334 provides electrical communication between the power source 330 and the string of casing 310. A third wire 336 optionally goes to ground.

In one aspect, a positive pole is set up at conductive wire 334, while a negative pole is set up at conductive wire 332. Current flows down the wellbore 305 through the string of casing 310, and then up the wellbore 305 through the solid rod 320. In this manner, the heater well 300 forms a circuit. Alternatively, the polarity of this circuit may be reversed.

It is necessary to provide a form of electrical communication between the string of casing 310 and the solid rod 320. In accordance with method 2900, an electrically conductive granular material 340 is used. The granular material 340 is placed in the wellbore 305 around the solid rod 320 and within the string of casing 310.

Suitable granular material 340 may include calcined coke, graphite, metal oxides, or ceramic particles coated with thin metal layers. The granular material 340 may be hollow, solid, porous, sintered, or agglomerated, so long as the material 340 conducts electricity and provides an in-place resistance generally higher than the string of casing 310 and the solid rod 320. The granular material may comprise regularly or irregularly shaped particles. The particles may have a range of sizes or be geometrically configured to increase the total particle-to-particle contact area. This serves to improve electrical conductivity. It is preferred that the lower end 324 of the second member 320 is sharpened so as to facilitate downward movement through the granular material in the event of thermal expansion of the second member 320.

The resistance of the in-place granular material 340 should be high enough that sufficient amounts of heat can be generated with moderate voltages, for example, about 600 to 2400 volts. In one aspect, the in-place resistivity of the bulk material 340 is on the order of $10^{-5}$ to $10^{-2}$ ohm-meters. This value is several orders of magnitude higher than the resistivity of most metals, and is intentionally higher than the resistivity of the first conductive first member 310 and the second conductive member 320.

It is noted that the range of resistivity provided above is for the in-place bulk granular material and not the individual granular particles. The resistivity of the individual particles necessarily will be less than the resistivity of the bulk value due to added resistance caused by limited contact area between the granular particles.

Figure 30B:
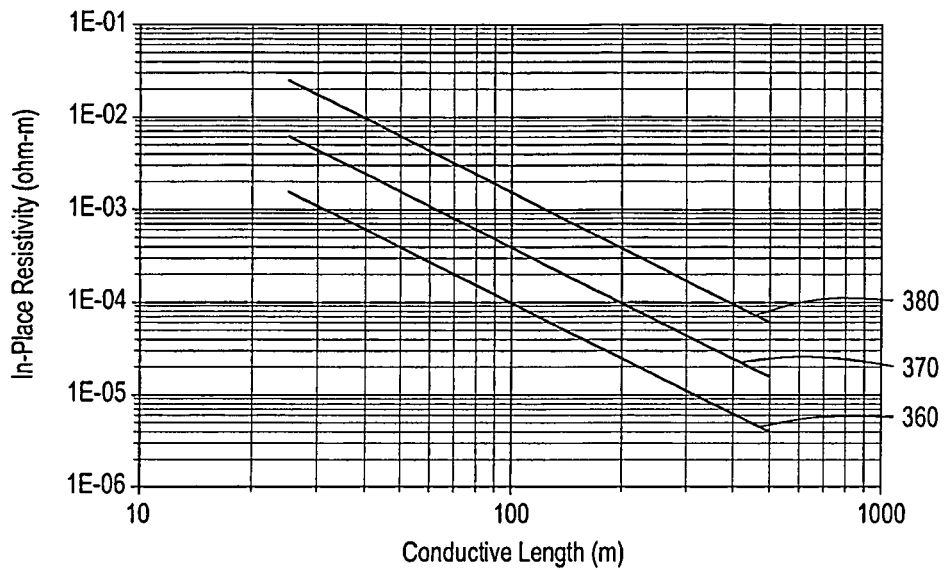
FIG. 30B provides a graph charting in-place resistivity of bulk granular material versus heated length required. The criteria is for the bulk granular material to suffer 2,000 Watts per meter of energy dissipation for three voltages: 500V, 1000V, and 2000V. The calculations assume that the electricity flows longitudinally through the granular material as would be provided in the heater well of FIG. 30A. The calculations assume that the bulk material is in a tubular form.

FIG. 30B provides a graph charting in-place resistivity of the bulk granular metal versus heated length required so that the bulk granular material suffers 2,000 Watts per meter of energy dissipation (e.g., "line loss"). The calculations are made at three different voltage levels: line 360 charts conductive length versus in-place resistivity at 500 volts; line 370 charts conductive length versus in-place resistivity at 1,000 volts; and line 380 charts conductive length versus in-place resistivity at 2,000 volts.

The length of the heated bulk material is measured in meters, while the resistivity of the granular material is measured in ohm-meters. The calculations assume that the electricity flows longitudinally through the granular material. The granular material is packed in a tubular form having a 0.10 meter (about 4 inches) inner diameter.

It is noted in the graph that resistivity varies depending upon the voltage applied through the granular material. Along each voltage line 360, 370, 380, the required resistivity decreases with length of heated material. For example, for line 370 representing 1,000 volts of electrical energy, the resistivity at 100 meters is about $3.9 \times 10^{-4}$ ohm-meters, while at 400 meters the resistivity drops to about $2.5 \times 10^{-5}$ ohm-meters. However, the required overall resistivities increase when the voltage is increased. Thus, for line 380 representing 2,000 volts of electrical energy, the resistivity at 100 meters is about $1.6 \times 10^{-3}$ ohm-meters, while at 400 meters the resistivity drops to about $9.8 \times 10^{-5}$ ohm-meters. This demonstrates that the resistivity of the granular material must be tailored to the heating length and supplied voltage so to achieve a desired heat dissipation.

Returning to FIG. 30A, the granular material 340 may be mixed with materials of greater or lower conductivity to adjust the bulk resistivity. Materials with greater conductivity may include metal filings or shot. Materials with lower conductivity may include quartz sand, ceramic particles, clays, gravel, or cement. To achieve repeatable and uniform performance, such a granular material 340 mix may be further mixed with another material to aid dry flowability. An example is silica powder.

The granular material 340 may be placed in the wellbore 305 by pouring it in dry, by blowing it in through moveable and removable tubing (e.g., coiled tubing), or by slurrying it in. Slurrying the material with a liquid is not the preferred method since the liquid will then need to be removed if the heater well 300 is to be heated above its boiling point. Moreover, heating the well 300 to vaporize the liquid may result in void spaces forming in the granular material 340 and interfere with the electrical properties. Whatever method is used for placing the granular material into the wellbore 305, reciprocating the casing 310, the solid rod 320, or both can aid the settling and packing of the granular material 340. Additionally, a mass of substantially nonconducting granular material (not shown) may be placed on top of the granular material 340 to be heated so to provide weight for compaction.

It is desirable to prevent a short circuit in the heater well 300. To inhibit shorting, an insulative coating 326 may be provided around the electrically conductive second member 320. The insulative coating 326 may be a ceramic coating, a cement coating, or other protective and nonconductive material. The insulative coating 326 extends through most of the targeted formation 308, but leaves the lower portion 324 of the electrically conductive second member 320 exposed.

In the illustrative heater well 300 of FIG. 30A, the insulative coating 326 extends from the surface 302 to about the targeted formation 308. However, the insulative coating 326 may optionally start just above the targeted formation 308. In that instance, nonconductive centralizers (not shown) would preferably be employed along the solid rod 320 to prevent contact with the surrounding casing 310.

It can be seen from FIG. 30A that the wellbore 305 is completed with a metal casing 310 that extends down to the shallowest depth of the formation 308 desired to be heated. Below this depth, the wellbore 305 is left uncased. Alternatively, a nonconductive casing (not shown) may be used below the shallowest depth to be heated. An electrical connection 334 is made to the metal casing 310 from the power source 330.

The conductive rod or wire 320, with or without insulation, is placed in the wellbore 305 and proceeds down in one aspect to the deepest depth desired to be heated. The conductive rod 320 is exposed near the bottom. A second electrical connection 332 is made to the rod 320 at the surface 302. Suitable electrically conductive granular material 340 is packed in the wellbore 305 and serves as a "heating element." In one embodiment, the electrically conductive granular material 340 is interspersed with slugs of highly conductive granular material in regions where no or minimal heating is desired.

In operation, the power supply 330 is activated. A voltage is applied across the string of casing 310, through the electrically conductive granular material 340, and up the solid rod 320. It is understood that the current may flow the opposite direction by changing the polarity of the power supply 330. Alternatively, alternating current may be used. The amount of power supplied may be approximately 500 to 4,000 Watts per meter of heated length or, alternatively, 1,000 to 3,000 Watts per meter.

The process of operating the heater well 300 causes heat to be generated within the granular material. This heat is thermally conducted into the surrounding formation 308. This, in turn, pyrolyzes solid hydrocarbons into hydrocarbon fluids. To prevent hydrocarbon fluids and potentially corrosive gases from entering the wellbore 305, the wellbore 305 may optionally be sealed to formation gases at the bottom. In one aspect, the wellbore 305 is pressurized with an inert gas such as nitrogen. The pressure is preferably at least 50 psia.

There are other ways of forming a heater well for resistively heating a subsurface formation. FIG. 31A is a cross-sectional view of a heater well 3100, in an alternate embodiment. Here, a wellbore 3105 is completed from an earth surface 3102, through the subterranean earth 3104, and through a targeted subsurface formation 3108. The wellbore 3105 has a wall 3106 that defines a radius. The wellbore 3105 is cased down through the formation 3108. Preferably, the formation 3108 comprises solid hydrocarbons such as kerogen.

Wellbore arrangement 3100 differs from wellbore arrangement 300 in FIG. 30A. In this respect, wellbore arrangement 300 utilizes a longitudinal flow of electricity. Electricity travels downward through the granular material 340 until it reaches the uninsulated lower portion 324 of the conductive member 320. However, in wellbore arrangement 3100, electricity flows between an electrically conductive second member 3120 and a surrounding electrically conductive first member 3110. Thus, the electricity flows radially through the granular material rather than longitudinally.

The heater well 3100 comprises an electrically conductive first member 3110. In the illustrative heater well 3100, the electrically conductive first member 3110 is again a string of casing. The string of casing 3110 has a top end 3112 adjacent the earth surface 3102, and a lower end 3114. The lower end 3114 is completed at a first depth which is proximate the bottom of the wellbore 3105.

The electrically conductive first member 3110 may again be fabricated from any conductive material. In one aspect, the material is a metal having a low resistivity. For example, the conductive material composing the electrically conductive first member 3110 may have a resistivity less than about 0.00001 ($1\times10^{-5}$) ohm-meters.

The heater well 3100 also comprises an electrically conductive second member 3120. In the illustrative heater well 3100, the electrically conductive second member 3120 is a solid rod. However, the electrically conductive second member 3120 may be an elongated wire or a tubular body such as a string of metal tubing. The solid rod 3120 has a top end 3122 adjacent the earth surface 3102, and a lower end 3124. The lower end 3124 is also completed proximate the bottom of the wellbore 3105.

The solid rod 3120 may be fabricated from any conductive material. In one aspect, the material is a metal having a low resistivity. For example, the material composing the solid rod 3110 may have a resistivity less than about 0.00001 ohm-meters ($1\times10^{-5}$).

In order to practice the method 2900 using heater well 3100, it is desirable to provide electrical current to the wellbore 3105. Therefore, a power source 3130 is employed. The power source 3130 delivers an electrical current to either the electrically conductive first member 3110 or the electrically conductive second member 3120. Conductive wire 3132 provides electrical communication between the power source 3130 and the solid rod 3120, while conductive wire 3134 provides electrical communication between the power source 3130 and the string of casing 3110. A third wire 3136 optionally goes to ground.

In one aspect, a positive pole is set up at conductive wire 3134 and a negative pole is set up at conductive wire 3132. Current flows down the wellbore 3105 through the string of casing 3110, radially through the granular material 3140, and then up the wellbore 3105 through the solid rod 3120. In this arrangement, the solid rod 3120 is not insulated in the region where heat generation is desired.

It is once again necessary to provide a form of electrical communication between the string of casing 3110 and the solid rod 3120 in order to complete the circuit. In accordance with method 2900, an electrically conductive granular material 3140 is used. The granular material 3140 is placed in the wellbore 3105 around the solid rod 3120 and within the string of casing 3110.

Overall, the resistance of electrical flow through the granular material 3140 is greater than the resistivity of the conductive first 3110 and second 3120 members. In this way, the granular material 3140 contributes the majority of the resistive heating from the heater well 3100. In one aspect, the granular material 3140 contributes at least 75% of the resistive heating. In one aspect, the resistivity of the in-place bulk granular material 3140 is on the order of 100 to 10,000 ohm-meters. Suitable granular materials 3140 may include calcined coke, graphite, metal oxides, or ceramic particles coated with thin metal layers.

Figure 31B:
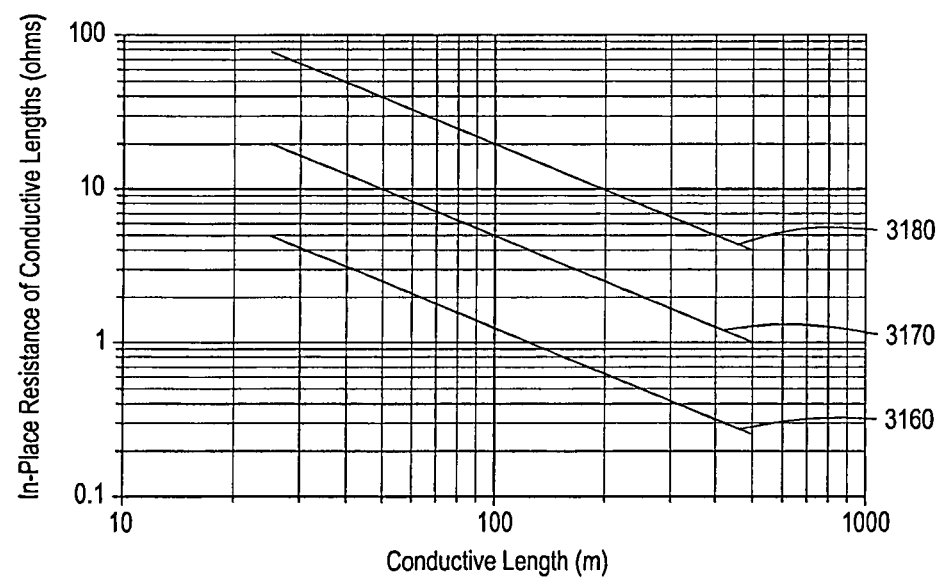
FIG. 31B is another graph charting the targeted in-place resistance of a granular heating element versus its length. Here, the electricity flows radially through the granular material as would be provided in the heater well of FIG. 30B. The calculations assume that the bulk material is in a tubular form.
Figure 31A:
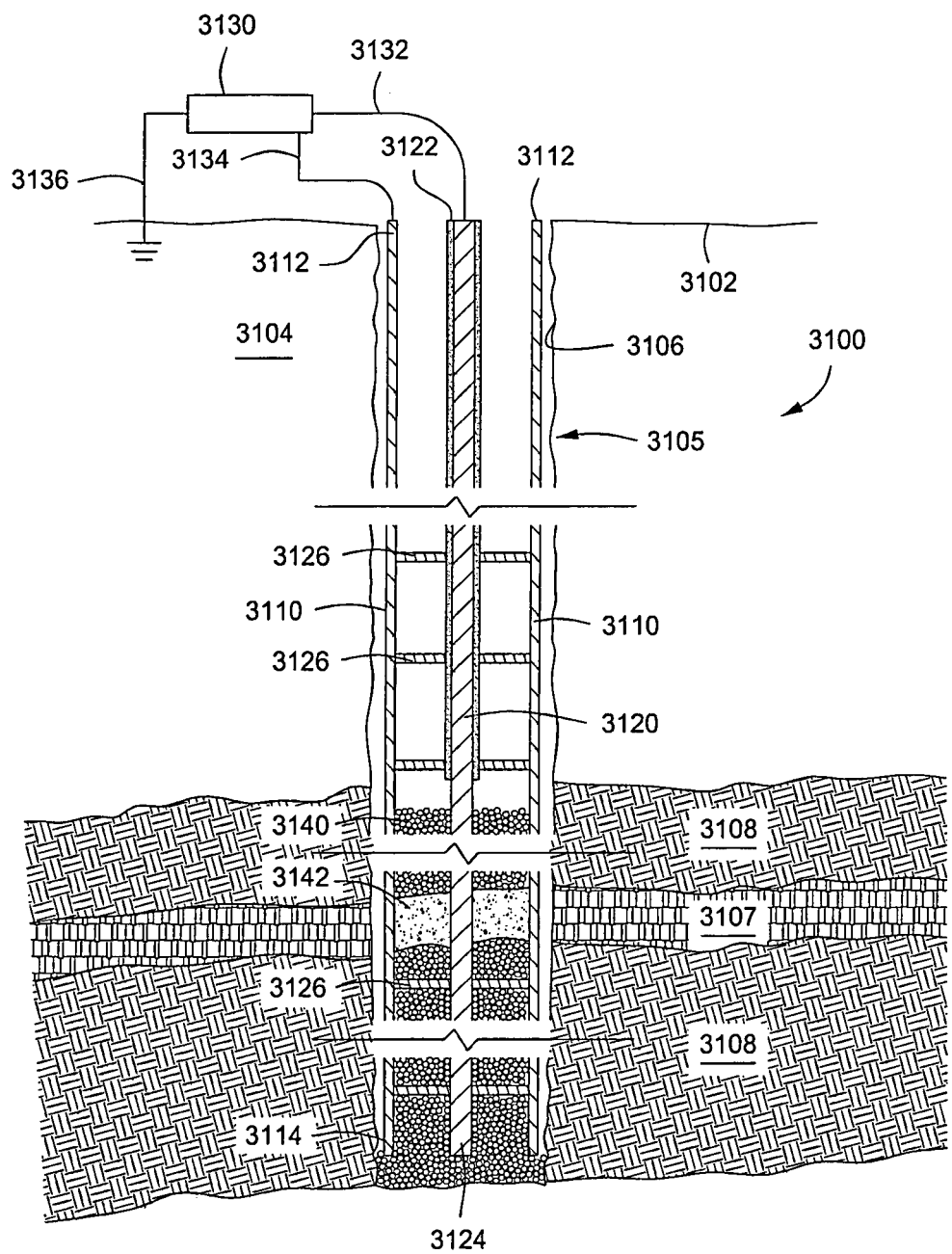
FIG. 31A is a cross-sectional view of a heater well, in an alternate embodiment where the electricity flows substantially radially through the granular material. Here, a wellbore is completed through a targeted subsurface formation. The wellbore is cased down through the formation.

FIG. 31B provides a graph charting the necessary in-place resistance of a granular heating element versus its length. The length of the heated bulk material is measured in meters, while the resistance of the granular heating element is measured in ohms.

The calculations assume that the bulk material is in a tubular form having a 2.5 cm inner diameter (about 1 inch) and 10 cm outer diameter (about 4 inches). The calculations also assume that the bulk granular material suffers 2,000 Watts per meter of energy dissipation. It is noted that the necessary resistance varies depending upon the voltage applied through the granular material. Three lines are charted at different voltage levels: line 3160 charts in-place resistance versus conductive length at 500 volts; line 3170 charts in-place resistance versus conductive length at 1,000 volts; and line 3180 charts in-place resistance versus conductive length at 2,000 volts.

In each instance 3160, 3170, 3180, necessary resistance decreases with the length of heated material, and increases with the supplied voltage. This again demonstrates the need to tailor the granular material properties to the heating length and supplied voltage.

Returning to FIG. 31A, the granular material 3140 may be mixed with materials of greater or lower conductivity to adjust the overall resistivity. Stated another way, the granular material 3140 may comprise a mixture of two or more component granular materials each with different electrical conductivity in order to adjust the bulk resistivity of the mixture. Materials with greater conductivity may include metal filings, metal spheres, or combinations thereof. Materials with lower conductivity may include quartz sand, ceramic particles, clay particles, gravel, or granulated cement. To achieve repeatable and uniform performance, such a granular material 3140 mix may be further mixed with another material such as silica powder to aid dry flowability.

In one aspect, the granular material may be mixed with a binder. The binder is designed to set after the granular material has been placed in the wellbore. The binder may be, for example, cement.

In another aspect, the granular material 3140 may comprise one or more slugs of highly conductive material interspersed between slugs of less conductive material. In this way only subsections of the wellbore 3105 receiving the less conductive granular material will be substantially heated. Alternatively, the granular material 3140 may comprise one or more slugs of highly resistive material interspersed with slugs of more conductive material. In this way only subsections of the wellbore 3105 receiving the more resistive granular material will be substantially heated.

The well 3100 of FIG. 31A demonstrates the use of granular material 3140 in layers so as to reduce or even avoid the heating of certain zones. In the illustrative heater well 3100, a material having little or no conductivity is shown at 3142. This nonconductive layer 3142 may be, for example, quartz sand, ceramic particles, clays or gravel. The nonconductive layer 3142 is placed adjacent a surrounding formation 3107, with formation 3107 being disposed between or within targeted formation layers 3108. In this way, resistive heat is applied primarily to the targeted formation layers 3108 but not appreciably to the intermediate formation 3107.

The granular material 3140 may be placed in the wellbore 3105 by pouring it in dry, by blowing it in through moveable and removable tubing (e.g., coiled tubing), or by slurrying it in. Whatever the method of placing the granular material in the well, reciprocating the casing 3110, the solid rod 3120, or both can aid the settling and packing of the granular material 3140. Additionally, a mass of nonconducting granular material (not shown) may be placed on top of the granular material 3140 to be heated so to provide weight for compaction.

It is again desirable to prevent a short circuit in the heater well 3100. To inhibit shorting, centralizers 3126 may be provided around the electrically conductive second member 3120. The centralizers 3126 are fabricated from a nonconductive material such as ceramic, brick, or substantially nonconductive cement. The centralizers 3126 prevent current from prematurely passing between the string of casing 3110 and the conductive rod 3120. Alternatively, or in addition, the electrically conductive second member 3120 may be insulated down to at least the level of the formation 3108 being heated as shown in FIG. 31A. Alternatively, the electrically conductive second member 3120 may be fully insulated except at its lower end 3124. In this way electrical flow may be urged downwardly towards the bottom of the wellbore 3105.

Various types of centralizers 3126 may be used. In one aspect, each centralizer is comprised of two or more pieces which are closely fitted around the solid rod (or other conductor element) 3120. In one aspect, the centralizers are spaced two or more feet apart, 10 feet or more apart, or 50 feet or more apart. In one embodiment, the centralizers 3126 rest upon metal supports clamped to the conductor element, or upon metal pins or bolts disposed along the conductor element 3120. The centralizers 3126 preferably permit relative longitudinal movement between the string of casing 3110 and the solid rod (or other conductor element) 3120. At the same time, the centralizers 3126 are preferably sized to slidingly engage an inner diameter of the surrounding string of casing 3110.

In operation, the power supply 3130 is activated. A voltage is applied across the electrically conductive first member 3110, through the electrically conductive granular material 3140, and up the electrically conductive second member 3120. It is understood that the current may flow the opposite direction by changing the polarity of the power supply 3130. It is also understood that alternating current may be used.

It is again noted that in heater well 3100, the electrical current flows radially through the granular material 3140. The granular material 3140 is placed in the well 3100 with the conductive casing 3110 (such as steel) and a centralized conductive rod or wire 3120. Electrical connections are made to the casing 3110 and rod 3120 at the surface 3102. Electricity is then conducted radially through the casing 3110 to the central rod 3120, or visa versa. The electrically conducting granular material 3140 may be interspersed with slugs of highly insulating granular material in regions where no or minimal heating is desired.

The process of operating the heater well 3100 causes heat to be thermally conducted into the surrounding formation 3108. This, in turn, pyrolyzes solid hydrocarbons into hydrocarbon fluids. To prevent hydrocarbon fluids and potentially corrosive gases from entering the wellbore 3105, the wellbore 3105 may optionally be sealed to formation gases at the bottom. In one aspect, the wellbore 3105 is pressurized with an inert gas such as nitrogen. In one aspect, the pressure is at least 50 psia.

Figure 32:
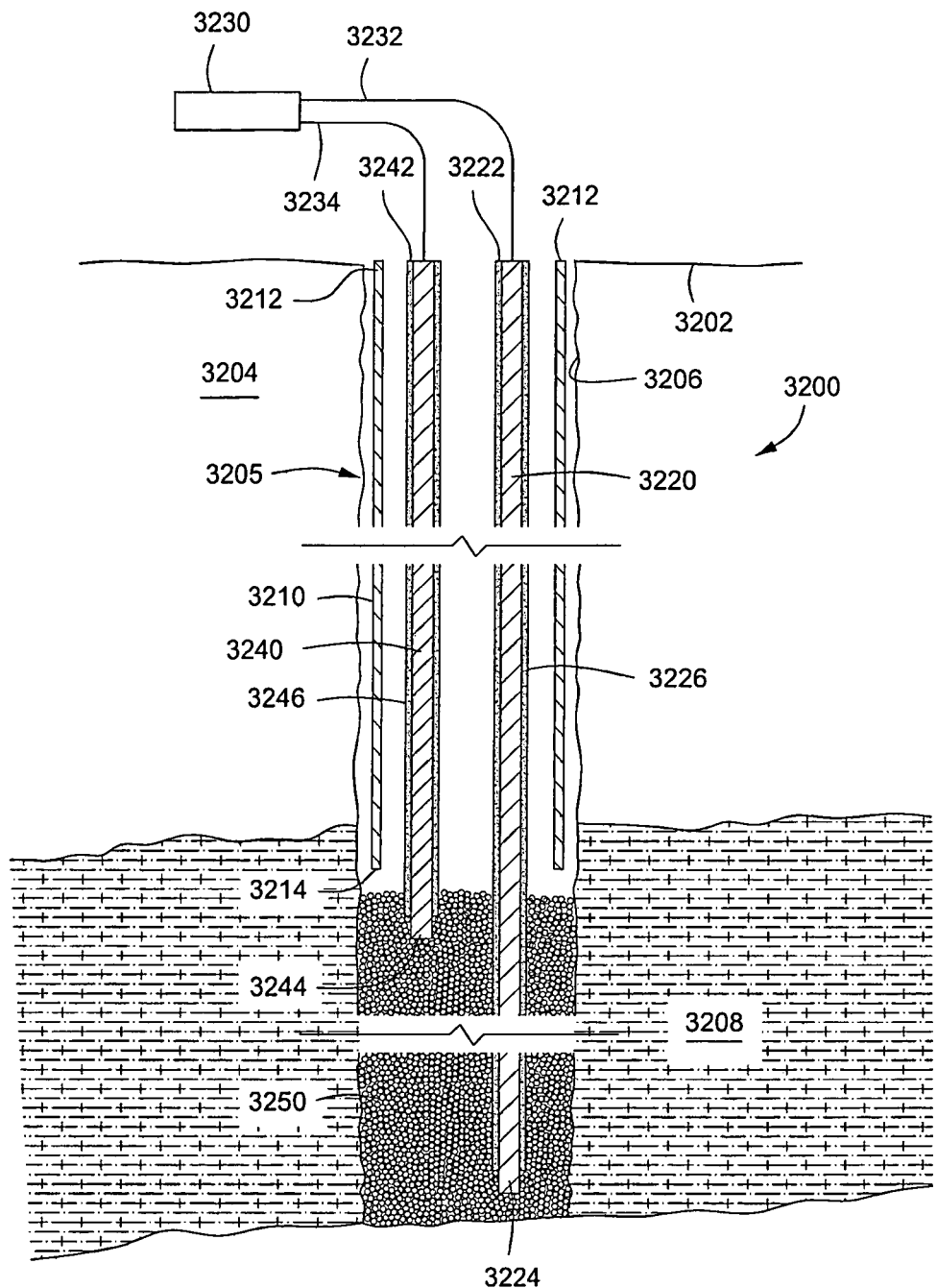
FIG. 32 is a cross-sectional view of a heater well, in an alternate embodiment. Here, a wellbore is completed through a targeted subsurface formation. The wellbore is completed as an open hole at the level of the formation. Two separate rods are used as electrically conductive members.

FIG. 32 is a cross-sectional view of a heater well 3200, in yet another alternate embodiment, that may be used for performing the method 2900. Here, a wellbore 3205 is formed from the earth surface 3202, through the subterranean earth 3204, and through a targeted subsurface formation 3208. The wellbore 3205 has a wall 3206 that defines a radius. The wellbore 3205 is completed as an open hole at the level of the targeted formation 3208. Preferably, the formation 3208 comprises solid hydrocarbons such as kerogen.

The heater well 3200 is partially cased. A string of casing 3210 is shown extending down from the earth surface 3202. The string of casing 3210 has an upper end 3212, and a lower end 3214. The lower end 3214 is cemented or shoed in place at or above the top of the targeted subsurface formation 3208.

It is noted that in the heater well 3200 of FIG. 32, the casing 3210 does not serve as a conductive member. Rather, the casing 3210 serves the traditional function of supporting the surrounding subterranean earth 3204 and isolating groundwater aquifers. The string of casing 3210 may be fabricated from any material, and may be any known type of casing.

The heater well 3200 also comprises a pair of conductive members 3220, 3240. The electrically conductive first member 3220 has an upper end 3222 substantially at the earth surface 3202. The electrically conductive first member 3220 also has a lower end 3224 that extends substantially through the subsurface formation 3208.

In the illustrative heater well 3200, the electrically conductive first member 3220 is a solid rod. However, the electrically conductive first member 3220 may be a tubular body, a wire, or any elongated member fabricated from a conductive material. In one aspect, the material is a metal having a high resistivity. For example, the material composing the electrically conductive first member 3220 may have a resistivity less than about 0.00001 ($1 \times 10^{-5}$) ohm-meters.

The heater well 3200 also comprises an electrically conductive second member 3240. In the illustrative heater well 3200, the electrically conductive second member 3240 is also a solid rod. However, the electrically conductive second member 3240 may be an elongated tubular body or a wire. The wire may be, for example, a braided wire or a cable. The solid rod (or other conductive member) 3240 has an upper end 3242 adjacent the earth surface 3202, and a lower end 3244. The lower end 3244 terminates at a point below the lower end 3214 of the casing 3210, and preferably near the top of the targeted subsurface formation 3208.

The electrically conductive second member 3240 may be fabricated from any conductive material. In one aspect, the material is a metal having a low resistivity. For example, the material comprising the electrically conductive second member 3240 may have a resistivity less than about 0.00001 ($1 \times 10^{-5}$) ohm-meters.

The heater well arrangement 3200 also comprises a granular material 3250. The granular material provides electrical communication between the first 3220 and second 3240 members. The granular material 3250 is placed in the wellbore 3205 around the lower end 3224 of the electrically conductive first member 3220. The granular material 3250 is filled in the wellbore 3205 substantially through the depth of the subsurface formation 3208, and extending around the lower end 3244 of the electrically conductive second member 3240. However, the granular material 3250 does not contact the lower end 3214 of the casing 3210.

Suitable granular material 3250 may include calcined coke, graphite, metal oxides, or ceramic particles coated with thin metal layers. The granular material 3250 may be hollow, solid, porous, sintered, or agglomerated, so long as it conducts electricity and provides an in-place resistance generally higher than the metal material making up the conductive members 3220, 3240 such that the majority of resistive heating is generated in the granular material 3250. The resistance of the conductive material 3250 should be high enough that sufficient amounts of heat can be generated with moderate voltages of about 600 to 2400 volts. In one aspect, the resistivity of the conductive material 3250 is on the order of $10^{-5}$ to $10^{-2}$ ohm-meters.

The granular material 3250 may be placed in the wellbore 3205 in the same manner as it is placed in wellbores 300 or 3100. A mass of nonconductive granular material may be placed on top of the conductive granular material so as to compact it.

In order to practice the method 2900, electrical current is provided between the electrically conductive first member 3220 and the electrically conductive second member 3240. Therefore, a power source 3230 is employed. The power source 3230 delivers an electrical current to either the electrically conductive first member 3220 or the electrically conductive second member 3240. Conductive wire 3232 provides electrical communication between the power source 3230 and the electrically conductive first member 3220, while conductive wire 3234 provides electrical communication between the power source 3230 and the electrically conductive second member 3240.

In one aspect, a positive pole is set up at conductive wire 3234, while a negative pole is set up at conductive wire 3232. Current flows down the wellbore 3205 through the electrically conductive second member 3240, and then up the wellbore 3205 through the electrically conductive first member 3220.

It is desirable to prevent a short circuit in the heater well 3200. To inhibit shorting, an insulative coating 3226 may be provided around the electrically conductive first member 3220. Similarly, an insulative coating 3246 may be provided around the electrically conductive first member 3220. The insulative coatings 3226, 3246 may be a ceramic coating, a cement coating, or other protective and nonconductive material. The insulative coatings 3226, 3246 extend along the length of the conductive members 3220, 3240, respectively, but leave the lower portions 3224, 3244 exposed.

In operation, the power supply 3230 is activated. A voltage is applied across the electrically conductive second member 3240, through the electrically conductive granular material 3250, and up the electrically conductive first member 3220. It is understood that the current may flow the opposite direction by changing the polarity of the power supply 3230. Alternatively, an alternating current may be used. The amount of power supplied may be approximately 500 Watts to 4000 Watts per meter of heated length. More preferably, the amount of power supplied may be approximately 1,000 to 3,000 Watts per meter.

The process of operating the heater well 3200 causes heat to be thermally conducted into the surrounding formation 3208. This, in turn, pyrolyzes solid hydrocarbons into hydrocarbon fluids. To prevent hydrocarbon fluids and potentially corrosive gases from entering the wellbore 3205, the wellbore 3205 may optionally be sealed to formation gases at the bottom.

Figure 33:
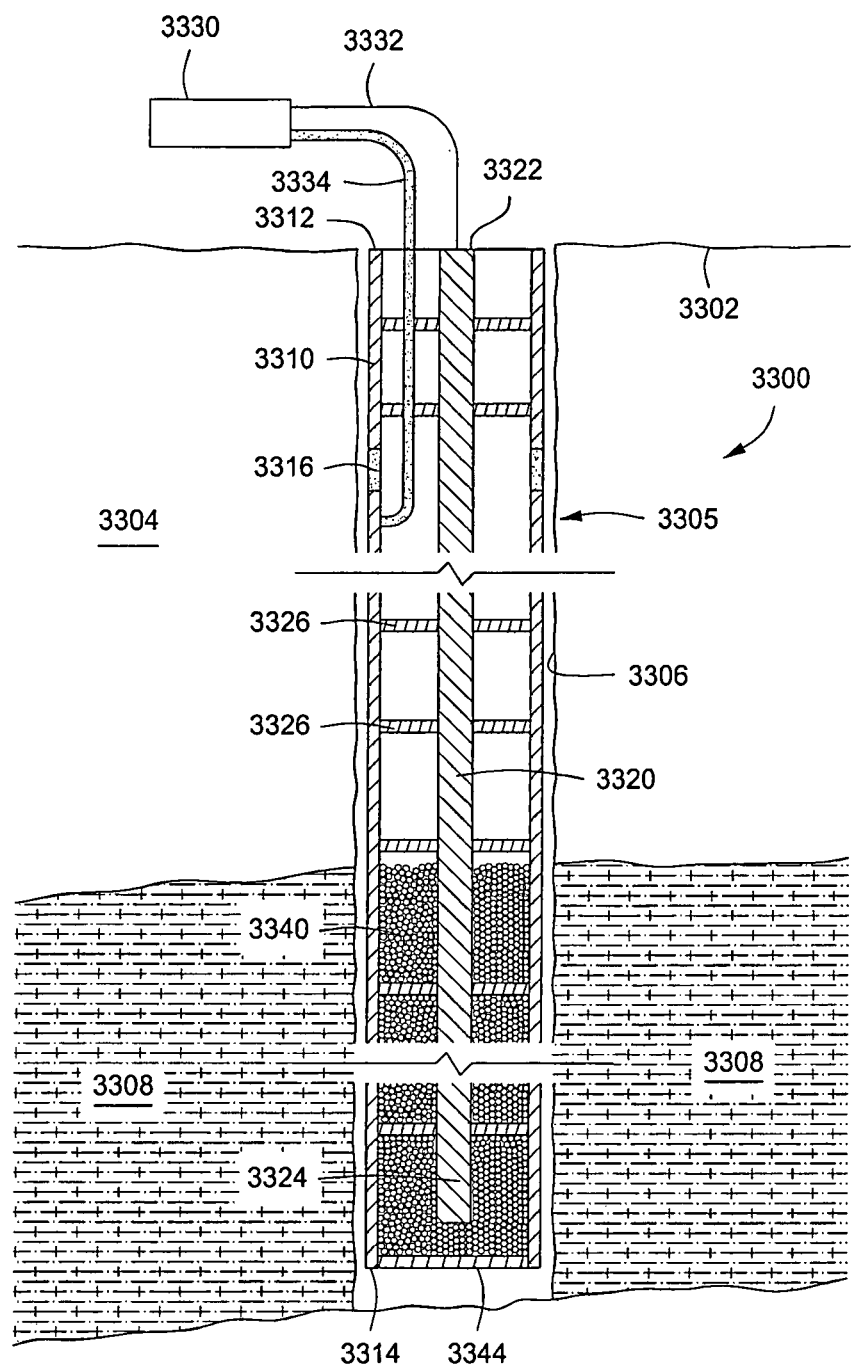
FIG. 33 is a cross-sectional view of a heater well, in an alternate embodiment. Here, a wellbore is completed through a targeted subsurface formation. The wellbore is cased down through the formation.

There are still other ways of forming a heater well for resistively heating a subsurface formation. FIG. 33 is a cross-sectional view of a heater well 3300, in an alternate embodiment. Here, a wellbore 3305 is completed from an earth surface 3302, through the subterranean earth 3304, and through a targeted subsurface formation 3308. The wellbore 3305 has a wall 3306 that defines a radius. The wellbore 3305 is cased down through the formation 3308.

The heater well 3300 comprises an electrically conductive first member 3310. In the illustrative heater well 3300, the electrically conductive first member 3310 is again a string of casing. The string of casing 3310 has a top end 3312 adjacent the earth surface 3302, and a lower end 3314. The lower end 3314 is completed at a first depth which is proximate the bottom of the wellbore 3305.

The string of casing 3310 may again be fabricated from any conductive material. In one aspect, the material is a metal having a low resistivity. For example, the material comprising the string of casing 3310 may have a resistivity less than about 0.00001 ($1 \times 10^{-5}$) ohm-meters.

The heater well 3300 also comprises an electrically conductive second member 3320. In the illustrative heater well 3300, the electrically conductive second member 3320 is a solid rod. However, the electrically conductive second member 3320 may be an elongated wire or a tubular body such as a string of tubing. The electrically conductive second member 3320 has a top end 3322 adjacent the earth surface 3302, and a lower end 3324. The lower end 3324 is also completed proximate the bottom of the wellbore 3305.

The electrically conductive second member 3320 may be fabricated from any conductive material. In one aspect, the material is a metal also having a low resistivity. For example, the solid rod 3310 may have a resistivity less than about 0.00001 ($1 \times 10^{-5}$) ohm-meters.

In order to practice the method 2900, an electrical current is provided to the wellbore 3305. Therefore, a power source 3330 is employed. The power source 3330 delivers an electrical current to either the electrically conductive first member 3310 or the electrically conductive second member 3320. Conductive wire 3332 provides electrical communication between the power source 3330 and the electrically conductive second member 3320, while conductive wire 3334 provides electrical communication between the power source 3330 and the string of casing 3310.

In one aspect, a positive pole is set up at conductive wire 3334 and a negative pole is set up at conductive wire 3332. Current flows down the wellbore 3305 through the string of casing 3310, and then up the wellbore 3305 through the electrically conductive second member 3320. In this arrangement, the electrically conductive second member 3320 is not insulated.

It is once again necessary to provide a form of electrical communication between the string of casing 3310 and the electrically conductive second member 3320 in order to complete the circuit. In accordance with method 2900, an electrically conductive granular material 3340 is used. The granular material 3340 is placed in the wellbore 3305 around the electrically conductive second member 3320 and within the string of casing 3310.

Suitable granular materials 3340 may once again include calcined coke, graphite, metal oxides, or ceramic particles coated with thin metal layers. The electrically conductive granular material 3340 has a resistivity that is higher than the metal material making up the string of casing 3310 and the electrically conductive second member 3320. In one aspect, the bulk resistivity of the in-place bulk granular material 3340 is on the order of 100 to 10,000 ohm-meters.

The granular material 3340 may be placed in the wellbore 3305 by pouring it in dry, by blowing it in through moveable and removable tubing (e.g., coiled tubing), or by slurrying it in. Whatever method is used for placing the granular material in the well, reciprocating the casing 3310, the electrically conductive second member 3320, or both can aid the settling and packing of the granular material 3340. Additionally, a mass of nonconducting granular material (not shown) may be placed on top of the granular material 3340 to be heated so to provide weight for compaction. Compaction, in turn, increases surface-to-surface contact area.

To further inhibit shorting, centralizers 3326 may be provided around the electrically conductive second member 3320. The centralizers 3326 are fabricated from a nonconductive material such as ceramic, brick, or substantially nonconductive cement. The centralizers 3326 prevent current from prematurely passing between the string of casing 3310 and the electrically conductive second member 3320. The centralizers may be of the same type and construction as centralizers 3126 described in connection with FIG. 31A.

An optional feature in the heater well arrangement 3300 is to provide an electrical break in the electrically conductive first member 3310. In this respect, one or more non-conductive joints 3316 may be placed within the electrically conductive first member 3310 above the subsurface formation 3308. The non-conductive joints 3316 may be fabricated from, for example, ceramic or fiberglass. In this arrangement, conductive wire 3334 serves as a heavily insulated wire that extends within the wellbore 3305 below the non-conductive joints 3316. When nonconductive joints 3316 are used, the centralizers 3326 may optionally be removed from around the conductive second member 3320 above the depth of the nonconductive joints 3316.

As yet another option, insulated wire 3334 may extend all the way down to the top of the granular material 3340. In this arrangement, the wire 3334 would serve as the electrically conductive first member itself. The surrounding casing 3310 would then be a substantially non-conductive pipe. In this instance, centralizers 3326 would not be required so long as the wire 3334 did not come into contact with the conductive second member 3320.

In operation, the power supply 3330 is activated. A voltage is applied across the string of casing 3310, through the electrically conductive granular material 3340, and up the electrically conductive second member 3320. It is understood that the current may flow the opposite direction by changing the polarity of the power supply 3330 or that alternating current may be used.

It is noted that in heater well 3300, the electrical current flows radially through the granular material 3340. The granular material is placed in the well 3300 with the conductive casing 3310 (such as steel) and a centralized conductive rod or wire 3320. Electrical connections are made to the casing 3310 and rod 3320 at the surface 3302. Electricity is then conducted radially through the casing 3310 to the central rod 3320, or visa versa. The electrically conducting granular material 3340 may be interspersed with slugs of highly insulating granular material in regions where no or minimal heating is desired.

The process of operating the heater well 3300 causes heat to be generated within the granular material 3340. The resistive heat is generated substantially within and from the granular material 3340. That heat is then thermally conducted into the surrounding formation 3308. This, in turn, pyrolyzes solid hydrocarbons into hydrocarbon fluids.

To prevent hydrocarbon fluids and potentially corrosive gases from entering the wellbore 3305, the wellbore 3305 may optionally be sealed to formation gases at the bottom. Lower cap 3344 is shown in FIG. 33 providing such a seal. In one aspect, the wellbore 3305 is pressurized with an inert gas such as nitrogen. In one aspect, the pressure is at least 50 psia.

The use of heater wells 300, 3100, 3200, 3300 will generate and recover hydrocarbons from oil shale or other organic-rich rocks or source rocks. Preferably, at least two adjacent heater wells representing heater wells 300, 3100, 3200, or 3300 are used for the hydrocarbon recovery. Electrical current is sent through electrically conductive granular material in order generate resistive heat. An AC voltage is preferred, as alternating current is more readily generated and minimizes electrochemical corrosion. Heat is transferred to the surrounding organic-rich rock 308, 3108, 3208 or 3308 by thermal conduction. As a result, the organic-rich rock is heated sufficiently to convert the kerogen in the rock to hydrocarbons. The generated hydrocarbons may then be produced.

During the thermal conversion process, shale permeability is expected to increase. This may be caused by increased pore volume available for flow as solid kerogen is converted to liquid or gaseous hydrocarbons, or it may result from the formation of fractures. As kerogen converts to hydrocarbons, it undergoes a substantial volume increase that increases pore pressure in a confined system. If initial permeability is too low to allow release of the hydrocarbons, excess pore pressure will eventually cause fractures. The generated hydrocarbons may be produced via the same wells (after recompletion) by which the electric power is delivered, or preferably via additional wells.

Although the process is applied in this example to generate hydrocarbons from oil shale, the idea may also be applicable to heavy oil reservoirs, tar sands, or gas hydrates. In these instances, the electrical heat supplied would serve to reduce hydrocarbon viscosity or to melt hydrates. U.S. Pat. No. 6,148,911 discusses the use of an electrically conductive proppant to release gas from a hydrate formation. It is also known to apply a voltage across a formation using brine as the electrical conductor and heating element. U.S. Pat. No. 3,547,193 discusses a method and apparatus in which electrical current is caused to flow through water in a mineral bearing, subsurface formation to produce heating of the mineral. However, it is believed that the use of formation brine as a heating element is inadequate for shale conversion as it is limited to temperatures below the in situ boiling point of water. This means that the circuit fails when water vaporizes.

For in situ development of shale oil, high temperatures must be generated and maintained within the targeted formation. Shale oil development typically requires temperatures in the formation in excess of about 270° C. To achieve such high temperatures throughout a target formation, the heater wells should be even hotter, typically greater than 400° C. However, even with high well temperatures, the heat substantially travels a relatively short distance in the course of several years, typically only about 20 to 50 meters. The short travel distance is a result of the fact that conductive heat transfer is the main mechanism in the formation. Thus, many heater wells are desired to treat a large formation. Rock has relatively low thermal diffusivity values and many oil shale formations have very limited permeability and hence ability to support substantial convective heat transfer.

Using the heater wells 300, 3100, 3200, or 3300, various methods for heating a subsurface formation may be practiced. In one aspect, the method includes forming a wellbore to the subsurface formation, and then filling at least a part of the wellbore with an electrically conductive granular material to act as a resistive heating element. Electricity is passed through the granular material in order to generate resistive heat. Electricity continues to be passed through the granular material to generate additional resistive heat in the subsurface formation. This causes pyrolysis of at least some solid hydrocarbons in the subsurface formation into hydrocarbon fluids.

The method may further comprise placing a string of conductive casing proximate the bottom of the wellbore, and running an elongated conductive element into the wellbore and within the string of casing. In this way an annular region between the string of conductive casing and the elongated conductive element is formed. At least a portion of the granular material is disposed in the annular region. In this embodiment, the steps of passing electricity through the electrically conductive granular material comprise radially passing an electrical current through the casing, through the granular material, and through the conductive element within the casing in order to generate resistive heat in the granular material.

In another embodiment, two elongated conductive members are run into the wellbore and within the surrounding casing string. A first elongated conductive member extends down to a first depth, while a second elongated conductive member extends down to a second depth below the first depth. Each of the conductive materials is insulated from except at its lower end. The conductive granular material is packed into the wellbore so as to contact the exposed lower ends of the respective conductive members. In this arrangement, a heating method includes the step of passing electricity longitudinally through the first conductive member, through the electrically conductive granular material, and through the exposed portion of the second conductive member in order to generate resistive heat in the granular material.

In another embodiment, the string of conductive casing is placed into the wellbore at a first depth. The method also includes running an elongated conductive element into the wellbore and within the string of casing. The elongated conductive element extends to a second depth that is proximate the bottom of the wellbore. Here, the conductive element is insulated from about the first depth in the wellbore to the second depth. An exposed portion is left in the conductive element proximate the bottom of the wellbore. The steps of passing electricity through the electrically conductive granular material comprise longitudinally passing an electrical current through the casing, through the granular material, and through the exposed portion of the conductive element in order to generate resistive heat in the granular material.

In any of the above embodiments, the method may further include testing the conductivity of the electrical circuit formed by the string of casing and the conductor element.

Figure 34A:
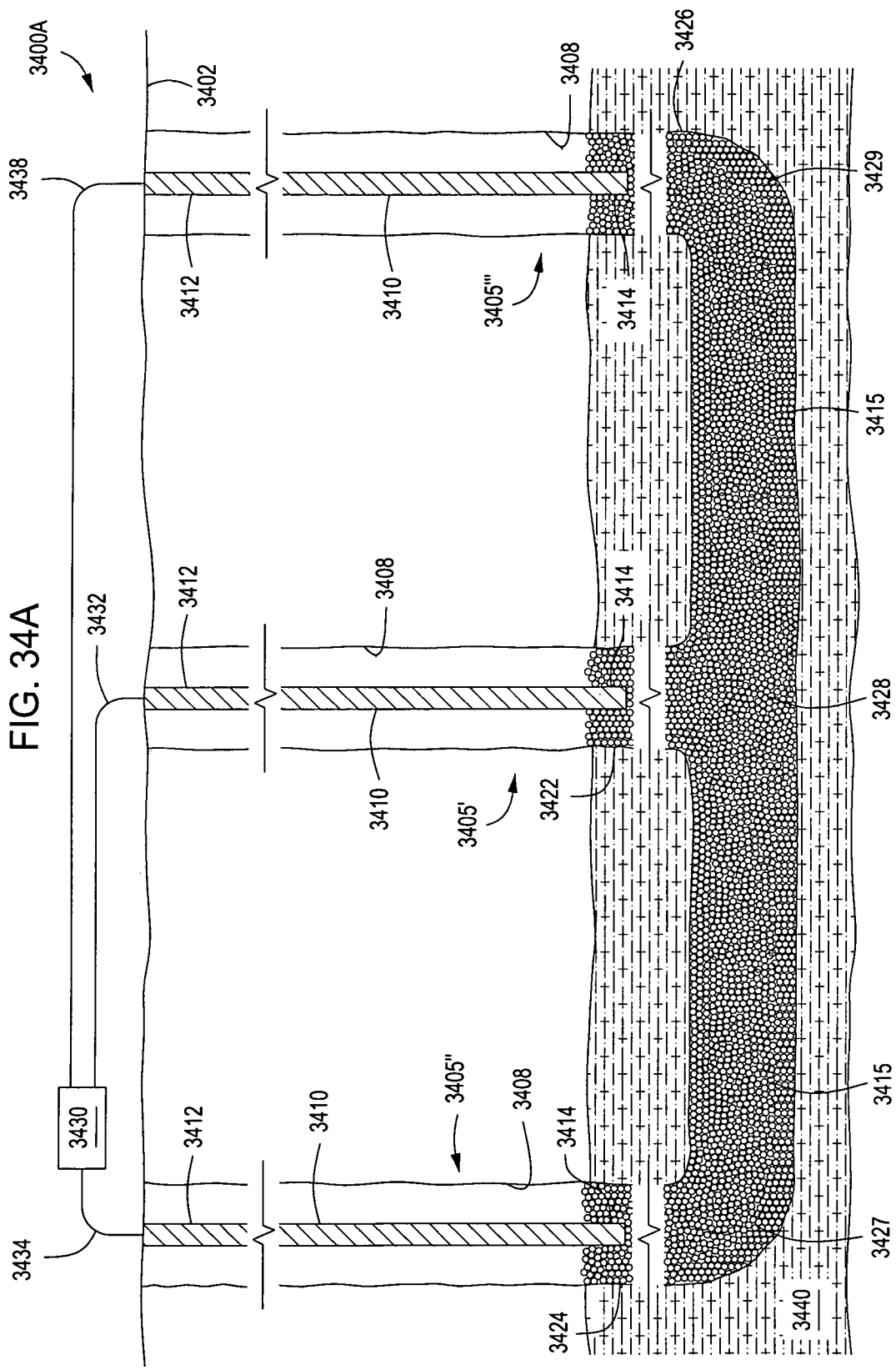
FIG. 34A is a cross-sectional view of a heater well, in yet an alternate embodiment. Here, three wellbores are completed through a targeted subsurface formation. The wellbores are connected using granular material.

The above-described heater well arrangements 300, 3100, 3200, 3300 utilize granular material within a single wellbore to generate resistive heating. However, granular material may also be used as a resistive element between two or more adjacent wellbores. FIG. 34A is a cross-sectional view of such a multi-wellbore heater well arrangement 3400A. Here, three wellbores 3405', 3405", 3405''' are completed through a targeted subsurface formation 3440. The subsurface formation 3440 comprises an organic-rich material such as oil shale. The organic-rich material may be converted to hydrocarbon fluids through a process of pyrolysis.

Each wellbore 3405', 3405", 3405''' defines a bore 3408 that extends from the earth surface 3402 and through the subterranean earth 3404. The bores 3408 further extend into the subsurface formation 3440. The first wellbore 3405' has a lower end indicated at 3422; the second wellbore 3405" has a lower end indicated at 3424; and the third wellbore 3405''' has a lower end indicated at 3426.

The second 3405" and third 3405''' wellbores are directionally drilled to intersect the lower end 3422 of the first wellbore 3405'. The second wellbore 3405" has a heel at 3427, while the third wellbore 3405''' has a heel at 3429. The second 3405" and third 3405''' wellbores each have a toe that converges at the lower end 3422 of the first wellbore 3405. Thus, a point of convergence 3428 below the first wellbore 3405' is defined by the toes.

Each wellbore 3405', 3405", 3405''' has a conductive member 3410 disposed therein. The conductive member 3410 has an upper end 3412 proximate the earth surface 3402, and a lower end 3414 terminating proximate an upper portion of the subsurface formation 3440. The conductive members 3410 define an elongated, electrically conductive body. The conductive members 3410 may be a tubular body such as a casing string or tubing; alternatively, the conductive members 3410 may be a solid body such as an elongated wire, a metal bar or a metal rod. Alternatively still, the conductive members 3410 may comprise a combination of these bodies. In the heater well arrangement of FIG. 34A, the conductive member 3410 is a solid bar.

The conductive members 3410 in the wellbores 3405', 3405", 3405''' are electrically connected using electrically conductive granular material 3415. The granular material 3415 is placed in the respective wellbores 3405', 3405", 3405''' around the lower ends 3414 of the conductive members 3410. The granular material fills the lower ends 3414 of the wellbores 3405', 3405", 3405''' along the heels 3427, 3429 to the point of convergence 3428.

The granular material 3415 may be hollow, solid, porous, sintered, or agglomerated, so long as the granular material 3415 conducts electricity and provides an in-place resistance generally higher than the metal material making up the conductive members 3410. The resistance of the in-place conductive material 3415 should be high enough that sufficient amounts of heat can be generated with moderate voltages, for example, about 600 to 2400 volts. In one aspect, the in-place resistivity of the bulk material 3415 is on the order of $10^{-5}$ to $10^{-2}$ ohm-meters. Suitable granular material 3415 may include calcined coke, graphite, metal oxides, or ceramic particles coated with thin metal layers.

It is again noted that the range of resistivity provided above is for the in-place bulk granular material and not the individual granular particles. The resistivity of the individual particles necessarily will be less than the resistivity of the bulk value due to added resistance caused by limited contact area between the granular particles.

In order to heat the subsurface formation 3440, an electrical current is provided through the conductive members 3410. Therefore, a power source 3430 is employed. The power source 3430 is preferably a three-phase power source that delivers an electrical current to the respective conductive members 3410. Conductive wire 3432 provides electrical communication between the power source 3430 and the conductive member 3410 in the first wellbore 3405'; conductive wire 3434 provides electrical communication between the power source 3430 and the conductive member 3410 in the second wellbore 3405"; and conductive wire 3438 provides electrical communication between the power source 3430 and the conductive member 3410 in the third wellbore 3405'''.

Passing a current through the conductive members 3410 will also cause current to be passed through the granular material 3415 within the subsurface formation 3440. The resistivity of the granular material 3415 is higher than that of the conductive members 3410 so that resistive heat is created primarily from the granular material 3415. By continuing to flow a current through the granular material 3415, the surrounding formation 3440 is warmed to the point of pyrolysis.

FIG. 34B is another cross-sectional view of a heater well 3400A. In this embodiment, two wellbores 3405', 3405" are completed through a targeted subsurface formation 3440. The subsurface formation 3440 comprises an organic-rich material such as oil shale. The organic-rich material may be converted to hydrocarbon fluids through a process of pyrolysis. The wellbores 3405', 3405" are again electrically connected using granular material.

Each wellbore 3405', 3405" defines a bore 3408 that extends from the earth surface 3402 and through the subterranean earth 3404. The bores 3408 further extend into the subsurface formation 3440. The first wellbore 3405' is substantially vertical, and has a lower end indicated at 3422. The second wellbore 3405" is deviated, and has a lower end indicated at 3424. The lower end 3424 has a heel 3427 and a toe 3429. The toe 3429 forms a point of convergence below the first wellbore 3405'.

Each wellbore 3405', 3405" has a conductive member 3410 disposed therein. The conductive member 3410 has an upper end 3412 proximate the earth surface 3402, and a lower end 3414 terminating proximate an upper portion of the subsurface formation 3440. As with the heater well arrangement 3400A, the conductive members 3410 in heater well arrangement 3400B define an elongated, electrically conductive body. The conductive members 3410 may be a tubular body such as a casing string or tubing; alternatively, the conductive members 3410 may be a solid body such as an elongated wire, a metal bar or a metal rod. Alternatively still, the conductive members 3410 may comprise a combination of these bodies.

The wellbores 3405', 3405" are connected using electrically conductive granular material 3415. The granular material 3415 is placed in the respective wellbores 3405', 3405", 3405''' around lower ends 3414 of the conductive members 3410. The granular material 3415 in heater well arrangement 3400B has properties that are the same as the granular material 3415 in heater well arrangement 3400A.

In order to heat the subsurface formation 3440, an electrical current is provided the conductive members 3410. Therefore, a power source 3430 is employed. The power source 3430 is preferably a two-phase power source that delivers an electrical current to the respective conductive members 3410. The power source 3430 may deliver a current that is an alternating current; alternatively, the power source 3430 may deliver a current that is a direct current. In either instance, conductive wire 3432 provides electrical communication between the power source 3430 and the conductive member 3410 in the first wellbore 3405', while conductive wire 3434 provides electrical communication between the power source 3430 and the conductive member 3410 in the second wellbore 3405". Conductive wire 3436 optionally goes to ground.

Passing a current through the conductive members 3410 will also cause current to be passed through the granular material 3415 within the subsurface formation 3440. The resistivity of the granular material 3415 is higher than that of the conductive members 3410 so that resistive heat is created primarily from the granular material 3415. By continuing to flow a current through the granular material 3415, the surrounding formation 3440 is warmed to the point of pyrolysis.

The heater well arrangements 3400A and 3400B offer heating systems that utilize granular conductive materials. Such arrangements 3400A, 3400B are relatively low-cost and simple to install. At the same time, such arrangements 3400A, 3400B are robust to distorting stresses caused by thermal expansion and hydrocarbon pyrolysis.

From the heater well arrangements of FIGS. 34A and 34B, certain methods for heating a subsurface formation are disclosed. In one aspect, a method is provided which first includes providing a first wellbore to the subsurface formation, and also a second wellbore to the subsurface formation. Preferably, the first wellbore is vertical. The second wellbore has a bottom portion that intersects the first wellbore within the subsurface formation. Thus, a point of convergence is formed.

A conductive member is run into the first wellbore. Similarly, a conductive member is also run into the second wellbore. The conductive members in the first and second wellbores comprise either a tubular body or a solid body. Examples include casing, a metal rod, a metal wire, a bar, or combinations thereof.

The method includes filling at least a part of each of the first and second wellbores with an electrically conductive granular material. In this way an electrical connection between the conductive member in the first wellbore and the conductive member in the second wellbore is provided at the point of convergence. The granular material also acts as a resistive heating element. An electrical current is passed through the conductive member in the first wellbore, the granular material, and the conductive member in the second wellbore. Heat is thereby generated via electrical resistance primarily within the granular material.

In one aspect, the first and second wellbores are spaced from about 10 to 120 feet apart. More preferably, the first and second wellbores are spaced from about 20 to 80 feet apart.

In one aspect, the method further includes the step of providing a third wellbore. The third wellbore also has a bottom portion that intersects the first wellbore within the subsurface formation. A conductive member is also run into the third wellbore.

In accordance with this embodiment, at least a part of the third wellbore is filled with the electrically conductive granular material. In this way an electrical connection is provided between the conductive members in the first, second and third wellbores at a point of convergence. The granular material again acts as the resistive heating element. In this embodiment, the step of passing an electrical current further comprises passing an electrical current through the conductive member in the third wellbore.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation, (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. Some formations by their nature are not expected to become significantly more electrically conductive upon heating. For example, a formation may be or become sufficiently fractured that gaps prevent electrical conduction over significant distances (e.g., 10 meters or more). Alternatively, a formation may have an unfavorable pore structure such that continuous electrical pathways are absent over significant distances. Further, the formation may include high amounts of inorganic constituents (e.g., sulfur) such that concentrated relatively pure coke is not appreciable formed upon pyrolysis of the hydrocarbons. In addition, heating may be controlled such that a majority of the heated portion of the formation does not reach the high temperatures expected to be required to appreciable increase the electrical connectivity of the formation itself. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C. Literature studies (for example see: R. N. Nottenburger et al., "Temperature and stress dependence of electrical and mechanical properties of Green River oil shale", *Fuel*, 58, 144-148, February 1979) have shown that temperatures of about 500° C. or more are needed for some oil shales to have electrical resistivities below $10^6$ ohm-cm, which is still largely non-conductive. Metals tend to have resistivities 11-12 orders of magnitude lower and even semiconductors (e.g., germanium or silicon) may have resistivities 3-5 orders of magnitude lower than the resistivity of at least some oil shales at about 500° C. The required high temperatures for electrical conductivity of oil shales is aligned with known electrical behavior of petroleum coke upon calcination (see for example, Z. I. Syunyaev, et al., "Change in the Resistivity of Petroleum Coke on Calcination", Chemistry and Technology of Fuels and Oils, 1(4), 292-295, April 1965).

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce NO, pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. No. 6,684,644 and U.S. Pat. No. 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
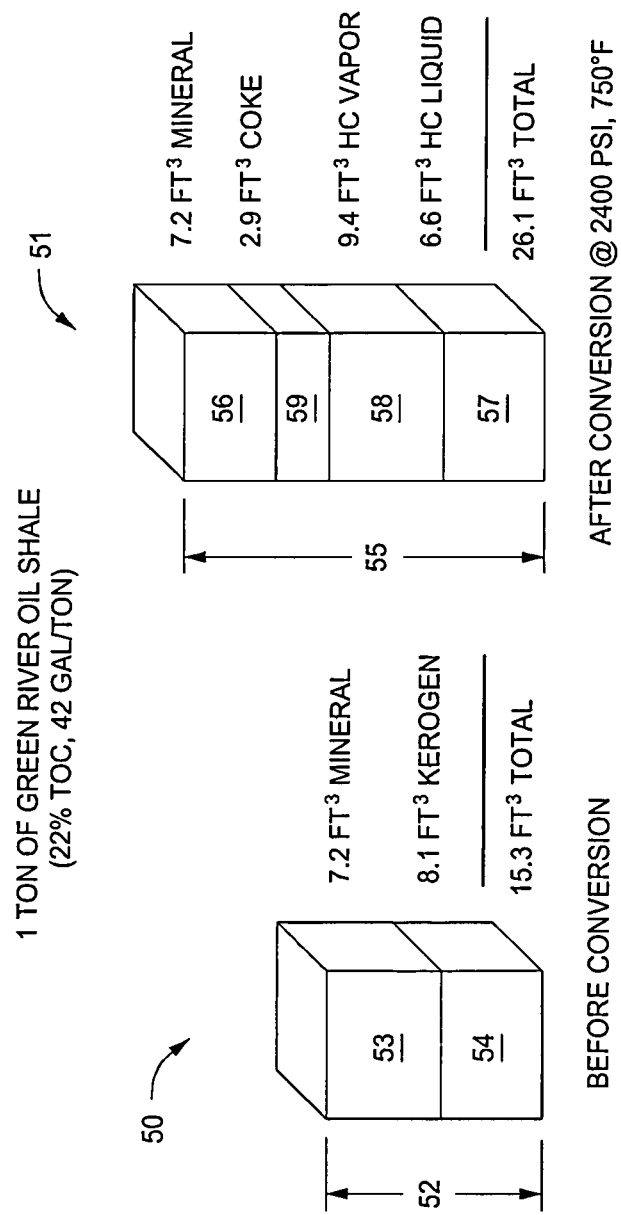
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

One embodiment of the invention includes an in situ method of producing hydrocarbon fluids with improved properties from an organic-rich rock formation. Applicants have surprisingly discovered that the quality of the hydrocarbon fluids produced from in situ heating and pyrolysis of an organic-rich rock formation may be improved by selecting sections of the organic-rich rock formation with higher lithostatic stress for in situ heating and pyrolysis.

The method may include in situ heating of a section of the organic-rich rock formation that has a high lithostatic stress to form hydrocarbon fluids with improved properties. The method may include creating the hydrocarbon fluid by pyrolysis of a solid hydrocarbon and/or a heavy hydrocarbon present in the organic-rich rock formation. Embodiments may include the hydrocarbon fluid being partially, predominantly or substantially completely created by pyrolysis of the solid hydrocarbon and/or heavy hydrocarbon present in the organic-rich rock formation. The method may include heating the section of the organic-rich rock formation by any method, including any of the methods described herein. For example, the method may include heating the section of the organic-rich rock formation by electrical resistance heating. Further, the method may include heating the section of the organic-rich rock formation through use of a heated heat transfer fluid. The method may include heating the section of the organic-rich rock formation to above 270° C. Alternatively, the method may include heating the section of the organic-rich rock formation between 270° C. and 500° C.

The method may include heating in situ a section of the organic-rich rock formation having a lithostatic stress greater than 200 psi and producing a hydrocarbon fluid from the heated section of the organic-rich rock formation. In alternative embodiments, the heated section of the organic-rich rock formation may have a lithostatic stress greater than 400 psi. In alternative embodiments, the heated section of the organic-rich rock formation may have a lithostatic stress greater than 800 psi, greater than 1,000 psi, greater than 1,200 psi, greater than 1,500 psi or greater than 2,000 psi. Applicants have found that in situ heating and pyrolysis of organic-rich rock formations with increasing amounts of stress lead to the production of hydrocarbon fluids with improved properties.

The lithostatic stress of a section of an organic-rich formation can normally be estimated by recognizing that it will generally be equal to the weight of the rocks overlying the formation. The density of the overlying rocks can be expressed in units of psi/ft. Generally, this value will fall between 0.8 and 1.1 psi/ft and can often be approximated as 0.9 psi/ft. As a result the lithostatic stress of a section of an organic-rich formation can be estimated by multiplying the depth of the organic-rich rock formation interval by 0.9 psi/ft. Thus the lithostatic stress of a section of an organic-rich formation occurring at about 1,000 fit can be estimated to be about (0.9 psi/ft) multiplied by (1,000 ft) or about 900 psi. If a more precise estimate of lithostatic stress is desired the density of overlying rocks can be measured using wireline logging techniques or by making laboratory measurements on samples recovered from coreholes. The method may include heating a section of the organic-rich rock formation that is located at a depth greater than 200 fit below the earth's surface. Alternatively, the method may include heating a section of the organic-rich rock formation that is located at a depth greater than 500 ft below the earth's surface, greater than 1,000 ft below the earth's surface, greater than 1,200 ft below the earth's surface, greater than 1,500 ft below the earth's surface, or greater than 2,000 ft below the earth's surface.

The organic-rich rock formation may be, for example, a heavy hydrocarbon formation or a solid hydrocarbon formation. Particular examples of such formations may include an oil shale formation, a tar sands formation or a coal formation. Particular formation hydrocarbons present in such formations may include oil shale, kerogen, coal, and/or bitumen.

The hydrocarbon fluid produced from the organic-rich rock formation may include both a condensable hydrocarbon portion (e.g. liquid) and a non-condensable hydrocarbon portion (e.g. gas). The hydrocarbon fluid may additionally be produced together with non-hydrocarbon fluids. Exemplary non-hydrocarbon fluids include, for example, water, carbon dioxide, hydrogen sulfide, hydrogen, ammonia, and/or carbon monoxide.

The condensable hydrocarbon portion of the hydrocarbon fluid may be a fluid present within different locations associated with an organic-rich rock development project. For example, the condensable hydrocarbon portion of the hydrocarbon fluid may be a fluid present within a production well that is in fluid communication with the organic-rich rock formation. The production well may serve as a device for withdrawing the produced hydrocarbon fluids from the organic-rich rock formation. Alternatively, the condensable hydrocarbon portion may be a fluid present within processing equipment adapted to process hydrocarbon fluids produced from the organic-rich rock formation. Exemplary processing equipment is described herein. Alternatively, the condensable hydrocarbon portion may be a fluid present within a fluid storage vessel. Fluid storage vessels may include, for example, fluid storage tanks with fixed or floating roofs, knock-out vessels, and other intermediate, temporary or product storage vessels. Alternatively, the condensable hydrocarbon portion may be a fluid present within a fluid transportation pipeline. A fluid transportation pipeline may include, for example, piping from production wells to processing equipment or fluid storage vessels, piping from processing equipment to fluid storage vessels, or pipelines associated with collection or transportation of fluids to or from intermediate or centralized storage locations.

The following discussion of FIGS. 7-16 concerns data obtained in Examples 1-5 which are discussed below in the section labeled "Experiments". The data was obtained through experimental procedures, gas and liquid sample collection procedures, hydrocarbon gas sample gas chromatography (GC) analysis methodology, gas sample GC peak integration methodology, gas sample GC peak identification methodology, whole oil gas chromatography (WOGC) analysis methodology, whole oil gas chromatography (WOGC) peak integration methodology, whole oil gas chromatography (WOGC) peak identification methodology, and pseudo component analysis methodology discussed in the Experiments section. For clarity, when referring to gas chromatography chromatograms of hydrocarbon gas samples, graphical data is provided for one unstressed experiment through Example 1, two 400 psi stressed experiments through Examples 2 and 3, and two 1,000 psi stressed experiments through Examples 4 and 5. When referring to whole oil gas chromatography (WOGC) chromatograms of liquid hydrocarbon samples, graphical data is provided for one unstressed experiment through Example 1, one 400 psi stressed experiments through Example 3, and one 1,000 psi stressed experiment through Example 4.

Figure 7:
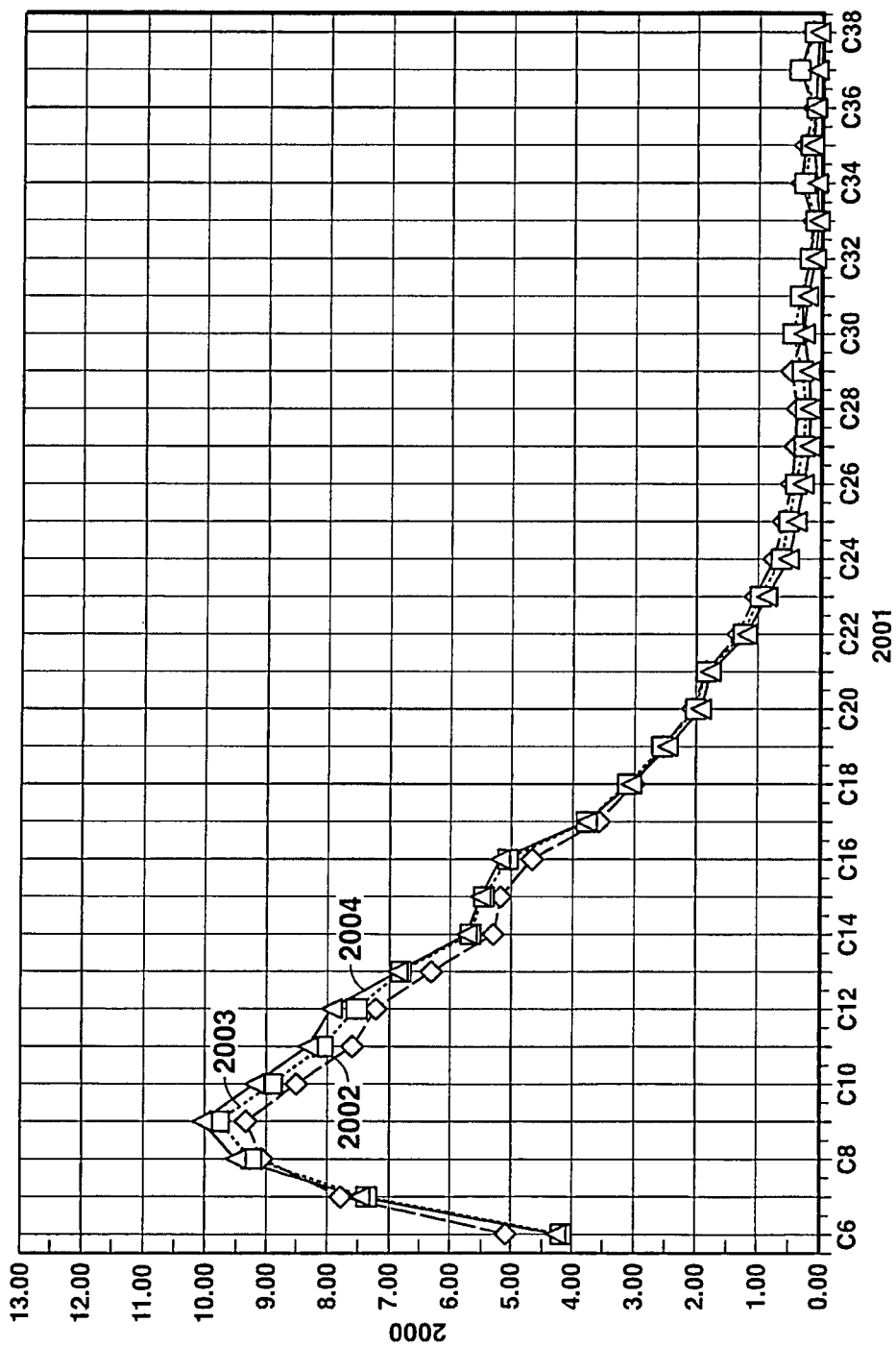
FIG. 7 is a graph of the weight percent of each carbon number pseudo component occurring from C6 to C38 for laboratory experiments conducted at three different stress levels.

FIG. 7 is a graph of the weight percent of each carbon number pseudo component occurring from $C_6$ to $C_{38}$ for each of the three stress levels tested and analyzed in the laboratory experiments discussed herein. The pseudo component weight percentages were obtained through the experimental procedures, liquid sample collection procedures, whole oil gas chromatography (WOGC) analysis methodology, whole oil gas chromatography (WOGC) peak identification and integration methodology, and pseudo component analysis methodology discussed in the Experiments section. For clarity, the pseudo component weight percentages are taken as a percentage of the entire $C_3$ to pseudo $C_{38}$ whole oil gas chromatography areas and calculated weights. Thus the graphed $C_3$ to $C_{38}$ weight percentages do not include the weight contribution of the associated gas phase product from any of the experiments which was separately treated. Further, the graphed weight percentages do not include the weight contribution of any liquid hydrocarbon compounds heavier than (i.e. having a longer retention time than) the $C_{38}$ pseudo component. The y-axis 2000 represents the concentration in terms of weight percent of each $C_6$ to $C_{38}$ pseudo component in the liquid phase. The x-axis 2001 contains the identity of each hydrocarbon pseudo component from $C_6$ to $C_{38}$. The data points occurring on line 2002 represent the weight percent of each $C_6$ to $C_{38}$ pseudo component for the unstressed experiment of Example 1. The data points occurring on line 2003 represent the weight percent of each $C_6$ to $C_{38}$ pseudo component for the 400 psi stressed experiment of Example 3. While the data points occurring on line 2004 represent the weight percent of each $C_6$ to $C_{38}$ pseudo component for the 1,000 psi stressed experiment of Example 4. From FIG. 7 it can be seen that the hydrocarbon liquid produced in the unstressed experiment, represented by data points on line 2002, contains a lower weight percentage of lighter hydrocarbon components in the $C_8$ to $C_{17}$ pseudo component range and a greater weight percentage of heavier hydrocarbon components in the $C_{20}$ to $C_{29}$ pseudo component range, both as compared to the 400 psi stress experiment hydrocarbon liquid and the 1,000 psi stress experiment hydrocarbon liquid. Looking now at the data points occurring on line 2003, it is apparent that the intermediate level 400 psi stress experiment produced a hydrocarbon liquid having $C_8$ to $C_{17}$ pseudo component concentrations between the unstressed experiment represented by line 2002 and the 1,000 psi stressed experiment represented by line 2004. It is noted that the $C_{17}$ pseudo component data for both the 400 psi and 1,000 psi stressed experiments are about equal. Further, it is apparent that the weight percentage of heavier hydrocarbon components in the $C_{20}$ to $C_{29}$ pseudo component range for the intermediate stress level experiment represented by line 2003 falls between the unstressed experiment (Line 2002) hydrocarbon liquid and the 1,000 psi stress experiment (Line 2004) hydrocarbon liquid. Lastly, it is apparent that the high level 1,000 psi stress experiment produced a hydrocarbon liquid having $C_8$ to $C_{17}$ pseudo component concentrations greater than both the unstressed experiment represented by line 2002 and the 400 psi stressed experiment represented by line 2003. Further, it is apparent that the weight percentage of heavier hydrocarbon components in the $C_{20}$ to $C_{29}$ pseudo component range for the high level stress experiment represented by line 2004 are less than both the unstressed experiment (Line 2002) hydrocarbon liquid and the 400 psi stress experiment (Line 2003) hydrocarbon liquid. Thus pyrolyzing oil shale under increasing levels of lithostatic stress appears to produce hydrocarbon liquids having increasingly lighter carbon number distributions.

Figure 8:
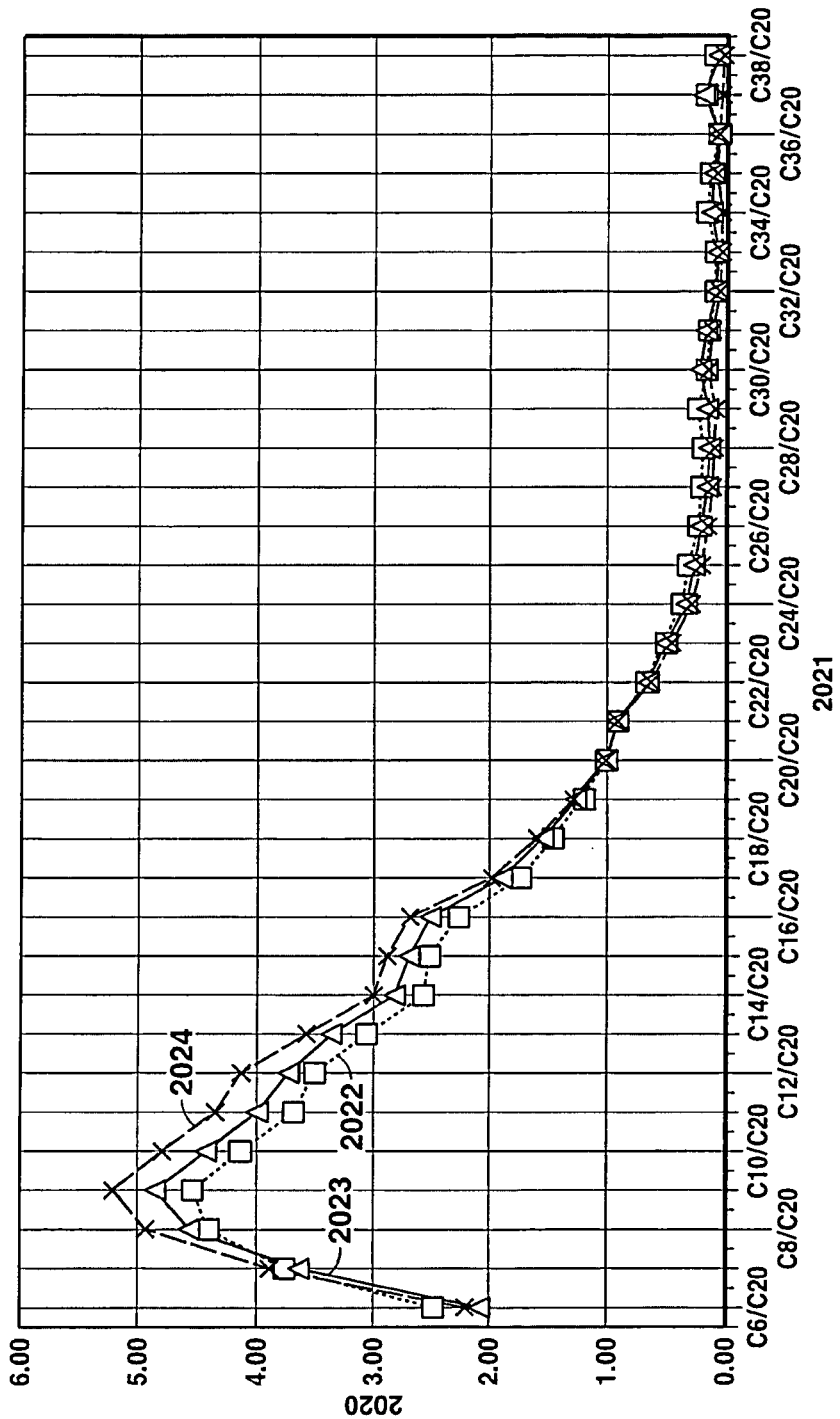
FIG. 8 is a graph of the weight percent ratios of each carbon number pseudo component occurring from $C_6$ to $C_{38}$ as compared to the $C_{20}$ pseudo component for laboratory experiments conducted at three different stress levels.

FIG. 8 is a graph of the weight percent ratios of each carbon number pseudo component occurring from $C_6$ to $C_{38}$ as compared to the $C_{20}$ pseudo component for each of the three stress levels tested and analyzed in the laboratory experiments discussed herein. The pseudo component weight percentages were obtained as described for FIG. 7. The y-axis 2020 represents the weight ratio of each $C_6$ to $C_{38}$ pseudo component compared to the $C_{20}$ pseudo component in the liquid phase. The x-axis 2021 contains the identity of each hydrocarbon pseudo component ratio from $C_6/C_{20}$ to $C_{38}/C_{20}$. The data points occurring on line 2022 represent the weight ratio of each $C_6$ to $C_{38}$ pseudo component to $C_{20}$ pseudo component for the unstressed experiment of Example 1. The data points occurring on line 2023 represent the weight ratio of each $C_6$ to $C_{38}$ pseudo component to $C_{20}$ pseudo component for the 400 psi stressed experiment of Example 3. While the data points occurring on line 2024 represent the weight ratio of each $C_6$ to $C_{38}$ pseudo component to $C_{20}$ pseudo component for the 1,000 psi stressed experiment of Example 4. From FIG. 8 it can be seen that the hydrocarbon liquid produced in the unstressed experiment, represented by data points on line 2022, contains a lower weight percentage of lighter hydrocarbon components in the $C_8$ to $C_{18}$ pseudo component range as compared to the $C_{20}$ pseudo component and a greater weight percentage of heavier hydrocarbon components in the $C_{22}$ to $C_{29}$ pseudo component range as compared to the $C_{20}$ pseudo component, both as compared to the 400 psi stress experiment hydrocarbon liquid and the 1,000 psi stress experiment hydrocarbon liquid. Looking now at the data points occurring on line 2023, it is apparent that the intermediate level 400 psi stress experiment produced a hydrocarbon liquid having $C_8$ to $C_{18}$ pseudo component concentrations as compared to the $C_{20}$ pseudo component between the unstressed experiment represented by line 2022 and the 1,000 psi stressed experiment represented by line 2024. Further, it is apparent that the weight percentage of heavier hydrocarbon components in the $C_{22}$ to $C_{29}$ pseudo component range as compared to the $C_{20}$ pseudo component for the intermediate stress level experiment represented by line 2023 falls between the unstressed experiment (Line 2022) hydrocarbon liquid and the 1,000 psi stress experiment (Line 2024) hydrocarbon liquid. Lastly, it is apparent that the high level 1,000 psi stress experiment produced a hydrocarbon liquid having $C_8$ to $C_{18}$ pseudo component concentrations as compared to the $C_{20}$ pseudo component greater than both the unstressed experiment represented by line 2022 and the 400 psi stressed experiment represented by line 2023. Further, it is apparent that the weight percentage of heavier hydrocarbon components in the $C_{22}$ to $C_{29}$ pseudo component range as compared to the $C_{20}$ pseudo component for the high level stress experiment represented by line 2024 are less than both the unstressed experiment (Line 2022) hydrocarbon liquid and the 400 psi stress experiment (Line 2023) hydrocarbon liquid. This analysis further supports the relationship that pyrolizing oil shale under increasing levels of lithostatic stress produces hydrocarbon liquids having increasingly lighter carbon number distributions.

Figure 9:
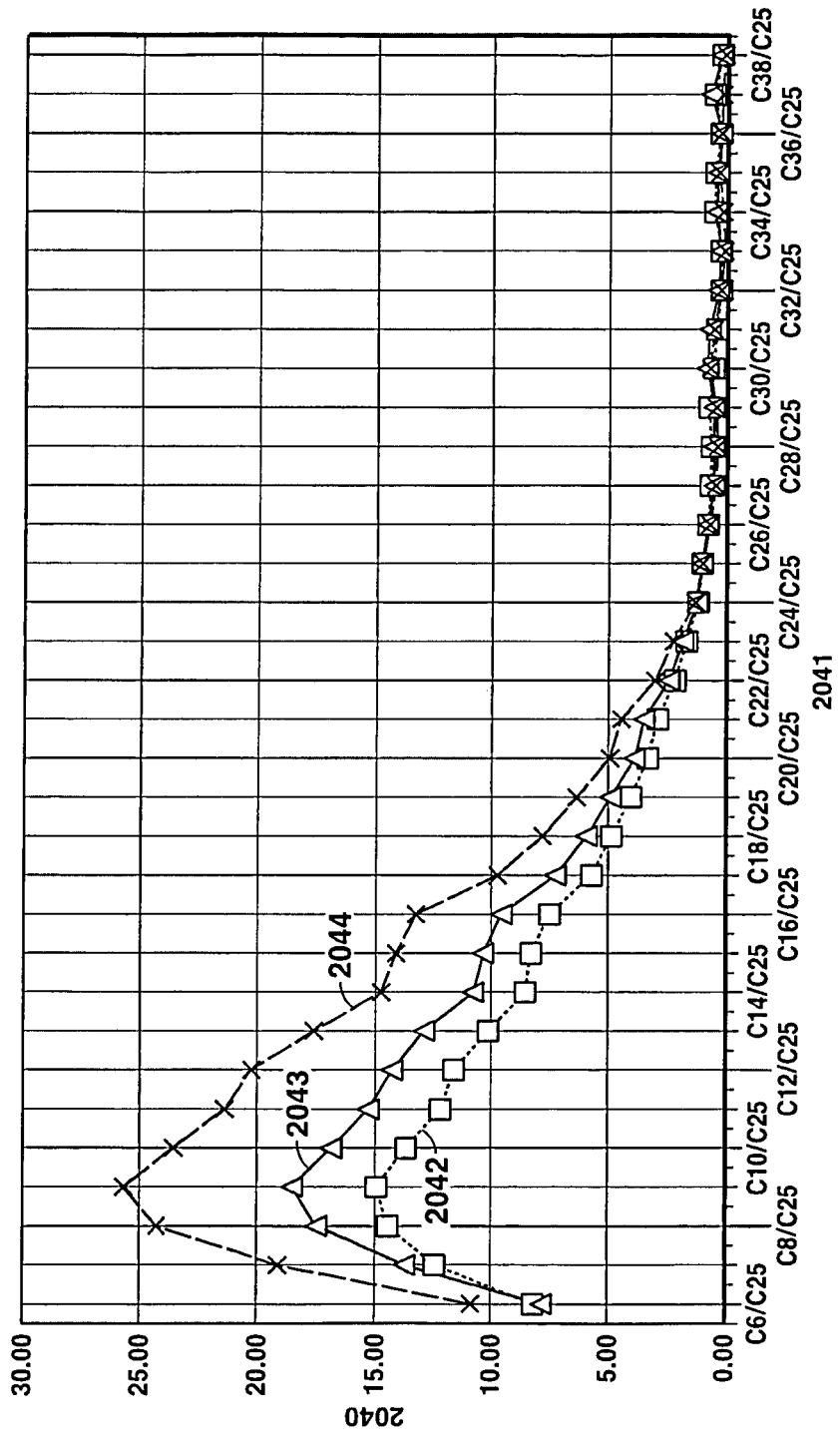
FIG. 9 is a graph of the weight percent ratios of each carbon number pseudo component occurring from $C_6$ to $C_{38}$ as compared to the $C_{25}$ pseudo component for laboratory experiments conducted at three different stress levels.

FIG. 9 is a graph of the weight percent ratios of each carbon number pseudo component occurring from $C_6$ to $C_{38}$ as compared to the $C_{25}$ pseudo component for each of the three stress levels tested and analyzed in the laboratory experiments discussed herein. The pseudo component weight percentages were obtained as described for FIG. 7. The y-axis 2040 represents the weight ratio of each $C_6$ to $C_{38}$ pseudo component compared to the $C_{25}$ pseudo component in the liquid phase. The x-axis 2041 contains the identity of each hydrocarbon pseudo component ratio from $C_6/C_{25}$ to $C_{38}/C_{25}$. The data points occurring on line 2042 represent the weight ratio of each $C_6$ to $C_{38}$ pseudo component to $C_{25}$ pseudo component for the unstressed experiment of Example 1. The data points occurring on line 2043 represent the weight ratio of each $C_6$ to $C_{38}$ pseudo component to $C_{25}$ pseudo component for the 400 psi stressed experiment of Example 3. While the data points occurring on line 2044 represent the weight ratio of each $C_6$ to $C_{38}$ pseudo component to $C_{25}$ pseudo component for the 1,000 psi stressed experiment of Example 4. From FIG. 9 it can be seen that the hydrocarbon liquid produced in the unstressed experiment, represented by data points on line 2042, contains a lower weight percentage of lighter hydrocarbon components in the $C_7$ to $C_{24}$ pseudo component range as compared to the $C_{25}$ pseudo component and a greater weight percentage of heavier hydrocarbon components in the $C_{26}$ to $C_{29}$ pseudo component range as compared to the $C_{25}$ pseudo component, both as compared to the 400 psi stress experiment hydrocarbon liquid and the 1,000 psi stress experiment hydrocarbon liquid. Looking now at the data points occurring on line 2043, it is apparent that the intermediate level 400 psi stress experiment produced a hydrocarbon liquid having $C_7$ to $C_{24}$ pseudo component concentrations as compared to the $C_{25}$ pseudo component between the unstressed experiment represented by line 2042 and the 1,000 psi stressed experiment represented by line 2044. Further, it is apparent that the weight percentage of heavier hydrocarbon components in the $C_{26}$ to $C_{29}$ pseudo component range as compared to the $C_{25}$ pseudo component for the intermediate stress level experiment represented by line 2043 falls between the unstressed experiment (Line 2042) hydrocarbon liquid and the 1,000 psi stress experiment (Line 2044) hydrocarbon liquid. Lastly, it is apparent that the high level 1,000 psi stress experiment produced a hydrocarbon liquid having $C_7$ to $C_{24}$ pseudo component concentrations as compared to the $C_{25}$ pseudo component greater than both the unstressed experiment represented by line 2042 and the 400 psi stressed experiment represented by line 2043. Further, it is apparent that the weight percentage of heavier hydrocarbon components in the $C_{26}$ to $C_{29}$ pseudo component range as compared to the $C_{25}$ pseudo component for the high level stress experiment represented by line 2044 are less than both the unstressed experiment (Line 2042) hydrocarbon liquid and the 400 psi stress experiment (Line 2043) hydrocarbon liquid. This analysis further supports the relationship that pyrolizing oil shale under increasing levels of lithostatic stress produces hydrocarbon liquids having increasingly lighter carbon number distributions.

Figure 10:
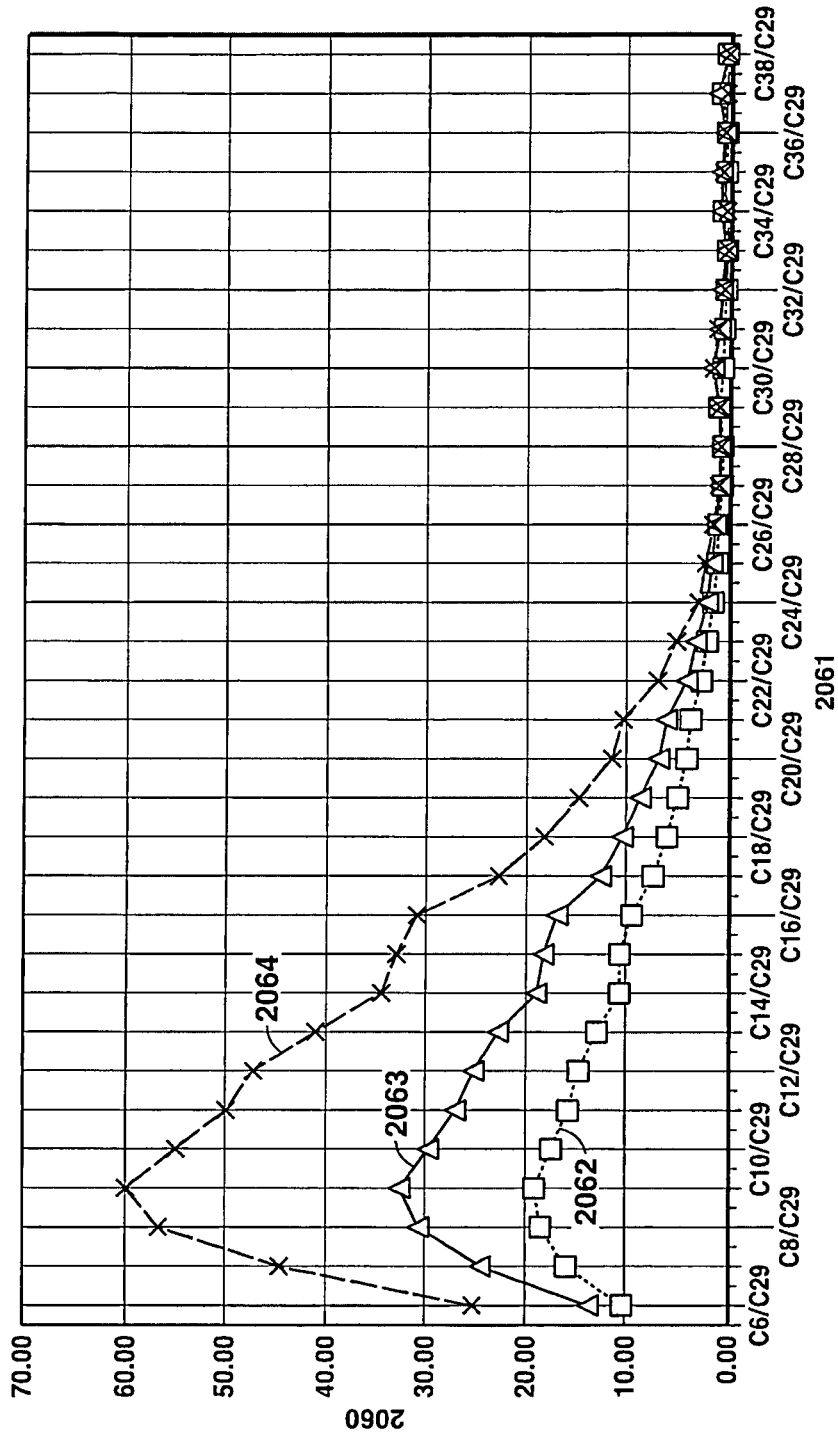
FIG. 10 is a graph of the weight percent ratios of each carbon number pseudo component occurring from $C_6$ to $C_{38}$ as compared to the $C_{29}$ pseudo component for laboratory experiments conducted at three different stress levels.

FIG. 10 is a graph of the weight percent ratios of each carbon number pseudo component occurring from $C_6$ to $C_{38}$ as compared to the $C_{29}$ pseudo component for each of the three stress levels tested and analyzed in the laboratory experiments discussed herein. The pseudo component weight percentages were obtained as described for FIG. 7. The y-axis 2060 represents the weight ratio of each $C_6$ to $C_{38}$ pseudo component compared to the $C_{29}$ pseudo component in the liquid phase. The x-axis 2061 contains the identity of each hydrocarbon pseudo component ratio from $C_6/C_{29}$ to $C_{38}/C_{29}$. The data points occurring on line 2062 represent the weight ratio of each $C_6$ to $C_{38}$ pseudo component to $C_{29}$ pseudo component for the unstressed experiment of Example 1. The data points occurring on line 2063 represent the weight ratio of each $C_6$ to $C_{38}$ pseudo component to $C_{29}$ pseudo component for the 400 psi stressed experiment of Example 3. While the data points occurring on line 2064 represent the weight ratio of each $C_6$ to $C_{38}$ pseudo component to $C_{29}$ pseudo component for the 1,000 psi stressed experiment of Example 4. From FIG. 10 it can be seen that the hydrocarbon liquid produced in the unstressed experiment, represented by data points on line 2062, contains a lower weight percentage of lighter hydrocarbon components in the $C_6$ to $C_{28}$ pseudo component range as compared to the $C_{29}$ pseudo component, both as compared to the 400 psi stress experiment hydrocarbon liquid and the 1,000 psi stress experiment hydrocarbon liquid. Looking now at the data points occurring on line 2063, it is apparent that the intermediate level 400 psi stress experiment produced a hydrocarbon liquid having $C_6$ to $C_{28}$ pseudo component concentrations as compared to the $C_{29}$ pseudo component between the unstressed experiment represented by line 2062 and the 1,000 psi stressed experiment represented by line 2064. Lastly, it is apparent that the high level 1,000 psi stress experiment produced a hydrocarbon liquid having $C_6$ to $C_{28}$ pseudo component concentrations as compared to the $C_{29}$ pseudo component greater than both the unstressed experiment represented by line 2062 and the 400 psi stressed experiment represented by line 2063. This analysis further supports the relationship that pyrolizing oil shale under increasing levels of lithostatic stress produces hydrocarbon liquids having increasingly lighter carbon number distributions.

Figure 11:
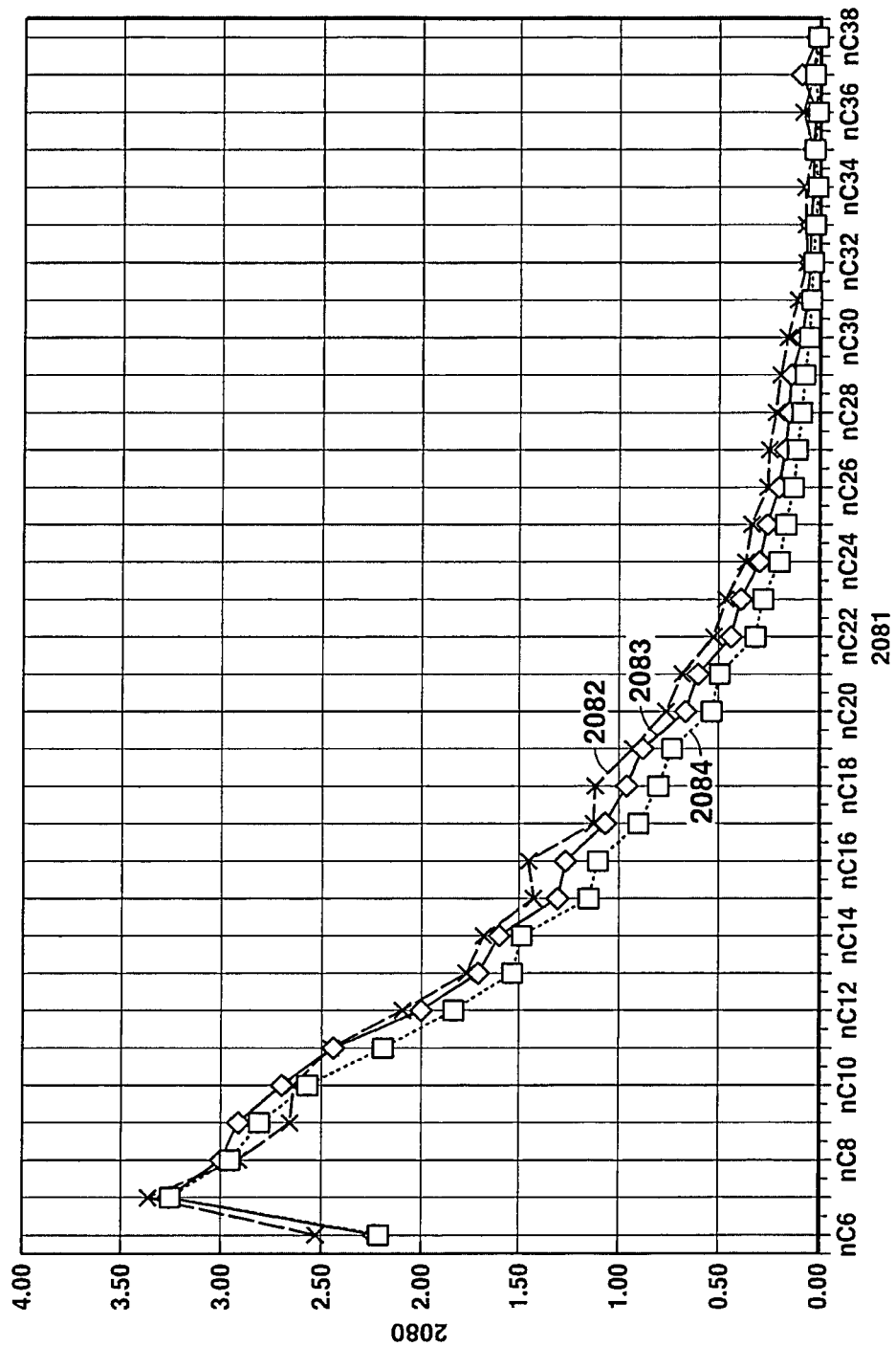
FIG. 11 is a graph of the weight percent of normal alkane hydrocarbon compounds occurring from normal-$C_6$ to normal-$C_{38}$ for laboratory experiments conducted at three different stress levels.

FIG. 11 is a graph of the weight percent of normal alkane hydrocarbon compounds occurring from the normal-$C_6$ alkane to the normal-$C_{38}$ alkane for each of the three stress levels tested and analyzed in the laboratory experiments discussed herein. The normal alkane compound weight percentages were obtained as described for FIG. 7, except that each individual normal alkane compound peak area integration was used to determine each respective normal alkane compound weight percentage. For clarity, the normal alkane hydrocarbon weight percentages are taken as a percentage of the entire $C_3$ to pseudo $C_{38}$ whole oil gas chromatography areas and calculated weights as used in the pseudo compound data presented in FIG. 7. The y-axis 2080 represents the concentration in terms of weight percent of each normal-$C_6$ to normal-$C_{38}$ compound found in the liquid phase. The x-axis 2081 contains the identity of each normal alkane hydrocarbon compound from normal-$C_6$ to normal-$C_{38}$. The data points occurring on line 2082 represent the weight percent of each normal-$C_6$ to normal-$C_{38}$ hydrocarbon compound for the unstressed experiment of Example 1. The data points occurring on line 2083 represent the weight percent of each normal-$C_6$ to normal-$C_{38}$ hydrocarbon compound for the 400 psi stressed experiment of Example 3. While the data points occurring on line 2084 represent the weight percent of each normal-$C_6$ to normal-$C_{38}$ hydrocarbon compound for the 1,000 psi stressed experiment of Example 4. From FIG. 11 it can be seen that the hydrocarbon liquid produced in the unstressed experiment, represented by data points on line 2082, contains a greater weight percentage of hydrocarbon compounds in the normal-$C_{12}$ to normal-$C_{30}$ compound range, both as compared to the 400 psi stress experiment hydrocarbon liquid and the 1,000 psi stress experiment hydrocarbon liquid. Looking now at the data points occurring on line 2083, it is apparent that the intermediate level 400 psi stress experiment produced a hydrocarbon liquid having normal-$C_{12}$ to normal-$C_{30}$ compound concentrations between the unstressed experiment represented by line 2082 and the 1,000 psi stressed experiment represented by line 2084. Lastly, it is apparent that the high level 1,000 psi stress experiment produced a hydrocarbon liquid having normal-$C_{12}$ to normal-$C_{30}$ compound concentrations less than both the unstressed experiment represented by line 2082 and the 400 psi stressed experiment represented by line 2083. Thus pyrolyzing oil shale under increasing levels of lithostatic stress appears to produce hydrocarbon liquids having lower concentrations of normal alkane hydrocarbons.

Figure 12:
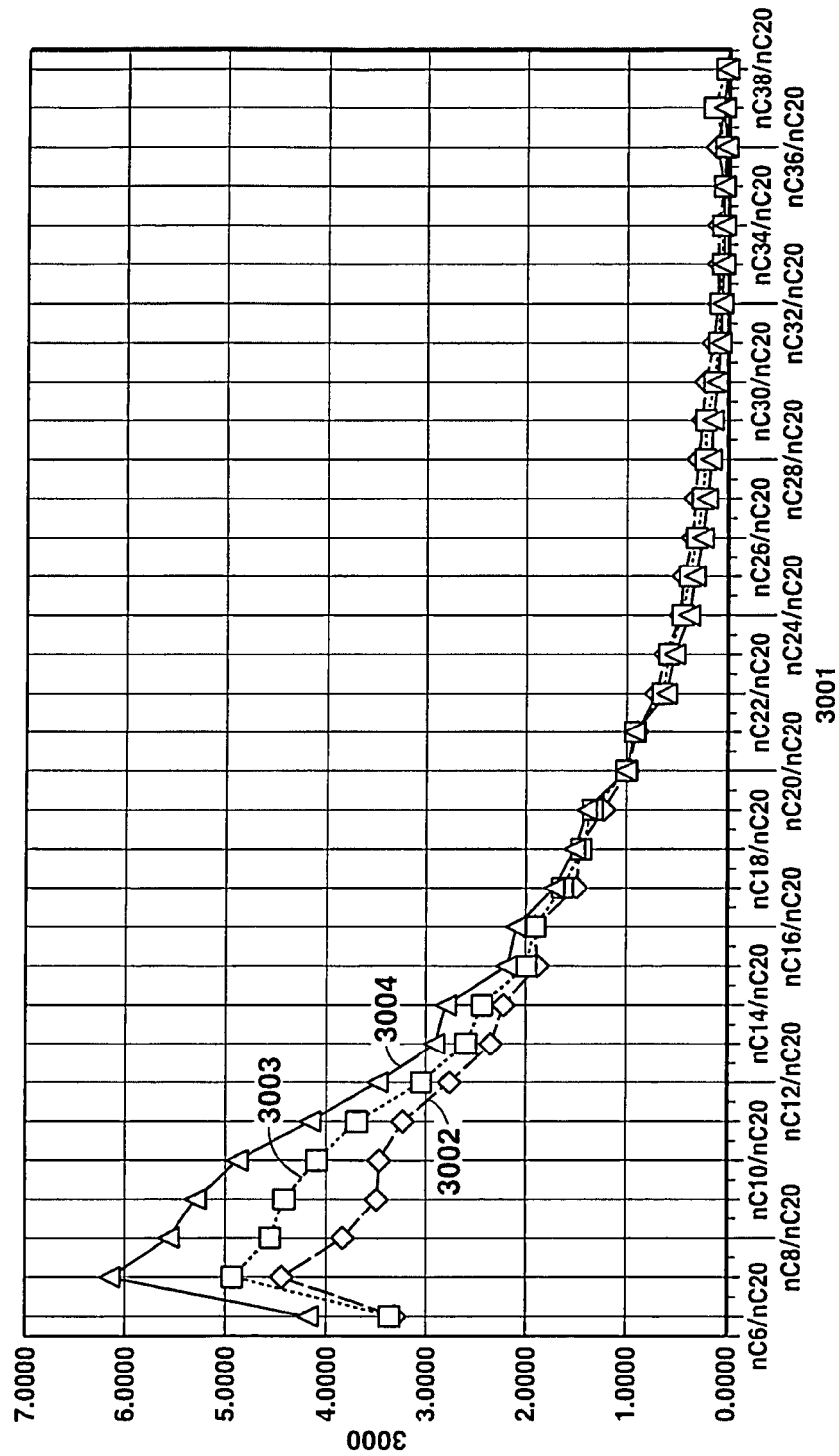
FIG. 12 is a graph of the weight percent of normal alkane hydrocarbon compounds occurring from normal-$C_6$ to normal-$C_{38}$ as compared to the normal-$C_{20}$ hydrocarbon compound for laboratory experiments conducted at three different stress levels.

FIG. 12 is a graph of the weight percent of normal alkane hydrocarbon compounds occurring from normal-$C_6$ to normal-$C_{38}$ as compared to the normal-$C_{20}$ hydrocarbon compound for each of the three stress levels tested and analyzed in the laboratory experiments discussed herein. The normal compound weight percentages were obtained as described for FIG. 11. The y-axis 3000 represents the concentration in terms of weight ratio of each normal-$C_6$ to normal-$C_{38}$ compound as compared to the normal-$C_{20}$ compound found in the liquid phase. The x-axis 3001 contains the identity of each normal alkane hydrocarbon compound ratio from normal-$C_6$/normal-$C_{20}$ to normal-$C_{38}$/normal-$C_{20}$. The data points occurring on line 3002 represent the weight ratio of each normal-$C_6$ to normal-$C_{38}$ hydrocarbon compound as compared to the normal-$C_{20}$ compound for the unstressed experiment of Example 1. The data points occurring on line 3003 represent the weight ratio of each normal-$C_6$ to normal-$C_{38}$ hydrocarbon compound as compared to the normal-$C_{20}$ compound for the 400 psi stressed experiment of Example 3. While the data points occurring on line 3004 represent the weight ratio of each normal-$C_6$ to normal-$C_{38}$ hydrocarbon compound as compared to the normal-$C_{20}$ compound for the 1,000 psi stressed experiment of Example 4. From FIG. 12 it can be seen that the hydrocarbon liquid produced in the unstressed experiment, represented by data points on line 3002, contains a lower weight percentage of lighter normal alkane hydrocarbon components in the normal-$C_6$ to normal-$C_{17}$ compound range as compared to the normal-$C_{20}$ compound and a greater weight percentage of heavier hydrocarbon components in the normal-$C_{22}$ to normal-$C_{34}$ compound range as compared to the normal-$C_{20}$ compound, both as compared to the 400 psi stress experiment hydrocarbon liquid and the 1,000 psi stress experiment hydrocarbon liquid. Looking now at the data points occurring on line 3003, it is apparent that the intermediate level 400 psi stress experiment produced a hydrocarbon liquid having normal-$C_6$ to normal-$C_{17}$ compound concentrations as compared to the normal-$C_{20}$ compound between the unstressed experiment represented by line 3002 and the 1,000 psi stressed experiment represented by line 3004. Further, it is apparent that the weight percentage of heavier hydrocarbon components in the normal-$C_{22}$ to normal-$C_{34}$ compound range as compared to the normal-$C_{20}$ compound for the intermediate stress level experiment represented by line 3003 falls between the unstressed experiment (Line 3002) hydrocarbon liquid and the 1,000 psi stress experiment (Line 3004) hydrocarbon liquid. Lastly, it is apparent that the high level 1,000 psi stress experiment produced a hydrocarbon liquid having normal-$C_6$ to normal-$C_{17}$ compound concentrations as compared to the normal-$C_{20}$ compound greater than both the unstressed experiment represented by line 3002 and the 400 psi stressed experiment represented by line 3003. Further, it is apparent that the weight percentage of heavier hydrocarbon components in the normal-$C_{22}$ to normal-$C_{34}$ compound range as compared to the normal-$C_{20}$ compound for the high level stress experiment represented by line 3004 are less than both the unstressed experiment (Line 3002) hydrocarbon liquid and the 400 psi stress experiment (Line 3003) hydrocarbon liquid. This analysis further supports the relationship that pyrolizing oil shale under increasing levels of lithostatic stress produces hydrocarbon liquids having lower concentrations of normal alkane hydrocarbons.

Figure 13:
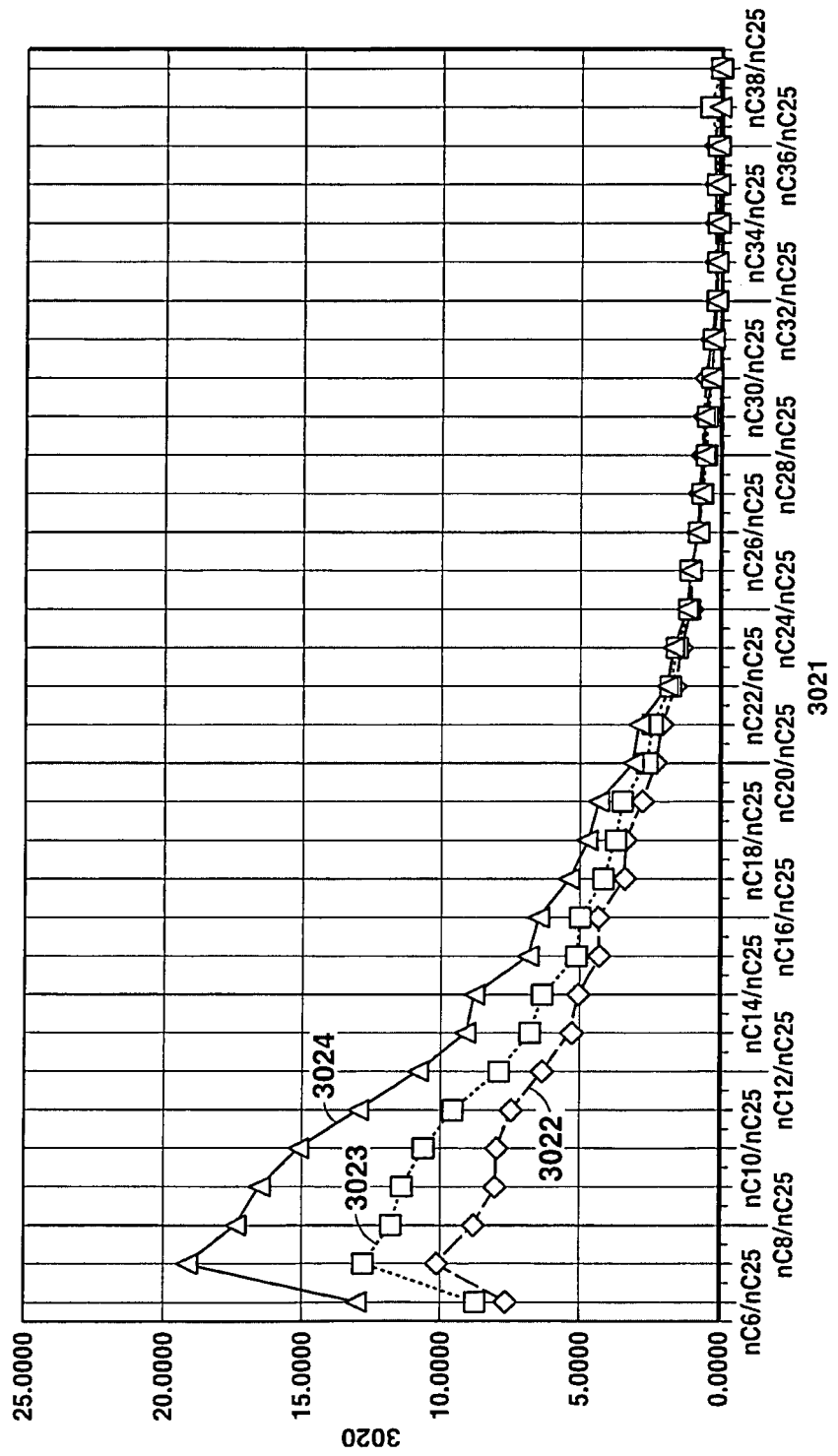
FIG. 13 is a graph of the weight percent of normal alkane hydrocarbon compounds occurring from normal-$C_6$ to normal-$C_{38}$ as compared to the normal-$C_{55}$ hydrocarbon compound for laboratory experiments conducted at three different stress levels.

FIG. 13 is a graph of the weight percent of normal alkane hydrocarbon compounds occurring from normal-$C_6$ to normal-$C_{38}$ as compared to the normal-$C_{25}$ hydrocarbon compound for each of the three stress levels tested and analyzed in the laboratory experiments discussed herein. The normal compound weight percentages were obtained as described for FIG. 11. The y-axis 3020 represents the concentration in terms of weight ratio of each normal-$C_6$ to normal-$C_{38}$ compound as compared to the normal-$C_{25}$ compound found in the liquid phase. The x-axis 3021 contains the identity of each normal alkane hydrocarbon compound ratio from normal-$C_6$/normal-$C_{25}$ to normal-$C_{38}$/normal-$C_{25}$. The data points occurring on line 3022 represent the weight ratio of each normal-$C_6$ to normal-$C_{38}$ hydrocarbon compound as compared to the normal-$C_{25}$ compound for the unstressed experiment of Example 1. The data points occurring on line 3023 represent the weight ratio of each normal-$C_6$ to normal-$C_{38}$ hydrocarbon compound as compared to the normal-$C_{25}$ compound for the 400 psi stressed experiment of Example 3. While the data points occurring on line 3024 represent the weight ratio of each normal-$C_6$ to normal-$C_{38}$ hydrocarbon compound as compared to the normal-$C_{25}$ compound for the 1,000 psi stressed experiment of Example 4. From FIG. 13 it can be seen that the hydrocarbon liquid produced in the unstressed experiment, represented by data points on line 3022, contains a lower weight percentage of lighter normal alkane hydrocarbon components in the normal-$C_6$ to normal-$C_{24}$ compound range as compared to the normal-$C_{25}$ compound and a greater weight percentage of heavier hydrocarbon components in the normal-$C_{26}$ to normal-$C_{30}$ compound range as compared to the normal-$C_{25}$ compound, both as compared to the 400 psi stress experiment hydrocarbon liquid and the 1,000 psi stress experiment hydrocarbon liquid. Looking now at the data points occurring on line 3023, it is apparent that the intermediate level 400 psi stress experiment produced a hydrocarbon liquid having normal-$C_6$ to normal-$C_{24}$ compound concentrations as compared to the normal-$C_{25}$ compound between the unstressed experiment represented by line 3022 and the 1,000 psi stressed experiment represented by line 3024. Further, it is apparent that the weight percentage of heavier hydrocarbon components in the normal-$C_{26}$ to normal-$C_{30}$ compound range as compared to the normal-$C_{25}$ compound for the intermediate stress level experiment represented by line 3023 falls between the unstressed experiment (Line 3022) hydrocarbon liquid and the 1,000 psi stress experiment (Line 3024) hydrocarbon liquid. Lastly, it is apparent that the high level 1,000 psi stress experiment produced a hydrocarbon liquid having normal-$C_6$ to normal-$C_{24}$ compound concentrations as compared to the normal-$C_{25}$ compound greater than both the unstressed experiment represented by line 3022 and the 400 psi stressed experiment represented by line 3023. Further, it is apparent that the weight percentage of heavier hydrocarbon components in the normal-$C_{26}$ to normal-$C_{30}$ compound range as compared to the normal-$C_{25}$ compound for the high level stress experiment represented by line 3024 are less than both the unstressed experiment (Line 3022) hydrocarbon liquid and the 400 psi stress experiment (Line 3023) hydrocarbon liquid. This analysis further supports the relationship that pyrolizing oil shale under increasing levels of lithostatic stress produces hydrocarbon liquids having lower concentrations of normal alkane hydrocarbons.

Figure 14:
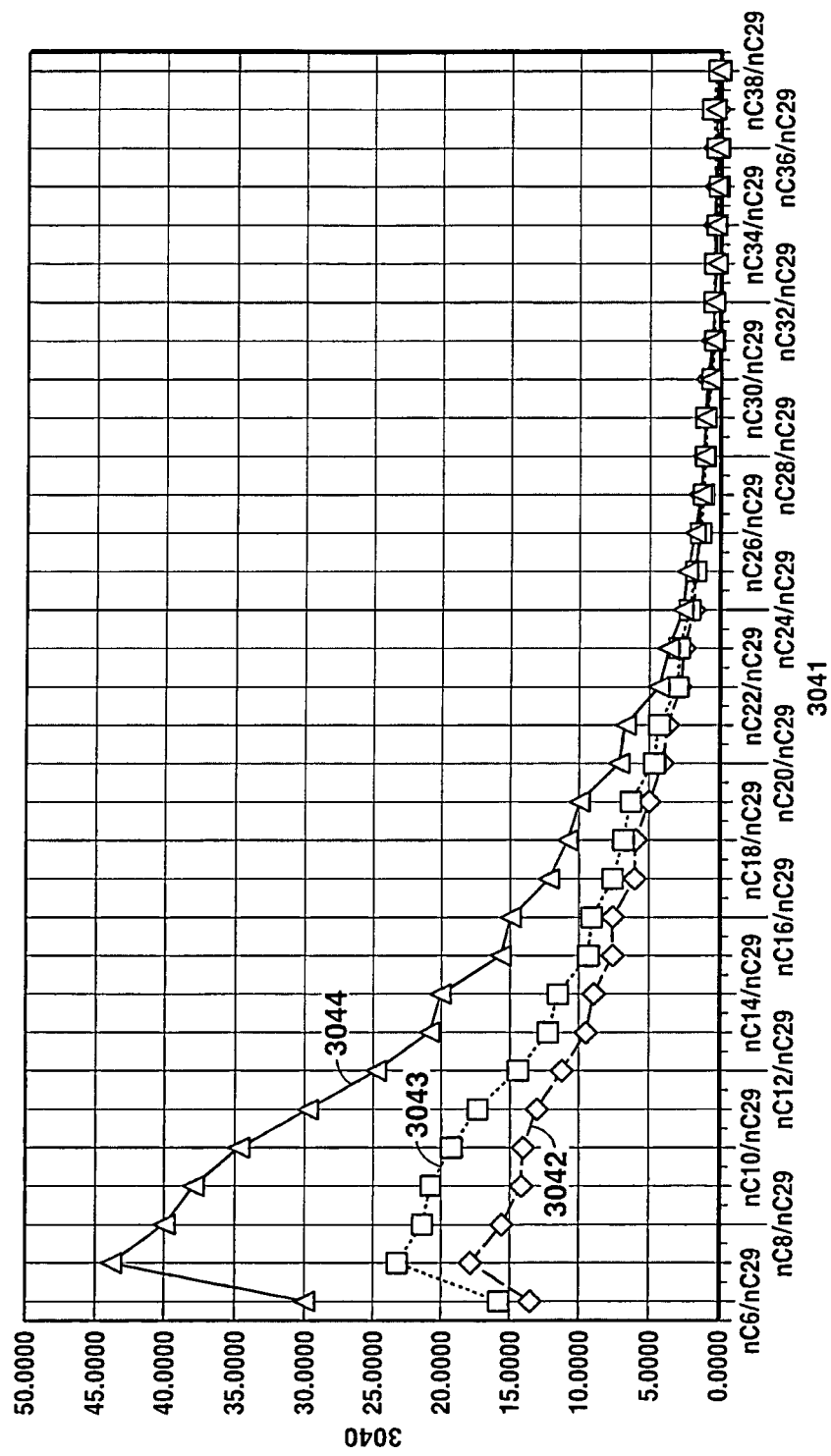
FIG. 14 is a graph of the weight percent of normal alkane hydrocarbon compounds occurring from normal-$C_6$ to normal-$C_{38}$ as compared to the normal-$C_{29}$ hydrocarbon compound for laboratory experiments conducted at three different stress levels.

FIG. 14 is a graph of the weight percent of normal alkane hydrocarbon compounds occurring from normal-$C_6$ to normal-$C_{38}$ as compared to the normal-$C_{29}$ hydrocarbon compound for each of the three stress levels tested and analyzed in the laboratory experiments discussed herein. The normal compound weight percentages were obtained as described for FIG. 11. The y-axis 3040 represents the concentration in terms of weight ratio of each normal-$C_6$ to normal-$C_{38}$ compound as compared to the normal-$C_{29}$ compound found in the liquid phase. The x-axis 3041 contains the identity of each normal alkane hydrocarbon compound ratio from normal-$C_6$/normal-$C_{29}$ to normal-$C_8$/normal-$C_{29}$. The data points occurring on line 3042 represent the weight ratio of each normal-$C_6$ to normal-$C_{38}$ hydrocarbon compound as compared to the normal-$C_{29}$ compound for the unstressed experiment of Example 1. The data points occurring on line 3043 represent the weight ratio of each normal-$C_6$ to normal-$C_{38}$ hydrocarbon compound as compared to the normal-$C_9$ compound for the 400 psi stressed experiment of Example 3. While the data points occurring on line 3044 represent the weight ratio of each normal-$C_6$ to normal-$C_8$ hydrocarbon compound as compared to the normal-$C_9$ compound for the 1,000 psi stressed experiment of Example 4. From FIG. 14 it can be seen that the hydrocarbon liquid produced in the unstressed experiment, represented by data points on line 3042, contains a lower weight percentage of lighter normal alkane hydrocarbon components in the normal-$C_6$ to normal-$C_{26}$ compound range as compared to the normal-$C_{29}$ compound, both as compared to the 400 psi stress experiment hydrocarbon liquid and the 1,000 psi stress experiment hydrocarbon liquid. Looking now at the data points occurring on line 3043, it is apparent that the intermediate level 400 psi stress experiment produced a hydrocarbon liquid having normal-C to normal-$C_{26}$ compound concentrations as compared to the normal-$C_{29}$ compound between the unstressed experiment represented by line 3042 and the 1,000 psi stressed experiment represented by line 3044. Lastly, it is apparent that the high level 1,000 psi stress experiment produced a hydrocarbon liquid having normal-$C_6$ to normal-$C_{26}$ compound concentrations as compared to the normal-$C_{29}$ compound greater than both the unstressed experiment represented by line 3042 and the 400 psi stressed experiment represented by line 3043. This analysis further supports the relationship that pyrolizing oil shale under increasing levels of lithostatic stress produces hydrocarbon liquids having lower concentrations of normal alkane hydrocarbons.

Figure 15:
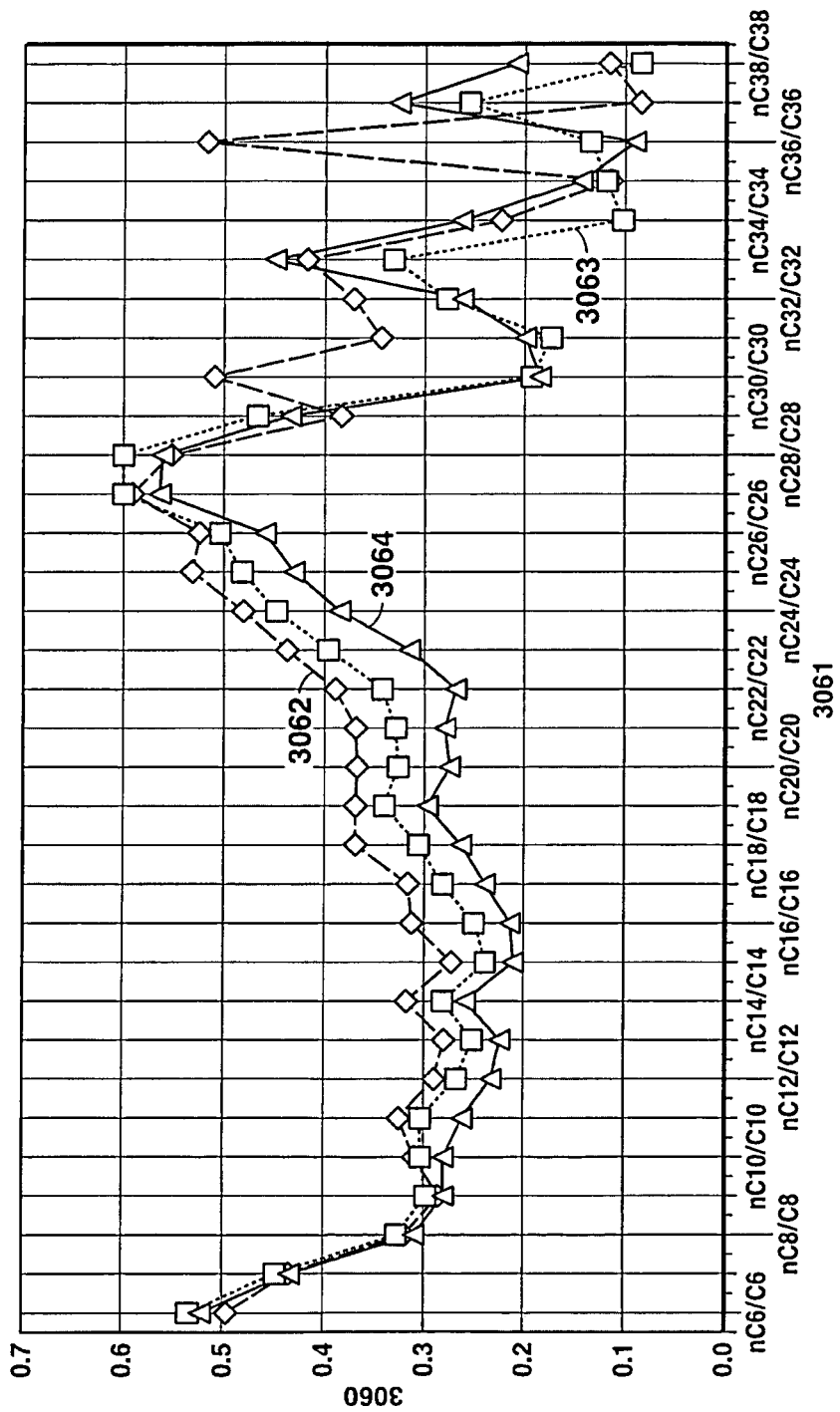
FIG. 15 is a graph of the weight ratio of normal alkane hydrocarbon compounds to pseudo components for each carbon number from $C_6$ to $C_{38}$ for laboratory experiments conducted at three different stress levels.

FIG. 15 is a graph of the weight ratio of normal alkane hydrocarbon compounds to pseudo components for each carbon number from $C_6$ to $C_{38}$ for each of the three stress levels tested and analyzed in the laboratory experiments discussed herein. The normal compound and pseudo component weight percentages were obtained as described for FIGS. 7 & 11. For clarity, the normal alkane hydrocarbon and pseudo component weight percentages are taken as a percentage of the entire $C_3$ to pseudo $C_{38}$ whole oil gas chromatography areas and calculated weights as used in the pseudo compound data presented in FIG. 7. The y-axis 3060 represents the concentration in terms of weight ratio of each normal-$C_6$/pseudo $C_6$ to normal-$C_{38}$/pseudo $C_{38}$ compound found in the liquid phase. The x-axis 3061 contains the identity of each normal alkane hydrocarbon compound to pseudo component ratio from normal-$C_6$/pseudo $C_6$ to normal-$C_{38}$/pseudo $C_{38}$. The data points occurring on line 3062 represent the weight ratio of each normal-$C_6$/pseudo $C_6$ to normal-$C_{38}$/pseudo $C_{38}$ ratio for the unstressed experiment of Example 1. The data points occurring on line 3063 represent the weight ratio of each normal-$C_6$/pseudo $C_6$ to normal-$C_{38}$/pseudo $C_{38}$ ratio for the 400 psi stressed experiment of Example 3. While the data points occurring on line 3064 represent the weight ratio of each normal-$C_6$/pseudo $C_6$ to normal-$C_{38}$/pseudo $C_{38}$ ratio for the 1,000 psi stressed experiment of Example 4. From FIG. 15 it can be seen that the hydrocarbon liquid produced in the unstressed experiment, represented by data points on line 3062, contains a greater weight percentage of normal alkane hydrocarbon compounds to pseudo components in the $C_{10}$ to $C_{26}$ range, both as compared to the 400 psi stress experiment hydrocarbon liquid and the 1,000 psi stress experiment hydrocarbon liquid. Looking now at the data points occurring on line 3063, it is apparent that the intermediate level 400 psi stress experiment produced a hydrocarbon liquid having normal alkane hydrocarbon compound to pseudo component ratios in the $C_{10}$ to $C_{26}$ range between the unstressed experiment represented by line 3062 and the 1,000 psi stressed experiment represented by line 3064. Lastly, it is apparent that the high level 1,000 psi stress experiment produced a hydrocarbon liquid having normal alkane hydrocarbon compound to pseudo component ratios in the $C_{10}$ to $C_{26}$ range less than both the unstressed experiment represented by line 3062 and the 400 psi stressed experiment represented by line 3063. Thus pyrolizing oil shale under increasing levels of lithostatic stress appears to produce hydrocarbon liquids having lower concentrations of normal alkane hydrocarbons as compared to the total hydrocarbons for a given carbon number occurring between $C_{10}$ and $C_{26}$.

From the above-described data, it can be seen that heating and pyrolysis of oil shale under increasing levels of stress results in a condensable hydrocarbon fluid product that is lighter (i.e., greater proportion of lower carbon number compounds or components relative to higher carbon number compounds or components) and contains a lower concentration of normal alkane hydrocarbon compounds. Such a product may be suitable for refining into gasoline and distillate products. Further, such a product, either before or after further fractionation, may have utility as a feed stock for certain chemical processes.

In some embodiments, the produced hydrocarbon fluid includes a condensable hydrocarbon portion. In some embodiments the condensable hydrocarbon portion may have one or more of a total $C_7$ to total $C_{20}$ weight ratio greater than 0.8, a total $C_8$ to total $C_{20}$ weight ratio greater than 1.7, a total $C_9$ to total $C_{20}$ weight ratio greater than 2.5, a total $C_{10}$ to total $C_{20}$ weight ratio greater than 2.8, a total $C_{11}$ to total $C_{20}$ weight ratio greater than 2.3, a total $C_{12}$ to total $C_{20}$ weight ratio greater than 2.3, a total $C_{13}$ to total $C_{20}$ weight ratio greater than 2.9, a total $C_{14}$ to total $C_{20}$ weight ratio greater than 2.2, a total $C_{15}$ to total $C_{20}$ weight ratio greater than 2.2, and a total $C_{16}$ to total $C_{20}$ weight ratio greater than 1.6. In alternative embodiments the condensable hydrocarbon portion has one or more of a total $C_7$ to total $C_{20}$ weight ratio greater than 2.5, a total $C_8$ to total $C_{20}$ weight ratio greater than 3.0, a total $C_9$ to total $C_{20}$ weight ratio greater than 3.5, a total $C_{10}$ to total $C_{20}$ weight ratio greater than 3.5, a total $C_{11}$ to total $C_{20}$ weight ratio greater than 3.0, and a total $C_{12}$ to total $C_{20}$ weight ratio greater than 3.0. In alternative embodiments the condensable hydrocarbon portion has one or more of a total $C_7$ to total $C_{20}$ weight ratio greater than 3.5, a total $C_8$ to total $C_{20}$ weight ratio greater than 4.3, a total $C_9$ to total $C_{10}$ weight ratio greater than 4.5, a total $C_{10}$ to total $C_{20}$ weight ratio greater than 4.2, a total $C_{11}$ to total $C_{20}$ weight ratio greater than 3.7, and a total $C_{12}$ to total $C_{20}$ weight ratio greater than 3.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_7$ to total $C_{20}$ weight ratio greater than 0.8. Alternatively, the condensable hydrocarbon portion may have a total $C_7$ to total $C_{20}$ weight ratio greater than 1.0, greater than 1.5, greater than 2.0, greater than 2.5, greater than 3.5 or greater than 3.7. In alternative embodiments, the condensable hydrocarbon portion may have a total $C_7$ to total $C_{20}$ weight ratio less than 10.0, less than 7.0, less than 5.0 or less than 4.0. In some embodiments the condensable hydrocarbon portion has a total $C_8$ to total $C_{20}$ weight ratio greater than 1.7. Alternatively, the condensable hydrocarbon portion may have a total $C_8$ to total $C_{20}$ weight ratio greater than 2.0, greater than 2.5, greater than 3.0, greater than 4.0, greater than 4.4, or greater than 4.6. In alternative embodiments, the condensable hydrocarbon portion may have a total $C_8$ to total $C_{20}$ weight ratio less than 7.0 or less than 6.0. In some embodiments the condensable hydrocarbon portion has a total $C_9$ to total $C_{20}$ weight ratio greater than 2.5. Alternatively, the condensable hydrocarbon portion may have a total $C_9$ to total $C_{20}$ weight ratio greater than 3.0, greater than 4.0, greater than 4.5, or greater than 4.7. In alternative embodiments, the condensable hydrocarbon portion may have a total $C_9$ to total $C_{20}$ weight ratio less than 7.0 or less than 6.0. In some embodiments the condensable hydrocarbon portion has a total $C_{10}$ to total $C_{20}$ weight ratio greater than 2.8. Alternatively, the condensable hydrocarbon portion may have a total $C_{10}$ to total $C_{20}$ weight ratio greater than 3.0, greater than 3.5, greater than 4.0, or greater than 4.3. In alternative embodiments, the condensable hydrocarbon portion may have a total $C_{10}$ to total $C_{20}$ weight ratio less than 7.0 or less than 6.0. In some embodiments the condensable hydrocarbon portion has a total $C_{11}$ to total $C_{20}$ weight ratio greater than 2.3. Alternatively, the condensable hydrocarbon portion may have a total $C_{11}$ to total $C_{20}$ weight ratio greater than 2.5, greater than 3.5, greater than 3.7, greater than 4.0. In alternative embodiments, the condensable hydrocarbon portion may have a total $C_{11}$ to total $C_{20}$ weight ratio less than 7.0 or less than 6.0. In some embodiments the condensable hydrocarbon portion has a total $C_{12}$ to total $C_{20}$ weight ratio greater than 2.3. Alternatively, the condensable hydrocarbon portion may have a total $C_{12}$ to total $C_{20}$ weight ratio greater than 2.5, greater than 3.0, greater than 3.5, or greater than 3.7. In alternative embodiments, the condensable hydrocarbon portion may have a total $C_{12}$ to total $C_{20}$ weight ratio less than 7.0 or less than 6.0. In some embodiments the condensable hydrocarbon portion has a total $C_{13}$ to total $C_{20}$ weight ratio greater than 2.9. Alternatively, the condensable hydrocarbon portion may have a total $C_{13}$ to total $C_{20}$ weight ratio greater than 3.0, greater than 3.1, or greater than 3.2. In alternative embodiments, the condensable hydrocarbon portion may have a total $C_{13}$ to total $C_{20}$ weight ratio less than 6.0 or less than 5.0. In some embodiments the condensable hydrocarbon portion has a total $C_{14}$ to total $C_{20}$ weight ratio greater than 2.2. Alternatively, the condensable hydrocarbon portion may have a total $C_{14}$ to total $C_{20}$ weight ratio greater than 2.5, greater than 2.6, or greater than 2.7. In alternative embodiments, the condensable hydrocarbon portion may have a total $C_{14}$ to total $C_{20}$ weight ratio less than 6.0 or less than 4.0. In some embodiments the condensable hydrocarbon portion has a total $C_{15}$ to total $C_{20}$ weight ratio greater than 2.2. Alternatively, the condensable hydrocarbon portion may have a total $C_{15}$ to total $C_{20}$ weight ratio greater than 2.3, greater than 2.4, or greater than 2.6. In alternative embodiments, the condensable hydrocarbon portion may have a total $C_{15}$ to total $C_{20}$ weight ratio less than 6.0 or less than 4.0. In some embodiments the condensable hydrocarbon portion has a total $C_{16}$ to total $C_{20}$ weight ratio greater than 1.6. Alternatively, the condensable hydrocarbon portion may have a total $C_{16}$ to total $C_{20}$ weight ratio greater than 1.8, greater than 2.3, or greater than 2.5. In alternative embodiments, the condensable hydrocarbon portion may have a total $C_{16}$ to total $C_{20}$ weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total $C_7$ to total $C_{25}$ weight ratio greater than 2.0, a total $C_8$ to total $C_{25}$ weight ratio greater than 4.5, a total $C_9$ to total $C_{25}$ weight ratio greater than 6.5, a total $C_{10}$ to total $C_{25}$ weight ratio greater than 7.5, a total $C_{11}$ to total $C_{25}$ weight ratio greater than 6.5, a total $C_{12}$ to total $C_{25}$ weight ratio greater than 6.5, a total $C_{13}$ to total $C_{25}$ weight ratio greater than 8.0, a total $C_{14}$ to total $C_{25}$ weight ratio greater than 6.0, a total $C_{15}$ to total $C_{25}$ weight ratio greater than 6.0, a total $C_{16}$ to total $C_{25}$ weight ratio greater than 4.5, a total $C_{17}$ to total $C_{25}$ weight ratio greater than 4.8, and a total $C_{18}$ to total $C_{25}$ weight ratio greater than 4.5. In alternative embodiments the condensable hydrocarbon portion has one or more of a total $C_7$ to total $C_{25}$ weight ratio greater than 7.0, a total $C_8$ to total $C_{25}$ weight ratio greater than 10.0, a total $C_9$ to total $C_{25}$ weight ratio greater than 10.0, a total $C_{10}$ to total $C_{25}$ weight ratio greater than 10.0, a total $C_{11}$ to total $C_{25}$ weight ratio greater than 8.0, and a total $C_{12}$ to total $C_{25}$ weight ratio greater than 8.0. In alternative embodiments the condensable hydrocarbon portion has one or more of a total $C_7$ to total $C_{25}$ weight ratio greater than 13.0, a total $C_8$ to total $C_{25}$ weight ratio greater than 17.0, a total $C_9$ to total $C_{25}$ weight ratio greater than 17.0, a total $C_{10}$ to total $C_{25}$ weight ratio greater than 15.0, a total $C_{11}$ to total $C_{25}$ weight ratio greater than 14.0, and a total $C_{12}$ to total $C_{25}$ weight ratio greater than 13.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_7$ to total $C_{25}$ weight ratio greater than 2.0. Alternatively, the condensable hydrocarbon portion may have a total $C_7$ to total $C_{25}$ weight ratio greater than 3.0, greater than 5.0, greater than 10.0, greater than 13.0, or greater than 15.0. In alternative embodiments, the condensable hydrocarbon portion may have a total $C_7$ to total $C_{25}$ weight ratio less than 30.0 or less than 25.0. In some embodiments the condensable hydrocarbon portion has a total $C_8$ to total $C_{25}$ weight ratio greater than 4.5. Alternatively, the condensable hydrocarbon portion may have a total $C_8$ to total $C_{25}$ weight ratio greater than 5.0, greater than 7.0, greater than 10.0, greater than 15.0, or greater than 17.0. In alternative embodiments, the condensable hydrocarbon portion may have a total $C_8$ to total $C_5$ weight ratio less than 35.0, or less than 30.0. In some embodiments the condensable hydrocarbon portion has a total $C_9$ to total $C_{25}$ weight ratio greater than 6.5. Alternatively, the condensable hydrocarbon portion may have a total $C_9$ to total $C_{25}$ weight ratio greater than 8.0, greater than 10.0, greater than 15.0, greater than 17.0, or greater than 19.0. In alternative embodiments, the condensable hydrocarbon portion may have a total $C_9$ to total $C_{25}$ weight ratio less than 40.0 or less than 35.0. In some embodiments the condensable hydrocarbon portion has a total $C_{10}$ to total $C_{25}$ weight ratio greater than 7.5. Alternatively, the condensable hydrocarbon portion may have a total $C_{10}$ to total $C_{25}$ weight ratio greater than 10.0, greater than 14.0, or greater than 17.0. In alternative embodiments, the condensable hydrocarbon portion may have a total $C_{10}$ to total $C_{25}$ weight ratio less than 35.0 or less than 30.0. In some embodiments the condensable hydrocarbon portion has a total $C_{11}$ to total $C_{25}$ weight ratio greater than 6.5. Alternatively, the condensable hydrocarbon portion may have a total $C_{11}$ to total $C_{25}$ weight ratio greater than 8.5, greater than 10.0, greater than 12.0, or greater than 14.0. In alternative embodiments, the condensable hydrocarbon portion may have a total $C_{11}$ to total $C_{25}$ weight ratio less than 35.0 or less than 30.0. In some embodiments the condensable hydrocarbon portion has a total $C_{12}$ to total $C_{25}$ weight ratio greater than 6.5. Alternatively, the condensable hydrocarbon portion may have a total $C_{12}$ to total $C_{25}$ weight ratio greater than 8.5, a total $C_{12}$ to total $C_{25}$ weight ratio greater than 10.0, greater than 12.0, or greater than 14.0. In alternative embodiments, the condensable hydrocarbon portion may have a total $C_{12}$ to total $C_{25}$ weight ratio less than 30.0 or less than 25.0. In some embodiments the condensable hydrocarbon portion has a total $C_{13}$ to total $C_{25}$ weight ratio greater than 8.0. Alternatively, the condensable hydrocarbon portion may have a total $C_{13}$ to total $C_{25}$ weight ratio greater than 10.0, greater than 12.0, or greater than 14.0. In alternative embodiments, the condensable hydrocarbon portion may have a total $C_{13}$ to total $C_{25}$ weight ratio less than 25.0 or less than 20.0. In some embodiments the condensable hydrocarbon portion has a total $C_{14}$ to total $C_{25}$ weight ratio greater than 6.0. Alternatively, the condensable hydrocarbon portion may have a total $C_{14}$ to total $C_{25}$ weight ratio greater than 8.0, greater than 10.0, or greater than 12.0. In alternative embodiments, the condensable hydrocarbon portion may have a total $C_{14}$ to total $C_{25}$ weight ratio less than 25.0 or less than 20.0. In some embodiments the condensable hydrocarbon portion has a total $C_{15}$ to total $C_{25}$ weight ratio greater than 6.0. Alternatively, the condensable hydrocarbon portion may have a total $C_{15}$ to total $C_{25}$ weight ratio greater than 8.0, or greater than 10.0. In alternative embodiments, the condensable hydrocarbon portion may have a total $C_{15}$ to total $C_{25}$ weight ratio less than 25.0 or less than 20.0. In some embodiments the condensable hydrocarbon portion has a total $C_{16}$ to total $C_{25}$ weight ratio greater than 4.5. Alternatively, the condensable hydrocarbon portion may have a total $C_{16}$ to total $C_{25}$ weight ratio greater than 6.0, greater than 8.0, or greater than 10.0. In alternative embodiments, the condensable hydrocarbon portion may have a total $C_{16}$ to total $C_{25}$ weight ratio less than 20.0 or less than 15.0. In some embodiments the condensable hydrocarbon portion has a total $C_{17}$ to total $C_{25}$ weight ratio greater than 4.8. Alternatively, the condensable hydrocarbon portion may have a total $C_{17}$ to total $C_{25}$ weight ratio greater than 5.5 or greater than 7.0. In alternative embodiments, the condensable hydrocarbon portion may have a total $C_{17}$ to total $C_{25}$ weight ratio less than 20.0. In some embodiments the condensable hydrocarbon portion has a total $C_{15}$ to total $C_{25}$ weight ratio greater than 4.5. Alternatively, the condensable hydrocarbon portion may have a total $C_{18}$ to total $C_{25}$ weight ratio greater than 5.0 or greater than 5.5. In alternative embodiments, the condensable hydrocarbon portion may have a total $C_{18}$ to total $C_{25}$ weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total $C_7$ to total $C_{29}$ weight ratio greater than 3.5, a total $C_8$ to total $C_{29}$ weight ratio greater than 9.0, a total $C_9$ to total $C_{29}$ weight ratio greater than 12.0, a total $C_{10}$ to total $C_{29}$ weight ratio greater than 15.0, a total $C_{11}$ to total $C_{29}$ weight ratio greater than 13.0, a total $C_{12}$ to total $C_{29}$ weight ratio greater than 12.5, and a total $C_{13}$ to total $C_{29}$ weight ratio greater than 16.0, a total $C_{14}$ to total $C_{29}$ weight ratio greater than 12.0, a total $C_{15}$ to total $C_{29}$ weight ratio greater than 12.0, a total $C_{16}$ to total $C_{29}$ weight ratio greater than 9.0, a total $C_{17}$ to total $C_{29}$ weight ratio greater than 10.0, a total $C_{18}$ to total $C_{29}$ weight ratio greater than 8.8, a total $C_{19}$ to total $C_{29}$ weight ratio greater than 7.0, a total $C_{20}$ to total $C_{29}$ weight ratio greater than 6.0, a total $C_{21}$ to total $C_{29}$ weight ratio greater than 5.5, and a total $C_{22}$ to total $C_{29}$ weight ratio greater than 4.2. In alternative embodiments the condensable hydrocarbon portion has one or more of a total $C_7$ to total $C_{29}$ weight ratio greater than 16.0, a total $C_8$ to total $C_{29}$ weight ratio greater than 19.0, a total $C_9$ to total $C_{29}$ weight ratio greater than 20.0, a total $C_{10}$ to total $C_{29}$ weight ratio greater than 18.0, a total $C_{11}$ to total $C_{29}$ weight ratio greater than 16.0, a total $C_{12}$ to total $C_{29}$ weight ratio greater than 15.0, and a total $C_{13}$ to total $C_{29}$ weight ratio greater than 17.0, a total $C_{14}$ to total $C_{29}$ weight ratio greater than 13.0, a total $C_{15}$ to total $C_{29}$ weight ratio greater than 13.0, a total $C_{16}$ to total $C_{29}$ weight ratio greater than 10.0, a total $C_{17}$ to total $C_{29}$ weight ratio greater than 11.0, a total $C_{18}$ to total $C_{29}$ weight ratio greater than 9.0, a total $C_{19}$ to total $C_{29}$ weight ratio greater than 8.0, a total $C_{20}$ to total $C_{29}$ weight ratio greater than 6.5, and a total $C_{21}$ to total $C_{29}$ weight ratio greater than 6.0. In alternative embodiments the condensable hydrocarbon portion has one or more of a total $C_7$ to total $C_{29}$ weight ratio greater than 24.0, a total $C_8$ to total $C_{29}$ weight ratio greater than 30.0, a total $C_9$ to total $C_{29}$ weight ratio greater than 32.0, a total $C_{10}$ to total $C_{29}$ weight ratio greater than 30.0, a total $C_{11}$ to total $C_{29}$ weight ratio greater than 27.0, a total $C_{12}$ to total $C_{29}$ weight ratio greater than 25.0, and a total $C_{13}$ to total $C_{29}$ weight ratio greater than 22.0, a total $C_{14}$ to total $C_{29}$ weight ratio greater than 18.0, a total $C_{15}$ to total $C_{29}$ weight ratio greater than 18.0, a total $C_{16}$ to total $C_{29}$ weight ratio greater than 16.0, a total $C_{17}$ to total $C_{29}$ weight ratio greater than 13.0, a total $C_{18}$ to total $C_{29}$ weight ratio greater than 10.0, a total $C_{19}$ to total $C_{29}$ weight ratio greater than 9.0, and a total $C_{20}$ to total $C_{29}$ weight ratio greater than 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_7$ to total $C_{29}$ weight ratio greater than 3.5. Alternatively, the condensable hydrocarbon portion may have a total $C_7$ to total $C_{29}$ weight ratio greater than 5.0, greater than 10.0, greater than 18.0, greater than 20.0, or greater than 24.0. In alternative embodiments, the condensable hydrocarbon portion may have a total $C_7$ to total $C_{29}$ weight ratio less than 60.0 or less than 50.0. In some embodiments the condensable hydrocarbon portion has a total $C_8$ to total $C_{29}$ weight ratio greater than 9.0. Alternatively, the condensable hydrocarbon portion may have a total $C_8$ to total $C_{29}$ weight ratio greater than 10.0, greater than 18.0, greater than 20.0, greater than 25.0, or greater than 30.0. In alternative embodiments, the condensable hydrocarbon portion may have a total $C_8$ to total $C_{29}$ weight ratio less than 85.0 or less than 75.0. In some embodiments the condensable hydrocarbon portion has a total $C_9$ to total $C_{29}$ weight ratio greater than 12.0. Alternatively, the condensable hydrocarbon portion may have a total $C_9$ to total $C_{29}$ weight ratio greater than 15.0, greater than 20.0, greater than 23.0, greater than 27.0, or greater than 32.0. In alternative embodiments, the condensable hydrocarbon portion may have a total $C_9$ to total $C_{29}$ weight ratio less than 85.0 or less than 75.0. In some embodiments the condensable hydrocarbon portion has a total $C_{10}$ to total $C_{29}$ weight ratio greater than 15.0. Alternatively, the condensable hydrocarbon portion may have a total $C_{10}$ to total $C_{29}$ weight ratio greater than 18.0, greater than 22.0, or greater than 28.0. In alternative embodiments, the condensable hydrocarbon portion may have a total $C_{10}$ to total $C_{29}$ weight ratio less than 80.0 or less than 70.0. In some embodiments the condensable hydrocarbon portion has a total $C_{11}$ to total $C_{29}$ weight ratio greater than 13.0. Alternatively, the condensable hydrocarbon portion may have a total $C_{10}$ to total $C_{29}$ weight ratio greater than 16.0, greater than 18.0, greater than 24.0, or greater than 27.0. In alternative embodiments, the condensable hydrocarbon portion may have a total $C_{11}$ to total $C_{29}$ weight ratio less than 75.0 or less than 65.0. In some embodiments the condensable hydrocarbon portion has a total $C_{12}$ to total $C_{29}$ weight ratio greater than 12.5. Alternatively, the condensable hydrocarbon portion may have a total $C_{12}$ to total $C_{29}$ weight ratio greater than 14.5, greater than 18.0, greater than 22.0, or greater than 25.0. In alternative embodiments, the condensable hydrocarbon portion may have a total $C_{12}$ to total $C_{29}$ weight ratio less than 75.0 or less than 65.0. In some embodiments the condensable hydrocarbon portion has a total $C_{13}$ to total $C_{29}$ weight ratio greater than 16.0. Alternatively, the condensable hydrocarbon portion may have a total $C_{13}$ to total $C_{29}$ weight ratio greater than 18.0, greater than 20.0, or greater than 22.0. In alternative embodiments, the condensable hydrocarbon portion may have a total $C_{13}$ to total $C_{29}$ weight ratio less than 70.0 or less than 60.0. In some embodiments the condensable hydrocarbon portion has a total $C_{14}$ to total $C_{29}$ weight ratio greater than 12.0. Alternatively, the condensable hydrocarbon portion may have a total $C_{14}$ to total $C_{29}$ weight ratio greater than 14.0, greater than 16.0, or greater than 18.0. In alternative embodiments, the condensable hydrocarbon portion may have a total $C_{14}$ to total $C_{29}$ weight ratio less than 60.0 or less than 50.0. In some embodiments the condensable hydrocarbon portion has a total $C_{15}$ to total $C_{29}$ weight ratio greater than 12.0. Alternatively, the condensable hydrocarbon portion may have a total $C_{15}$ to total $C_{29}$ weight ratio greater than 15.0 or greater than 18.0. In alternative embodiments, the condensable hydrocarbon portion may have a total $C_{15}$ to total $C_{29}$ weight ratio less than 60.0 or less than 50.0. In some embodiments the condensable hydrocarbon portion has a total $C_{16}$ to total $C_{29}$ weight ratio greater than 9.0. Alternatively, the condensable hydrocarbon portion may have a total $C_{16}$ to total $C_{29}$ weight ratio greater than 10.0, greater than 13.0, or greater than 16.0. In alternative embodiments, the condensable hydrocarbon portion may have a total $C_{16}$ to total $C_{29}$ weight ratio less than 55.0 or less than 45.0. In some embodiments the condensable hydrocarbon portion has a total $C_{17}$ to total $C_{29}$ weight ratio greater than 10.0. Alternatively, the condensable hydrocarbon portion may have a total $C_{17}$ to total $C_{29}$ weight ratio greater than 11.0 or greater than 12.0. In alternative embodiments, the condensable hydrocarbon portion may have a total $C_{17}$ to total $C_{29}$ weight ratio less than 45.0. In some embodiments the condensable hydrocarbon portion has a total $C_{18}$ to total $C_{29}$ weight ratio greater than 8.8. Alternatively, the condensable hydrocarbon portion may have a total $C_{18}$ to total $C_{29}$ weight ratio greater than 9.0 or greater than 10.0. In alternative embodiments, the condensable hydrocarbon portion may have a total $C_{18}$ to total $C_{29}$ weight ratio less than 35.0. In some embodiments the condensable hydrocarbon portion has a total $C_{19}$ to total $C_{29}$ weight ratio greater than 7.0. Alternatively, the condensable hydrocarbon portion may have a total $C_{19}$ to total $C_{29}$ weight ratio greater than 8.0 or greater than 9.0. In alternative embodiments, the condensable hydrocarbon portion may have a total $C_{19}$ to total $C_{29}$ weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total $C_9$ to total $C_{20}$ weight ratio between 2.5 and 6.0, a total $C_{10}$ to total $C_{20}$ weight ratio between 2.8 and 7.3, a total $C_{11}$ to total $C_{20}$ weight ratio between 2.6 and 6.5, a total $C_{12}$ to total $C_{20}$ weight ratio between 2.6 and 6.4 and a total $C_{13}$ to total $C_{20}$ weight ratio between 3.2 and 8.0. In alternative embodiments the condensable hydrocarbon portion has one or more of a total $C_9$ to total $C_{20}$ weight ratio between 3.0 and 5.5, a total $C_{10}$ to total $C_{20}$ weight ratio between 3.2 and 7.0, a total $C_{11}$ to total $C_{20}$ weight ratio between 3.0 and 6.0, a total $C_{12}$ to total $C_{20}$ weight ratio between 3.0 and 6.0, and a total $C_{13}$ to total $C_{20}$ weight ratio between 3.3 and 7.0. In alternative embodiments the condensable hydrocarbon portion has one or more of a total $C_9$ to total $C_{20}$ weight ratio between 4.6 and 5.5, a total $C_{10}$ to total $C_{20}$ weight ratio between 4.2 and 7.0, a total $C_{11}$ to total $C_{20}$ weight ratio between 3.7 and 6.0, a total $C_{12}$ to total $C_{20}$ weight ratio between 3.6 and 6.0, and a total $C_{13}$ to total $C_{20}$ weight ratio between 3.4 and 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_9$ to total $C_{20}$ weight ratio between 2.5 and 6.0. Alternatively, the condensable hydrocarbon portion may have a total $C_9$ to total $C_{20}$ weight ratio between 3.0 and 5.8, between 3.5 and 5.8, between 4.0 and 5.8, between 4.5 and 5.8, between 4.6 and 5.8, or between 4.7 and 5.8. In some embodiments the condensable hydrocarbon portion has a total $C_{10}$ to total $C_{20}$ weight ratio between 2.8 and 7.3. Alternatively, the condensable hydrocarbon portion may have a total $C_{10}$ to total $C_{20}$ weight ratio between 3.0 and 7.2, between 3.5 and 7.0, between 4.0 and 7.0, between 4.2 and 7.0, between 4.3 and 7.0, or between 4.4 and 7.0. In some embodiments the condensable hydrocarbon portion has a total $C_{11}$ to total $C_{20}$ weight ratio between 2.6 and 6.5. Alternatively, the condensable hydrocarbon portion may have a total $C_{11}$ to total $C_{20}$ weight ratio between 2.8 and 6.3, between 3.5 and 6.3, between 3.7 and 6.3, between 3.8 and 6.3, between 3.9 and 6.2, or between 4.0 and 6.2. In some embodiments the condensable hydrocarbon portion has a total $C_{12}$ to total $C_{20}$ weight ratio between 2.6 and 6.4. Alternatively, the condensable hydrocarbon portion may have a total $C_{12}$ to total $C_{20}$ weight ratio between 2.8 and 6.2, between 3.2 and 6.2, between 3.5 and 6.2, between 3.6 and 6.2, between 3.7 and 6.0, or between 3.8 and 6.0. In some embodiments the condensable hydrocarbon portion has a total $C_{13}$ to total $C_{20}$ weight ratio between 3.2 and 8.0. Alternatively, the condensable hydrocarbon portion may have a total $C_{13}$ to total $C_{20}$ weight ratio between 3.3 and 7.8, between 3.3 and 7.0, between 3.4 and 7.0, between 3.5 and 6.5, or between 3.6 and 6.0. The embodiments described in this paragraph may be combined with any of the other aspects of the invention discussed herein.

In some embodiments the condensable hydrocarbon portion may have one or more of a total $C_{10}$ to total $C_{25}$ weight ratio between 7.1 and 24.5, a total $C_{11}$ to total $C_{25}$ weight ratio between 6.5 and 22.0, a total $C_{12}$ to total $C_{25}$ weight ratio between 6.5 and 22.0, and a total $C_{13}$ to total $C_{25}$ weight ratio between 8.0 and 27.0. In alternative embodiments the condensable hydrocarbon portion has one or more of a total $C_{10}$ to total $C_{25}$ weight ratio between 10.0 and 24.0, a total $C_{11}$ to total $C_{25}$ weight ratio between 10.0 and 21.5, a total $C_{12}$ to total $C_{25}$ weight ratio between 10.0 and 21.5, and a total $C_{13}$ to total $C_{25}$ weight ratio between 9.0 and 25.0. In alternative embodiments the condensable hydrocarbon portion has one or more of a total $C_{10}$ to total $C_{25}$ weight ratio between 14.0 and 24.0, a total $C_{11}$ to total $C_{25}$ weight ratio between 12.5 and 21.5, a total $C_{12}$ to total $C_{25}$ weight ratio between 12.0 and 21.5, and a total $C_{13}$ to total $C_{25}$ weight ratio between 10.5 and 25.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_{10}$ to total $C_{25}$ weight ratio between 7.1 and 24.5. Alternatively, the condensable hydrocarbon portion may have a total $C_{10}$ to total $C_{25}$ weight ratio between 7.5 and 24.5, between 12.0 and 24.5, between 13.8 and 24.5, between 14.0 and 24.5, or between 15.0 and 24.5. In some embodiments the condensable hydrocarbon portion has a total $C_{11}$ to total $C_{25}$ weight ratio between 6.5 and 22.0. Alternatively, the condensable hydrocarbon portion may have a total $C_{11}$ to total $C_{25}$ weight ratio between 7.0 and 21.5, between 10.0 and 21.5, between 12.5 and 21.5, between 13.0 and 21.5, between 13.7 and 21.5, or between 14.5 and 21.5. In some embodiments the condensable hydrocarbon portion has a total $C_{12}$ to total $C_{25}$ weight ratio between 10.0 and 21.5. Alternatively, the condensable hydrocarbon portion may have a total $C_{12}$ to total $C_{25}$ weight ratio between 10.5 and 21.0, between 11.0 and 21.0, between 12.0 and 21.0, between 12.5 and 21.0, between 13.0 and 21.0, or between 13.5 and 21.0. In some embodiments the condensable hydrocarbon portion has a total $C_{13}$ to total $C_{25}$ weight ratio between 8.0 and 27.0. Alternatively, the condensable hydrocarbon portion may have a total $C_{13}$ to total $C_{25}$ weight ratio between 9.0 and 26.0, between 10.0 and 25.0, between 10.5 and 25.0, between 11.0 and 25.0, or between 11.5 and 25.0. The embodiments described in this paragraph may be combined with any of the other aspects of the invention discussed herein.

In some embodiments the condensable hydrocarbon portion may have one or more of a total $C_{10}$ to total $C_{29}$ weight ratio between 15.0 and 60.0, a total $C_{11}$ to total $C_{29}$ weight ratio between 13.0 and 54.0, a total $C_{12}$ to total $C_{29}$ weight ratio between 12.5 and 53.0, and a total $C_{13}$ to total $C_{29}$ weight ratio between 16.0 and 65.0. In alternative embodiments the condensable hydrocarbon portion has one or more of a total $C_{10}$ to total $C_{29}$ weight ratio between 17.0 and 58.0, a total $C_{11}$ to total $C_{29}$ weight ratio between 15.0 and 52.0, a total $C_{12}$ to total $C_{29}$ weight ratio between 14.0 and 50.0, and a total $C_{13}$ to total $C_{29}$ weight ratio between 17.0 and 60.0. In alternative embodiments the condensable hydrocarbon portion has one or more of a total $C_{10}$ to total $C_{29}$ weight ratio between 20.0 and 58.0, a total $C_{11}$ to total $C_{29}$ weight ratio between 18.0 and 52.0, a total $C_{12}$ to total $C_{29}$ weight ratio between 18.0 and 50.0, and a total $C_{13}$ to total $C_{29}$ weight ratio between 18.0 and 50.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total $C_{10}$ to total $C_{29}$ weight ratio between 15.0 and 60.0. Alternatively, the condensable hydrocarbon portion may have a total $C_{10}$ to total $C_{29}$ weight ratio between 18.0 and 58.0, between 20.0 and 58.0, between 24.0 and 58.0, between 27.0 and 58.0, or between 30.0 and 58.0. In some embodiments the condensable hydrocarbon portion has a total $C_{11}$ to total $C_{29}$ weight ratio between 13.0 and 54.0. Alternatively, the condensable hydrocarbon portion may have a total $C_{11}$ to total $C_{29}$ weight ratio between 15.0 and 53.0, between 18.0 and 53.0, between 20.0 and 53.0, between 22.0 and 53.0, between 25.0 and 53.0, or between 27.0 and 53.0. In some embodiments the condensable hydrocarbon portion has a total $C_{12}$ to total $C_{29}$ weight ratio between 12.5 and 53.0. Alternatively, the condensable hydrocarbon portion may have a total $C_{12}$ to total $C_{29}$ weight ratio between 14.5 and 51.0, between 16.0 and 51.0, between 18.0 and 51.0, between 20.0 and 51.0, between 23.0 and 51.0, or between 25.0 and 51.0. In some embodiments the condensable hydrocarbon portion has a total $C_{13}$ to total $C_{29}$ weight ratio between 16.0 and 65.0. Alternatively, the condensable hydrocarbon portion may have a total $C_{13}$ to total $C_{29}$ weight ratio between 17.0 and 60.0, between 18.0 and 60.0, between 20.0 and 60.0, between 22.0 and 60.0, or between 25.0 and 60.0. The embodiments described in this paragraph may be combined with any of the other aspects of the invention discussed herein.

In some embodiments the condensable hydrocarbon portion may have one or more of a normal-$C_7$ to normal-$C_{20}$ weight ratio greater than 0.9, a normal-$C_8$ to normal-$C_{20}$ weight ratio greater than 2.0, a normal-$C_9$ to normal-$C_{20}$ weight ratio greater than 1.9, a normal-$C_{10}$ to normal-$C_{20}$ weight ratio greater than 2.2, a normal-$C_{11}$ to normal-$C_{20}$ weight ratio greater than 1.9, a normal-$C_{12}$ to normal-$C_{20}$ weight ratio greater than 1.9, a normal-$C_{11}$ to normal-$C_{20}$ weight ratio greater than 2.3, a normal-$C_{14}$ to normal-$C_{20}$ weight ratio greater than 1.8, a normal-$C_{15}$ to normal-$C_{20}$ weight ratio greater than 1.8, and normal-$C_6$ to normal-$C_{20}$ weight ratio greater than 1.3. In alternative embodiments the condensable hydrocarbon portion has one or more of a normal-$C_{11}$ to normal-$C_{20}$ weight ratio greater than 4.4, a normal-$C_8$ to normal-$C_{20}$ weight ratio greater than 3.7, a normal-$C_9$ to normal-$C_{20}$ weight ratio greater than 3.5, a normal-$C_{10}$ to normal-$C_{20}$ weight ratio greater than 3.4, a normal-$C_{11}$ to normal-$C_{20}$ weight ratio greater than 3.0, and a normal-$C_{12}$ to normal-$C_{20}$ weight ratio greater than 2.7. In alternative embodiments the condensable hydrocarbon portion has one or more of a normal-$C_7$ to normal-$C_{20}$ weight ratio greater than 4.9, a normal-C to normal-$C_{20}$ weight ratio greater than 4.5, a normal-$C_9$ to normal-$C_{20}$ weight ratio greater than 4.4, a normal-$C_{10}$ to normal-$C_{20}$ weight ratio greater than 4.1, a normal-$C_{11}$ to normal-$C_{20}$ weight ratio greater than 3.7, and a normal-$C_{12}$ to normal-$C_{20}$ weight ratio greater than 3.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-$C_7$ to normal-$C_{20}$ weight ratio greater than 0.9. Alternatively, the condensable hydrocarbon portion may have a normal-$C_7$ to normal-$C_{20}$ weight ratio greater than 1.0, than 2.0, greater than 3.0, greater than 4.0, greater than 4.5, or greater than 5.0. In alternative embodiments, the condensable hydrocarbon portion may have a normal-$C_7$ to normal-$C_{20}$ weight ratio less than 8.0 or less than 7.0. In some embodiments the condensable hydrocarbon portion has a normal-$C_8$ to normal-$C_{20}$ weight ratio greater than 1.7. Alternatively, the condensable hydrocarbon portion may have a normal-$C_8$ to normal-$C_{20}$ weight ratio greater than 2.0, greater than 2.5, greater than 3.0, greater than 3.5, greater than 4.0, or greater than 4.4. In alternative embodiments, the condensable hydrocarbon portion may have a normal-$C_8$ to normal-$C_{20}$ weight ratio less than 8.0 or less than 7.0. In some embodiments the condensable hydrocarbon portion has a normal-$C_9$ to normal-$C_{20}$ weight ratio greater than 1.9. Alternatively, the condensable hydrocarbon portion may have a normal-$C_9$ to normal-$C_{20}$ weight ratio greater than 2.0, greater than 3.0, greater than 4.0, or greater than 4.5. In alternative embodiments, the condensable hydrocarbon portion may have a normal-$C_9$ to normal-$C_{20}$ weight ratio less than 7.0 or less than 6.0. In some embodiments the condensable hydrocarbon portion has a normal-$C_{10}$ to normal-$C_{20}$ weight ratio greater than 2.2. Alternatively, the condensable hydrocarbon portion may have a normal-$C_{10}$ to normal-$C_{20}$ weight ratio greater than 2.8, greater than 3.3, greater than 3.5, or greater than 4.0. In alternative embodiments, the condensable hydrocarbon portion may have a normal-$C_{10}$ to normal-$C_{20}$ weight ratio less than 7.0 or less than 6.0. In some embodiments the condensable hydrocarbon portion has a normal-$C_{11}$ to normal-$C_{20}$ weight ratio greater than 1.9. Alternatively, the condensable hydrocarbon portion may have a normal-$C_{11}$ to normal-$C_{20}$ weight ratio greater than 2.5, greater than 3.0, greater than 3.5, or greater than 3.7. In alternative embodiments, the condensable hydrocarbon portion may have a normal-$C_{11}$ to normal-$C_{20}$ weight ratio less than 7.0 or less than 6.0. In some embodiments the condensable hydrocarbon portion has a normal-$C_{12}$ to normal-$C_{20}$ weight ratio greater than 1.9. Alternatively, the condensable hydrocarbon portion may have a normal-$C_{12}$ to normal-$C_{20}$ weight ratio greater than 2.0, greater than 2.2, greater than 2.6, or greater than 3.0. In alternative embodiments, the condensable hydrocarbon portion may have a normal-$C_{12}$ to normal-$C_{20}$ weight ratio less than 7.0 or less than 6.0. In some embodiments the condensable hydrocarbon portion has a normal-$C_{13}$ to normal-$C_{20}$ weight ratio greater than 2.3. Alternatively, the condensable hydrocarbon portion may have a normal-$C_{13}$ to normal-$C_{20}$ weight ratio greater than 2.5, greater than 2.7, or greater than 3.0. In alternative embodiments, the condensable hydrocarbon portion may have a normal-$C_{13}$ to normal-$C_{20}$ weight ratio less than 6.0 or less than 5.0. In some embodiments the condensable hydrocarbon portion has a normal-$C_{14}$ to normal-$C_{20}$ weight ratio greater than 1.8. Alternatively, the condensable hydrocarbon portion may have a normal-$C_{14}$ to normal-$C_{20}$ weight ratio greater than 2.0, greater than 2.2, or greater than 2.5. In alternative embodiments, the condensable hydrocarbon portion may have a normal-$C_{14}$ to normal-$C_{20}$ weight ratio less than 6.0 or less than 4.0. In some embodiments the condensable hydrocarbon portion has a normal-$C_{15}$ to normal-$C_{20}$ weight ratio greater than 1.8. Alternatively, the condensable hydrocarbon portion may have a normal-$C_{15}$ to normal-$C_{20}$ weight ratio greater than 2.0, greater than 2.2, or greater than 2.4. In alternative embodiments, the condensable hydrocarbon portion may have a normal-$C_{15}$ to normal-$C_{20}$ weight ratio less than 6.0 or less than 4.0. In some embodiments the condensable hydrocarbon portion has a normal-$C_{16}$ to normal-$C_{20}$ weight ratio greater than 1.3. Alternatively, the condensable hydrocarbon portion may have a normal-$C_{16}$ to normal-$C_{20}$ weight ratio greater than 1.5, greater than 1.7, or greater than 2.0. In alternative embodiments, the condensable hydrocarbon portion may have a normal-$C_{16}$ to normal-$C_{20}$ weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-$C_7$ to normal-$C_{25}$ weight ratio greater than 1.9, a normal-C to normal-$C_{25}$ weight ratio greater than 3.9, a normal-C to normal-$C_{25}$ weight ratio greater than 3.7, a normal-$C_{10}$ to normal-$C_{25}$ weight ratio greater than 4.4, a normal-$C_{11}$ to normal-$C_{25}$ weight ratio greater than 3.8, a normal-$C_{12}$ to normal-$C_{25}$ weight ratio greater than 3.7, a normal-$C_{13}$ to normal-$C_{25}$ weight ratio greater than 4.7, a normal-$C_{14}$ to normal-$C_{25}$ weight ratio greater than 3.7, a normal-$C_{15}$ to normal-$C_{25}$ weight ratio greater than 3.7, a normal-$C_{16}$ to normal-$C_{25}$ weight ratio greater than 2.5, a normal-$C_{17}$ to normal-$C_{25}$ weight ratio greater than 3.0, and a normal-$C_{18}$ to normal-$C_{25}$ weight ratio greater than 3.4. In alternative embodiments the condensable hydrocarbon portion has one or more of a normal-$C_7$ to normal-$C_{25}$ weight ratio greater than 10, a normal-$C_8$ to normal-$C_{25}$ weight ratio greater than 8.0, a normal-$C_9$ to normal-$C_{25}$ weight ratio greater than 7.0, a normal-$C_{10}$ to normal-$C_{25}$ weight ratio greater than 7.0, a normal-$C_1$ to normal-$C_{25}$ weight ratio greater than 7.0, and a normal-$C_{12}$ to normal-$C_{25}$ weight ratio greater than 6.0. In alternative embodiments the condensable hydrocarbon portion has one or more of a normal-$C_7$ to normal-$C_{25}$ weight ratio greater than 10.0, a normal-$C_8$ to normal-$C_{25}$ weight ratio greater than 12.0, a normal-C to normal-$C_{25}$ weight ratio greater than 11.0, a normal-$C_{10}$ to normal-$C_{25}$ weight ratio greater than 11.0, a normal-$C_{11}$ to normal-$C_{25}$ weight ratio greater than 9.0, and a normal-$C_{12}$ to normal-$C_{25}$ weight ratio greater than 8.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-$C_7$ to normal-$C_{25}$ weight ratio greater than 1.9. Alternatively, the condensable hydrocarbon portion may have a normal-$C_7$ to normal-$C_{25}$ weight ratio greater than 3.0, greater than 5.0, greater than 8.0, greater than 10.0, or greater than 13.0. In alternative embodiments, the condensable hydrocarbon portion may have a normal-$C_7$ to normal-$C_{25}$ weight ratio less than 35.0 or less than 25.0. In some embodiments the condensable hydrocarbon portion has a normal-$C_8$ to normal-$C_{25}$ weight ratio greater than 3.9. Alternatively, the condensable hydrocarbon portion may have a normal-$C_8$ to normal-$C_{25}$ weight ratio greater than 4.5, greater than 6.0, greater than 8.0, greater than 10.0, or greater than 13.0. In alternative embodiments, the condensable hydrocarbon portion may have a normal-$C_8$ to normal-$C_{25}$ weight ratio less than 35.0 or less than 25.0. In some embodiments the condensable hydrocarbon portion has a normal-$C_9$ to normal-$C_{25}$ weight ratio greater than 3.7. Alternatively, the condensable hydrocarbon portion may have a normal-$C_9$ to normal-$C_{25}$ weight ratio greater than 4.5, greater than 7.0, greater than 10.0, greater than 12.0, or greater than 13.0. In alternative embodiments, the condensable hydrocarbon portion may have a normal-$C_9$ to normal-$C_{25}$ weight ratio less than 35.0 or less than 25.0. In some embodiments the condensable hydrocarbon portion has a normal-$C_{10}$ to normal-$C_{25}$ weight ratio greater than 4.4. Alternatively, the condensable hydrocarbon portion may have a normal-$C_{10}$ to normal-$C_{25}$ weight ratio greater than 6.0, greater than 8.0, or greater than 11.0. In alternative embodiments, the condensable hydrocarbon portion may have a normal-$C_{10}$ to normal-$C_{25}$ weight ratio less than 35.0 or less than 25.0. In some embodiments the condensable hydrocarbon portion has a normal-$C_{11}$ to normal-$C_{25}$ weight ratio greater than 3.8. Alternatively, the condensable hydrocarbon portion may have a normal-$C_{11}$ to normal-$C_{25}$ weight ratio greater than 4.5, greater than 7.0, greater than 8.0, or greater than 10.0. In alternative embodiments, the condensable hydrocarbon portion may have a normal-$C_{11}$ to normal-$C_{25}$ weight ratio less than 35.0 or less than 25.0. In some embodiments the condensable hydrocarbon portion has a normal-$C_{12}$ to normal-$C_{25}$ weight ratio greater than 3.7. Alternatively, the condensable hydrocarbon portion may have a normal-$C_{12}$ to normal-$C_{25}$ weight ratio greater than 4.5, greater than 6.0, greater than 7.0, or greater than 8.0. In alternative embodiments, the condensable hydrocarbon portion may have a normal-$C_{12}$ to normal-$C_{25}$ weight ratio less than 30.0 or less than 20.0. In some embodiments the condensable hydrocarbon portion has a normal-$C_{13}$ to normal-$C_{25}$ weight ratio greater than 4.7. Alternatively, the condensable hydrocarbon portion may have a normal-$C_{13}$ to normal-$C_{25}$ weight ratio greater than 5.0, greater than 6.0, or greater than 7.5. In alternative embodiments, the condensable hydrocarbon portion may have a normal-$C_{13}$ to normal-$C_{25}$ weight ratio less than 25.0 or less than 20.0. In some embodiments the condensable hydrocarbon portion has a normal-$C_{14}$ to normal-$C_{25}$ weight ratio greater than 3.7. Alternatively, the condensable hydrocarbon portion may have a normal-$C_{14}$ to normal-$C_{25}$ weight ratio greater than 4.5, greater than 5.5, or greater than 7.0. In alternative embodiments, the condensable hydrocarbon portion may have a normal-$C_{14}$ to normal-$C_{25}$ weight ratio less than 25.0 or less than 20.0. In some embodiments the condensable hydrocarbon portion has a normal-$C_{15}$ to normal-$C_{25}$ weight ratio greater than 3.7. Alternatively, the condensable hydrocarbon portion may have a normal-$C_{15}$ to normal-$C_5$ weight ratio greater than 4.2 or greater than 5.0. In alternative embodiments, the condensable hydrocarbon portion may have a normal-$C_{15}$ to normal-$C_{25}$ weight ratio less than 25.0 or less than 20.0. In some embodiments the condensable hydrocarbon portion has a normal-$C_6$ to normal-$C_{25}$ weight ratio greater than 2.5. Alternatively, the condensable hydrocarbon portion may have a normal-$C_{16}$ to normal-$C_{25}$ weight ratio greater than 3.0, greater than 4.0, or greater than 5.0. In alternative embodiments, the condensable hydrocarbon portion may have a normal-$C_{16}$ to normal-$C_{25}$ weight ratio less than 20.0 or less than 15.0. In some embodiments the condensable hydrocarbon portion has a normal-$C_{17}$ to normal-$C_{25}$ weight ratio greater than 3.0. Alternatively, the condensable hydrocarbon portion may have a normal-$C_{17}$ to normal-$C_{25}$ weight ratio greater than 3.5 or greater than 4.0. In alternative embodiments, the condensable hydrocarbon portion may have a normal-$C_{17}$ to normal-$C_{25}$ weight ratio less than 20.0. In some embodiments the condensable hydrocarbon portion has a normal-$C_{18}$ to normal-$C_{25}$ weight ratio greater than 3.4. Alternatively, the condensable hydrocarbon portion may have a normal-$C_{18}$ to normal-$C_{25}$ weight ratio greater than 3.6 or greater than 4.0. In alternative embodiments, the condensable hydrocarbon portion may have a normal-$C_{18}$ to normal-$C_{25}$ weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-$C_7$ to normal-$C_{29}$ weight ratio greater than 18.0, a normal-$C_8$ to normal-$C_{29}$ weight ratio greater than 16.0, a normal-$C_9$ to normal-$C_{29}$ weight ratio greater than 14.0, a normal-$C_{10}$ to normal-$C_{29}$ weight ratio greater than 14.0, a normal-$C_{11}$ to normal-$C_{29}$ weight ratio greater than 13.0, a normal-$C_{12}$ to normal-$C_{29}$ weight ratio greater than 11.0, a normal-$C_9$ to normal-$C_{29}$ weight ratio greater than 10.0, a normal-$C_{14}$ to normal-$C_{29}$ weight ratio greater than 9.0, a normal-$C_{15}$ to normal-$C_{29}$ weight ratio greater than 8.0, a normal-$C_{16}$ to normal-$C_{29}$ weight ratio greater than 8.0, a normal-$C_{17}$ to normal-$C_{29}$ weight ratio greater than 6.0, a normal-$C_{18}$ to normal-$C_{29}$ weight ratio greater than 6.0, a normal-$C_{19}$ to normal-$C_{29}$ weight ratio greater than 5.0, a normal-$C_{20}$ to normal-$C_{29}$ weight ratio greater than 4.0, a normal-$C_{21}$ to normal-$C_{29}$ weight ratio greater than 3.6, and a normal-$C_{22}$ to normal-$C_{29}$ weight ratio greater than 2.8. In alternative embodiments the condensable hydrocarbon portion has one or more of a normal-$C_7$ to normal-$C_{29}$ weight ratio greater than 20.0, a normal-$C_8$ to normal-$C_{29}$ weight ratio greater than 18.0, a normal-$C_{29}$ to normal-$C_{29}$ weight ratio greater than 17.0, a normal-$C_{10}$ to normal-$C_{29}$ weight ratio greater than 16.0, a normal-$C_{11}$ to normal-$C_{29}$ weight ratio greater than 15.0, a normal-$C_{12}$ to normal-$C_{29}$ weight ratio greater than 12.5, a normal-$C_{13}$ to normal-$C_{29}$ weight ratio greater than 11.0, a normal-$C_{14}$ to normal-$C_{29}$ weight ratio greater than 10.0, a normal-$C_{15}$ to normal-$C_{29}$ weight ratio greater than 8.0, a normal-$C_{16}$ to normal-$C_{29}$ weight ratio greater than 8.0, a normal-$C_{17}$ to normal-$C_{29}$ weight ratio greater than 7.0, a normal-$C_{15}$ to normal-$C_{29}$ weight ratio greater than 6.5, a normal-$C_{19}$ to normal-$C_{29}$ weight ratio greater than 5.5, a normal-$C_{20}$ to normal-$C_{29}$ weight ratio greater than 4.5, and a normal-$C_{21}$ to normal-$C_{29}$ weight ratio greater than 4.0. In alternative embodiments the condensable hydrocarbon portion has one or more of a normal-$C_7$ to normal-$C_{29}$ weight ratio greater than 23.0, a normal-$C_8$ to normal-$C_{29}$ weight ratio greater than 21.0, a normal-$C_9$ to normal-$C_{29}$ weight ratio greater than 20.0, a normal-$C_{10}$ to normal-$C_{29}$ weight ratio greater than 19.0, a normal-$C_{11}$ to normal-$C_{29}$ weight ratio greater than 17.0, a normal-$C_{12}$ to normal-$C_{29}$ weight ratio greater than 14.0, a normal-$C_{13}$ to normal-$C_{29}$ weight ratio greater than 12.0, a normal-$C_{14}$ to normal-$C_{29}$ weight ratio greater than 11.0, a normal-$C_{15}$ to normal-$C_{29}$ weight ratio greater than 9.0, a normal-$C_{16}$ to normal-$C_{29}$ weight ratio greater than 9.0, a normal-$C_{17}$ to normal-$C_{29}$ weight ratio greater than 7.5, a normal-$C_{18}$ to normal-$C_{29}$ weight ratio greater than 7.0, a normal-$C_{19}$ to normal-$C_{29}$ weight ratio greater than 6.5, a normal-$C_{20}$ to normal-$C_{29}$ weight ratio greater than 4.8, and a normal-$C_{21}$ to normal-$C_{29}$ weight ratio greater than 4.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-$C_7$ to normal-$C_{29}$ weight ratio greater than 18.0. Alternatively, the condensable hydrocarbon portion may have a normal-$C_7$ to normal-$C_{29}$ weight ratio greater than 20.0, greater than 22.0, greater than 25.0, greater than 30.0, or greater than 35.0. In alternative embodiments, the condensable hydrocarbon portion may have a normal-$C_7$ to normal-$C_{29}$ weight ratio less than 70.0 or less than 60.0. In some embodiments the condensable hydrocarbon portion has a normal-$C_8$ to normal-$C_{29}$ weight ratio greater than 16.0. Alternatively, the condensable hydrocarbon portion may have a normal-$C_8$ to normal-$C_{29}$ weight ratio greater than 18.0, greater than 22.0, greater than 25.0, greater than 27.0, or greater than 30.0. In alternative embodiments, the condensable hydrocarbon portion may have a normal-$C_8$ to normal-$C_{29}$ weight ratio less than 85.0 or less than 75.0. In some embodiments the condensable hydrocarbon portion has a normal-$C_9$ to normal-$C_{29}$ weight ratio greater than 14.0. Alternatively, the condensable hydrocarbon portion may have a normal-$C_9$ to normal-$C_{29}$ weight ratio greater than 18.0, greater than 20.0, greater than 23.0, greater than 27.0, or greater than 30.0. In alternative embodiments, the condensable hydrocarbon portion may have a normal-C to normal-$C_9$ weight ratio less than 85.0 or less than 75.0. In some embodiments the condensable hydrocarbon portion has a normal-$C_{10}$ to normal-$C_{29}$ weight ratio greater than 14.0. Alternatively, the condensable hydrocarbon portion may have a normal-$C_{10}$ to normal-$C_{29}$ weight ratio greater than 20.0, greater than 25.0, or greater than 30.0. In alternative embodiments, the condensable hydrocarbon portion may have a normal-$C_{10}$ to normal-$C_{29}$ weight ratio less than 80.0 or less than 70.0. In some embodiments the condensable hydrocarbon portion has a normal-$C_{11}$ to normal-$C_{29}$ weight ratio greater than 13.0. Alternatively, the condensable hydrocarbon portion may have a normal-$C_{11}$ to normal-$C_{29}$ weight ratio greater than 16.0, greater than 18.0, greater than 24.0, or greater than 27.0. In alternative embodiments, the condensable hydrocarbon portion may have a normal-$C_{11}$ to normal-$C_{29}$ weight ratio less than 75.0 or less than 65.0. In some embodiments the condensable hydrocarbon portion has a normal-$C_{12}$ to normal-$C_{29}$ weight ratio greater than 11.0. Alternatively, the condensable hydrocarbon portion may have a normal-$C_{12}$ to normal-$C_{29}$ weight ratio greater than 14.5, greater than 18.0, greater than 22.0, or greater than 25.0. In alternative embodiments, the condensable hydrocarbon portion may have a normal-$C_{12}$ to normal-$C_{29}$ weight ratio less than 75.0 or less than 65.0. In some embodiments the condensable hydrocarbon portion has a normal-$C_{13}$ to normal-$C_{29}$ weight ratio greater than 10.0. Alternatively, the condensable hydrocarbon portion may have a normal-$C_{13}$ to normal-$C_{29}$ weight ratio greater than 18.0, greater than 20.0, or greater than 22.0. In alternative embodiments, the condensable hydrocarbon portion may have a normal-$C_{13}$ to normal-$C_{29}$ weight ratio less than 70.0 or less than 60.0. In some embodiments the condensable hydrocarbon portion has a normal-$C_{14}$ to normal-$C_{29}$ weight ratio greater than 9.0. Alternatively, the condensable hydrocarbon portion may have a normal-$C_{14}$ to normal-$C_{29}$ weight ratio greater than 14.0, greater than 16.0, or greater than 18.0. In alternative embodiments, the condensable hydrocarbon portion may have a normal-$C_{14}$ to normal-$C_{29}$ weight ratio less than 60.0 or less than 50.0. In some embodiments the condensable hydrocarbon portion has a normal-$C_{15}$ to normal-$C_{29}$ weight ratio greater than 8.0. Alternatively, the condensable hydrocarbon portion may have a normal-$C_{15}$ to normal-$C_{29}$ weight ratio greater than 12.0 or greater than 16.0. In alternative embodiments, the condensable hydrocarbon portion may have a normal-$C_{15}$ to normal-$C_{29}$ weight ratio less than 60.0 or less than 50.0. In some embodiments the condensable hydrocarbon portion has a normal-$C_{16}$ to normal-$C_{29}$ weight ratio greater than 8.0. Alternatively, the condensable hydrocarbon portion may have a normal-$C_{16}$ to normal-$C_{29}$ weight ratio greater than 10.0, greater than 13.0, or greater than 15.0. In alternative embodiments, the condensable hydrocarbon portion may have a normal-$C_{16}$ to normal-$C_{29}$ weight ratio less than 55.0 or less than 45.0. In some embodiments the condensable hydrocarbon portion has a normal-$C_{17}$ to normal-$C_{29}$ weight ratio greater than 6.0. Alternatively, the condensable hydrocarbon portion may have a normal-$C_{17}$ to normal-$C_{29}$ weight ratio greater than 8.0 or greater than 12.0. In alternative embodiments, the condensable hydrocarbon portion may have a normal-$C_{17}$ to normal-$C_{29}$ weight ratio less than 45.0. In some embodiments the condensable hydrocarbon portion has a normal-$C_{18}$ to normal-$C_{29}$ weight ratio greater than 6.0. Alternatively, the condensable hydrocarbon portion may have a normal-$C_{18}$ to normal-$C_{29}$ weight ratio greater than 8.0 or greater than 10.0. In alternative embodiments, the condensable hydrocarbon portion may have a normal-$C_{18}$ to normal-$C_{29}$ weight ratio less than 35.0. In some embodiments the condensable hydrocarbon portion has a normal-$C_{19}$ to normal-$C_{29}$ weight ratio greater than 5.0. Alternatively, the condensable hydrocarbon portion may have a normal-$C_{19}$ to normal-$C_{29}$ weight ratio greater than 7.0 or greater than 9.0. In alternative embodiments, the condensable hydrocarbon portion may have a normal-$C_{19}$ to normal-$C_{29}$ weight ratio less than 30.0. In some embodiments the condensable hydrocarbon portion has a normal-$C_{20}$ to normal-$C_{29}$ weight ratio greater than 4.0. Alternatively, the condensable hydrocarbon portion may have a normal-$C_{20}$ to normal-$C_{29}$ weight ratio greater than 6.0 or greater than 8.0. In alternative embodiments, the condensable hydrocarbon portion may have a normal-$C_{20}$ to normal-$C_{29}$ weight ratio less than 30.0. In some embodiments the condensable hydrocarbon portion has a normal-$C_{21}$ to normal-$C_{29}$ weight ratio greater than 3.6. Alternatively, the condensable hydrocarbon portion may have a normal-$C_{21}$ to normal-$C_{29}$ weight ratio greater than 4.0 or greater than 6.0. In alternative embodiments, the condensable hydrocarbon portion may have a normal-$C_{21}$ to normal-$C_{29}$ weight ratio less than 30.0. In some embodiments the condensable hydrocarbon portion has a normal-$C_{22}$ to normal-$C_{29}$ weight ratio greater than 2.8. Alternatively, the condensable hydrocarbon portion may have a normal-$C_{22}$ to normal-$C_{29}$ weight ratio greater than 3.0. In alternative embodiments, the condensable hydrocarbon portion may have a normal-$C_{22}$ to normal-$C_{29}$ weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-$C_{10}$ to total $C_{10}$ weight ratio less than 0.31, a normal-$C_{11}$ to total $C_{11}$ weight ratio less than 0.32, a normal-$C_{12}$ to total $C_{12}$ weight ratio less than 0.29, a normal-$C_{13}$ to total $C_{13}$ weight ratio less than 0.28, a normal-$C_{14}$ to total $C_{14}$ weight ratio less than 0.31, a normal-$C_{15}$ to total $C_{15}$ weight ratio less than 0.27, a normal-$C_{16}$ to total $C_{16}$ weight ratio less than 0.31, a normal-$C_{17}$ to total $C_{17}$ weight ratio less than 0.31, a normal-$C_{18}$ to total $C_{18}$ weight ratio less than 0.37, normal-$C_{19}$ to total $C_{19}$ weight ratio less than 0.37, a normal-$C_{20}$ to total $C_{20}$ weight ratio less than 0.37, a normal-$C_{21}$ to total $C_{21}$ weight ratio less than 0.37, a normal-$C_{22}$ to total $C_{22}$ weight ratio less than 0.38, normal-$C_{23}$ to total $C_{23}$ weight ratio less than 0.43, a normal-$C_{24}$ to total $C_{24}$ weight ratio less than 0.48, and a normal-$C_{25}$ to total $C_{25}$ weight ratio less than 0.53. In alternative embodiments the condensable hydrocarbon portion has one or more of a normal-$C_{11}$ to total $C_{11}$ weight ratio less than 0.30, a normal-$C_{12}$ to total $C_{12}$ weight ratio less than 0.27, a normal-$C_{13}$ to total $C_{13}$ weight ratio less than 0.26, a normal-$C_{14}$ to total $C_{14}$ weight ratio less than 0.29, a normal-$C_{15}$ to total $C_{15}$ weight ratio less than 0.24, a normal-$C_{16}$ to total $C_{16}$ weight ratio less than 0.25, a normal-$C_{17}$ to total $C_{17}$ weight ratio less than 0.29, a normal-$C_{18}$ to total $C_{18}$ weight ratio less than 0.31, normal-$C_{19}$ to total $C_{19}$ weight ratio less than 0.35, a normal-$C_{20}$ to total $C_{20}$ weight ratio less than 0.33, a normal-$C_{21}$ to total $C_{21}$ weight ratio less than 0.33, a normal-$C_{22}$ to total $C_{22}$ weight ratio less than 0.35, normal-$C_{23}$ to total $C_{23}$ weight ratio less than 0.40, a normal-$C_{24}$ to total $C_{24}$ weight ratio less than 0.45, and a normal-$C_{25}$ to total $C_{25}$ weight ratio less than 0.49. In alternative embodiments the condensable hydrocarbon portion has one or more of a normal-$C_{11}$ to total $C_{11}$ weight ratio less than 0.28, a normal-$C_{12}$ to total $C_{12}$ weight ratio less than 0.25, a normal-$C_{13}$ to total $C_{13}$ weight ratio less than 0.24, a normal-$C_{14}$ to total $C_{14}$ weight ratio less than 0.27, a normal-$C_{15}$ to total $C_{15}$ weight ratio less than 0.22, a normal-$C_{16}$ to total $C_{16}$ weight ratio less than 0.23, a normal-$C_{17}$ to total $C_{17}$ weight ratio less than 0.25, a normal-$C_{18}$ to total $C_{18}$ weight ratio less than 0.28, normal-$C_{19}$ to total $C_{19}$ weight ratio less than 0.31, a normal-$C_{20}$ to total $C_{20}$ weight ratio less than 0.29, a normal-$C_{21}$ to total $C_{21}$ weight ratio less than 0.30, a normal-$C_{22}$ to total $C_{22}$ weight ratio less than 0.28, normal-$C_{23}$ to total $C_{23}$ weight ratio less than 0.33, a normal-$C_{24}$ to total $C_{24}$ weight ratio less than 0.40, and a normal-$C_{25}$ to total $C_{25}$ weight ratio less than 0.45. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-$C_{10}$ to total $C_{10}$ weight ratio less than 0.31. Alternatively, the condensable hydrocarbon portion may have a normal-$C_{10}$ to total $C_{10}$ weight ratio less than 0.30 or less than 0.29. In alternative embodiments, the condensable hydrocarbon portion may have a normal-$C_{10}$ to total $C_{10}$ weight ratio greater than 0.15 or greater than 0.20. In some embodiments the condensable hydrocarbon portion has a normal-$C_{11}$ to total $C_{11}$ weight ratio less than 0.32. Alternatively, the condensable hydrocarbon portion may have a normal-$C_{11}$ to total $C_{11}$ weight ratio less than 0.31, less than 0.30, or less than 0.29. In alternative embodiments, the condensable hydrocarbon portion may have a normal-$C_{11}$ to total $C_{11}$ weight ratio greater than 0.15 or greater than 0.20. In some embodiments the condensable hydrocarbon portion has a normal-$C_{12}$ to total $C_{12}$ weight ratio less than 0.29. Alternatively, the condensable hydrocarbon portion may have a normal-$C_{12}$ to total $C_{12}$ weight ratio less than 0.26, or less than 0.24. In alternative embodiments, the condensable hydrocarbon portion may have a normal-$C_{12}$ to total $C_{12}$ weight ratio greater than 0.10 or greater than 0.15. In some embodiments the condensable hydrocarbon portion has a normal-$C_{13}$ to total $C_{13}$ weight ratio less than 0.28. Alternatively, the condensable hydrocarbon portion may have a normal-$C_{13}$ to total $C_{13}$ weight ratio less than 0.27, less than 0.25, or less than 0.23. In alternative embodiments, the condensable hydrocarbon portion may have a normal-$C_{13}$ to total $C_{13}$ weight ratio greater than 0.10 or greater than 0.15. In some embodiments the condensable hydrocarbon portion has a normal-$C_{14}$ to total $C_{14}$ weight ratio less than 0.31. Alternatively, the condensable hydrocarbon portion may have a normal-$C_{14}$ to total $C_{14}$ weight ratio less than 0.30, less than 0.28, or less than 0.26. In alternative embodiments, the condensable hydrocarbon portion may have a normal-$C_{14}$ to total $C_{14}$ weight ratio greater than 0.10 or greater than 0.15. In some embodiments the condensable hydrocarbon portion has a normal-$C_{15}$ to total $C_{15}$ weight ratio less than 0.27. Alternatively, the condensable hydrocarbon portion may have a normal-$C_{15}$ to total $C_{15}$ weight ratio less than 0.26, less than 0.24, or less than 0.22. In alternative embodiments, the condensable hydrocarbon portion may have a normal-$C_{15}$ to total $C_{15}$ weight ratio greater than 0.10 or greater than 0.15. In some embodiments the condensable hydrocarbon portion has a normal-$C_{16}$ to total $C_{16}$ weight ratio less than 0.31. Alternatively, the condensable hydrocarbon portion may have a normal-$C_{16}$ to total $C_{16}$ weight ratio less than 0.29, less than 0.26, or less than 0.24. In alternative embodiments, the condensable hydrocarbon portion may have a normal-$C_{16}$ to total $C_{16}$ weight ratio greater than 0.10 or greater than 0.15. In some embodiments the condensable hydrocarbon portion has a normal-$C_{17}$ to total $C_{17}$ weight ratio less than 0.31. Alternatively, the condensable hydrocarbon portion may have a normal-$C_{17}$ to total $C_{17}$ weight ratio less than 0.29, less than 0.27, or less than 0.25. In alternative embodiments, the condensable hydrocarbon portion may have a normal-$C_{17}$ to total $C_{17}$ weight ratio greater than 0.10 or greater than 0.15. In some embodiments the condensable hydrocarbon portion has a normal-$C_{18}$ to total $C_{18}$ weight ratio less than 0.37. Alternatively, the condensable hydrocarbon portion may have a normal-$C_{18}$ to total $C_{18}$ weight ratio less than 0.35, less than 0.31, or less than 0.28. In alternative embodiments, the condensable hydrocarbon portion may have a normal-$C_{18}$ to total $C_{18}$ weight ratio greater than 0.10 or greater than 0.15. In some embodiments the condensable hydrocarbon portion has a normal-$C_{19}$ to total $C_{19}$ weight ratio less than 0.37. Alternatively, the condensable hydrocarbon portion may have a normal-$C_{19}$ to total $C_{19}$ weight ratio less than 0.36, less than 0.34, or less than 0.31. In alternative embodiments, the condensable hydrocarbon portion may have a normal-$C_{19}$ to total $C_{19}$ weight ratio greater than 0.10 or greater than 0.15. In some embodiments the condensable hydrocarbon portion has a normal-$C_{20}$ to total $C_{20}$ weight ratio less than 0.37. Alternatively, the condensable hydrocarbon portion may have a normal-$C_{20}$ to total $C_{20}$ weight ratio less than 0.35, less than 0.32, or less than 0.29. In alternative embodiments, the condensable hydrocarbon portion may have a normal-$C_{21}$ to total $C_{20}$ weight ratio greater than 0.10 or greater than 0.15. In some embodiments the condensable hydrocarbon portion has a normal-$C_{21}$ to total $C_{21}$ weight ratio less than 0.37. Alternatively, the condensable hydrocarbon portion may have a normal-$C_{21}$ to total $C_{21}$ weight ratio less than 0.35, less than 0.32, or less than 0.30. In alternative embodiments, the condensable hydrocarbon portion may have a normal-$C_{21}$ to total $C_{21}$ weight ratio greater than 0.10 or greater than 0.15. In some embodiments the condensable hydrocarbon portion has a normal-$C_{22}$ to total $C_{22}$ weight ratio less than 0.38. Alternatively, the condensable hydrocarbon portion may have a normal-$C_{22}$ to total $C_{22}$ weight ratio less than 0.36, less than 0.34, or less than 0.30. In alternative embodiments, the condensable hydrocarbon portion may have a normal-$C_{22}$ to total $C_{22}$ weight ratio greater than 0.10 or greater than 0.15. In some embodiments the condensable hydrocarbon portion has a normal-$C_{23}$ to total $C_3$ weight ratio less than 0.43. Alternatively, the condensable hydrocarbon portion may have a normal-$C_3$ to total $C_{23}$ weight ratio less than 0.40, less than 0.35, or less than 0.29. In alternative embodiments, the condensable hydrocarbon portion may have a normal-$C_{23}$ to total $C_{23}$ weight ratio greater than 0.15 or greater than 0.20. In some embodiments the condensable hydrocarbon portion has a normal-$C_{24}$ to total $C_{24}$ weight ratio less than 0.48. Alternatively, the condensable hydrocarbon portion may have a normal-$C_4$ to total $C_{24}$ weight ratio less than 0.46, less than 0.42, or less than 0.40. In alternative embodiments, the condensable hydrocarbon portion may have a normal-$C_{24}$ to total $C_{24}$ weight ratio greater than 0.15 or greater than 0.20. In some embodiments the condensable hydrocarbon portion has a normal-$C_{25}$ to total $C_{25}$ weight ratio less than 0.48. Alternatively, the condensable hydrocarbon portion may have a normal-$C_{25}$ to total $C_{25}$ weight ratio less than 0.46, less than 0.42, or less than 0.40. In alternative embodiments, the condensable hydrocarbon portion may have a normal-$C_{25}$ to total $C_{25}$ weight ratio greater than 0.20 or greater than 0.25. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

The use of "total C_" (e.g., total $C_{10}$) herein and in the claims is meant to refer to the amount of a particular pseudo component found in a condensable hydrocarbon fluid determined as described herein, particularly as described in the section labeled "Experiments" herein. That is "total C_" is determined using the whole oil gas chromatography (WOGC) analysis methodology according to the procedure described in the Experiments section of this application. Further, "total C_" is determined from the whole oil gas chromatography (WOGC) peak integration methodology and peak identification methodology used for identifying and quantifying each pseudo-component as described in the Experiments section herein. Further, "total C_" weight percent and mole percent values for the pseudo components were obtained using the pseudo component analysis methodology involving correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655) as described in the Experiments section, including the exemplary molar and weight percentage determinations.

The use of "normal-C_" (e.g., normal-$C_{10}$) herein and in the claims is meant to refer to the amount of a particular normal alkane hydrocarbon compound found in a condensable hydrocarbon fluid determined as described herein, particularly in the section labeled "Experiments" herein. That is "normal-C_" is determined from the GC peak areas determined using the whole oil gas chromatography (WOGC) analysis methodology according to the procedure described in the Experiments section of this application. Further, "total C_" is determined from the whole oil gas chromatography (WOGC) peak identification and integration methodology used for identifying and quantifying individual compound peaks as described in the Experiments section herein. Further, "normal-C_" weight percent and mole percent values for the normal alkane compounds were obtained using methodology analogous to the pseudo component exemplary molar and weight percentage determinations explained in the Experiments section, except that the densities and molecular weights for the particular normal alkane compound of interest were used and then compared to the totals obtained in the pseudo component methodology to obtain weight and molar percentages.

Figure 16:
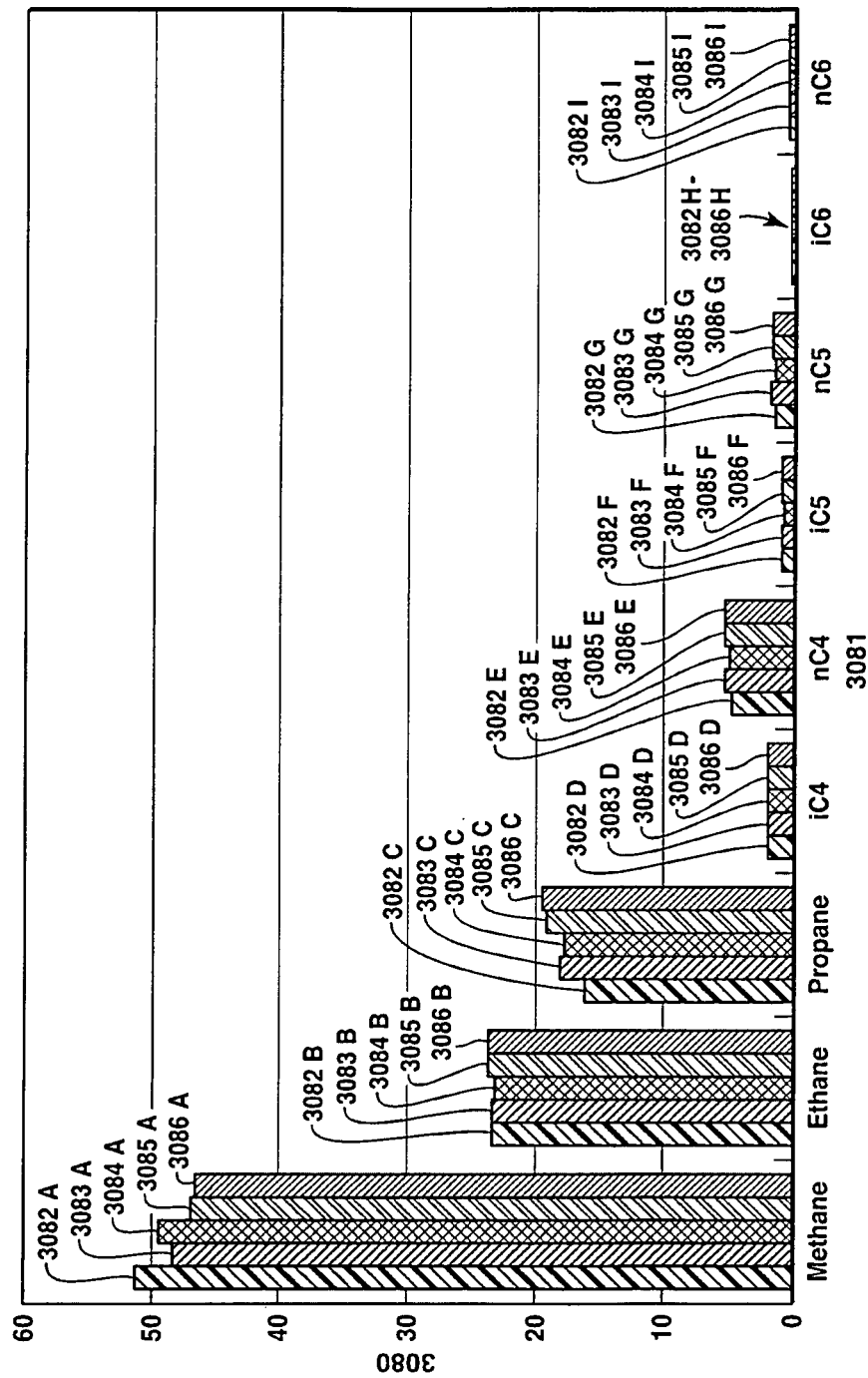
FIG. 16 is a bar graph showing the concentration, in molar percentage, of the hydrocarbon species present in the gas samples taken from duplicate laboratory experiments conducted at three different stress levels.

The following discussion of FIG. 16 concerns data obtained in Examples 1-5 which are discussed in the section labeled "Experiments". The data was obtained through the experimental procedures, gas sample collection procedures, hydrocarbon gas sample gas chromatography (GC) analysis methodology, and gas sample GC peak identification and integration methodology discussed in the Experiments section. For clarity, when referring to gas chromatograms of gaseous hydrocarbon samples, graphical data is provided for one unstressed experiment through Example 1, two 400 psi stressed experiments through Examples 2 and 3, and two 1,000 psi stressed experiments through Examples 4 and 5.

FIG. 16 is a bar graph showing the concentration, in molar percentage, of the hydrocarbon species present in the gas samples taken from each of the three stress levels tested and analyzed in the laboratory experiments discussed herein. The gas compound molar percentages were obtained through the experimental procedures, gas sample collection procedures, hydrocarbon gas sample gas chromatography (GC) analysis methodology, gas sample GC peak integration methodology and molar concentration determination procedures described herein. For clarity, the hydrocarbon molar percentages are taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal C6 molar percentages for all of the experiments do not include the molar contribution of any associated non-hydrocarbon gas phase product (e.g., hydrogen, $CO_2$ or $H_2S$), any of the unidentified hydrocarbon gas species listed in Tables 2, 4, 5, 7, or 9 (e.g., peak numbers 2, 6, 8-11, 13, 15-22, 24-26, and 28-78 in Table 2) or any of the gas species dissolved in the liquid phase which were separately treated in the liquid GC's. The y-axis 3080 represents the concentration in terms of molar percent of each gaseous compound in the gas phase. The x-axis 3081 contains the identity of each hydrocarbon compound from methane to normal hexane. The bars 3082A-I represent the molar percentage of each gaseous compound for the unstressed experiment of Example 1. That is 3082A represents methane, 3082B represents ethane, 3082C represents propane, 3082D represents iso-butane, 3082E represents normal butane, 3082F represents iso-pentane, 3082G represents normal pentane, 3082H represents 2-methyl pentane, and 3082I represents normal hexane. The bars 3083A-I and 3084A-I represent the molar percent of each gaseous compound for samples from the duplicate 400 psi stressed experiments of Examples 2 and 3, with the letters assigned in the manner described for the unstressed experiment. While the bars 3085A-I and 3086A-I represent the molar percent of each gaseous compound for the duplicate 1,000 psi stressed experiments of Examples 4 and 5, with the letters assigned in the manner described for the unstressed experiment. From FIG. 16 it can be seen that the hydrocarbon gas produced in all the experiments is primarily methane, ethane and propane on a molar basis. It is further apparent that the unstressed experiment, represented by bars 3082A-I, contains the most methane 3082A and least propane 3082C, both as compared to the 400 psi stress experiments hydrocarbon gases and the 1,000 psi stress experiments hydrocarbon gases. Looking now at bars 3083A-I and 3084A-I, it is apparent that the intermediate level 400 psi stress experiments produced a hydrocarbon gas having methane 3083A & 3084A and propane 3083C & 3084C concentrations between the unstressed experiment represented by bars 3082A & 3082C and the 1,000 psi stressed experiment represented by bars 3085A & 3085C and 3086A & 3086C. Lastly, it is apparent that the high level 1,000 psi stress experiments produced hydrocarbon gases having the lowest methane 3085A & 3086A concentration and the highest propane concentrations 3085C & 3086C, as compared to both the unstressed experiments represented by bars 3082A & 3082C and the 400 psi stressed experiment represented by bars 3083A & 3084A and 3083C & 3084C. Thus pyrolizing oil shale under increasing levels of lithostatic stress appears to produce hydrocarbon gases having decreasing concentrations of methane and increasing concentrations of propane.

The hydrocarbon fluid produced from the organic-rich rock formation may include both a condensable hydrocarbon portion (e.g. liquid) and a non-condensable hydrocarbon portion (e.g. gas). In some embodiments the non-condensable hydrocarbon portion includes methane and propane. In some embodiments the molar ratio of propane to methane in the non-condensable hydrocarbon portion is greater than 0.32. In alternative embodiments, the molar ratio of propane to methane in the non-condensable hydrocarbon portion is greater than 0.34, 0.36 or 0.38. As used herein "molar ratio of propane to methane" is the molar ratio that may be determined as described herein, particularly as described in the section labeled "Experiments" herein. That is "molar ratio of propane to methane" is determined using the hydrocarbon gas sample gas chromatography (GC) analysis methodology, gas sample GC peak identification and integration methodology and molar concentration determination procedures described in the Experiments section of this application.

In some embodiments the condensable hydrocarbon portion of the hydrocarbon fluid includes benzene. In some embodiments the condensable hydrocarbon portion has a benzene content between 0.1 and 0.8 weight percent. Alternatively, the condensable hydrocarbon portion may have a benzene content between 0.15 and 0.6 weight percent, a benzene content between 0.15 and 0.5, or a benzene content between 0.15 and 0.5.

In some embodiments the condensable hydrocarbon portion of the hydrocarbon fluid includes cyclohexane. In some embodiments the condensable hydrocarbon portion has a cyclohexane content less than 0.8 weight percent. Alternatively, the condensable hydrocarbon portion may have a cyclohexane content less than 0.6 weight percent or less than 0.43 weight percent. Alternatively, the condensable hydrocarbon portion may have a cyclohexane content greater than 0.1 weight percent or greater than 0.2 weight percent.

In some embodiments the condensable hydrocarbon portion of the hydrocarbon fluid includes methyl-cyclohexane. In some embodiments the condensable hydrocarbon portion has a methly-cyclohexane content greater than 0.5 weight percent. Alternatively, the condensable hydrocarbon portion may have a methly-cyclohexane content greater than 0.7 weight percent or greater than 0.75 weight percent. Alternatively, the condensable hydrocarbon portion may have a methly-cyclohexane content less than 1.2 or 1.0 weight percent.

The use of weight percentage contents of benzene, cyclohexane, and methyl-cyclohexane herein and in the claims is meant to refer to the amount of benzene, cyclohexane, and methyl-cyclohexane found in a condensable hydrocarbon fluid determined as described herein, particularly as described in the section labeled "Experiments" herein. That is, respective compound weight percentages are determined from the whole oil gas chromatography (WOGC) analysis methodology and whole oil gas chromatography (WOGC) peak identification and integration methodology discussed in the Experiments section herein. Further, the respective compound weight percentages were obtained as described for FIG. 11, except that each individual respective compound peak area integration was used to determine each respective compound weight percentage. For clarity, the compound weight percentages are taken as a percentage of the entire C3 to pseudo C38 whole oil gas chromatography areas and calculated weights as used in the pseudo compound data presented in FIG. 7.

In some embodiments the condensable hydrocarbon portion of the hydrocarbon fluid has an API gravity greater than 30. Alternatively, the condensable hydrocarbon portion may have an API gravity greater than 30, 32, 34, 36, 40, 42 or 44. As used herein and in the claims, API gravity may be determined by any generally accepted method for determining API gravity.

In some embodiments the condensable hydrocarbon portion of the hydrocarbon fluid has a basic nitrogen to total nitrogen ratio between 0.1 and 0.50. Alternatively, the condensable hydrocarbon portion may have a basic nitrogen to total nitrogen ratio between 0.15 and 0.40. As used herein and in the claims, basic nitrogen and total nitrogen may be determined by any generally accepted method for determining basic nitrogen and total nitrogen. Where results conflict, the generally accepted more accurate methodology shall control.

The discovery that lithostatic stress can affect the composition of produced fluids generated within an organic-rich rock via heating and pyrolysis implies that the composition of the produced hydrocarbon fluid can also be influenced by altering the lithostatic stress of the organic-rich rock formation. For example, the lithostatic stress of the organic-rich rock formation may be altered by choice of pillar geometries and/or locations and/or by choice of heating and pyrolysis formation region thickness and/or heating sequencing.

Pillars are regions within the organic-rich rock formation left unpyrolyzed at a given time to lessen or mitigate surface subsidence. Pillars may be regions within a formation surrounded by pyrolysis regions within the same formation. Alternatively, pillars may be part of or connected to the unheated regions outside the general development area. Certain regions that act as pillars early in the life of a producing field may be converted to producing regions later in the life of the field.

Typically in its natural state, the weight of a formation's overburden is fairly uniformly distributed over the formation. In this state the lithostatic stress existing at particular point within a formation is largely controlled by the thickness and density of the overburden. A desired lithostatic stress may be selected by analyzing overburden geology and choosing a position with an appropriate depth and position.

Although lithostatic stresses are commonly assumed to be set by nature and not changeable short of removing all or part of the overburden, lithostatic stress at a specific location within a formation can be adjusted by redistributing the overburden weight so it is not uniformly supported by the formation. For example, this redistribution of overburden weight may be accomplished by two exemplary methods. One or both of these methods may be used within a single formation. In certain cases, one method may be primarily used earlier in time whereas the other may be primarily used at a later time. Favorably altering the lithostatic stress experienced by a formation region may be performed prior to instigating significant pyrolysis within the formation region and also before generating significant hydrocarbon fluids. Alternately, favorably altering the lithostatic stress may be performed simultaneously with the pyrolysis.

A first method of altering lithostatic stress involves making a region of a subsurface formation less stiff than its neighboring regions. Neighboring regions thus increasingly act as pillars supporting the overburden as a particular region becomes less stiff. These pillar regions experience increased lithostatic stress whereas the less stiff regions experience reduced lithostatic stress. The amount of change in lithostatic stress depends upon a number of factors including, for example, the change in stiffness of the treated region, the size of the treated region, the pillar size, the pillar spacing, the rock compressibility, and the rock strength. In an organic-rich rock formation, a region within a formation may be made to experience mechanical weakening by pyrolyzing the region and creating void space within the region by removing produced fluids. In this way a region within a formation may be made less stiff than neighboring regions that have not experienced pyrolysis or have experienced a lesser degree of pyrolysis or production.

A second method of altering lithostatic stress involves causing a region of a subsurface formation to expand and push against the overburden with greater force than neighboring regions. This expansion may remove a portion of the overburden weight from the neighboring regions thus increasing the lithostatic stress experienced by the heated region(s) and reducing the lithostatic stress experienced by neighboring regions. If the expansion is sufficient, horizontal fractures will form in the neighboring regions and the contribution of these regions to supporting the overburden will decrease. The amount of change in lithostatic stress depends upon a number of factors including, for example, the amount of expansion in the treated region, the size of the treated region, the pillar size, the pillar spacing, the rock compressibility, and the rock strength. A region within a formation may be made to expand by heating it so to cause thermal expansion of the rock. Fluid expansion or fluid generation can also contribute to expansion if the fluids are largely trapped within the region. The total expansion amount may be proportional to the thickness of the heated region. It is noted that if pyrolysis occurs in the heated region and sufficient fluids are removed, the heated region may mechanically weaken and thus may alter the lithostatic stresses experienced by the neighboring regions as described in the first exemplary method.

Embodiments of the method may include controlling the composition of produced hydrocarbon fluids generated by heating and pyrolysis from a first region within an organic-rich rock formation by increasing the lithostatic stresses within the first region by first heating and pyrolyzing formation hydrocarbons present in the organic-rich rock formation and producing fluids from a second neighboring region within the organic-rich rock formation such that the Young's modulus (i.e., stiffness) of the second region is reduced.

Embodiments of the method may include controlling the composition of produced hydrocarbon fluids generated by heating and pyrolysis from a first region within an organic-rich rock formation by increasing the lithostatic stresses within the first region by heating the first region prior to or to a greater degree than neighboring regions within the organic-rich rock formation such that the thermal expansion within the first region is greater than that within the neighboring regions of the organic-rich rock formation.

Embodiments of the method may include controlling the composition of produced hydrocarbon fluids generated by heating and pyrolysis from a first region within an organic-rich rock formation by decreasing the lithostatic stresses within the first region by heating one or more neighboring regions of the organic-rich rock formation prior to or to a greater degree than the first region such that the thermal expansion within the neighboring regions is greater than that within the first region.

Embodiments of the method may include locating, sizing, and/or timing the heating of heated regions within an organic-rich rock formation so as to alter the in situ lithostatic stresses of current or future heating and pyrolysis regions within the organic-rich rock formation so as to control the composition of produced hydrocarbon fluids.

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, fluorides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional oil shale resources or other hydrocarbon resources may exist at lower depths. Other hydrocarbon resources may include natural gas in low permeability formations (so-called "tight gas") or natural gas trapped in and adsorbed on coal (so called "coalbed methane"). In some embodiments with multiple shale oil resources it may be advantageous to develop deeper zones first and then sequentially shallower zones. In this way, wells need not cross hot zones or zones of weakened rock. In other embodiments in may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 6:
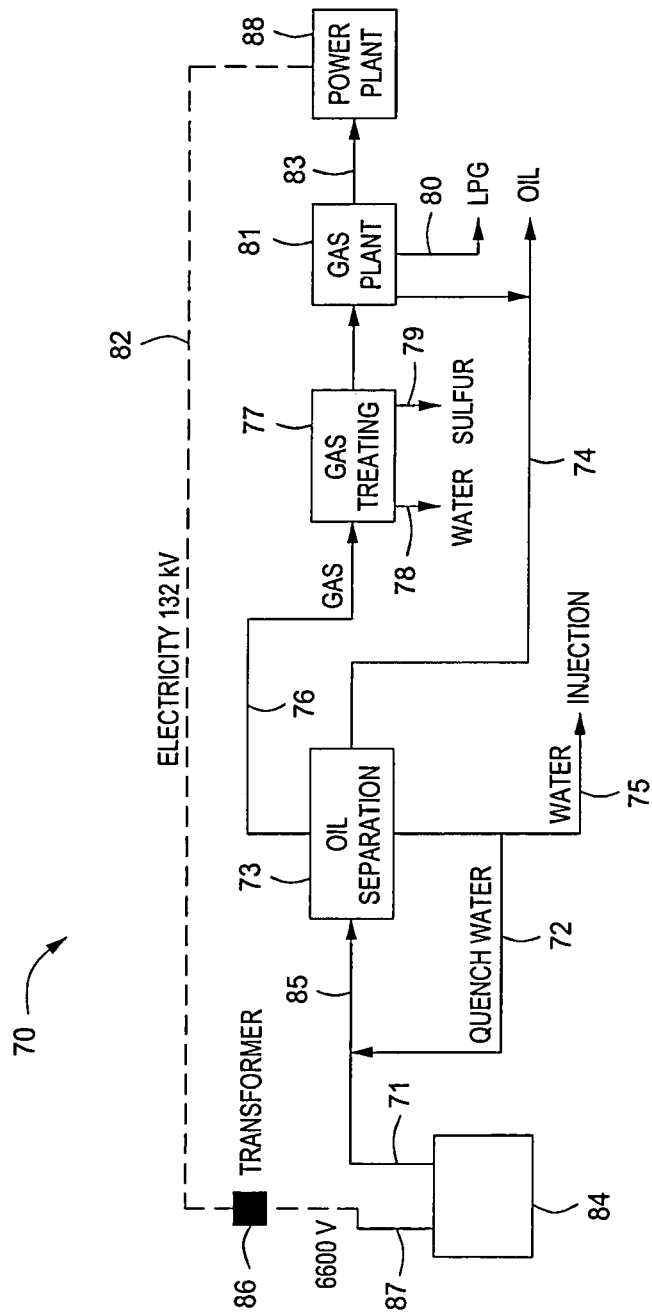
FIG. 6 is a process flow diagram of exemplary surface processing facilities for a subsurface formation development.

FIG. 6 illustrates a schematic diagram of an embodiment of surface facilities 70 that may be configured to treat a produced fluid. The produced fluid 85 may be produced from the subsurface formation 84 though a production well 71 as described herein. The produced fluid may include any of the produced fluids produced by any of the methods as described herein. The subsurface formation 84 may be any subsurface formation, including, for example, an organic-rich rock formation containing any of oil shale, coal, or tar sands for example. A production scheme may involve quenching 72 produced fluids to a temperature below 300° F., 200° F., or even 100° F., separating out condensable components (i.e., oil 74 and water 75) in an oil separator 73, treating the noncondensable components 76 (i.e. gas) in a gas treating unit 77 to remove water 78 and sulfur species 79, removing the heavier components from the gas (e.g., propane and butanes) in a gas plant 81 to form liquid petroleum gas (LPG) 80 for sale, and generating electrical power 82 in a power plant 88 from the remaining gas 83. The electrical power 82 may be used as an energy source for heating the subsurface formation 84 through any of the methods described herein. For example, the electrical power 82 may be feed at a high voltage, for example 132 kV, to a transformer 86 and let down to a lower voltage, for example 6600 V, before being fed to an electrical resistance heater element located in a heater well 87 located in the subsurface formation 84. In this way all or a portion of the power required to heat the subsurface formation 84 may be generated from the non-condensable portion of the produced fluids 85. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, CO, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensable hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

EXPERIMENTS

Figure 18:
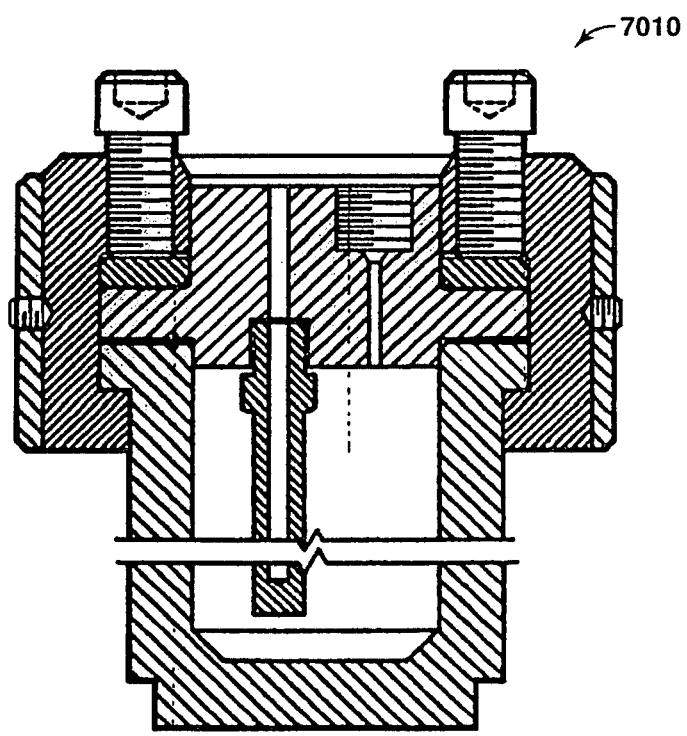
FIG. 18 is a cross-sectional view of the Parr vessel used in Examples 1-5, described below.

Heating experiments were conducted on several different oil shale specimens and the liquids and gases released from the heated oil shale examined in detail. An oil shale sample from the Mahogany formation in the Piceance Basin in Colorado was collected. A solid, continuous block of the oil shale formation, approximately 1 cubic foot in size, was collected from the pilot mine at the Colony mine site on the eastern side of Parachute Creek. The oil shale block was designated CM-1B. The core specimens taken from this block, as described in the following examples, were all taken from the same stratigraphic interval. The heating tests were conducted using a Parr vessel, model number 243HC5, which is shown in FIG. 18 and is available from Parr Instrument Company.

Example 1

Figure 17:
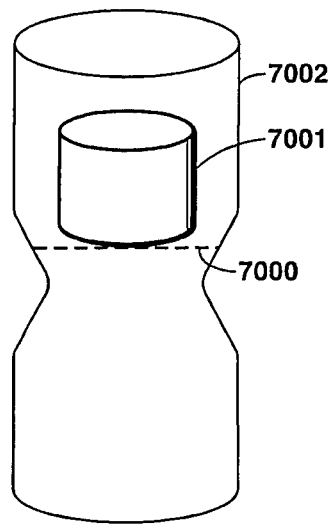
FIG. 17 is an exemplary view of the gold tube apparatus used in the unstressed Parr heating test described below in Example 1.

Oil shale block CM-1B was cored across the bedding planes to produce a cylinder 1.391 inches in diameter and approximately 2 inches long. A gold tube 7002 approximately 2 inches in diameter and 5 inches long was crimped and a screen 7000 inserted to serve as a support for the core specimen 7001 (FIG. 17). The oil shale core specimen 7001, 82.46 grams in weight, was placed on the screen 7000 in the gold tube 7002 and the entire assembly placed into a Parr heating vessel. The Parr vessel 7010, shown in FIG. 18, had an internal volume of 565 milliliters. Argon was used to flush the Parr vessel 7010 several times to remove air present in the chamber and the vessel pressurized to 500 psi with argon. The Parr vessel was then placed in a furnace which was designed to fit the Parr vessel. The furnace was initially at room temperature and was heated to 400° C. after the Parr vessel was placed in the furnace. The temperature of the Parr vessel achieved 400° C. after about 3 hours and remained in the 400° C. furnace for 24 hours. The Parr vessel was then removed from the furnace and allowed to cool to room temperature over a period of approximately 16 hours.

Figure 19:
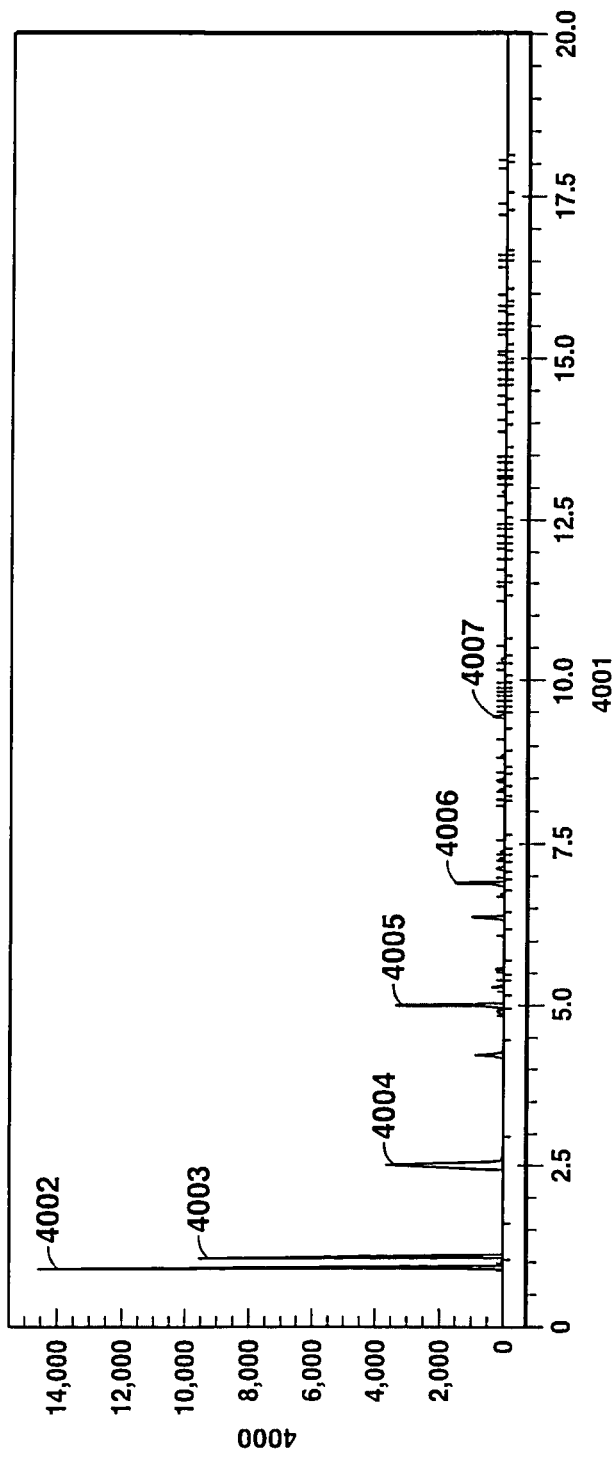
FIG. 19 is gas chromatogram of gas sampled from Example 1.

The room temperature Parr vessel was sampled to obtain a representative portion of the gas remaining in the vessel following the heating experiment. A small gas sampling cylinder 150 milliliters in volume was evacuated, attached to the Parr vessel and the pressure allowed to equilibrate. Gas chromatography (GC) analysis testing and non-hydrocarbon gas sample gas chromatography (GC) (GC not shown) of this gas sample yielded the results shown in FIG. 19, Table 2 and Table 1. In FIG. 19 the y-axis 4000 represents the detector response in pico-amperes (pA) while the x-axis 4001 represents the retention time in minutes. In FIG. 19 peak 4002 represents the response for methane, peak 4003 represents the response for ethane, peak 4004 represents the response for propane, peak 4005 represents the response for butane, peak 4006 represents the response for pentane and peak 4007 represents the response for hexane. From the GC results and the known volumes and pressures involved the total hydrocarbon content of the gas (2.09 grams), $CO_2$ content of the gas (3.35 grams), and H2S content of the gas (0.06 gram) were obtained.

TABLE 2

Peak and area details for FIG. 19-Example 1-0 stress-gas GC

| Peak Number | Ret. Time [min] | Area [pA * s] | Name |
| --- | --- | --- | --- |
| 1 | 0.910 | 1.46868e4 | Methane |
| 2 | 0.999 | 148.12119 | ? |
| 3 | 1.077 | 1.26473e4 | Ethane |
| 4 | 2.528 | 1.29459e4 | Propane |
| 5 | 4.243 | 2162.93066 | iC4 |
| 6 | 4.922 | 563.11804 | ? |
| 7 | 5.022 | 5090.54150 | n-Butane |
| 8 | 5.301 | 437.92255 | ? |
| 9 | 5.446 | 4.67394 | ? |
| 10 | 5.582 | 283.92194 | ? |
| 11 | 6.135 | 15.47334 | ? |
| 12 | 6.375 | 1159.83130 | iC5 |
| 13 | 6.742 | 114.83960 | ? |
| 14 | 6.899 | 1922.98450 | n-Pentane |
| 15 | 7.023 | 2.44915 | ? |
| 16 | 7.136 | 264.34424 | ? |

TABLE 2-continued

Peak and area details for FIG. 19-Example 1-0 stress-gas GC

| Peak Number | Ret. Time [min] | Area [pA * s] | Name |
|---|---|---|---|
| 17 | 7.296 | 127.60601 | ? |
| 18 | 7.383 | 118.79453 | ? |
| 19 | 7.603 | 3.99227 | ? |
| 20 | 8.138 | 13.15432 | ? |
| 21 | 8.223 | 13.01887 | ? |
| 22 | 8.345 | 103.15615 | ? |
| 23 | 8.495 | 291.26767 | 2-methyl pentane |
| 24 | 8.651 | 15.64066 | ? |
| 25 | 8.884 | 91.85989 | ? |
| 26 | 9.165 | 40.09448 | ? |
| 27 | 9.444 | 534.44507 | n-Hexane |
| 28 | 9.557 | 2.64731 | ? |
| 29 | 9.650 | 32.28295 | ? |
| 30 | 9.714 | 52.42796 | ? |
| 31 | 9.793 | 42.05001 | ? |
| 32 | 9.852 | 8.93775 | ? |
| 33 | 9.914 | 4.43648 | ? |
| 34 | 10.013 | 24.74299 | ? |
| 35 | 10.229 | 13.34387 | ? |
| 36 | 10.302 | 133.95892 | ? |
| 37 | 10.577 | 2.67224 | ? |
| 38 | 11.252 | 27.57400 | ? |
| 39 | 11.490 | 23.41665 | ? |
| 40 | 11.567 | 8.13992 | ? |
| 41 | 11.820 | 32.80781 | ? |
| 42 | 11.945 | 4.61821 | ? |
| 43 | 12.107 | 30.67044 | ? |
| 44 | 12.178 | 2.58269 | ? |
| 45 | 12.308 | 13.57769 | ? |
| 46 | 12.403 | 12.43018 | ? |
| 47 | 12.492 | 34.29918 | ? |
| 48 | 12.685 | 4.71311 | ? |
| 49 | 12.937 | 183.31729 | ? |
| 50 | 13.071 | 7.18510 | ? |
| 51 | 13.155 | 2.01699 | ? |
| 52 | 13.204 | 7.77467 | ? |
| 53 | 13.317 | 7.21400 | ? |
| 54 | 13.443 | 4.22721 | ? |
| 55 | 13.525 | 35.08374 | ? |
| 56 | 13.903 | 18.48654 | ? |
| 57 | 14.095 | 6.39745 | ? |
| 58 | 14.322 | 3.19935 | ? |
| 59 | 14.553 | 8.48772 | ? |
| 60 | 14.613 | 3.34738 | ? |
| 61 | 14.730 | 5.44062 | ? |
| 62 | 14.874 | 40.17010 | ? |
| 63 | 14.955 | 3.41596 | ? |
| 64 | 15.082 | 3.04766 | ? |
| 65 | 15.138 | 7.33028 | ? |
| 66 | 15.428 | 2.71734 | ? |
| 67 | 15.518 | 11.00256 | ? |
| 68 | 15.644 | 5.16752 | ? |
| 69 | 15.778 | 45.12025 | ? |
| 70 | 15.855 | 3.26920 | ? |
| 71 | 16.018 | 3.77424 | ? |
| 72 | 16.484 | 4.66657 | ? |
| 73 | 16.559 | 5.54783 | ? |
| 74 | 16.643 | 10.57255 | ? |
| 75 | 17.261 | 2.19534 | ? |
| 76 | 17.439 | 10.26123 | ? |
| 77 | 17.971 | 1.85618 | ? |
| 78 | 18.097 | 11.42077 | ? |

Figure 20:
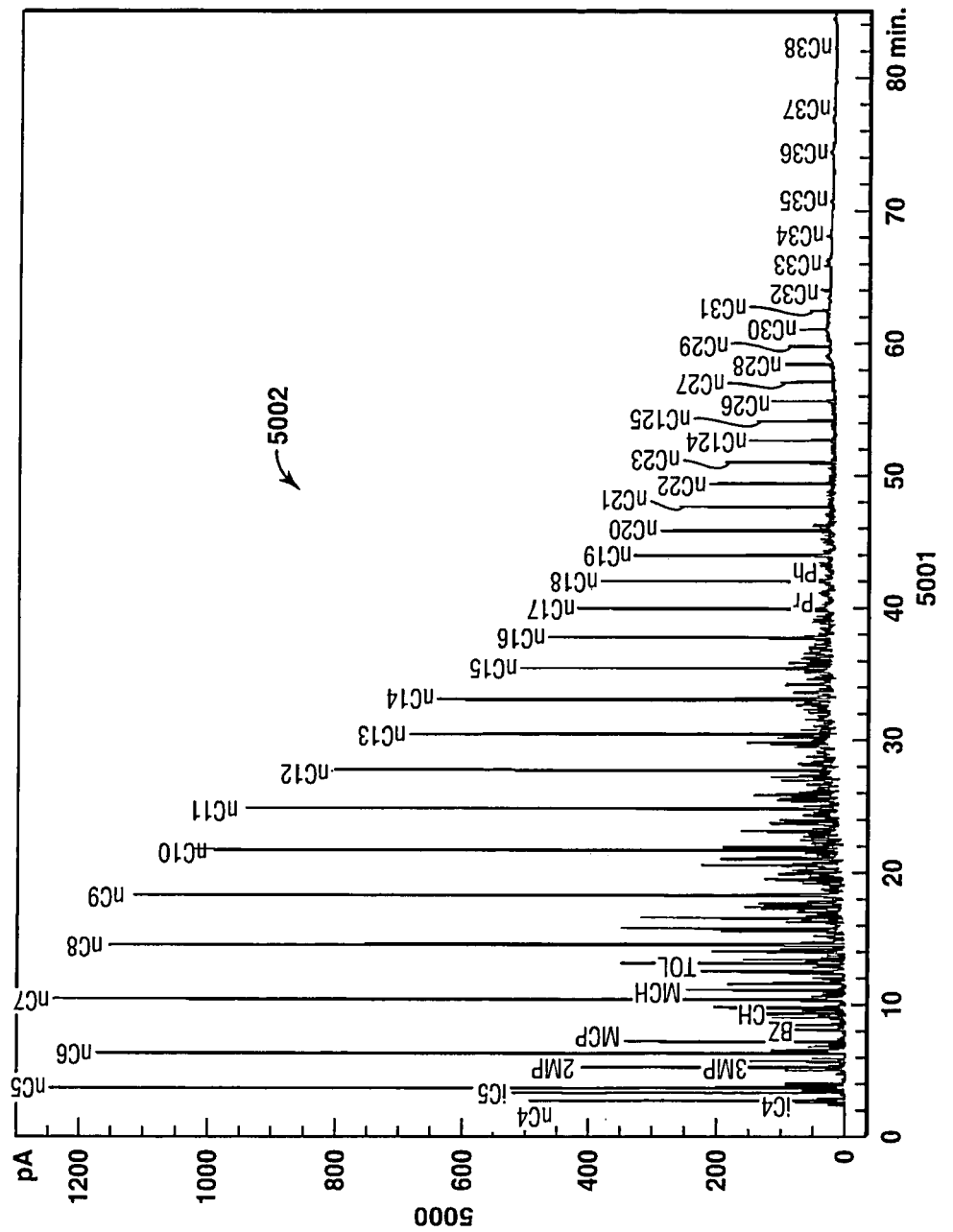
FIG. 20 is a whole oil gas chromatogram of liquid sampled from Example 1.

The Parr vessel was then vented to achieve atmospheric pressure, the vessel opened, and liquids collected from both inside the gold tube and in the bottom of the Parr vessel. Water was separated from the hydrocarbon layer and weighed. The amount collected is noted in Table 1. The collected hydrocarbon liquids were placed in a small vial, sealed and stored in the absence of light. No solids were observed on the walls of the gold tube or the walls of the Parr vessel. The solid core specimen was weighed and determined to have lost 19.21 grams as a result of heating. Whole oil gas chromatography (WOGC) testing of the liquid yielded the results shown in FIG. 20, Table 3, and Table 1. In FIG. 20 the y-axis 5000 represents the detector response in pico-amperes (pA) while the x-axis 5001 represents the retention time in minutes. The GC chromatogram is shown generally by label 5002 with individual identified peaks labeled with abbreviations.

TABLE 3

Peak and area details for FIG. 20-Example 1-0 stress-liquid GC

| Peak Number | Ret. Time [min] | Peak Area [pA * s] | Compound Name |
|---|---|---|---|
| 1 | 2.660 | 119.95327 | iC4 |
| 2 | 2.819 | 803.25989 | nC4 |
| 3 | 3.433 | 1091.80298 | iC5 |
| 4 | 3.788 | 2799.32520 | nC5 |
| 5 | 5.363 | 1332.67871 | 2-methyl pentane (2MP) |
| 6 | 5.798 | 466.35703 | 3-methyl pentane (3MP) |
| 7 | 6.413 | 3666.46240 | nC6 |
| 8 | 7.314 | 1161.70435 | Methyl cyclopentane (MCP) |
| 9 | 8.577 | 287.05969 | Benzene (BZ) |
| 10 | 9.072 | 530.19781 | Cyclohexane (CH) |
| 11 | 10.488 | 4700.48291 | nC7 |
| 12 | 11.174 | 937.38757 | Methyl cyclohexane (MCH) |
| 13 | 12.616 | 882.17358 | Toluene (TOL) |
| 14 | 14.621 | 3954.29687 | nC8 |
| 15 | 18.379 | 3544.52905 | nC9 |
| 16 | 21.793 | 3452.04199 | nC10 |
| 17 | 24.929 | 3179.11841 | nC11 |
| 18 | 27.843 | 2680.95459 | nC12 |
| 19 | 30.571 | 2238.89600 | nC13 |
| 20 | 33.138 | 2122.53540 | nC14 |
| 21 | 35.561 | 1773.59973 | nC15 |
| 22 | 37.852 | 1792.89526 | nC16 |
| 23 | 40.027 | 1394.61707 | nC17 |
| 24 | 40.252 | 116.81663 | Pristane (Pr) |
| 25 | 42.099 | 1368.02734 | nC18 |
| 26 | 42.322 | 146.96437 | Phytane (Ph) |
| 27 | 44.071 | 1130.63342 | nC19 |
| 28 | 45.956 | 920.52136 | nC20 |
| 29 | 47.759 | 819.92810 | nC21 |
| 30 | 49.483 | 635.42065 | nC22 |
| 31 | 51.141 | 563.24316 | nC23 |
| 32 | 52.731 | 432.74606 | nC24 |
| 33 | 54.261 | 397.36270 | nC25 |
| 34 | 55.738 | 307.56073 | nC26 |
| 35 | 57.161 | 298.70926 | nC27 |
| 36 | 58.536 | 252.60083 | nC28 |
| 37 | 59.867 | 221.84540 | nC29 |
| 38 | 61.154 | 190.29596 | nC30 |
| 39 | 62.539 | 123.65781 | nC31 |
| 40 | 64.133 | 72.47668 | nC32 |
| 41 | 66.003 | 76.84142 | nC33 |
| 42 | 68.208 | 84.35004 | nC34 |
| 43 | 70.847 | 36.68131 | nC35 |
| 44 | 74.567 | 87.62341 | nC36 |
| 45 | 77.798 | 33.30892 | nC37 |
| 46 | 82.361 | 21.99784 | nC38 |
| Totals: | | 5.32519e4 | |

Example 2

Figure 21:
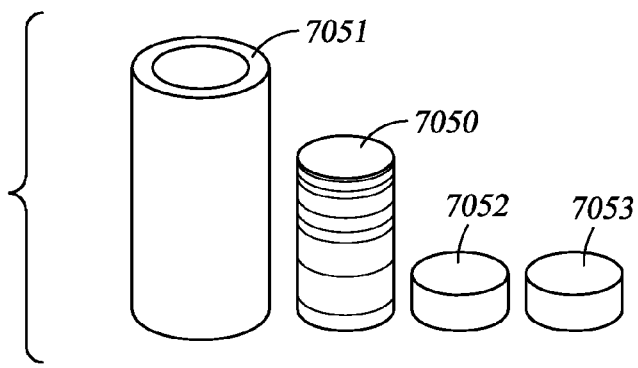
FIG. 21 is an exemplary view of a Berea cylinder, Berea plugs, and an oil shale core specimen as used in Examples 2-5.
Figure 22:
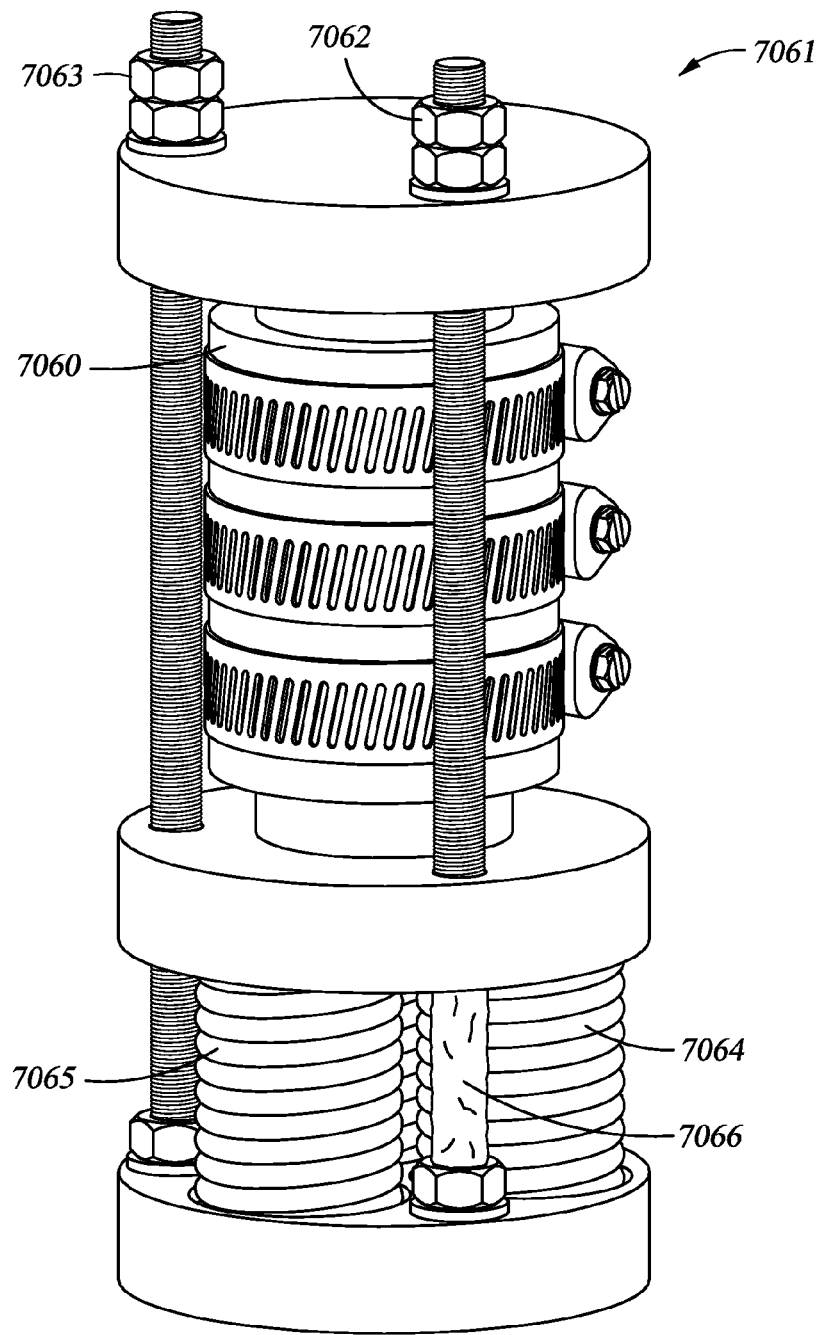
FIG. 22 is an exemplary view of the mini load frame and sample assembly used in Examples 2-5.

Oil shale block CM-1B was cored in a manner similar to that of Example 1 except that a 1 inch diameter core was created. With reference to FIG. 21, the core specimen 7050 was approximately 2 inches in length and weighed 42.47 grams. This core specimen 7050 was placed in a Berea sandstone cylinder 7051 with a 1-inch inner diameter and a 1.39 inch outer diameter. Berea plugs 7052 and 7053 were placed at each end of this assembly, so that the core specimen was completely surrounded by Berea. The Berea cylinder 7051 along with the core specimen 7050 and the Berea end plugs 7052 and 7053 were placed in a slotted stainless steel sleeve and clamped into place. The sample assembly 7060 was placed in a spring-loaded mini-load-frame 7061 as shown in FIG. 22. Load was applied by tightening the nuts 7062 and 7063 at the top of the load frame 7061 to compress the springs 7064 and 7065. The springs 7064 and 7065 were high temperature, Inconel springs, which delivered 400 psi effective stress to the oil shale specimen 7060 when compressed. Sufficient travel of the springs 7064 and 7065 remained in order to accommodate any expansion of the core specimen 7060 during the course of heating. In order to ensure that this was the case, gold foil 7066 was placed on one of the legs of the apparatus to gauge the extent of travel. The entire spring loaded apparatus 7061 was placed in the Parr vessel (FIG. 18) and the heating experiment conducted as described in Example 1.

Figure 23:
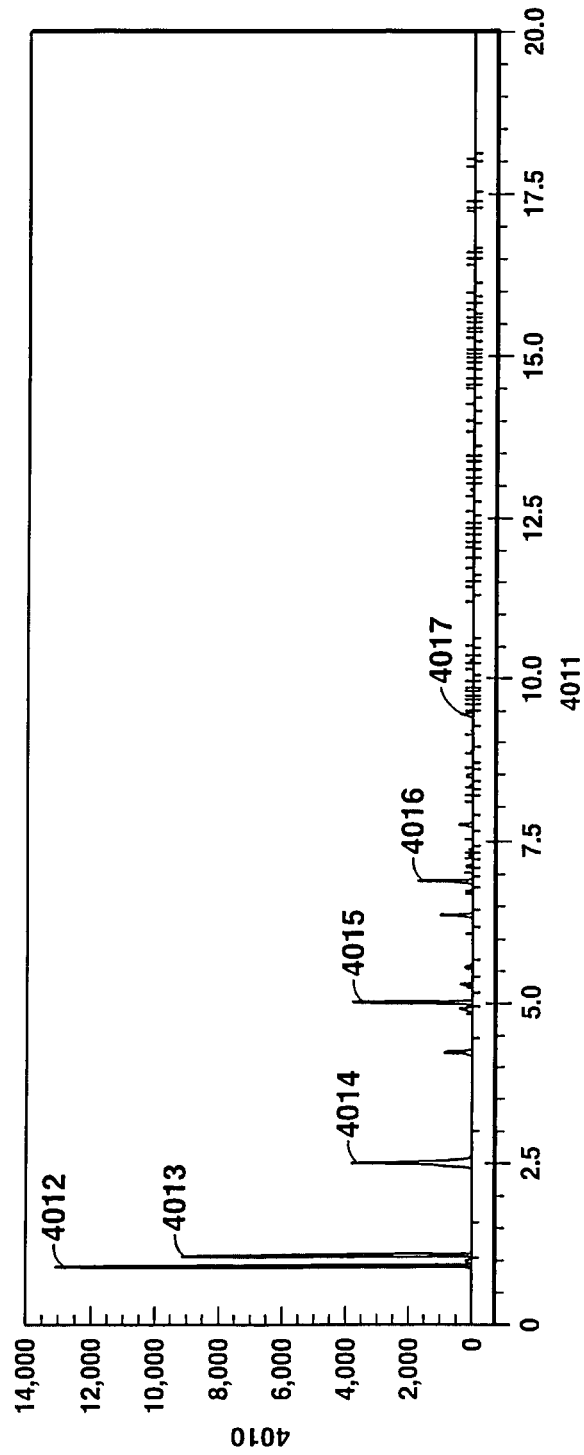
FIG. 23 is gas chromatogram of gas sampled from Example 2.

As described in EXAMPLE 1, the room temperature Parr vessel was then sampled to obtain a representative portion of the gas remaining in the vessel following the heating experiment. Gas sampling, hydrocarbon gas sample gas chromatography (GC) testing, and non-hydrocarbon gas sample gas chromatography (GC) was conducted as in Example 1. Results are shown in FIG. 23, Table 4 and Table 1. In FIG. 23 the y-axis 4010 represents the detector response in pico-amperes (pA) while the x-axis 4011 represents the retention time in minutes. In FIG. 23 peak 4012 represents the response for methane, peak 4013 represents the response for ethane, peak 4014 represents the response for propane, peak 4015 represents the response for butane, peak 4016 represents the response for pentane and peak 4017 represents the response for hexane. From the gas chromatographic results and the known volumes and pressures involved the total hydrocarbon content of the gas was determined to be 1.33 grams and $CO_2$ content of the gas was 1.70 grams.

TABLE 4

Peak and area details for FIG. 23-Example 2-400 psi stress-gas GC

| Peak Number | Ret. Time [min] | Area [pA * s] | Name |
|---|---|---|---|
| 1 | 0.910 | 1.36178e4 | Methane |
| 2 | 0.999 | 309.65613 | ? |
| 3 | 1.077 | 1.24143e4 | Ethane |
| 4 | 2.528 | 1.41685e4 | Propane |
| 5 | 4.240 | 2103.01929 | iC4 |
| 6 | 4.917 | 1035.25513 | ? |
| 7 | 5.022 | 5689.08887 | n-Butane |
| 8 | 5.298 | 450.26572 | ? |
| 9 | 5.578 | 302.56229 | ? |
| 10 | 6.125 | 33.82201 | ? |
| 11 | 6.372 | 1136.37097 | iC5 |
| 12 | 6.736 | 263.35754 | ? |
| 13 | 6.898 | 2254.86621 | n-Pentane |
| 14 | 7.066 | 7.12101 | ? |
| 15 | 7.133 | 258.31876 | ? |
| 16 | 7.293 | 126.54671 | ? |
| 17 | 7.378 | 155.60977 | ? |
| 18 | 7.598 | 6.73467 | ? |
| 19 | 7.758 | 679.95312 | ? |
| 20 | 8.133 | 27.13466 | ? |
| 21 | 8.216 | 24.77329 | ? |
| 22 | 8.339 | 124.70064 | ? |
| 23 | 8.489 | 289.12952 | 2-methyl pentane |
| 24 | 8.644 | 19.83309 | ? |
| 25 | 8.878 | 92.18938 | ? |
| 26 | 9.184 | 102.25701 | ? |
| 27 | 9.438 | 664.42584 | n-Hexane |
| 28 | 9.549 | 2.91525 | ? |
| 29 | 9.642 | 26.86672 | ? |
| 30 | 9.705 | 49.83235 | ? |
| 31 | 9.784 | 52.11239 | ? |
| 32 | 9.843 | 9.03158 | ? |
| 33 | 9.904 | 6.18217 | ? |
| 34 | 10.004 | 24.84150 | ? |

TABLE 4-continued

Peak and area details for FIG. 23-Example 2-400 psi stress-gas GC

| Peak Number | Ret. Time [min] | Area [pA * s] | Name |
|---|---|---|---|
| 35 | 10.219 | 13.21182 | ? |
| 36 | 10.292 | 158.67511 | ? |
| 37 | 10.411 | 2.49094 | ? |
| 38 | 10.566 | 3.25252 | ? |
| 39 | 11.240 | 46.79988 | ? |
| 40 | 11.478 | 29.59438 | ? |
| 41 | 11.555 | 12.84377 | ? |
| 42 | 11.809 | 38.67433 | ? |
| 43 | 11.935 | 5.68525 | ? |
| 44 | 12.096 | 31.29068 | ? |
| 45 | 12.167 | 5.84513 | ? |
| 46 | 12.297 | 15.52042 | ? |
| 47 | 12.393 | 13.54158 | ? |
| 48 | 12.483 | 30.95983 | ? |
| 49 | 12.669 | 20.21915 | ? |
| 50 | 12.929 | 229.00655 | ? |
| 51 | 13.063 | 6.38678 | ? |
| 52 | 13.196 | 10.89876 | ? |
| 53 | 13.306 | 7.91553 | ? |
| 54 | 13.435 | 5.05444 | ? |
| 55 | 13.516 | 44.42806 | ? |
| 56 | 13.894 | 20.61910 | ? |
| 57 | 14.086 | 8.32365 | ? |
| 58 | 14.313 | 2.80677 | ? |
| 59 | 14.545 | 9.18198 | ? |
| 60 | 14.605 | 4.93703 | ? |
| 61 | 14.722 | 5.06628 | ? |
| 62 | 14.865 | 46.53282 | ? |
| 63 | 14.946 | 6.55945 | ? |
| 64 | 15.010 | 2.85594 | ? |
| 65 | 15.075 | 4.05371 | ? |
| 66 | 15.131 | 9.15954 | ? |
| 67 | 15.331 | 2.16523 | ? |
| 68 | 15.421 | 3.03294 | ? |
| 69 | 15.511 | 9.73797 | ? |
| 70 | 15.562 | 5.22962 | ? |
| 71 | 15.636 | 3.73105 | ? |
| 72 | 15.771 | 54.64651 | ? |
| 73 | 15.848 | 3.95764 | ? |
| 74 | 16.010 | 3.39639 | ? |
| 75 | 16.477 | 5.49586 | ? |
| 76 | 16.552 | 6.21470 | ? |
| 77 | 16.635 | 11.08140 | ? |
| 78 | 17.257 | 2.28673 | ? |
| 79 | 17.318 | 2.82284 | ? |
| 80 | 17.433 | 11.11376 | ? |
| 81 | 17.966 | 2.54065 | ? |
| 82 | 18.090 | 14.28333 | ? |

At this point, the Parr vessel was vented to achieve atmospheric pressure, the vessel opened, and liquids collected from inside the Parr vessel. Water was separated from the hydrocarbon layer and weighed. The amount collected is noted in Table 1. The collected hydrocarbon liquids were placed in a small vial, sealed and stored in the absence of light. Any additional liquid coating the surface of the apparatus or sides of the Parr vessel was collected with a paper towel and the weight of this collected liquid added to the total liquid collected. Any liquid remaining in the Berea sandstone was extracted with methylene chloride and the weight accounted for in the liquid total reported in Table 1. The Berea sandstone cylinder and end caps were clearly blackened with organic material as a result of the heating. The organic material in the Berea was not extractable with either toluene or methylene chloride, and was therefore determined to be coke formed from the cracking of hydrocarbon liquids. After the heating experiment, the Berea was crushed and its total organic carbon (TOC) was measured. This measurement was used to estimate the amount of coke in the Berea and subsequently how much liquid must have cracked in the Berea. A constant factor of 2.283 was used to convert the TOC measured to an estimate of the amount of liquid, which must have been present to produce the carbon found in the Berea. This liquid estimated is the "inferred oil" value shown in Table 1. The solid core specimen was weighed and determined to have lost 10.29 grams as a result of heating.

Example 3

Figure 24:
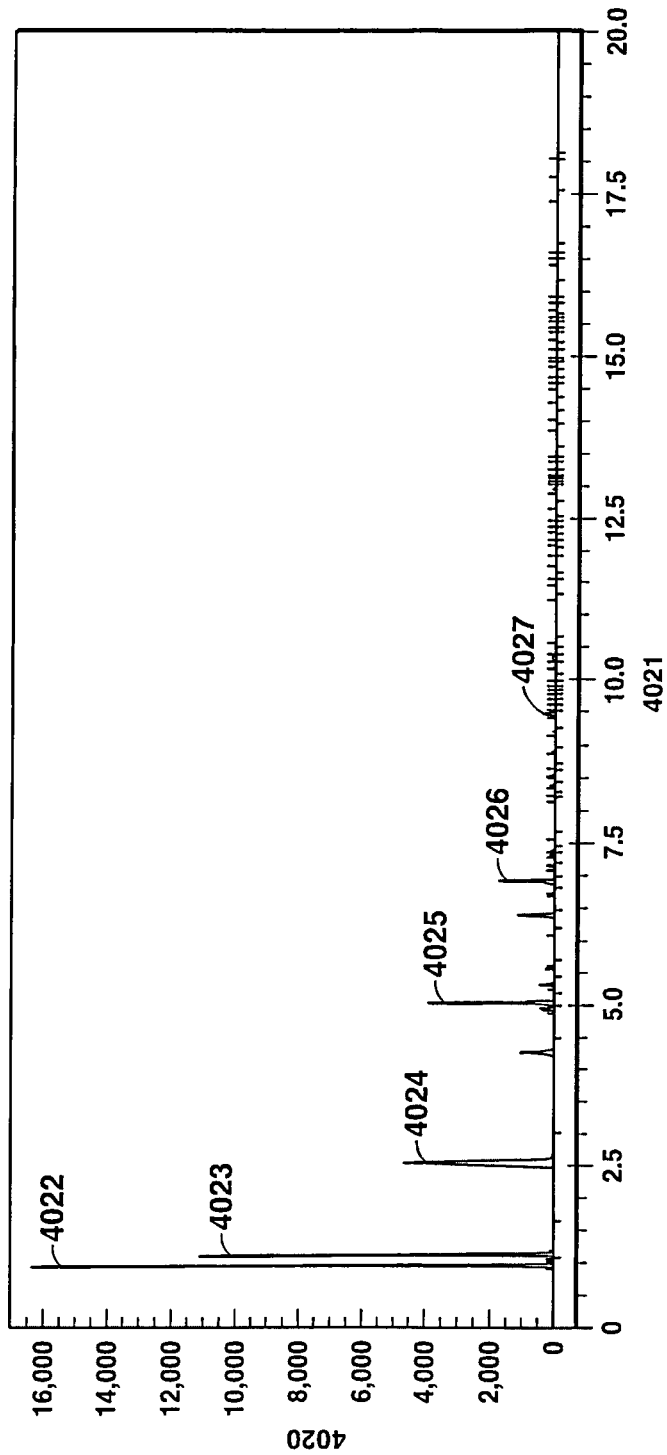
FIG. 24 is gas chromatogram of gas sampled from Example 3.
Figure 25:
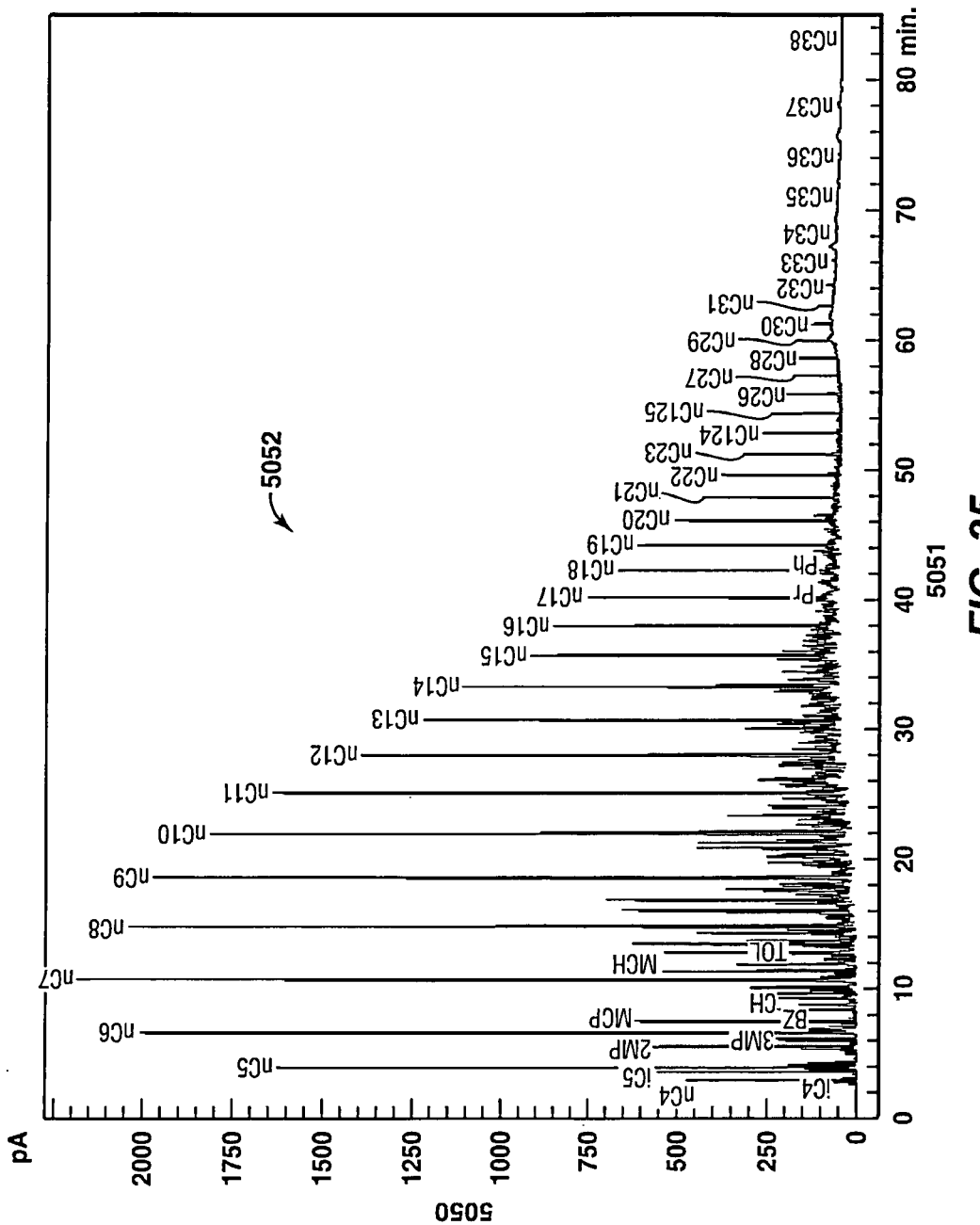
FIG. 25 is a whole oil gas chromatogram of liquid sampled from Example 3.

Conducted in a manner similar to that of Example 2 on a core specimen from oil shale block CM-1B, where the effective stress applied was 400 psi. Results for the gas sample collected and analyzed by hydrocarbon gas sample gas chromatography (GC) and non-hydrocarbon gas sample gas chromatography (GC) (GC not shown) are shown in FIG. 24, Table 5 and Table 1. In FIG. 24 the y-axis 4020 represents the detector response in pico-amperes (pA) while the x-axis 4021 represents the retention time in minutes. In FIG. 24 peak 4022 represents the response for methane, peak 4023 represents the response for ethane, peak 4024 represents the response for propane, peak 4025 represents the response for butane, peak 4026 represents the response for pentane and peak 4027 represents the response for hexane. Results for the liquid collected and analyzed by whole oil gas chromatography (WOGC) analysis are shown in FIG. 25, Table 6 and Table 1. In FIG. 25 the y-axis 5050 represents the detector response in pico-amperes (pA) while the x-axis 5051 represents the retention time in minutes. The GC chromatogram is shown generally by label 5052 with individual identified peaks labeled with abbreviations.

TABLE 5

Peak and area details for FIG. 24-Example 3-400 psi stress-gas GC

| Peak Number | Ret. Time [min] | Area [pA * s] | Name |
|---|---|---|---|
| 1 | 0.910 | 1.71356e4 | Methane |
| 2 | 0.998 | 341.71646 | ? |
| 3 | 1.076 | 1.52621e4 | Ethane |
| 4 | 2.534 | 1.72319e4 | Propane |
| 5 | 4.242 | 2564.04077 | iC4 |
| 6 | 4.919 | 1066.90942 | ? |
| 7 | 5.026 | 6553.25244 | n-Butane |
| 8 | 5.299 | 467.88803 | ? |
| 9 | 5.579 | 311.65158 | ? |
| 10 | 6.126 | 33.61063 | ? |
| 11 | 6.374 | 1280.77869 | iC5 |
| 12 | 6.737 | 250.05510 | ? |
| 13 | 6.900 | 2412.40918 | n-Pentane |
| 14 | 7.134 | 249.80679 | ? |
| 15 | 7.294 | 122.60424 | ? |
| 16 | 7.379 | 154.40988 | ? |
| 17 | 7.599 | 6.87471 | ? |
| 18 | 8.132 | 25.50270 | ? |
| 19 | 8.216 | 22.33015 | ? |
| 20 | 8.339 | 129.17023 | ? |
| 21 | 8.490 | 304.97903 | 2-methyl pentane |
| 22 | 8.645 | 18.48411 | ? |
| 23 | 8.879 | 98.23043 | ? |
| 24 | 9.187 | 89.71329 | ? |
| 25 | 9.440 | 656.02161 | n-Hexane |
| 26 | 9.551 | 3.05892 | ? |
| 27 | 9.645 | 25.34058 | ? |
| 28 | 9.708 | 45.14915 | ? |
| 29 | 9.786 | 48.62077 | ? |
| 30 | 9.845 | 10.03335 | ? |
| 31 | 9.906 | 5.43165 | ? |
| 32 | 10.007 | 22.33582 | ? |
| 33 | 10.219 | 16.02756 | ? |
| 34 | 10.295 | 196.43715 | ? |
| 35 | 10.413 | 2.98115 | ? |
| 36 | 10.569 | 3.88067 | ? |

TABLE 5-continued

Peak and area details for FIG. 24-Example 3-400 psi stress-gas GC

| Peak Number | Ret. Time [min] | Area [pA * s] | Name |
|---|---|---|---|
| 37 | 11.243 | 41.63386 | ? |
| 38 | 11.482 | 28.44063 | ? |
| 39 | 11.558 | 12.05196 | ? |
| 40 | 11.812 | 37.83630 | ? |
| 41 | 11.938 | 5.45990 | ? |
| 42 | 12.100 | 31.03111 | ? |
| 43 | 12.170 | 4.91053 | ? |
| 44 | 12.301 | 15.75041 | ? |
| 45 | 12.397 | 13.75454 | ? |
| 46 | 12.486 | 30.26099 | ? |
| 47 | 12.672 | 15.14775 | ? |
| 48 | 12.931 | 207.50433 | ? |
| 49 | 13.064 | 3.35393 | ? |
| 50 | 13.103 | 3.04880 | ? |
| 51 | 13.149 | 1.62203 | ? |
| 52 | 13.198 | 7.97665 | ? |
| 53 | 13.310 | 7.49605 | ? |
| 54 | 13.437 | 4.64921 | ? |
| 55 | 13.519 | 41.82572 | ? |
| 56 | 13.898 | 19.01739 | ? |
| 57 | 14.089 | 7.34498 | ? |
| 58 | 14.316 | 2.68912 | ? |
| 59 | 14.548 | 8.29593 | ? |
| 60 | 14.608 | 3.93147 | ? |
| 61 | 14.725 | 4.75483 | ? |
| 62 | 14.869 | 40.93447 | ? |
| 63 | 14.949 | 5.30140 | ? |
| 64 | 15.078 | 5.79979 | ? |
| 65 | 15.134 | 7.95179 | ? |
| 66 | 15.335 | 1.91589 | ? |
| 67 | 15.423 | 2.75893 | ? |
| 68 | 15.515 | 8.64343 | ? |
| 69 | 15.565 | 3.76481 | ? |
| 70 | 15.639 | 3.41854 | ? |
| 71 | 15.774 | 45.59035 | ? |
| 72 | 15.850 | 3.73501 | ? |
| 73 | 16.014 | 5.84199 | ? |
| 74 | 16.480 | 4.87036 | ? |
| 75 | 16.555 | 5.12607 | ? |
| 76 | 16.639 | 9.97469 | ? |
| 77 | 17.436 | 8.00434 | ? |
| 78 | 17.969 | 3.86749 | ? |
| 79 | 18.093 | 9.71661 | ? |

TABLE 6

Peak and area details from FIG. 25-Example 3-400 psi stress-liquid GC.

| Peak Number | Ret. Time [min] | Peak Area [pA * s] | Compound Name |
|---|---|---|---|
| 1 | 2.744 | 102.90978 | iC4 |
| 2 | 2.907 | 817.57861 | nC4 |
| 3 | 3.538 | 1187.01831 | iC5 |
| 4 | 3.903 | 3752.84326 | nC5 |
| 5 | 5.512 | 1866.25342 | 2MP |
| 6 | 5.950 | 692.18964 | 3MP |
| 7 | 6.580 | 6646.48242 | nC6 |
| 8 | 7.475 | 2117.66919 | MCP |
| 9 | 8.739 | 603.21204 | BZ |
| 10 | 9.230 | 1049.96240 | CH |
| 11 | 10.668 | 9354.29590 | nC7 |
| 12 | 11.340 | 2059.10303 | MCH |
| 13 | 12.669 | 689.82861 | TOL |
| 14 | 14.788 | 8378.59375 | nC8 |
| 15 | 18.534 | 7974.54883 | nC9 |
| 16 | 21.938 | 7276.47705 | nC10 |
| 17 | 25.063 | 6486.47998 | nC11 |
| 18 | 27.970 | 5279.17187 | nC12 |
| 19 | 30.690 | 4451.49902 | nC13 |
| 20 | 33.254 | 4156.73389 | nC14 |
| 21 | 35.672 | 3345.80273 | nC15 |

TABLE 6-continued

Peak and area details from FIG. 25-Example 3-400 psi stress-liquid GC.

| Peak Number | Ret. Time [min] | Peak Area [pA * s] | Compound Name |
|---|---|---|---|
| 22 | 37.959 | 3219.63745 | nC16 |
| 23 | 40.137 | 2708.28003 | nC17 |
| 24 | 40.227 | 219.38252 | Pr |
| 25 | 42.203 | 2413.01929 | nC18 |
| 26 | 42.455 | 317.17825 | Ph |
| 27 | 44.173 | 2206.65405 | nC19 |
| 28 | 46.056 | 1646.56616 | nC20 |
| 29 | 47.858 | 1504.49097 | nC21 |
| 30 | 49.579 | 1069.23608 | nC22 |
| 31 | 51.234 | 949.49316 | nC23 |
| 32 | 52.823 | 719.34735 | nC24 |
| 33 | 54.355 | 627.46436 | nC25 |
| 34 | 55.829 | 483.81885 | nC26 |
| 35 | 57.253 | 407.86371 | nC27 |
| 36 | 58.628 | 358.52216 | nC28 |
| 37 | 59.956 | 341.01791 | nC29 |
| 38 | 61.245 | 214.87863 | nC30 |
| 39 | 62.647 | 146.06461 | nC31 |
| 40 | 64.259 | 127.66831 | nC32 |
| 41 | 66.155 | 85.17574 | nC33 |
| 42 | 68.403 | 64.29253 | nC34 |
| 43 | 71.066 | 56.55088 | nC35 |
| 44 | 74.282 | 28.61854 | nC36 |
| 45 | 78.140 | 220.95929 | nC37 |
| 46 | 83.075 | 26.95426 | nC38 |
| Totals: | | 9.84518e4 | |

Example 4

Figure 26:
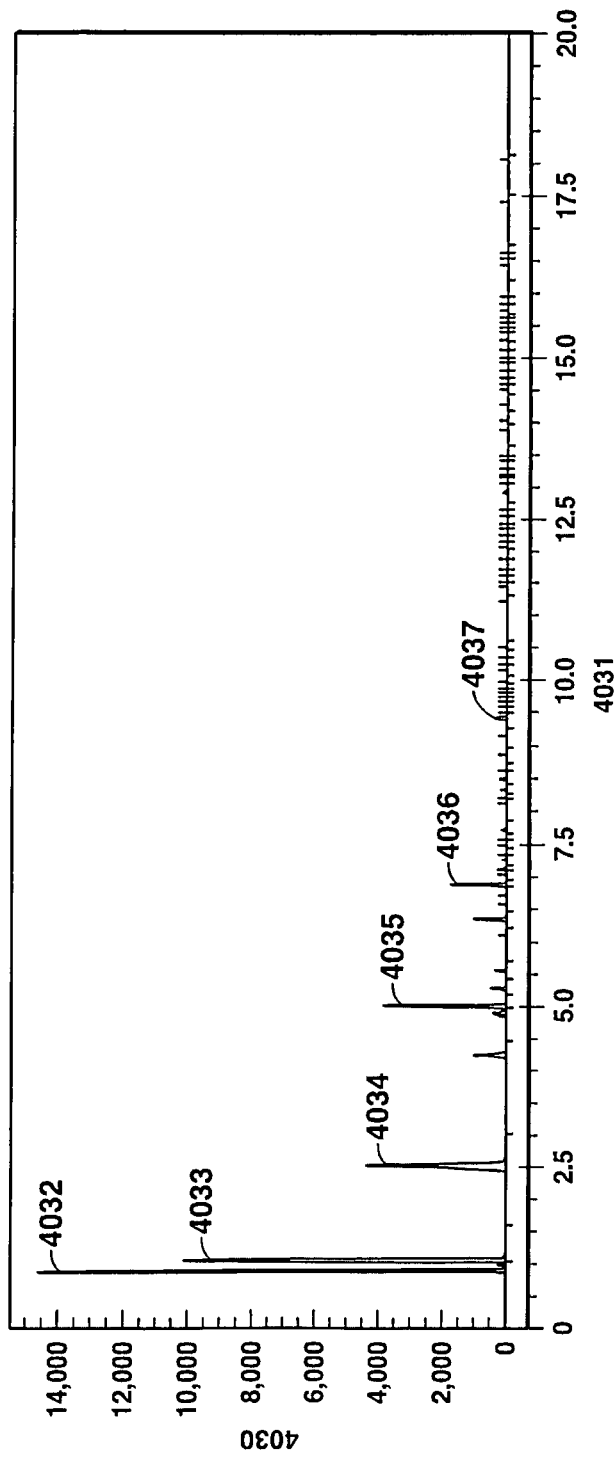
FIG. 26 is gas chromatogram of gas sampled from Example 4.
Figure 27:
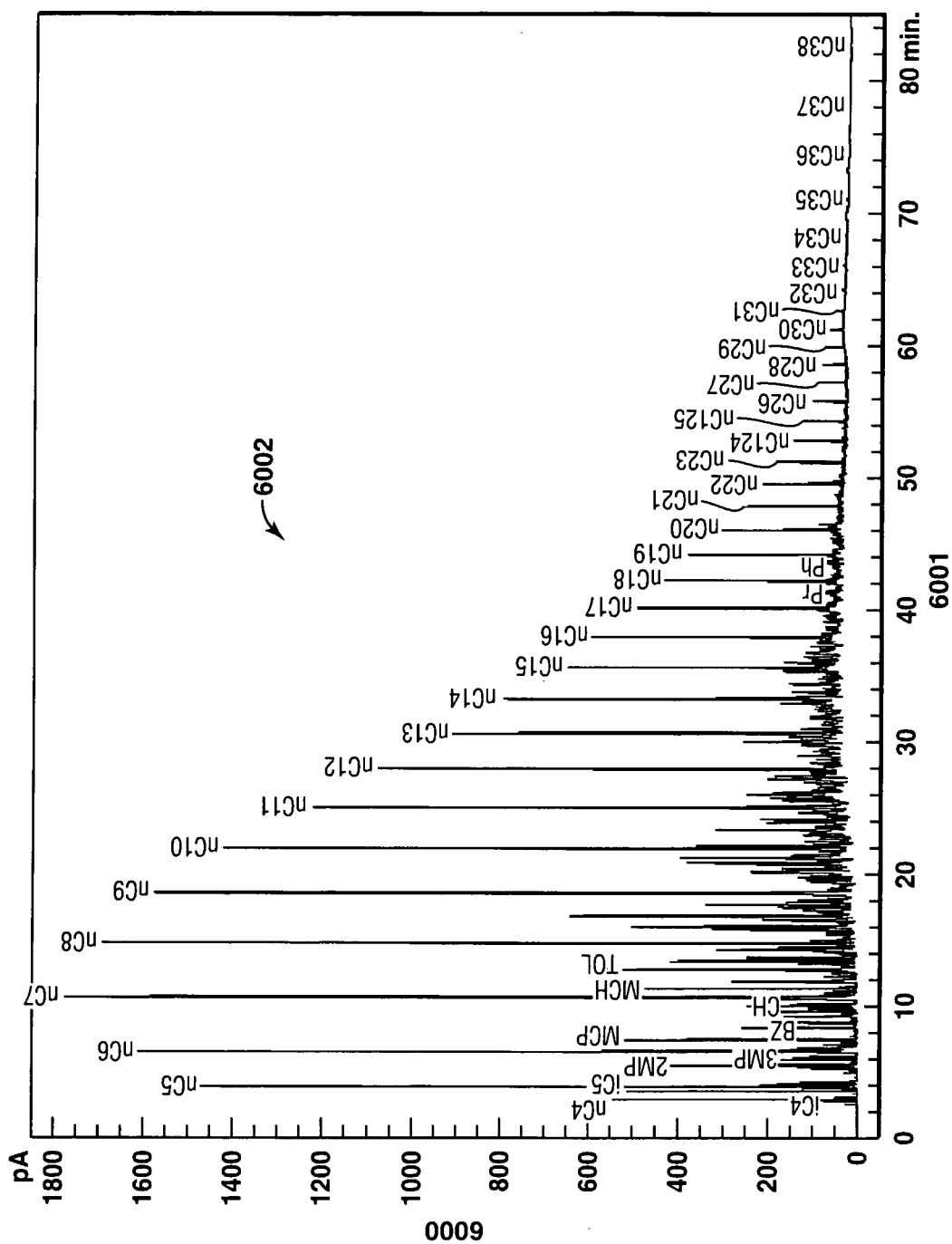
FIG. 27 is a whole oil gas chromatogram of liquid sampled from Example 4.

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 26, Table 7 and Table 1. In FIG. 26 the y-axis 4030 represents the detector response in pico-amperes (pA) while the x-axis 4031 represents the retention time in minutes. In FIG. 26 peak 4032 represents the response for methane, peak 4033 represents the response for ethane, peak 4034 represents the response for propane, peak 4035 represents the response for butane, peak 4036 represents the response for pentane and peak 4037 represents the response for hexane. Results for the liquid collected and analyzed by whole oil gas chromatography (WOGC) are shown in FIG. 27, Table 8 and Table 1. In FIG. 27 the y-axis 6000 represents the detector response in pico-amperes (pA) while the x-axis 6001 represents the retention time in minutes. The GC chromatogram is shown generally by label 6002 with individual identified peaks labeled with abbreviations.

TABLE 7

Peak and area details for FIG. 26-Example 4-1000 psi stress-gas GC

| Peak Number | Ret. Time [min] | Area [pA * s] | Name |
|---|---|---|---|
| 1 | 0.910 | 1.43817e4 | Methane |
| 2 | 1.000 | 301.69287 | ? |
| 3 | 1.078 | 1.37821e4 | Ethane |
| 4 | 2.541 | 1.64047e4 | Propane |
| 5 | 4.249 | 2286.08032 | iC4 |
| 6 | 4.924 | 992.04395 | ? |
| 7 | 5.030 | 6167.50000 | n-Butane |
| 8 | 5.303 | 534.37000 | ? |
| 9 | 5.583 | 358.96567 | ? |
| 10 | 6.131 | 27.44937 | ? |
| 11 | 6.376 | 1174.68872 | iC5 |
| 12 | 6.740 | 223.61662 | ? |
| 13 | 6.902 | 2340.79248 | n-Pentane |
| 14 | 7.071 | 5.29245 | ? |
| 15 | 7.136 | 309.94775 | ? |
| 16 | 7.295 | 154.59171 | ? |
| 17 | 7.381 | 169.53279 | ? |
| 18 | 7.555 | 2.80458 | ? |
| 19 | 7.601 | 5.22327 | ? |
| 20 | 7.751 | 117.69164 | ? |
| 21 | 8.134 | 29.41086 | ? |
| 22 | 8.219 | 19.39338 | ? |
| 23 | 8.342 | 133.52739 | ? |
| 24 | 8.492 | 281.61343 | 2-methyl pentane |
| 25 | 8.647 | 22.19704 | ? |
| 26 | 8.882 | 99.56919 | ? |
| 27 | 9.190 | 86.65676 | ? |
| 28 | 9.443 | 657.28754 | n-Hexane |
| 29 | 9.552 | 4.12572 | ? |
| 30 | 9.646 | 34.33701 | ? |
| 31 | 9.710 | 59.12064 | ? |
| 32 | 9.788 | 62.97972 | ? |
| 33 | 9.847 | 15.13559 | ? |
| 34 | 9.909 | 6.88310 | ? |
| 35 | 10.009 | 29.11555 | ? |
| 36 | 10.223 | 23.65434 | ? |
| 37 | 10.298 | 173.95422 | ? |
| 38 | 10.416 | 3.37255 | ? |
| 39 | 10.569 | 7.64592 | ? |
| 40 | 11.246 | 47.30062 | ? |
| 41 | 11.485 | 32.04262 | ? |
| 42 | 11.560 | 13.74583 | ? |
| 43 | 11.702 | 2.68917 | ? |
| 44 | 11.815 | 36.51670 | ? |
| 45 | 11.941 | 6.45255 | ? |
| 46 | 12.103 | 28.44484 | ? |
| 47 | 12.172 | 5.96475 | ? |
| 48 | 12.304 | 17.59856 | ? |
| 49 | 12.399 | 15.17446 | ? |
| 50 | 12.490 | 31.96492 | ? |
| 51 | 12.584 | 3.27834 | ? |
| 52 | 12.675 | 14.08259 | ? |
| 53 | 12.934 | 207.21574 | ? |
| 54 | 13.105 | 8.29743 | ? |
| 55 | 13.151 | 2.25476 | ? |
| 56 | 13.201 | 8.36965 | ? |
| 57 | 13.312 | 9.49917 | ? |
| 58 | 13.436 | 6.09893 | ? |
| 59 | 13.521 | 46.34579 | ? |
| 60 | 13.900 | 20.53506 | ? |
| 61 | 14.090 | 8.41120 | ? |
| 62 | 14.318 | 4.36870 | ? |
| 63 | 14.550 | 8.68951 | ? |
| 64 | 14.610 | 4.39150 | ? |
| 65 | 14.727 | 4.35713 | ? |
| 66 | 14.870 | 37.17881 | ? |
| 67 | 14.951 | 5.78219 | ? |
| 68 | 15.080 | 5.54470 | ? |
| 69 | 15.136 | 8.07308 | ? |
| 70 | 15.336 | 2.07075 | ? |
| 71 | 15.425 | 2.67118 | ? |
| 72 | 15.516 | 8.47004 | ? |
| 73 | 15.569 | 3.89987 | ? |
| 74 | 15.641 | 3.96979 | ? |
| 75 | 15.776 | 40.75155 | ? |
| 76 | 16.558 | 5.06379 | ? |
| 77 | 16.641 | 8.43767 | ? |
| 78 | 17.437 | 6.00180 | ? |
| 79 | 18.095 | 7.66881 | ? |
| 80 | 15.853 | 3.97375 | ? |
| 81 | 16.016 | 5.68997 | ? |
| 82 | 16.482 | 3.27234 | ? |

TABLE 8

Peak and area details from FIG. 27-Example 4-1000 psi stress-liquid GC.

| Peak Number | Ret. Time [min] | Peak Area [pA * s] | Compound Name |
|---|---|---|---|
| 1 | 2.737 | 117.78948 | iC4 |
| 2 | 2.901 | 923.40125 | nC4 |
| 3 | 3.528 | 1079.83325 | iC5 |
| 4 | 3.891 | 3341.44604 | nC5 |
| 5 | 5.493 | 1364.53186 | 2MP |
| 6 | 5.930 | 533.68530 | 3MP |
| 7 | 6.552 | 5160.12207 | nC6 |
| 8 | 7.452 | 1770.29932 | MCP |
| 9 | 8.717 | 487.04718 | BZ |
| 10 | 9.206 | 712.61566 | CH |
| 11 | 10.634 | 7302.51123 | nC7 |
| 12 | 11. | 1755.92236 | MCH |
| 13 | 12.760 | 2145.57666 | TOL |
| 14 | 14.755 | 6434.40430 | nC8 |
| 15 | 18.503 | 6007.12891 | nC9 |
| 16 | 21.906 | 5417.67480 | nC10 |
| 17 | 25.030 | 4565.11084 | nC11 |
| 18 | 27.936 | 3773.91943 | nC12 |
| 19 | 30.656 | 3112.23950 | nC13 |
| 20 | 33.220 | 2998.37720 | nC14 |
| 21 | 35.639 | 2304.97632 | nC15 |
| 22 | 37.927 | 2197.88892 | nC16 |
| 23 | 40.102 | 1791.11877 | nC17 |
| 24 | 40.257 | 278.39423 | Pr |
| 25 | 42.171 | 1589.64233 | nC18 |
| 26 | 42.428 | 241.65131 | Ph |
| 27 | 44.141 | 1442.51843 | nC19 |
| 28 | 46.025 | 1031.68481 | nC20 |
| 29 | 47.825 | 957.65479 | nC21 |
| 30 | 49.551 | 609.59943 | nC22 |
| 31 | 51.208 | 526.53339 | nC23 |
| 32 | 52.798 | 383.01022 | nC24 |
| 33 | 54.329 | 325.93640 | nC25 |
| 34 | 55.806 | 248.12935 | nC26 |
| 35 | 57.230 | 203.21725 | nC27 |
| 36 | 58.603 | 168.78055 | nC28 |
| 37 | 59.934 | 140.40034 | nC29 |
| 38 | 61.222 | 95.47594 | nC30 |
| 39 | 62.622 | 77.49546 | nC31 |
| 40 | 64.234 | 49.08135 | nC32 |
| 41 | 66.114 | 33.61663 | nC33 |
| 42 | 68.350 | 27.46170 | nC34 |
| 43 | 71.030 | 35.89277 | nC35 |
| 44 | 74.162 | 16.87499 | nC36 |
| 45 | 78.055 | 29.21477 | nC37 |
| 46 | 82.653 | 9.88631 | nC38 |
| Totals: | | 7.38198e4 | |

TABLE 9

Figure 28:
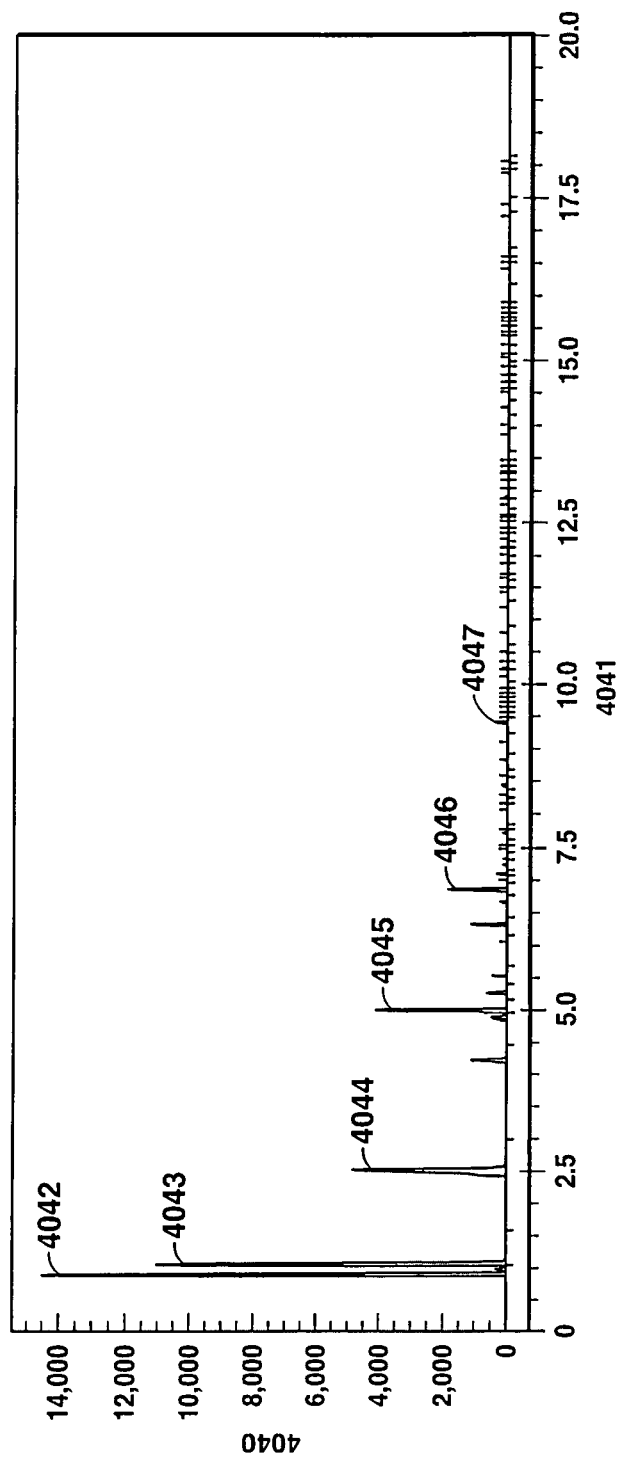
FIG. 28 is gas chromatogram of gas sampled from Example 5.

Peak and area details for FIG. 28-Example 5-1000 psi stress-gas GC

| Peak Number | Ret Time [min] | Area [pA * s] | Name |
|---|---|---|---|
| 1 | 0.910 | 1.59035e4 | Methane |
| 2 | 0.999 | 434.21375 | ? |
| 3 | 1.077 | 1.53391e4 | Ethane |
| 4 | 2.537 | 1.86530e4 | Propane |
| 5 | 4.235 | 2545.45850 | iC4 |
| 6 | 4.907 | 1192.68970 | ? |
| 7 | 5.015 | 6814.44678 | n-Butane |
| 8 | 5.285 | 687.83679 | ? |
| 9 | 5.564 | 463.25885 | ? |
| 10 | 6.106 | 30.02624 | ? |
| 11 | 6.351 | 1295.13477 | iC5 |
| 12 | 6.712 | 245.26985 | ? |
| 13 | 6.876 | 2561.11792 | n-Pentane |
| 14 | 7.039 | 4.50998 | ? |
| 15 | 7.109 | 408.32999 | ? |
| 16 | 7.268 | 204.45311 | ? |
| 17 | 7.354 | 207.92183 | ? |
| 18 | 7.527 | 4.02397 | ? |
| 19 | 7.574 | 5.65699 | ? |
| 20 | 7.755 | 2.35952 | ? |
| 21 | 7.818 | 2.00382 | ? |
| 22 | 8.107 | 38.23093 | ? |
| 23 | 8.193 | 20.54333 | ? |
| 24 | 8.317 | 148.54445 | ? |
| 25 | 8.468 | 300.31586 | 2-methyl pentane |
| 26 | 8.622 | 26.06131 | ? |
| 27 | 8.858 | 113.70123 | ? |
| 28 | 9.168 | 90.37163 | ? |
| 29 | 9.422 | 694.74438 | n-Hexane |
| 30 | 9.531 | 4.88323 | ? |
| 31 | 9.625 | 45.91505 | ? |
| 32 | 9.689 | 76.32931 | ? |
| 33 | 9.767 | 77.63214 | ? |
| 34 | 9.826 | 19.23768 | ? |
| 35 | 9.889 | 8.54605 | ? |
| 36 | 9.989 | 37.74959 | ? |
| 37 | 10.204 | 30.83943 | ? |
| 38 | 10.280 | 184.58420 | ? |
| 39 | 10.397 | 4.43609 | ? |
| 40 | 10.551 | 10.59880 | ? |
| 41 | 10.843 | 2.30370 | ? |
| 42 | 11.231 | 55.64666 | ? |
| 43 | 11.472 | 35.46931 | ? |
| 44 | 11.547 | 17.16440 | ? |
| 45 | 11.691 | 3.30460 | ? |
| 46 | 11.804 | 39.46368 | ? |
| 47 | 11.931 | 7.32969 | ? |
| 48 | 12.094 | 30.59748 | ? |
| 49 | 12.163 | 6.93754 | ? |
| 50 | 12.295 | 18.69523 | ? |
| 51 | 12.391 | 15.96837 | ? |
| 52 | 12.482 | 33.66422 | ? |
| 53 | 12.577 | 2.02121 | ? |
| 54 | 12.618 | 2.32440 | ? |
| 55 | 12.670 | 12.83803 | ? |
| 56 | 12.851 | 2.22731 | ? |
| 57 | 12.929 | 218.23195 | ? |
| 58 | 13.100 | 14.33166 | ? |
| 59 | 13.198 | 10.20244 | ? |
| 60 | 13.310 | 12.02551 | ? |
| 61 | 13.432 | 8.23884 | ? |
| 62 | 13.519 | 47.64641 | ? |
| 63 | 13.898 | 22.63760 | ? |
| 64 | 14.090 | 9.29738 | ? |
| 65 | 14.319 | 3.88012 | ? |
| 66 | 14.551 | 9.26884 | ? |
| 67 | 14.612 | 4.34914 | ? |
| 68 | 14.729 | 4.07543 | ? |
| 69 | 14.872 | 46.24465 | ? |
| 70 | 14.954 | 6.62461 | ? |
| 71 | 15.084 | 3.92423 | ? |
| 72 | 15.139 | 8.60328 | ? |
| 73 | 15.340 | 2.17899 | ? |
| 74 | 15.430 | 2.96646 | ? |

Example 5

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 28, Table 9 and Table 1. In FIG. 28 the y-axis 4040 represents the detector response in pico-amperes (pA) while the x-axis 4041 represents the retention time in minutes. In FIG. 28 peak 4042 represents the response for methane, peak 4043 represents the response for ethane, peak 4044 represents the response for propane, peak 4045 represents the response for butane, peak 4046 represents the response for pentane and peak 4047 represents the response for hexane.

TABLE 9-continued

Peak and area details for FIG. 28-Example 5-1000 psi stress-gas GC

| Peak Number | Ret Time [min] | Area [pA * s] | Name |
|---|---|---|---|
| 75 | 15.521 | 9.66407 | ? |
| 76 | 15.578 | 4.27190 | ? |
| 77 | 15.645 | 4.37904 | ? |
| 78 | 15.703 | 2.68909 | ? |
| 79 | 15.782 | 46.97895 | ? |
| 80 | 15.859 | 4.69475 | ? |
| 81 | 16.022 | 7.36509 | ? |
| 82 | 16.489 | 3.91073 | ? |
| 83 | 16.564 | 6.22445 | ? |
| 84 | 16.648 | 10.24660 | ? |
| 85 | 17.269 | 2.69753 | ? |
| 86 | 17.445 | 10.16989 | ? |
| 87 | 17.925 | 2.28341 | ? |
| 88 | 17.979 | 2.71101 | ? |
| 89 | 18.104 | 11.19730 | ? |

TABLE 1

Summary data for Examples 1-5.

|  | Example 1 | Example 2 | Example 3 | Example 4 | Example 5 |
|---|---|---|---|---|---|
| Effective Stress (psi) | 0 | 400 | 400 | 1000 | 1000 |
| Sample weight (g) | 82.46 | 42.57 | 48.34 | 43.61 | 43.73 |
| Sample weight loss (g) | 19.21 | 10.29 | 11.41 | 10.20 | 9.17 |
| Fluids Recovered: |  |  |  |  |  |
| Oil (g) | 10.91 | 3.63 | 3.77 | 3.02 | 2.10 |
|  | 36.2 gal/ton | 23.4 gal/ton | 21.0 gal/ton | 19.3 gal/ton | 13/1 gal/ton |
| Water (g) | 0.90 | 0.30 | 0.34 | 0.39 | 0.28 |
|  | 2.6 gal/ton | 1.7 gal/ton | 1.7 gal/ton | 2.1 gal/ton | 1.5 gal/ton |
| HC gas (g) | 2.09 | 1.33 | 1.58 | 1.53 | 1.66 |
|  | 683 scf/ton | 811 scf/ton | 862 scf/ton | 905 scf/ton | 974 scf/ton |
| $CO_2$ (g) | 3.35 | 1.70 | 1.64 | 1.74 | 1.71 |
|  | 700 scf/ton | 690 scf/ton | 586 scf/ton | 690 scf/ton | 673 scf/ton |
| $H_2S$ (g) | 0.06 | 0.0 | 0.0 | 0.0 | 0.0 |
| Coke Recovered: | 0.0 | 0.73 | 0.79 | .47 | 0.53 |
| Inferred Oil (g) | 0.0 | 1.67 | 1.81 | 1.07 | 1.21 |
|  | 0 gal/ton | 10.8 gal/ton | 10.0 gal/ton | 6.8 gal/ton | 7.6 gal/ton |
| Total Oil (g) | 10.91 | 5.31 | 5.58 | 4.09 | 3.30 |
|  | 36.2 gal/ton | 34.1 gal/ton | 31.0 gal/ton | 26.1 gal/ton | 20.7 gal/ton |
| Balance (g) | 1.91 | 2.59 | 3.29 | 3.05 | 2.91 |

Analysis

The gas and liquid samples obtained, through the experimental procedures and gas and liquid sample collection procedures described for Examples 1-5, were analyzed by the following hydrocarbon gas sample gas chromatography (GC) analysis methodology, non-hydrocarbon gas sample gas chromatography (GC) analysis methodology, gas sample GC peak identification and integration methodology, whole oil gas chromatography (WOGC) analysis methodology, and whole oil gas chromatography (WOGC) peak identification and integration methodology.

Gas samples collected during the heating tests as described in Examples 1-5 were analyzed for both hydrocarbon and non-hydrocarbon gases, using an Agilent Model 6890 Gas Chromatograph coupled to an Agilent Model 5973 quadrapole mass selective detector. The 6890 GC was configured with two inlets (front and back) and two detectors (front and back) with two fixed volume sample loops for sample introduction. Peak identifications and integrations were performed using the Chemstation software (Revision A.03.01) supplied with the GC instrument. For hydrocarbon gases, the GC configuration consisted of the following:

a) split/splitless inlet (back position of the GC)
b) FID (Flame ionization detector) back position of the GC
c) HP Ultra-2 (5% Phenyl Methyl Siloxane) capillary columns (two) (25 meters×200 μm ID) one directed to the FID detector, the other to an Agilent 5973 Mass Selective Detector
d) 500 μl fixed volume sample loop
e) six-port gas sampling valve
f) cryogenic (liquid nitrogen) oven cooling capability
g) Oven program −80° C. for 2 mins., 20° C./min. to 0° C., then 4° C./min to 20° C., then 10° C./min. to 100° C., hold for 1 min.
h) Helium carrier gas flow rate of 2.2 ml/min
i) Inlet temperature 100° C.
j) Inlet pressure 19.35 psi
k) Split ratio 25:1
l) FID temperature 310° C.

For non-hydrocarbon gases (e.g., argon, carbon dioxide and hydrogen sulfide) the GC configuration consisted of the following:

a) PTV (programmable temperature vaporization) inlet (front position of the GC)
b) TCD (Thermal conductivity detector) front position of the GC
c) GS-GasPro capillary column (30 meters×0.32 mm ID)
d) 100 μl fixed volume sample loop
e) six port gas sampling valve
f) Oven program: 25° C. hold for 2 min., then 10° C./min to 200° C., hold 1 min.
g) Helium carrier gas flow rate of 4.1 ml/min.
h) Inlet temperature 200° C.
i) Inlet pressure 14.9 psi
j) Splitless mode
k) TCD temperature 250° C.

For Examples 1-5, a stainless steel sample cylinder containing gas collected from the Parr vessel (FIG. 18) was fitted with a two stage gas regulator (designed for lecture bottle use) to reduce gas pressure to approximately twenty pounds per square inch. A septum fitting was positioned at the outlet port of the regulator to allow withdrawal of gas by means of a Hamilton model 1005 gas-tight syringe. Both the septum fitting and the syringe were purged with gas from the stainless steel sample cylinder to ensure that a representative gas sample was collected. The gas sample was then transferred to a stainless steel cell (septum cell) equipped with a pressure transducer and a septum fitting. The septum cell was connected to the fixed volume sample loop mounted on the GC by stainless steel capillary tubing. The septum cell and sample loop were evacuated for approximately 5 minutes. The evacuated septum cell was then isolated from the evacuated sample loop by closure of a needle valve positioned at the outlet of the septum cell. The gas sample was introduced into the septum cell from the gas-tight syringe through the septum fitting and a pressure recorded. The evacuated sample loop was then opened to the pressurized septum cell and the gas sample allowed to equilibrate between the sample loop and the septum cell for one minute. The equilibrium pressure was then recorded, to allow calculation of the total moles of gas present in the sample loop before injection into the GC inlet. The sample loop contents were then swept into the inlet by Helium carrier gas and components separated by retention time in the capillary column, based upon the GC oven temperature program and carrier gas flow rates.

Calibration curves, correlating integrated peak areas with concentration, were generated for quantification of gas compositions using certified gas standards. For hydrocarbon gases, standards containing a mixture of methane, ethane, propane, butane, pentane and hexane in a helium matrix in varying concentrations (parts per million, mole basis) were injected into the GC through the fixed volume sample loop at atmospheric pressure. For non-hydrocarbon gases, standards containing individual components, i.e., carbon dioxide in helium and hydrogen sulfide in natural gas, were injected into the GC at varying pressures in the sample loop to generate calibration curves.

The hydrocarbon gas sample molar percentages reported in FIG. 16 were obtained using the following procedure. Gas standards for methane, ethane, propane, butane, pentane and hexane of at least three varying concentrations were run on the gas chromatograph to obtain peak area responses for such standard concentrations. The known concentrations were then correlated to the respective peak area responses within the Chemstation software to generate calibration curves for methane, ethane, propane, butane, pentane and hexane. The calibration curves were plotted in Chemstation to ensure good linearity ($R2>0.98$) between concentration and peak intensity. A linear fit was used for each calibrated compound, so that the response factor between peak area and molar concentration was a function of the slope of the line as determined by the Chemstation software. The Chemstation software program then determined a response factor relating GC peak area intensity to the amount of moles for each calibrated compound. The software then determined the number of moles of each calibrated compound from the response factor and the peak area. The peak areas used in Examples 1-5 are reported in Tables 2, 4, 5, 7, and 9. The number of moles of each identified compound for which a calibration curve was not determined (i.e., iso-butane, iso-pentane, and 2-methyl pentane) was then estimated using the response factor for the closest calibrated compound (i.e., butane for iso-butane; pentane for iso-pentane; and hexane for 2-methyl pentane) multiplied by the ratio of the peak area for the identified compound for which a calibration curve was not determined to the peak area of the calibrated compound. The values reported in FIG. 16 were then taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal $C_6$ molar percentages for all of the experiments do not include the molar contribution of the unidentified hydrocarbon gas species listed in Tables 2, 4, 5, 7, or 9 (e.g., peak numbers 2, 6, 8-11, 13, 15-22, 24-26, and 28-78 in Table 2).

Liquid samples collected during the heating tests as described in Examples 1, 3 and 4 were analyzed by whole oil gas chromatography (WOGC) according to the following procedure. Samples, QA/QC standards and blanks (carbon disulfide) were analyzed using an Ultra 1 Methyl Siloxane column (25 m length, 0.32 µm diameter, 0.52 µm film thickness) in an Agilent 6890 GC equipped with a split/splitless injector, autosampler and flame ionization detector (FID). Samples were injected onto the capillary column in split mode with a split ratio of 80:1. The GC oven temperature was kept constant at 20° C. for 5 min, programmed from 20° C. to 300° C. at a rate of 5° C.min$^{-1}$, and then maintained at 300° C. for 30 min (total run time=90 min.). The injector temperature was maintained at 300° C. and the FID temperature set at 310° C. Helium was used as carrier gas at a flow of 2.1 mL min$^{-1}$. Peak identifications and integrations were performed using Chemstation software Rev.A.10.02 [1757] (Agilent Tech. 1990-2003) supplied with the Agilent instrument.

Standard mixtures of hydrocarbons were analyzed in parallel by the WOGC method described above and by an Agilent 6890 GC equipped with a split/splitless injector, autosampler and mass selective detector (MS) under the same conditions. Identification of the hydrocarbon compounds was conducted by analysis of the mass spectrum of each peak from the GC-MS. Since conditions were identical for both instruments, peak identification conducted on the GC-MS could be transferred to the peaks obtained on the GC-FID. Using these data, a compound table relating retention time and peak identification was set up in the GC-FID Chemstation. This table was used for peak identification.

The gas chromatograms obtained on the liquid samples (FIGS. 4, 9 and 11) were analyzed using a pseudo-component technique. The convention used for identifying each pseudo-component was to integrate all contributions from normal alkane to next occurring normal alkane with the pseudo-component being named by the late eluting n-alkane. For example, the C-10 pseudo-component would be obtained from integration beginning just past normal-$C_9$ and continue just through normal-$C_{10}$. The carbon number weight % and mole % values for the pseudo-components obtained in this manner were assigned using correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655). Results of the pseudo-component analyses for Examples 1, 3 and 4 are shown in Tables 10, 11 and 12.

An exemplary pseudo component weight percent calculation is presented below with reference to Table 10 for the $C_{10}$ pseudo component for Example 1 in order to illustrate the technique. First, the C-10 pseudo-component total area is obtained from integration of the area beginning just past normal-$C_9$ and continued just through normal-$C_{10}$ as described above. The total integration area for the $C_{10}$ pseudo component is 10551.700 pico-ampere-seconds (pAs). The total $C_{10}$ pseudo component integration area (10551.700 pAs) is then multiplied by the $C_{10}$ pseudo component density (0.7780 g/ml) to yield an "area X density" of 8209.22 pAs g/ml. Similarly, the peak integration areas for each pseudo component and all lighter listed compounds (i.e., nC3, iC4, nC4, iC5 & nC5) are determined and multiplied by their respective densities to yield "area X density" numbers for each respective pseudo component and listed compound. The respective determined "area X density" numbers for each pseudo component and listed compound is then summed to determine a "total area X density" number. The "total area X density" number for Example 1 is 96266.96 pAs g/ml. The $C_{10}$ pseudo component weight percentage is then obtained by dividing the $C_{10}$ pseudo component "area X density" number (8209.22 pAs g/ml) by the "total area X density" number (96266.96 pAs g/ml) to obtain the $C_{10}$ pseudo component weight percentage of 8.53 weight percent.

An exemplary pseudo component molar percent calculation is presented below with reference to Table 10 for the $C_{10}$ pseudo component for Example 1 in order to further illustrate the pseudo component technique. First, the C-10 pseudo-component total area is obtained from integration of the area beginning just past normal-$C_9$ and continued just through normal-$C_{10}$ as described above. The total integration area for the $C_{10}$ pseudo component is 10551.700 pico-ampere-seconds (pAs). The total $C_{10}$ pseudo component integration area (10551.700 pAs) is then multiplied by the $C_{10}$ pseudo component density (0.7780 g/ml) to yield an "area X density" of 8209.22 pAs g/ml. Similarly, the integration areas for each pseudo component and all lighter listed compounds (i.e., nC3, iC4, nC4, iC5 & nC5) are determined and multiplied by their respective densities to yield "area X density" numbers for each respective pseudo component and listed compound. The $C_{10}$ pseudo component "area X density" number (8209.22 pAs g/ml) is then divided by the $C_{10}$ pseudo component molecular weight (134.00 g/mol) to yield a $C_{10}$ pseudo component "area X density/molecular weight" number of 61.26 pAs mol/ml. Similarly, the "area X density" number for each pseudo component and listed compound is then divided by such components or compounds respective molecular weight to yield an "area X density/molecular weight" number for each respective pseudo component and listed compound. The respective determined "area X density/molecular weight" numbers for each pseudo component and listed compound is then summed to determine a "total area X density/molecular weight" number. The total "total area X density/molecular weight" number for Example 1 is 665.28 pAs mol/ml. The $C_{10}$ pseudo component molar percentage is then obtained by dividing the $C_{10}$ pseudo component "area X density/molecular weight" number (61.26 pAs mol/ml) by the "total area X density/molecular weight" number (665.28 pAs mol/ml) to obtain the $C_{10}$ pseudo component molar percentage of 9.21 molar percent.

TABLE 10

Pseudo-components for Example 1 - GC of liquid - 0 stress

| Component | Area (cts.) | Area % | Avg. Boiling Pt. (° F.) | Density (g/ml) | Molecular Wt. (g/mol) | Wt. % | Mol % |
|---|---|---|---|---|---|---|---|
| $nC_3$ | 41.881 | 0.03 | −43.73 | 0.5069 | 44.10 | 0.02 | 0.07 |
| $iC_4$ | 120.873 | 0.10 | 10.94 | 0.5628 | 58.12 | 0.07 | 0.18 |
| $nC_4$ | 805.690 | 0.66 | 31.10 | 0.5840 | 58.12 | 0.49 | 1.22 |
| $iC_5$ | 1092.699 | 0.89 | 82.13 | 0.6244 | 72.15 | 0.71 | 1.42 |
| $nC_5$ | 2801.815 | 2.29 | 96.93 | 0.6311 | 72.15 | 1.84 | 3.68 |
| Pseudo $C_6$ | 7150.533 | 5.84 | 147.00 | 0.6850 | 84.00 | 5.09 | 8.76 |
| Pseudo $C_7$ | 10372.800 | 8.47 | 197.50 | 0.7220 | 96.00 | 7.78 | 11.73 |
| Pseudo $C_8$ | 11703.500 | 9.56 | 242.00 | 0.7450 | 107.00 | 9.06 | 12.25 |
| Pseudo $C_9$ | 11776.200 | 9.61 | 288.00 | 0.7640 | 121.00 | 9.35 | 11.18 |
| Pseudo $C_{10}$ | 10551.700 | 8.61 | 330.50 | 0.7780 | 134.00 | 8.53 | 9.21 |
| Pseudo $C_{11}$ | 9274.333 | 7.57 | 369.00 | 0.7890 | 147.00 | 7.60 | 7.48 |
| Pseudo $C_{12}$ | 8709.231 | 7.11 | 407.00 | 0.8000 | 161.00 | 7.24 | 6.50 |
| Pseudo $C_{13}$ | 7494.549 | 6.12 | 441.00 | 0.8110 | 175.00 | 6.31 | 5.22 |
| Pseudo $C_{14}$ | 6223.394 | 5.08 | 475.50 | 0.8220 | 190.00 | 5.31 | 4.05 |
| Pseudo $C_{15}$ | 6000.179 | 4.90 | 511.00 | 0.8320 | 206.00 | 5.19 | 3.64 |
| Pseudo $C_{16}$ | 5345.791 | 4.36 | 542.00 | 0.8390 | 222.00 | 4.66 | 3.04 |
| Pseudo $C_{17}$ | 4051.886 | 3.31 | 572.00 | 0.8470 | 237.00 | 3.57 | 2.18 |
| Pseudo $C_{18}$ | 3398.586 | 2.77 | 595.00 | 0.8520 | 251.00 | 3.01 | 1.73 |
| Pseudo $C_{19}$ | 2812.101 | 2.30 | 617.00 | 0.8570 | 263.00 | 2.50 | 1.38 |
| Pseudo $C_{20}$ | 2304.651 | 1.88 | 640.50 | 0.8620 | 275.00 | 2.06 | 1.09 |
| Pseudo $C_{21}$ | 2038.925 | 1.66 | 664.00 | 0.8670 | 291.00 | 1.84 | 0.91 |
| Pseudo $C_{22}$ | 1497.726 | 1.22 | 686.00 | 0.8720 | 305.00 | 1.36 | 0.64 |
| Pseudo $C_{23}$ | 1173.834 | 0.96 | 707.00 | 0.8770 | 318.00 | 1.07 | 0.49 |
| Pseudo $C_{24}$ | 822.762 | 0.67 | 727.00 | 0.8810 | 331.00 | 0.75 | 0.33 |
| Pseudo $C_{25}$ | 677.938 | 0.55 | 747.00 | 0.8850 | 345.00 | 0.62 | 0.26 |
| Pseudo $C_{26}$ | 532.788 | 0.43 | 766.00 | 0.8890 | 359.00 | 0.49 | 0.20 |
| Pseudo $C_{27}$ | 459.465 | 0.38 | 784.00 | 0.8930 | 374.00 | 0.43 | 0.16 |
| Pseudo $C_{28}$ | 413.397 | 0.34 | 802.00 | 0.8960 | 388.00 | 0.38 | 0.14 |
| Pseudo $C_{29}$ | 522.898 | 0.43 | 817.00 | 0.8990 | 402.00 | 0.49 | 0.18 |
| Pseudo $C_{30}$ | 336.968 | 0.28 | 834.00 | 0.9020 | 416.00 | 0.32 | 0.11 |
| Pseudo $C_{31}$ | 322.495 | 0.26 | 850.00 | 0.9060 | 430.00 | 0.30 | 0.10 |
| Pseudo $C_{32}$ | 175.615 | 0.14 | 866.00 | 0.9090 | 444.00 | 0.17 | 0.05 |
| Pseudo $C_{33}$ | 165.912 | 0.14 | 881.00 | 0.9120 | 458.00 | 0.16 | 0.05 |
| Pseudo $C_{34}$ | 341.051 | 0.28 | 895.00 | 0.9140 | 472.00 | 0.32 | 0.10 |
| Pseudo $C_{35}$ | 286.861 | 0.23 | 908.00 | 0.9170 | 486.00 | 0.27 | 0.08 |
| Pseudo $C_{36}$ | 152.814 | 0.12 | 922.00 | 0.9190 | 500.00 | 0.15 | 0.04 |
| Pseudo $C_{37}$ | 356.947 | 0.29 | 934.00 | 0.9220 | 514.00 | 0.34 | 0.10 |
| Pseudo $C_{38}$ | 173.428 | 0.14 | 947.00 | 0.9240 | 528.00 | 0.17 | 0.05 |
| Totals | 122484.217 | 100.00 | | | | 100.00 | 100.00 |

TABLE 11

Pseudo-components for Example 3 - GC of liquid - 400 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| $nC_3$ | 35.845 | 0.014 | −43.730 | 0.5069 | 44.10 | 0.01 | 0.03 |
| $iC_4$ | 103.065 | 0.041 | 10.940 | 0.5628 | 58.12 | 0.03 | 0.07 |
| $nC_4$ | 821.863 | 0.328 | 31.100 | 0.5840 | 58.12 | 0.24 | 0.62 |
| $iC_5$ | 1187.912 | 0.474 | 82.130 | 0.6244 | 72.15 | 0.37 | 0.77 |
| $nC_5$ | 3752.655 | 1.498 | 96.930 | 0.6311 | 72.15 | 1.20 | 2.45 |
| Pseudo $C_6$ | 12040.900 | 4.805 | 147.000 | 0.6850 | 84.00 | 4.17 | 7.34 |
| Pseudo $C_7$ | 20038.600 | 7.997 | 197.500 | 0.7220 | 96.00 | 7.31 | 11.26 |
| Pseudo $C_8$ | 24531.500 | 9.790 | 242.000 | 0.7450 | 107.00 | 9.23 | 12.76 |
| Pseudo $C_9$ | 25315.000 | 10.103 | 288.000 | 0.7640 | 121.00 | 9.77 | 11.94 |
| Pseudo $C_{10}$ | 22640.400 | 9.035 | 330.500 | 0.7780 | 134.00 | 8.90 | 9.82 |
| Pseudo $C_{11}$ | 20268.100 | 8.089 | 369.000 | 0.7890 | 147.00 | 8.08 | 8.13 |
| Pseudo $C_{12}$ | 18675.600 | 7.453 | 407.000 | 0.8000 | 161.00 | 7.55 | 6.93 |
| Pseudo $C_{13}$ | 16591.100 | 6.621 | 441.000 | 0.8110 | 175.00 | 6.80 | 5.74 |
| Pseudo $C_{14}$ | 13654.000 | 5.449 | 475.500 | 0.8220 | 190.00 | 5.67 | 4.41 |
| Pseudo $C_{15}$ | 13006.300 | 5.191 | 511.000 | 0.8320 | 206.00 | 5.47 | 3.92 |
| Pseudo $C_{16}$ | 11962.200 | 4.774 | 542.000 | 0.8390 | 222.00 | 5.07 | 3.38 |
| Pseudo $C_{17}$ | 8851.622 | 3.533 | 572.000 | 0.8470 | 237.00 | 3.79 | 2.36 |
| Pseudo $C_{18}$ | 7251.438 | 2.894 | 595.000 | 0.8520 | 251.00 | 3.12 | 1.84 |
| Pseudo $C_{19}$ | 5946.166 | 2.373 | 617.000 | 0.8570 | 263.00 | 2.57 | 1.45 |
| Pseudo $C_{20}$ | 4645.178 | 1.854 | 640.500 | 0.8620 | 275.00 | 2.02 | 1.09 |
| Pseudo $C_{21}$ | 4188.168 | 1.671 | 664.000 | 0.8670 | 291.00 | 1.83 | 0.93 |
| Pseudo $C_{22}$ | 2868.636 | 1.145 | 686.000 | 0.8720 | 305.00 | 1.26 | 0.61 |
| Pseudo $C_{23}$ | 2188.895 | 0.874 | 707.000 | 0.8770 | 318.00 | 0.97 | 0.45 |
| Pseudo $C_{24}$ | 1466.162 | 0.585 | 727.000 | 0.8810 | 331.00 | 0.65 | 0.29 |
| Pseudo $C_{25}$ | 1181.133 | 0.471 | 747.000 | 0.8850 | 345.00 | 0.53 | 0.23 |
| Pseudo $C_{26}$ | 875.812 | 0.350 | 766.000 | 0.8890 | 359.00 | 0.39 | 0.16 |
| Pseudo $C_{27}$ | 617.103 | 0.246 | 784.000 | 0.8930 | 374.00 | 0.28 | 0.11 |
| Pseudo $C_{28}$ | 538.147 | 0.215 | 802.000 | 0.8960 | 388.00 | 0.24 | 0.09 |
| Pseudo $C_{29}$ | 659.027 | 0.263 | 817.000 | 0.8990 | 402.00 | 0.30 | 0.11 |
| Pseudo $C_{30}$ | 1013.942 | 0.405 | 834.000 | 0.9020 | 416.00 | 0.46 | 0.16 |
| Pseudo $C_{31}$ | 761.259 | 0.304 | 850.000 | 0.9060 | 430.00 | 0.35 | 0.12 |
| Pseudo $C_{32}$ | 416.031 | 0.166 | 866.000 | 0.9090 | 444.00 | 0.19 | 0.06 |
| Pseudo $C_{33}$ | 231.207 | 0.092 | 881.000 | 0.9120 | 458.00 | 0.11 | 0.03 |
| Pseudo $C_{34}$ | 566.926 | 0.226 | 895.000 | 0.9140 | 472.00 | 0.26 | 0.08 |
| Pseudo $C_{35}$ | 426.697 | 0.170 | 908.000 | 0.9170 | 486.00 | 0.20 | 0.06 |
| Pseudo $C_{36}$ | 191.626 | 0.076 | 922.000 | 0.9190 | 500.00 | 0.09 | 0.03 |
| Pseudo $C_{37}$ | 778.713 | 0.311 | 934.000 | 0.9220 | 514.00 | 0.36 | 0.10 |
| Pseudo $C_{38}$ | 285.217 | 0.114 | 947.000 | 0.9240 | 528.00 | 0.13 | 0.04 |
| Totals | 250574.144 | 100.000 | | | | 100.00 | 100.00 |

TABLE 12

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| $nC_3$ | 44.761 | 0.023 | −43.730 | 0.5069 | 44.10 | 0.01 | 0.05 |
| $iC_4$ | 117.876 | 0.060 | 10.940 | 0.5628 | 58.12 | 0.04 | 0.11 |
| $nC_4$ | 927.866 | 0.472 | 31.100 | 0.5840 | 58.12 | 0.35 | 0.87 |
| $iC_5$ | 1082.570 | 0.550 | 82.130 | 0.6244 | 72.15 | 0.44 | 0.88 |
| $nC_5$ | 3346.533 | 1.701 | 96.930 | 0.6311 | 72.15 | 1.37 | 2.74 |
| Pseudo $C_6$ | 9579.443 | 4.870 | 147.000 | 0.6850 | 84.00 | 4.24 | 7.31 |
| Pseudo $C_7$ | 16046.200 | 8.158 | 197.500 | 0.7220 | 96.00 | 7.49 | 11.29 |
| Pseudo $C_8$ | 19693.300 | 10.012 | 242.000 | 0.7450 | 107.00 | 9.48 | 12.83 |
| Pseudo $C_9$ | 20326.300 | 10.334 | 288.000 | 0.7640 | 121.00 | 10.04 | 12.01 |
| Pseudo $C_{10}$ | 18297.600 | 9.302 | 330.500 | 0.7780 | 134.00 | 9.20 | 9.94 |
| Pseudo $C_{11}$ | 16385.600 | 8.330 | 369.000 | 0.7890 | 147.00 | 8.36 | 8.23 |
| Pseudo $C_{12}$ | 15349.000 | 7.803 | 407.000 | 0.8000 | 161.00 | 7.94 | 7.14 |
| Pseudo $C_{13}$ | 13116.500 | 6.668 | 441.000 | 0.8110 | 175.00 | 6.88 | 5.69 |
| Pseudo $C_{14}$ | 10816.100 | 5.499 | 475.500 | 0.8220 | 190.00 | 5.75 | 4.38 |
| Pseudo $C_{15}$ | 10276.900 | 5.225 | 511.000 | 0.8320 | 206.00 | 5.53 | 3.88 |
| Pseudo $C_{16}$ | 9537.818 | 4.849 | 542.000 | 0.8390 | 222.00 | 5.17 | 3.37 |
| Pseudo $C_{17}$ | 6930.611 | 3.523 | 572.000 | 0.8470 | 237.00 | 3.79 | 2.32 |
| Pseudo $C_{18}$ | 5549.802 | 2.821 | 595.000 | 0.8520 | 251.00 | 3.06 | 1.76 |
| Pseudo $C_{19}$ | 4440.457 | 2.257 | 617.000 | 0.8570 | 263.00 | 2.46 | 1.35 |
| Pseudo $C_{20}$ | 3451.250 | 1.755 | 640.500 | 0.8620 | 275.00 | 1.92 | 1.01 |
| Pseudo $C_{21}$ | 3133.251 | 1.593 | 664.000 | 0.8670 | 291.00 | 1.76 | 0.87 |
| Pseudo $C_{22}$ | 2088.036 | 1.062 | 686.000 | 0.8720 | 305.00 | 1.18 | 0.56 |
| Pseudo $C_{23}$ | 1519.460 | 0.772 | 707.000 | 0.8770 | 318.00 | 0.86 | 0.39 |
| Pseudo $C_{24}$ | 907.473 | 0.461 | 727.000 | 0.8810 | 331.00 | 0.52 | 0.23 |

TABLE 12-continued

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| Pseudo $C_{25}$ | 683.205 | 0.347 | 747.000 | 0.8850 | 345.00 | 0.39 | 0.16 |
| Pseudo $C_{26}$ | 493.413 | 0.251 | 766.000 | 0.8890 | 359.00 | 0.28 | 0.11 |
| Pseudo $C_{27}$ | 326.831 | 0.166 | 784.000 | 0.8930 | 374.00 | 0.19 | 0.07 |
| Pseudo $C_{28}$ | 272.527 | 0.139 | 802.000 | 0.8960 | 388.00 | 0.16 | 0.06 |
| Pseudo $C_{29}$ | 291.862 | 0.148 | 817.000 | 0.8990 | 402.00 | 0.17 | 0.06 |
| Pseudo $C_{30}$ | 462.840 | 0.235 | 834.000 | 0.9020 | 416.00 | 0.27 | 0.09 |
| Pseudo $C_{31}$ | 352.886 | 0.179 | 850.000 | 0.9060 | 430.00 | 0.21 | 0.07 |
| Pseudo $C_{32}$ | 168.635 | 0.086 | 866.000 | 0.9090 | 444.00 | 0.10 | 0.03 |
| Pseudo $C_{33}$ | 67.575 | 0.034 | 881.000 | 0.9120 | 458.00 | 0.04 | 0.01 |
| Pseudo $C_{34}$ | 95.207 | 0.048 | 895.000 | 0.9140 | 472.00 | 0.06 | 0.02 |
| Pseudo $C_{35}$ | 226.660 | 0.115 | 908.000 | 0.9170 | 486.00 | 0.13 | 0.04 |
| Pseudo $C_{36}$ | 169.729 | 0.086 | 922.000 | 0.9190 | 500.00 | 0.10 | 0.03 |
| Pseudo $C_{37}$ | 80.976 | 0.041 | 934.000 | 0.9220 | 514.00 | 0.05 | 0.01 |
| Pseudo $C_{38}$ | 42.940 | 0.022 | 947.000 | 0.9240 | 528.00 | 0.03 | 0.01 |
| Totals | 196699.994 | 100.000 | | | | 100.00 | 100.00 |

TOC and Rock-eval tests were performed on specimens from oil shale block CM-1B taken at the same stratigraphic interval as the specimens tested by the Parr heating method described in Examples 1-5. These tests resulted in a TOC of 21% and a Rock-eval Hydrogen Index of 872 mg/g-toc.

The TOC and rock-eval procedures described below were performed on the oil shale specimens remaining after the Parr heating tests described in Examples 1-5. Results are shown in Table 13.

The Rock-Eval pyrolysis analyses described above were performed using the following procedures. Rock-Eval pyrolysis analyses were performed on calibration rock standards (IFP standard #55000), blanks, and samples using a Delsi Rock-Eval II instrument. Rock samples were crushed, micronized, and air-dried before loading into Rock-Eval crucibles. Between 25 and 100 mg of powdered-rock samples were loaded into the crucibles depending on the total organic carbon (TOC) content of the sample. Two or three blanks were run at the beginning of each day to purge the system and stabilize the temperature. Two or three samples of IFP calibration standard #55000 with weight of 100±1 mg were run to calibrate the system. If the Rock-Eval $T_{max}$ parameter was 419° C.±2° C. on these standards, analyses proceeded with samples. The standard was also run before and after every 10 samples to monitor the instrument's performance.

The Rock-Eval pyrolysis technique involves the rate-programmed heating of a powdered rock sample to a high temperature in an inert (helium) atmosphere and the characterization of products generated from the thermal breakdown of chemical bonds. After introduction of the sample the pyrolysis oven was held isothermally at 300° C. for three minutes. Hydrocarbons generated during this stage are detected by a flame-ionization detector (FID) yielding the $S_1$ peak. The pyrolysis-oven temperature was then increased at a gradient of 25° C./minute up to 550° C., where the oven was held isothermally for one minute. Hydrocarbons generated during this step were detected by the FID and yielded the $S_2$ peak.

Hydrogen Index (HI) is calculated by normalizing the $S_2$ peak (expressed as $mg_{hydrocarbons}/g_{rock}$) to weight % TOC (Total Organic Carbon determined independently) as follows:

$$HI=(S_2/TOC)*100$$

where HI is expressed as $mg_{hydrocarbons}/g_{TOC}$

Total Organic Carbon (TOC) was determined by well known methods suitable for geological samples—i.e., any carbonate rock present was removed by acid treatment followed by combustion of the remaining material to produce and measure organic based carbon in the form of $CO_2$.

TABLE 13

TOC and Rock-eval results on oil shale specimens after the Parr heating tests

| | Example 1 | Example 2 | Example 3 | Example 4 | Example 5 |
|---|---|---|---|---|---|
| TOC (%) | 12.07 | 10.83 | 10.62 | 11.22 | 11.63 |
| HI (mg/g-toc) | 77 | 83 | 81 | 62 | 77 |

The API gravity of Examples 1-5 was estimated by estimating the room temperature specific gravity (SG) of the liquids collected and the results are reported in Table 14. The API gravity was estimated from the determined specific gravity by applying the following formula:

$$API\ gravity=(141.5/SG)-131.5$$

The specific gravity of each liquid sample was estimated using the following procedure. An empty 50 μl Hamilton Model 1705 gastight syringe was weighed on a Mettler AE 163 digital balance to determine the empty syringe weight. The syringe was then loaded by filling the syringe with a volume of liquid. The volume of liquid in the syringe was noted. The loaded syringe was then weighed. The liquid sample weight was then estimated by subtracting the loaded syringe measured weight from the measured empty syringe weight. The specific gravity was then estimated by dividing the liquid sample weight by the syringe volume occupied by the liquid sample.

TABLE 14

Estimated API Gravity of liquid samples from Examples 1-5

| | Example | | | | |
|---|---|---|---|---|---|
| | Example 1 | Example 2 | Example 3 | Example 4 | Example 5 |
| API Gravity | 29.92 | 30.00 | 27.13 | 32.70 | 30.00 |

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for heating a subsurface formation, comprising:
   forming a wellbore to the subsurface formation;
   placing a string of conductive casing proximate the bottom of the wellbore;
   running an elongated conductive element into the wellbore and within the string of conductive casing, thereby forming an annular region between the string of conductive casing and the elongated conductive element;
   filling at least a part of the annular region with an electrically conductive granular material to act as a resistive heating element;
   radially passing an electrical current through the string of conductive casing, through the granular material, and through the elongated conductive element within the casing in order to generate resistive heat within the granular material; and
   continuing to radially pass electricity through the granular material to generate additional resistive heat in order to cause in situ pyrolysis of at least some formation hydrocarbons, thereby forming hydrocarbon fluids.

2. The method of claim 1, wherein the formation hydrocarbons comprise oil shale.

3. The method of claim 2, wherein the elongated conductive element comprises a metal rod, a metal tubing, a cable or a metal wire.

4. The method of claim 2, wherein the conductive element hangs within the surrounding string of casing.

5. The method of claim 4, wherein the elongated conductive element is centralized in the string of conductive casing using electrically nonconductive centralizers, the centralizers being sized to slidably engage an inner diameter of the surrounding string of casing while permitting relative longitudinal movement between the string of casing and the conductive element.

6. The method of claim 5, wherein the centralizers are spaced at least twenty feet apart.

7. The method of claim 5, wherein the bottom of the string of casing is sealed to formation gases.

8. The method of claim 7, wherein the wellbore is pressurized with an inert gas.

9. The method of claim 2, wherein the granular material is a mixture of two or more component granular materials each with different electrical conductivity to adjust a bulk resistivity of the mixture.

10. The method of claim 2, wherein the granular material is mixed with a binder which sets after being placed in the wellbore.

11. The method of claim 10, wherein the binder is cement.

12. The method of claim 2, wherein the resistive heating element has a bulk electrical resistance that is higher than the electrical resistance of the string of conductive casing and the elongated conductive element so that resistive heat is generated primarily within the granular material when a current is passed through the string of conductive casing, the granular material and the elongated conductive element.

* * * * *